FIG. 2

| LOAN ENTRY | MISC. | SHARE ENTRY | LOAN BAL. | DATE | SHARE BAL. | LOAN ENTRY | MISC. | SHARE ENTRY | LOAN BAL. | DATE | SHARE BAL. |
|---|---|---|---|---|---|---|---|---|---|---|---|
| BAL. FWD. 500.00 | .25 F | 5.00 | | MAR. 15, 62 | 5.00 | | | | | | |
| | | 10.00 | 500.00 | APR. 1, 62 | 5.00 | | | | | | |
| | | 10.00 | 500.00 | APR. 8, 62 | 15.00 | | | | | | |
| | | 10.00 | 500.00 | APR. 15, 62 | 25.00 | | | | | | |
| 20.00 | 5.00 | 10.00 | 500.00 | APR. 22, 62 | 35.00 | | | | | | |
| | | 10.00 | 500.00 | APR. 29, 62 | 45.00 | | | | | | |
| | | 20.00 | 485.00 | MAY 1, 62 | 25.00 | | | | | | |
| | | 10.00 | 485.00 | MAY 8, 62 | 35.00 | | | | | | |
| | | 10.00 | 485.00 | MAY 15, 62 | 45.00 | | | | | | |
| | | 10.00 | 485.00 | MAY 22, 62 | 55.00 | | | | | | |
| 20.00 | 4.85 | 10.00 | 485.00 | MAY 29, 62 | 65.00 | | | | | | |
| | | 20.00 | 469.85 | JUN. 1, 62 | 45.00 | | | | | | |

INVENTORS
RUSSELL E. KNEISLEY
ANTHONY G. OSTERLOH &
WILLIAM F. SOMMER

BY Louis A Kline
Albert L. Sessler, Jr.

THEIR ATTORNEYS

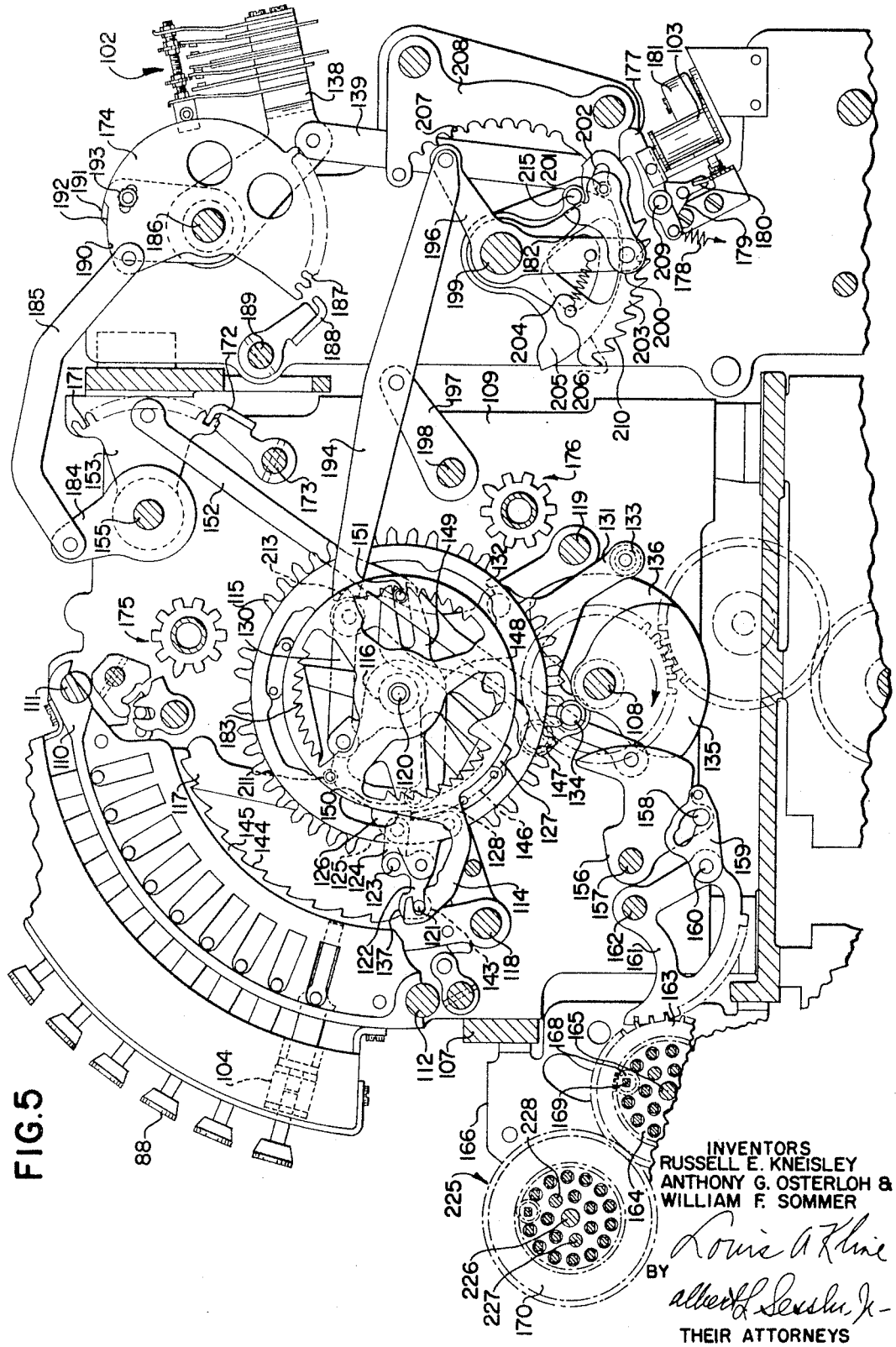

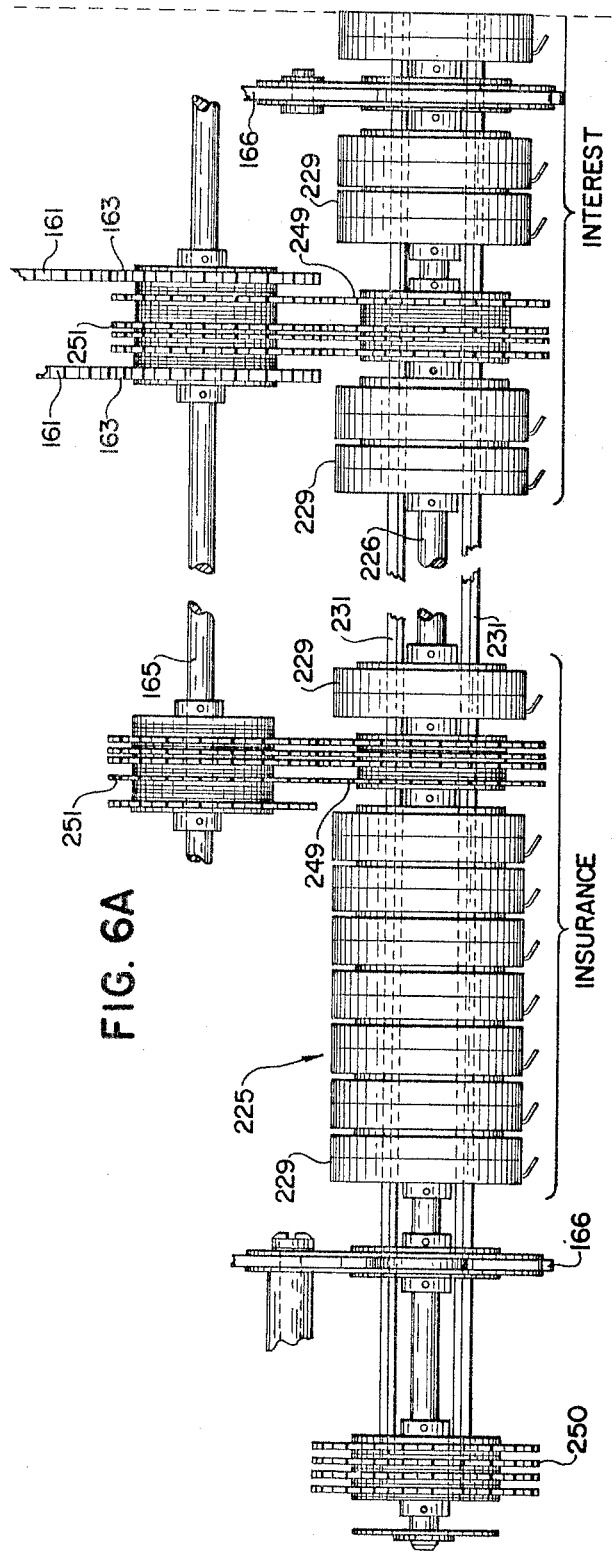

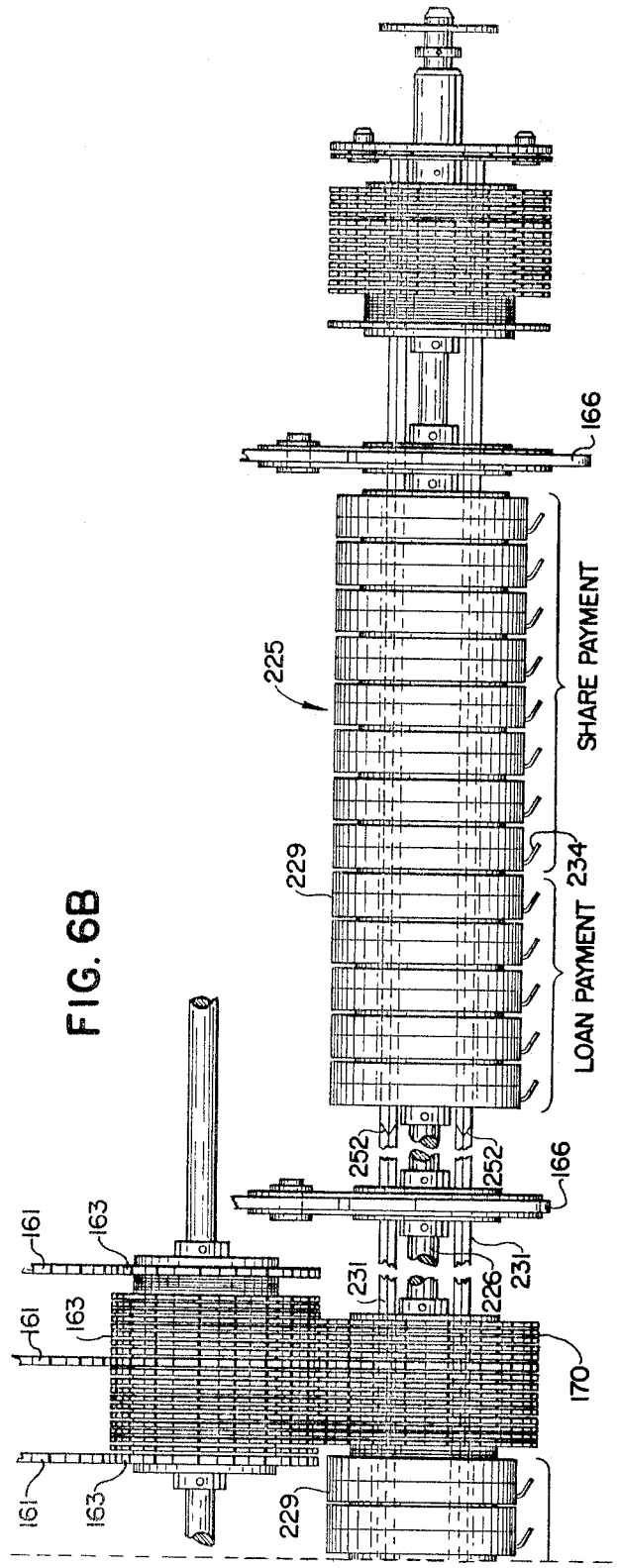

May 2, 1967 W. F. SOMMER ETAL 3,317,711
AUTOMATIC CONTROLS FOR ACCOUNTING MACHINES
Filed April 22, 1963 40 Sheets-Sheet 8

INVENTORS
RUSSELL E. KNEISLEY
ANTHONY G. OSTERLOH &
WILLIAM F. SOMMER

BY

THEIR ATTORNEYS

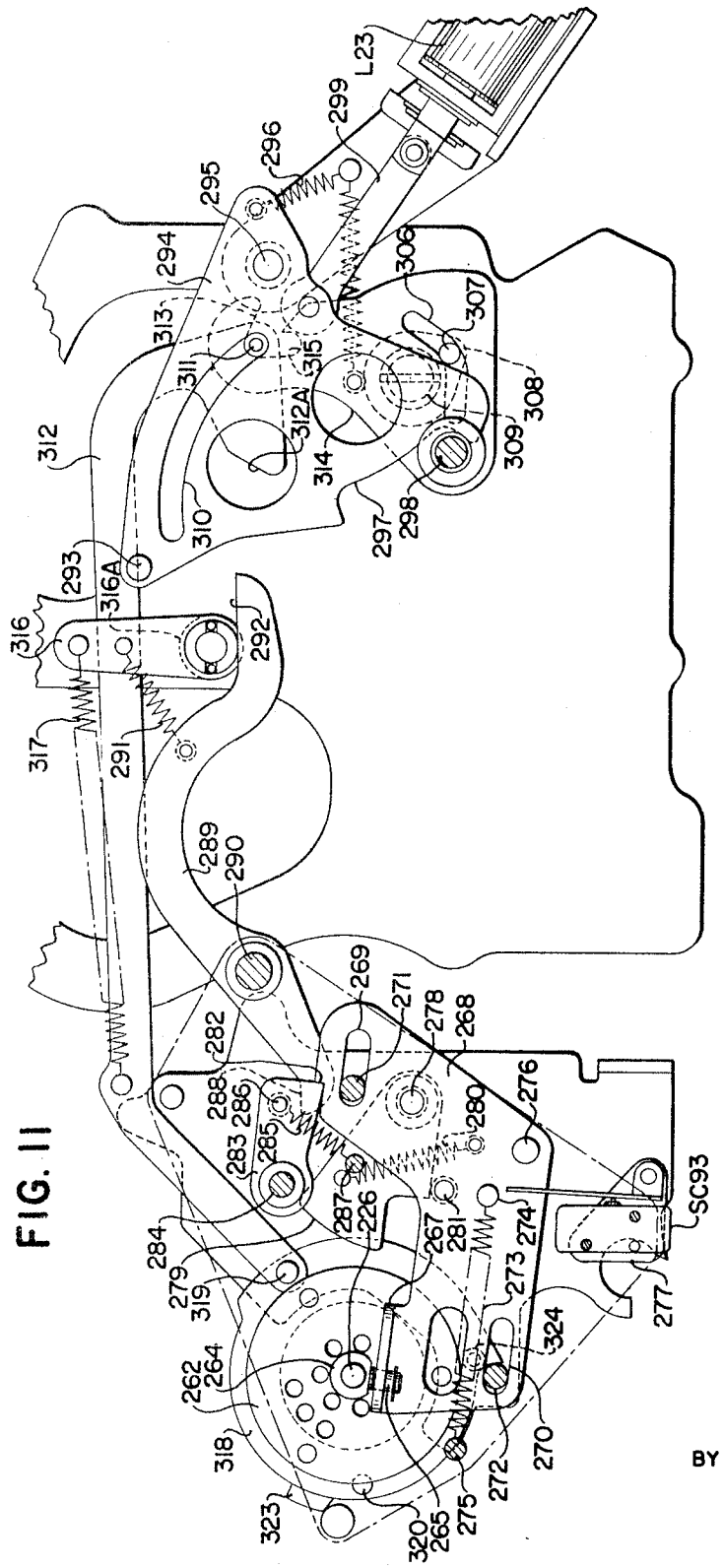

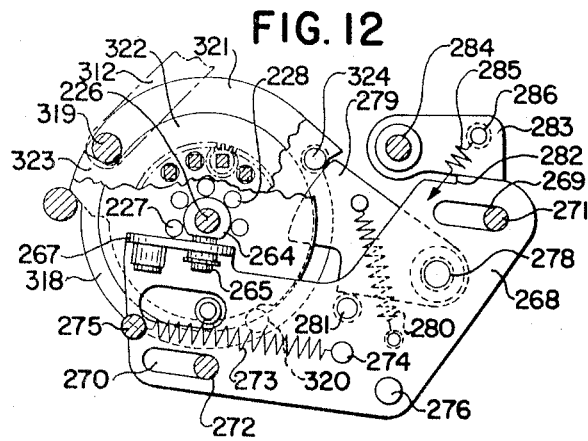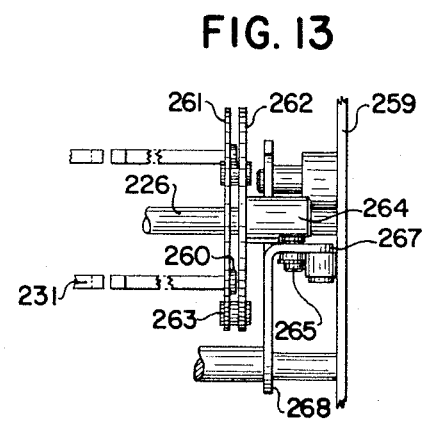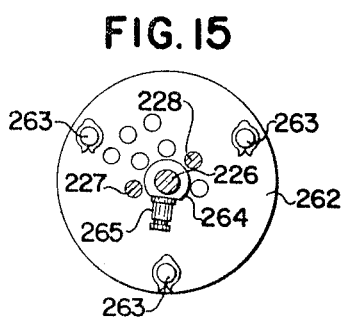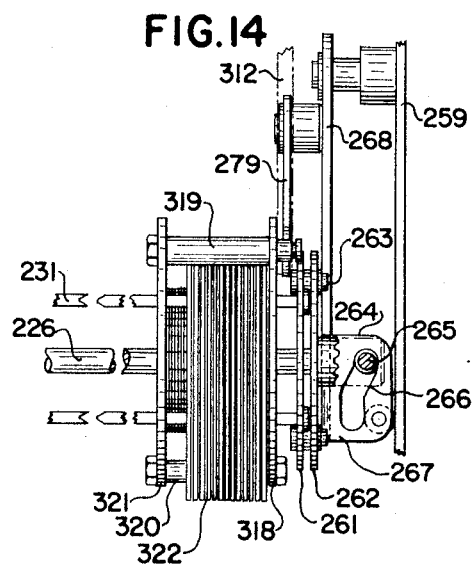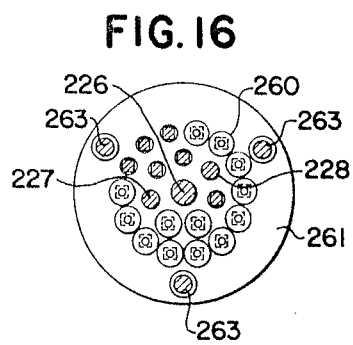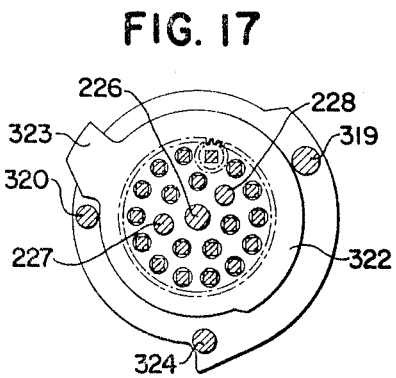

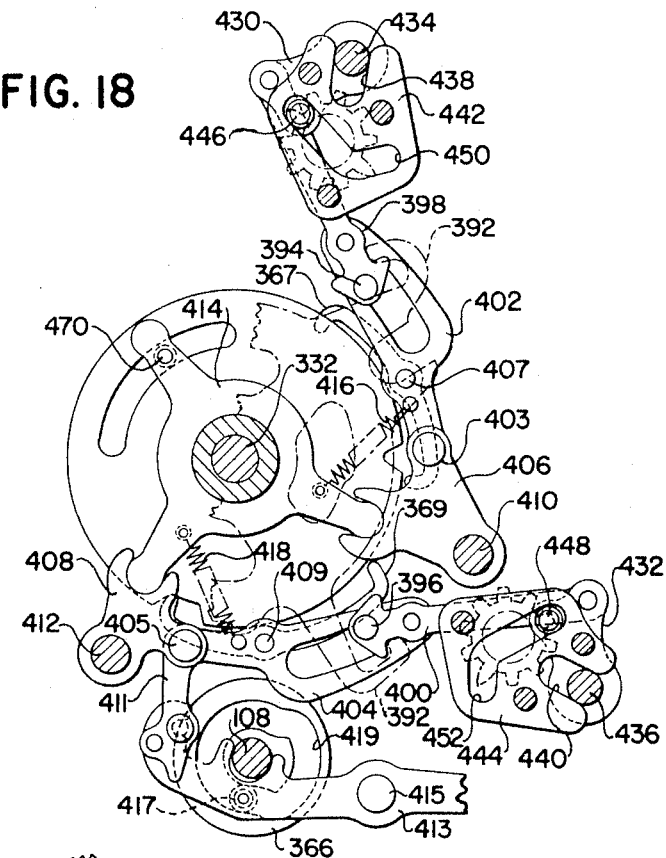
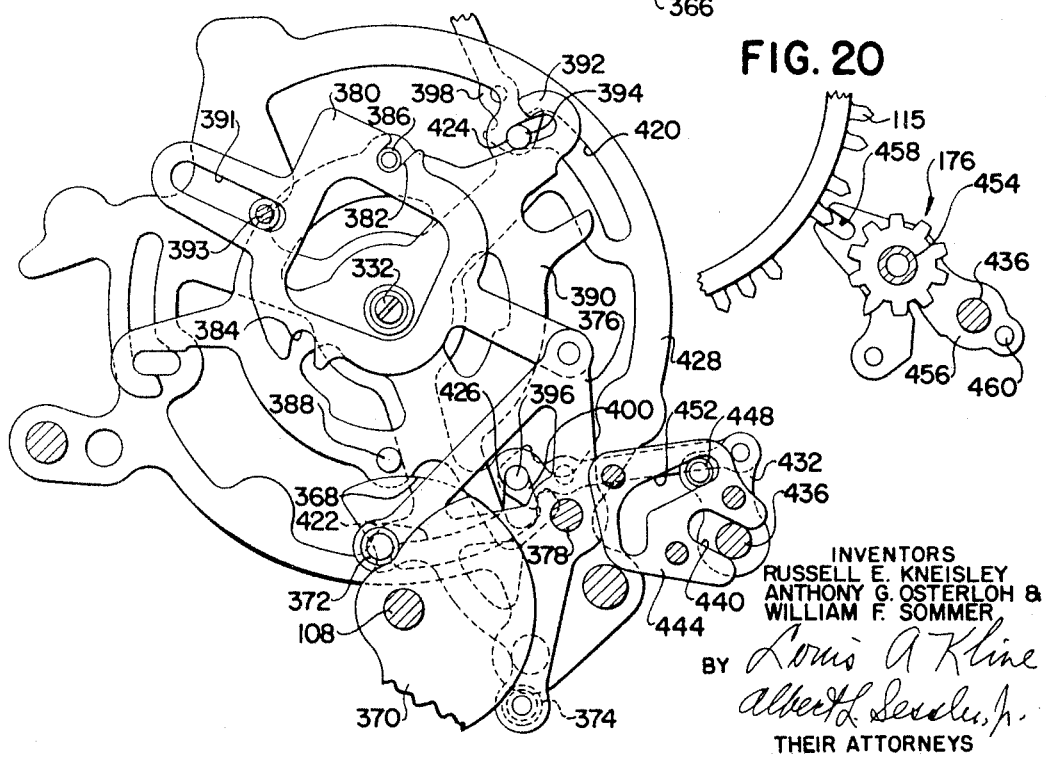

May 2, 1967  W. F. SOMMER ETAL  3,317,711
AUTOMATIC CONTROLS FOR ACCOUNTING MACHINES
Filed April 22, 1963  40 Sheets-Sheet 12

INVENTORS
RUSSELL E. KNEISLEY
ANTHONY G. OSTERLOH &
WILLIAM F. SOMMER

BY *Louis A. Kline*
*Albert L. Sessler, Jr.*

THEIR ATTORNEYS

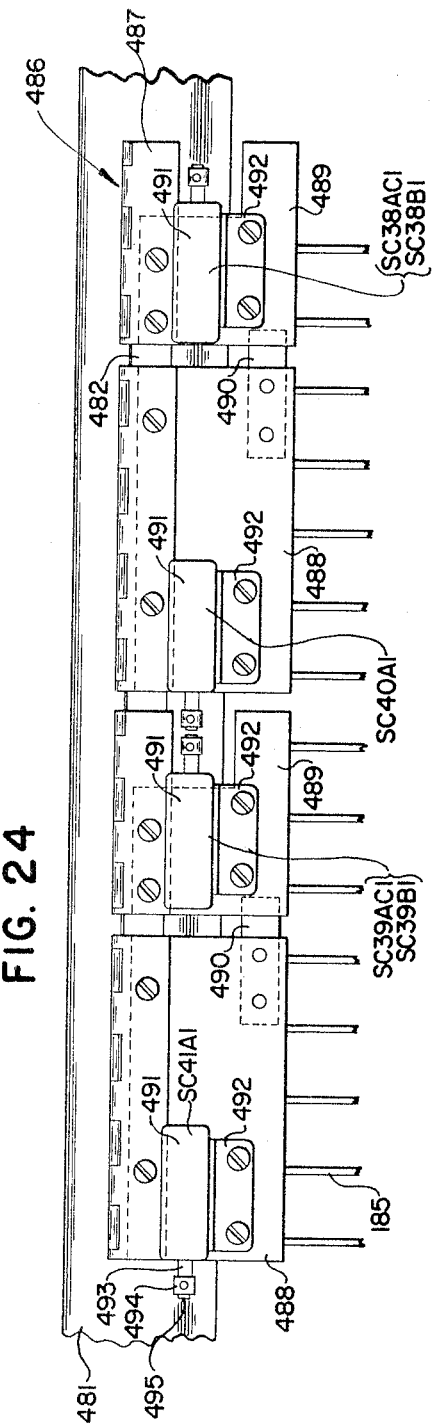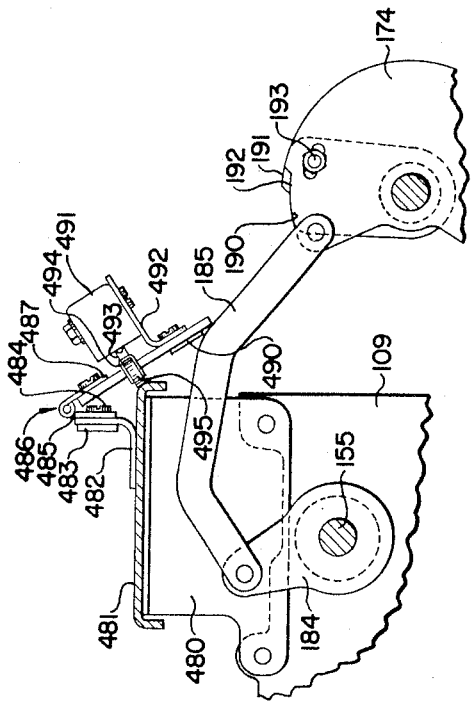

May 2, 1967 W. F. SOMMER ETAL 3,317,711
AUTOMATIC CONTROLS FOR ACCOUNTING MACHINES
Filed April 22, 1963 40 Sheets-Sheet 15

INVENTORS
RUSSELL E. KNEISLEY
ANTHONY G. OSTERLOH &
WILLIAM F. SOMMER
BY Louis A. Kline
Albert L. Sessler, Jr.
THEIR ATTORNEYS

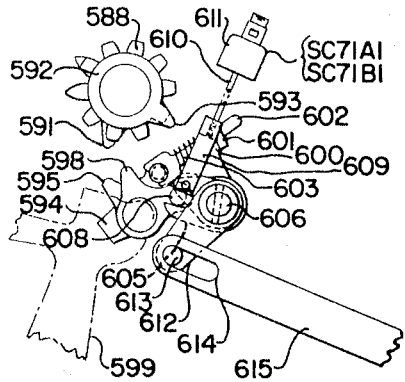
FIG. 32
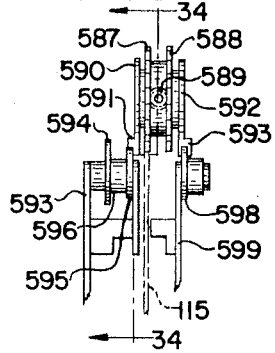
FIG. 33
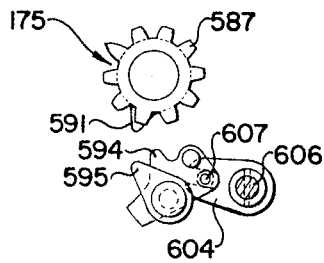
FIG. 34
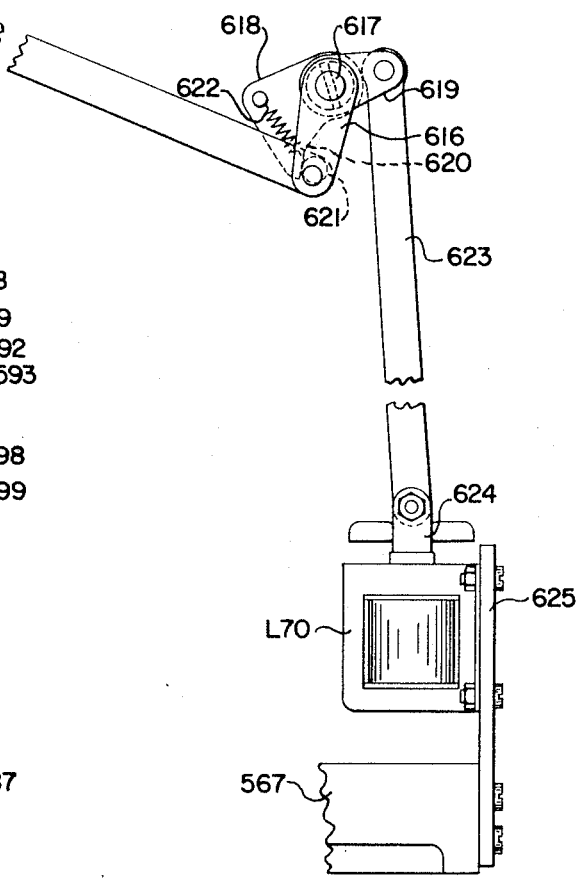
INVENTORS
RUSSELL E. KNEISLEY
ANTHONY G. OSTERLOH &
WILLIAM F. SOMMER
BY Louis A Kline
Albert L. Sessler, Jr.
THEIR ATTORNEYS

INVENTORS
RUSSELL E. KNEISLEY
ANTHONY G. OSTERLOH &
WILLIAM F. SOMMER

BY *Louis A. Kline*
*Albert L. Sessler, Jr.*
THEIR ATTORNEYS

May 2, 1967     W. F. SOMMER ET AL     3,317,711
AUTOMATIC CONTROLS FOR ACCOUNTING MACHINES
Filed April 22, 1963     40 Sheets-Sheet 19

INVENTORS—RUSSELL E. KNEISLEY,
ANTHONY G. OSTERLOH & WILLIAM F. SOMMER
BY Louis A. Kline
Albert L. Sessler, Jr.
THEIR ATTORNEYS May 2, 1967    W. F. SOMMER ET AL    3,317,711
AUTOMATIC CONTROLS FOR ACCOUNTING MACHINES
Filed April 22, 1963    40 Sheets-Sheet 20

INVENTORS — RUSSELL E. KNEISLEY,
ANTHONY G. OSTERLOH & WILLIAM F. SOMMER

BY Louis A. Kline
Albert L. Sessler
THEIR ATTORNEYS

May 2, 1967    W. F. SOMMER ETAL    3,317,711
AUTOMATIC CONTROLS FOR ACCOUNTING MACHINES
Filed April 22, 1963    40 Sheets-Sheet 21

INVENTORS—RUSSELL E. KNEISLEY,
ANTHONY OSTERLOH & WILLIAM F. SOMMER
BY Louis A. Kline
Albert L. Sessler Jr.
THEIR ATTORNEYS May 2, 1967    W. F. SOMMER ETAL    3,317,711
AUTOMATIC CONTROLS FOR ACCOUNTING MACHINES
Filed April 22, 1963    40 Sheets-Sheet 22

| | 12 | 11 | 10 | 9 | 8 | 7 | 6 | 5 | 4 | 3 | 2 | 1 |
|---|---|---|---|---|---|---|---|---|---|---|---|---|
| Q | 1 | 2 | 3 | 4 | 5 | 6 | 7 | 8 | 9 | 10 | 11 | 12 |
| R | 13 (13-36) | 14 (13-24) | 15 (13-12) | 16 (11-96) | 17 (12-63) | 18 | 19 (12-67) | 20 | 21 (12-66) | 22 | 23 (12-65) | 24 |
| S | 25 | 26 | 27 | 28 | 29 (12-56) | 30 (12-44) | 31 (8-38) | 32 (9-59) | 33 (9-47) | 34 (9-35) | 35 (9-23) | 36 (9-11) |
| T | 37 | 38 | 39 | 40 | 41 | 42 | 43 | 44 | 45 | 46 | 47 | 48 |
| U | 49 | 50 | 51 | 52 | 53 | 54 | 55 | 56 | 57 | 58 | 59 | 60 |
| V | 61 | 62 | 63 | 64 | 65 | 66 | 67 | 68 | 69 | 70 | 71 | 72 |
| W | 73 (11-47) | 74 (11-35) | 75 (11-23) | 76 (11-11) | 77 (12-62) | 78 (10-37) | 79 (8-74) | 80 (11-60) | 81 (11-48) | 82 (11-36) | 83 (11-24) | 84 (11-12) |
| X | 85 | 86 | 87 | 88 | 89 | 90 | 91 | 92 | 93 | 94 | 95 | 96 |

FIG. 45

| | 12 | 11 | 10 | 9 | 8 | 7 | 6 | 5 | 4 | 3 | 2 | 1 |
|---|---|---|---|---|---|---|---|---|---|---|---|---|
| Y | 1 (11-45) | 2 (11-33) | 3 (11-21) | 4 (11-9) | 5 (12-64) | 6 (12-61) | 7 (8-14) | 8 (11-58) | 9 (11-46) | 10 (11-34) | 11 (11-22) | 12 (11-10) |
| Z | 13 | 14 | 15 | 16 | 17 | 18 | 19 | 20 | 21 | 22 | 23 | 24 |

LOAN O.D.  WITH S.W. WITHOUT S.W.
25 (6-40) C, 26 A, 27 (7-28), 28 (7-27), 29, 30 (14-39), 31 (14-40), 32, 33 (7-52) B, 34 (12-75) C, 35 (4-13), 36 (17-48) A
37 (6-4) B, 38 (7-51), 39, 40 (14-89), 41 (6-94), 42, 43, 44, 45, 46 (14-51), 47 (4-73) B, 48 (7-26) C A
L-R PRINT K563   HOLD   SHARE O.D.   ZERO BAL. OUT SORT
49 C, 50 A, 51 (7-38) C, 52 (7-33) A, 53 (16-27), 54 (3-22), 55 B, 56 C, 57 A B, 58 C, 59 A, 60
FILLED CARD K564
61 B, 62, 63 B, 64, 65 (16-28), 66, 67 (17-38) B, 68 (2-37) C, 69 (17-51) A B, 70 (7-92) C, 71 (0-13) A, 72 (7-53)
STEP CAM   NO LOAN   REL. R-1
73 (17-31) B, 74 (6-1) C, 75, 76 (14-27) A, 77 +, 78 −, 79 (0-1) A, 80 (17-37) A, 81 B, 82 B, 83 B, 84 B
85, 86, 87, 88, 89, 90, 91 A, 92 (7-70), 93, 94, 95, 96
OVERDRAFT              90 V. D.C.        CLEAR TOTAL RELAY K506

PB507

INVENTORS—RUSSELL E. KNEISLEY,
ANTHONY G. OSTERLOH & WILLIAM F. SOMMER
BY *Louis A. Kline*
*Albert L. Sessler, Jr.*
THEIR ATTORNEY May 2, 1967    W. F. SOMMER ETAL    3,317,711
AUTOMATIC CONTROLS FOR ACCOUNTING MACHINES
Filed April 22, 1963    40 Sheets-Sheet 23

INVENTORS— RUSSELL E. KNEISLEY,
ANTHONY G. OSTERLOH & WILLIAM F. SOMMER
BY
THEIR ATTORNEY

May 2, 1967 W. F. SOMMER ET AL 3,317,711
AUTOMATIC CONTROLS FOR ACCOUNTING MACHINES
Filed April 22, 1963 40 Sheets-Sheet 24

INVENTORS— RUSSELL E. KNEISLEY,
ANTHONY G. OSTERLOH & WILLIAM F. SOMMER
BY *Louis G. Kline*
*Albert L. Sessler, Jr.*
THEIR ATTORNEYS

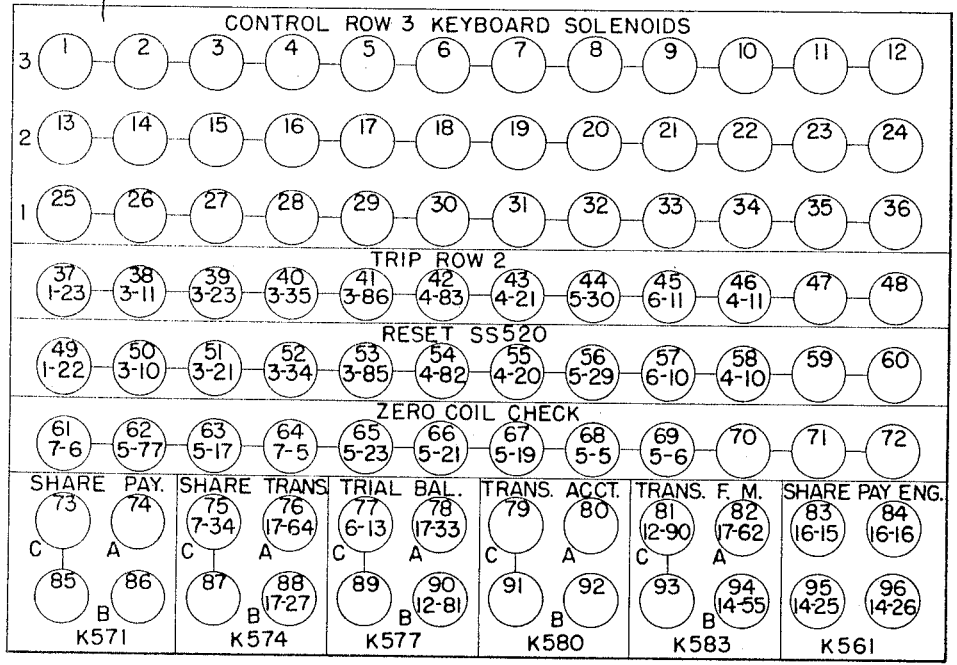

May 2, 1967 W. F. SOMMER ET AL 3,317,711
AUTOMATIC CONTROLS FOR ACCOUNTING MACHINES
Filed April 22, 1963 40 Sheets-Sheet 26

INVENTORS — RUSSELL E. KNEISLEY,
ANTHONY G. OSTERLOH & WILLIAM F. SOMMER

BY
THEIR ATTORNEYS

May 2, 1967 W. F. SOMMER ET AL 3,317,711
AUTOMATIC CONTROLS FOR ACCOUNTING MACHINES
Filed April 22, 1963 40 Sheets-Sheet 27

INVENTORS—RUSSELL E. KNEISLEY,
ANTHONY G. OSTERLOH & WILLIAM F. SOMMER
BY Louis A. Kline
Albert L. Sessler, Jr.
THEIR ATTORNEYS

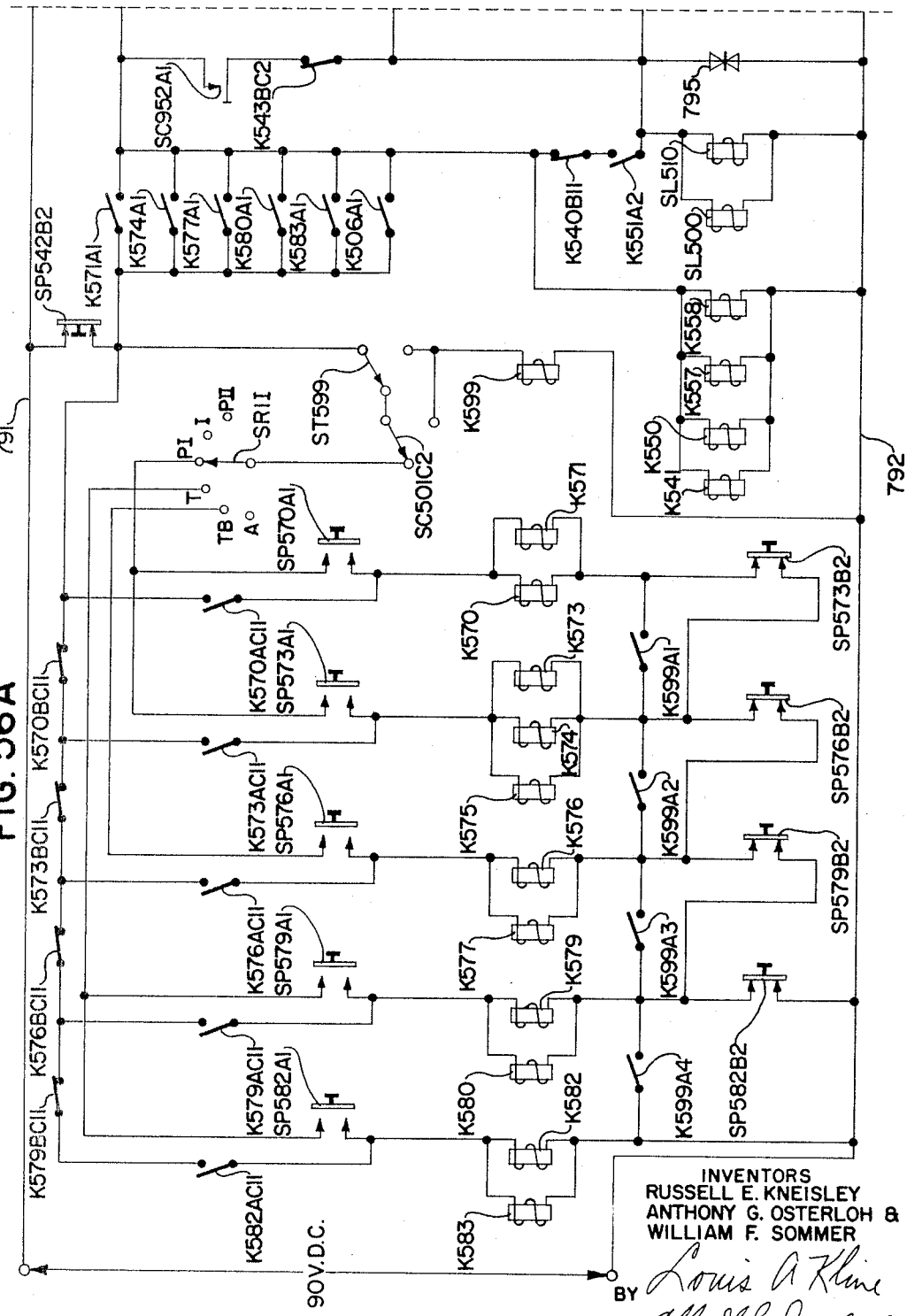

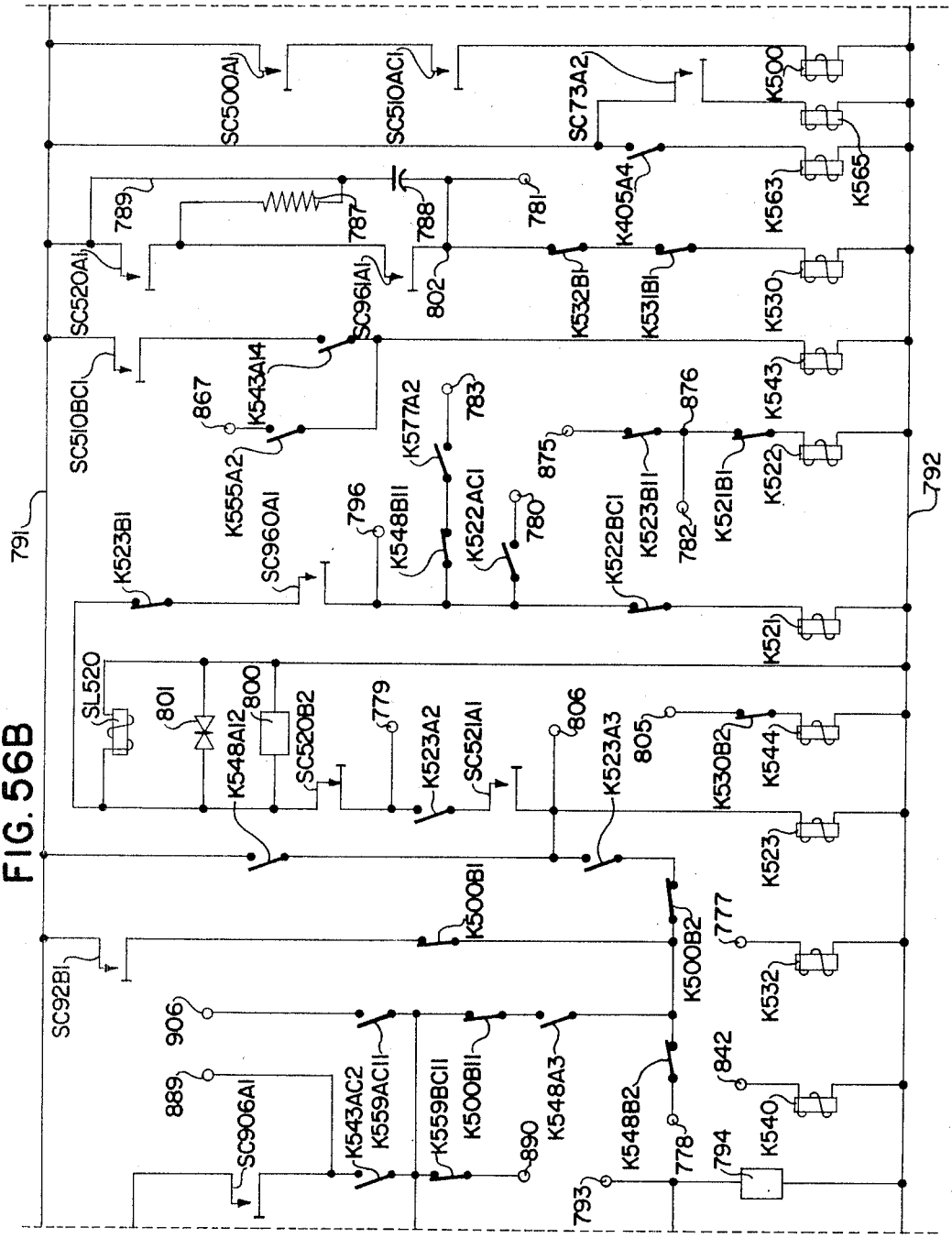

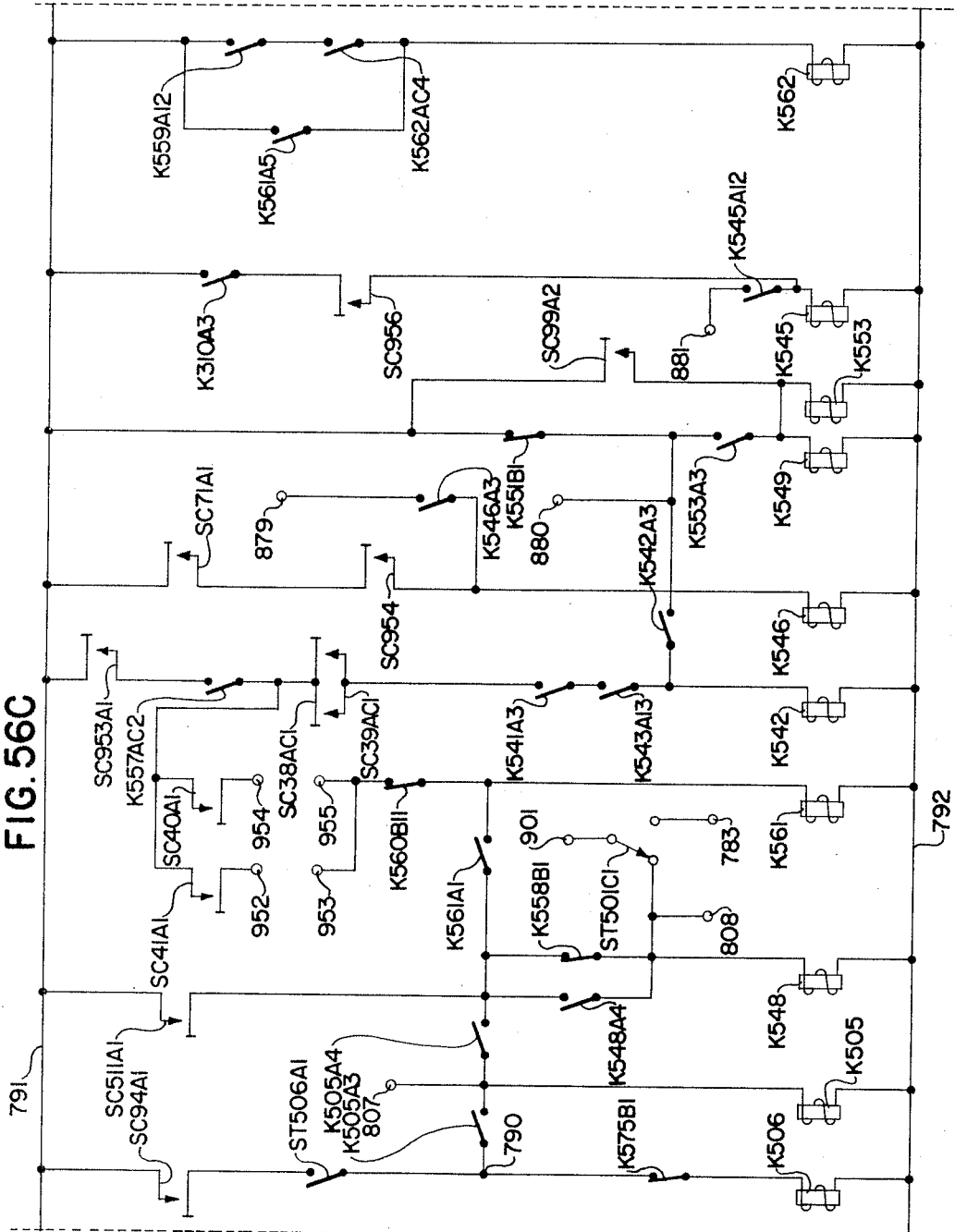

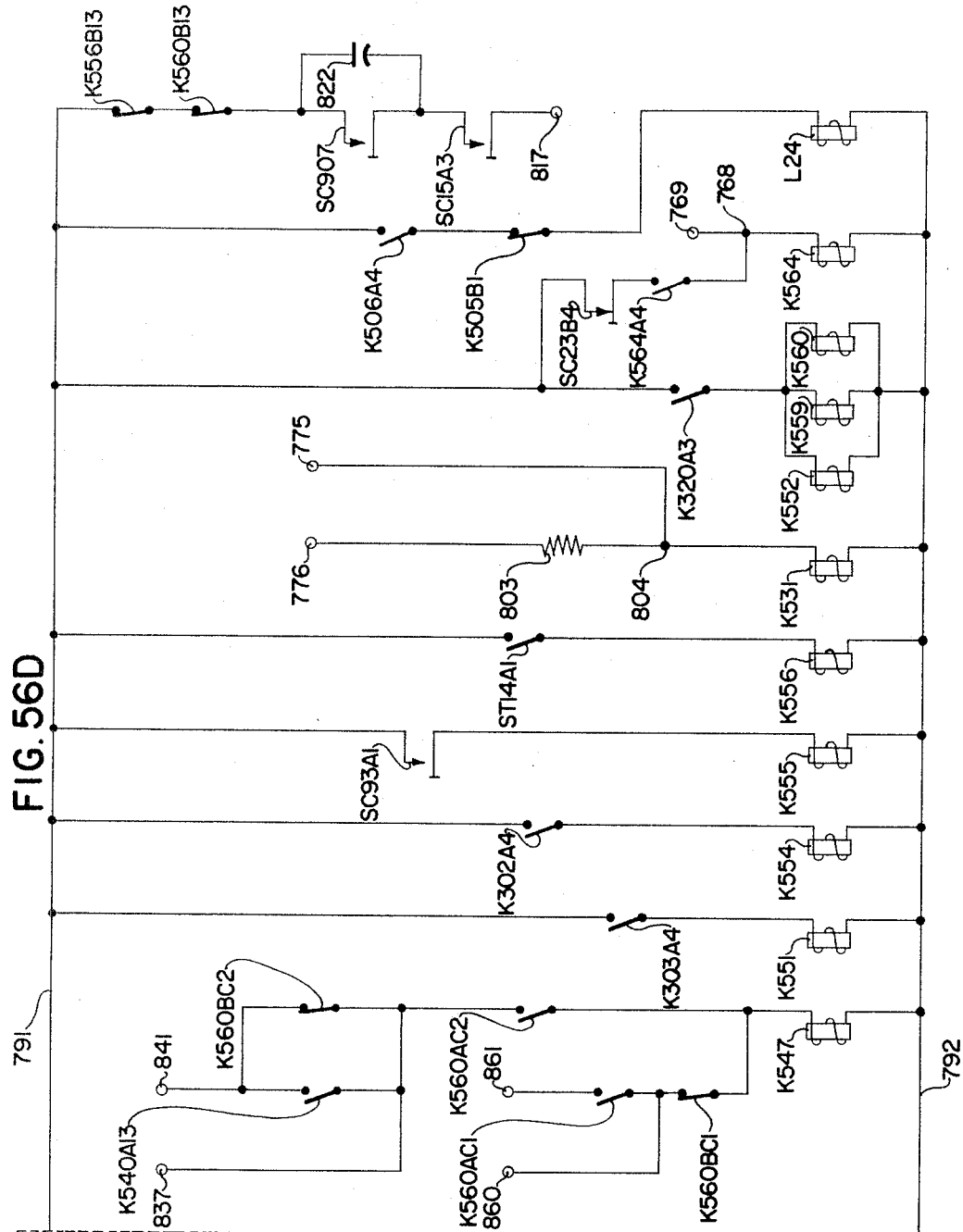

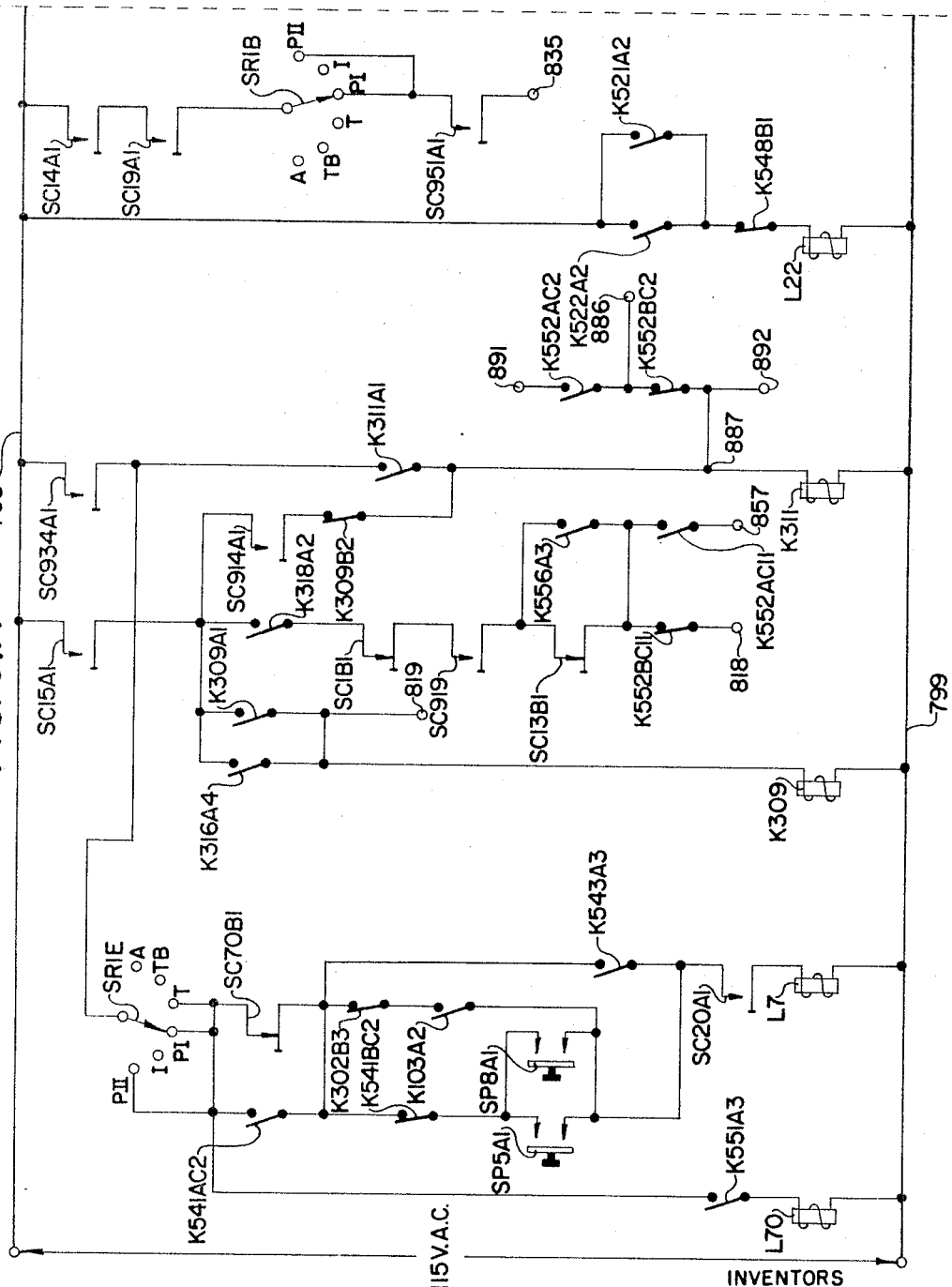

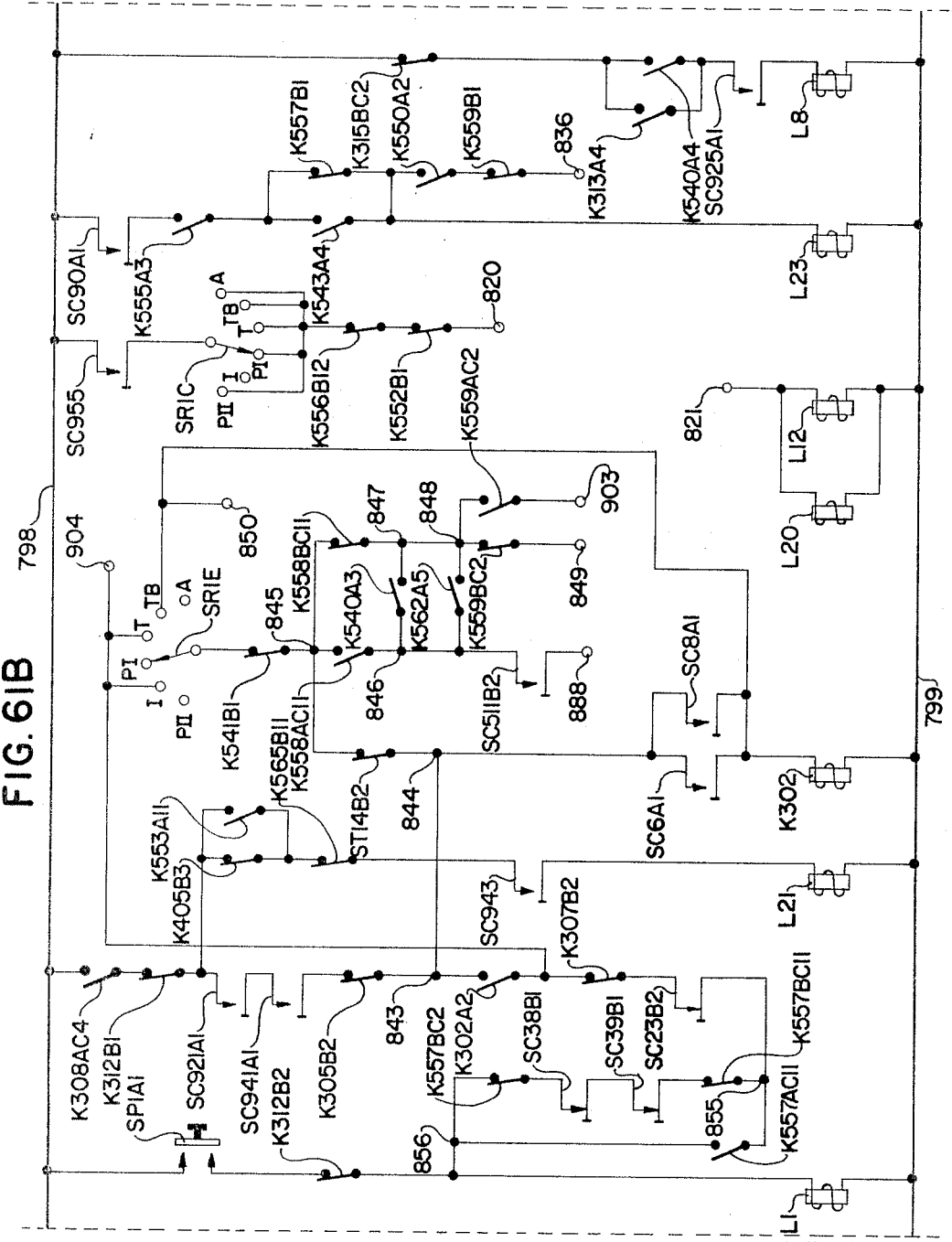

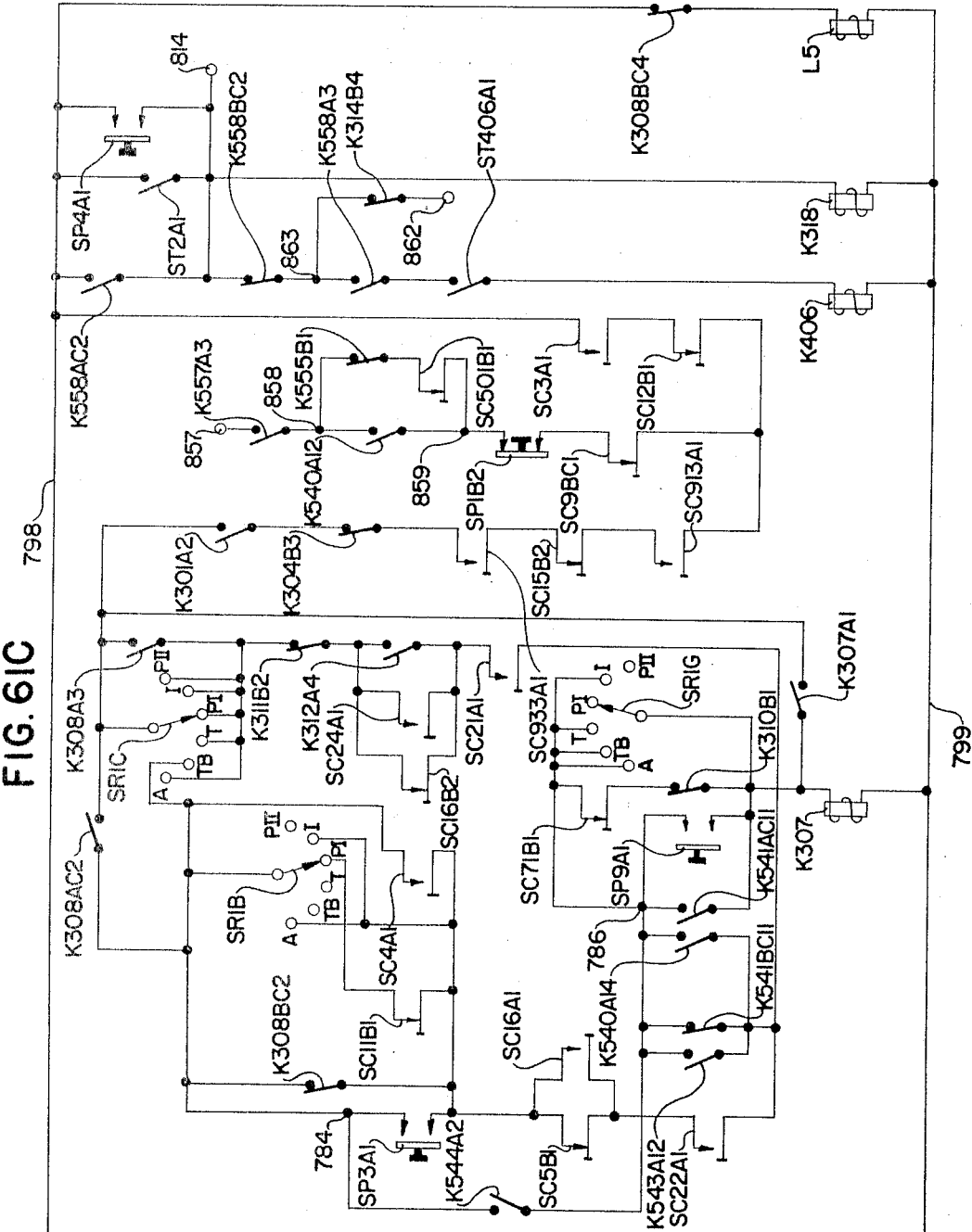

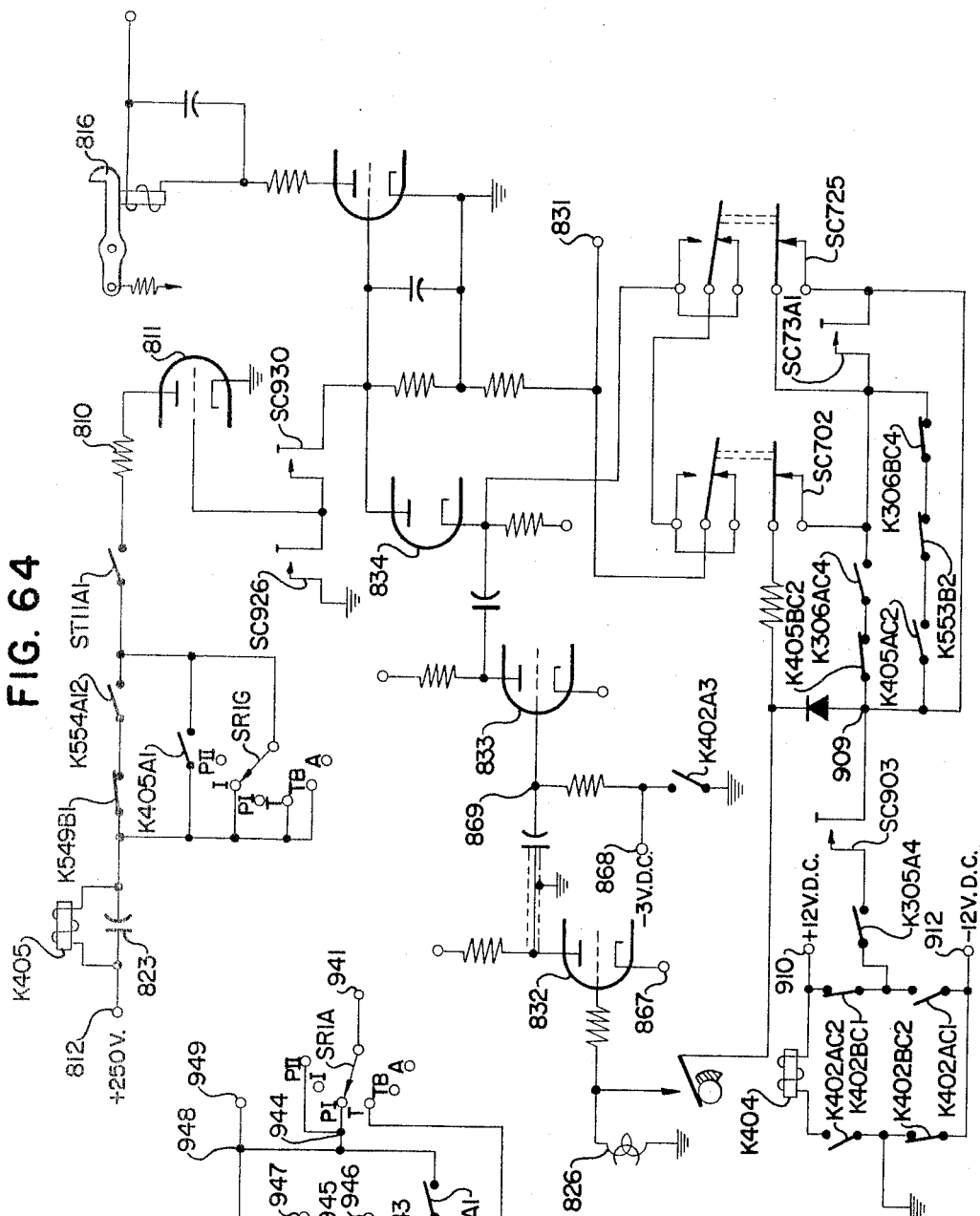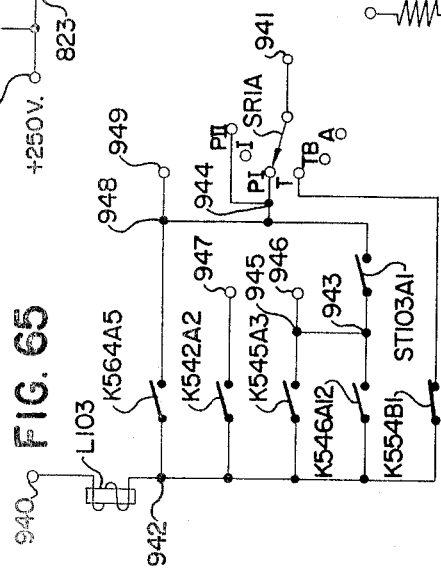

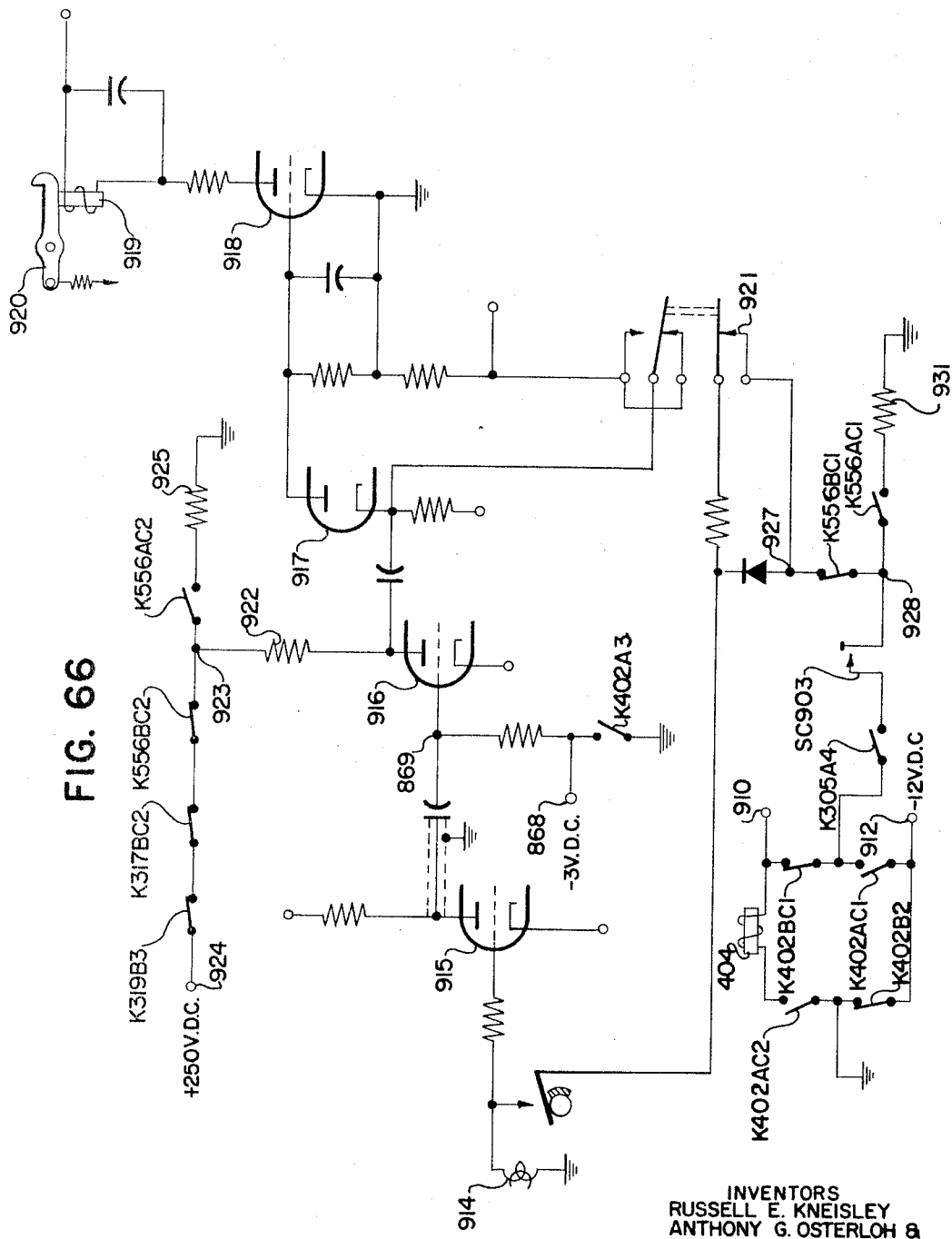

United States Patent Office 3,317,711
Patented May 2, 1967

3,317,711
AUTOMATIC CONTROLS FOR ACCOUNTING MACHINES
William F. Sommer, Brookville, and Russell E. Kneisley and Anthony G. Osterloh, Dayton, Ohio, assignors to The National Cash Register Company, Dayton, Ohio, a corporation of Maryland
Filed Apr. 22, 1963, Ser. No. 274,543
37 Claims. (Cl. 235—61.6)

This invention relates to operating means for effecting the automatic entry of both item and balance information into an accounting machine from record members on which said information is magnetically stored, the automatic computation of interest amounts, and the automatic control of operation of the accounting machine, whereby a number of different types of accounting operations can be carried out completely automatically.

The present invention is directed to an operating system including an accounting machine capable of utilizing ledger cards having magnetically encoded information thereon, and which can automatically pick up and store the magnetically encoded information from the ledger card when the ledger card is inserted into the machine; a feeding device adapted for use with an accounting machine of the above type, capable of automatically feeding the ledger cards into the accounting machine; and a controlling device capable of sequentially controlling the operation of the accounting machine and the feeding device to enable a plurality of different types of accounting operations to be performed.

It is the purpose of the present invention to provide multiple-program means for sequentially controlling the accounting machine to effect the entry into the accounting machine of certain information carried by record members for the accounts being processed, by causing the record members to be fed to the accounting machine by the feeding device, and to control the accounting machine to cause a predetermined sequence of operations to be performed, according to a program selected, said operations including, among others, posting, interest computation, totalling, clearing of totals, trial balancing, and transferring of accounts from one record member to another.

It is accordingly an object of the present invention to provide means for controlling an accounting machine in accordance with information sensed from record media.

Another object is to provide a device capable of automatically processing a plurality of accounts, including the entry of individual debit or credit items on such accounts, the computation of interest for such accounts, and the production of new balances for these accounts, without the necessity for a human operator.

Another object is to provide a device having means capable of distinguishing between record members bearing two different types of information, and of preventing further operation of the device in the event of sequential misplacement of the record members.

A further object is to provide a device having means capable of comparing identification information sensed from two different record members related to the same account, and of requiring proper comparison before proceeding with the processing of the account.

An additional object is to provide a device capable of performing an account trial balance operation in which the balances of all of the accounts, up to a given maximum for each account, are totalled.

A further object is to provide a device capable of automatic sequential action in performing a variety of different types of accounting operations, according to the program selected.

With these and other objects, which will become apparent from the following description, in view, the invention includes certain novel features of construction and combinations of parts, a preferred form or embodiment of which is hereinafter described with reference to the drawings which accompany and form a part of this specification.

In the drawings:

FIG. 2 is a view of an account card supplied with magnetizable areas for controlling the accounting machine.

FIG. 5 is a cross-sectional view through the accounting machine, showing one of the amount denominational order differential mechanisms with its related check-back and recording control plate and auxiliary differential mechanism, by which the setting of the differential mechanism can be effected under control of the ledger card.

FIGS. 6A and 6B are views which, taken together, show the line of memory switches which are controlled by the accounting machine differential mechanism, and which are used for storage of information.

FIG. 11 is a detail view showing the operating mechanism for controlling the engagement and disengagement of the memory switch line from the actuators controlled by the differential mechanism, said operating mechanism being shown in engaged position.

FIG. 12 is a detail view showing a portion of the mechanism of FIG. 11 shifted to a disengaged position.

FIG. 13 is an end view showing the mechanism of FIGS. 11 and 12 in engaged position.

FIG. 14 is a plan view showing the mechanism of FIGS. 11 and 12 in disengaged position.

FIGS. 15 and 16 are detail views showing the end plates between which enlarged end elements of certain of the shafts of the memory switch line are retained.

FIG. 17 is a detail view showing the resetting means for the portion of the memory switch line shown in FIG. 14.

FIGS. 18 and 19 are partial detail views of the totalizer-engaging and -disengaging means which forms a part of the machine in which the present invention is embodied.

FIG. 20 is a fragmentary detail view showing one of the totalizer lines of the machine and a portion of the differential actuating mechanism which serves to enter information into the totalizers and extract the information therefrom.

FIG. 24 is an elevational view showing the switch means which function to detect when the share, loan, and book number storage means are set to zero.

FIG. 25 is an end view of the switch means shown in FIG. 24.

FIG. 32 is a detail view showing the overdraft mechanism and its restoring means.

FIG. 33 is an end view of a portion of the overdraft mechanism.

FIG. 34 is a sectional view, taken along line 34—34 of FIG. 33.

FIGS. 38 to 55 inclusive are diagrammatic views showing the various program boards utilized in the system.

FIGS. 56A to 56D inclusive, 57, 58, 59, and 60 show the essential operating circuitry of the controller unit.

FIGS. 61A, 61B, 61C, 62, 63, 64, 65, and 66 show those portions of the operating circuitry of the accounting machine which have been specially adapted to enable the accounting machine to function in the novel system.

GENERAL DESCRIPTION

Figure 1:
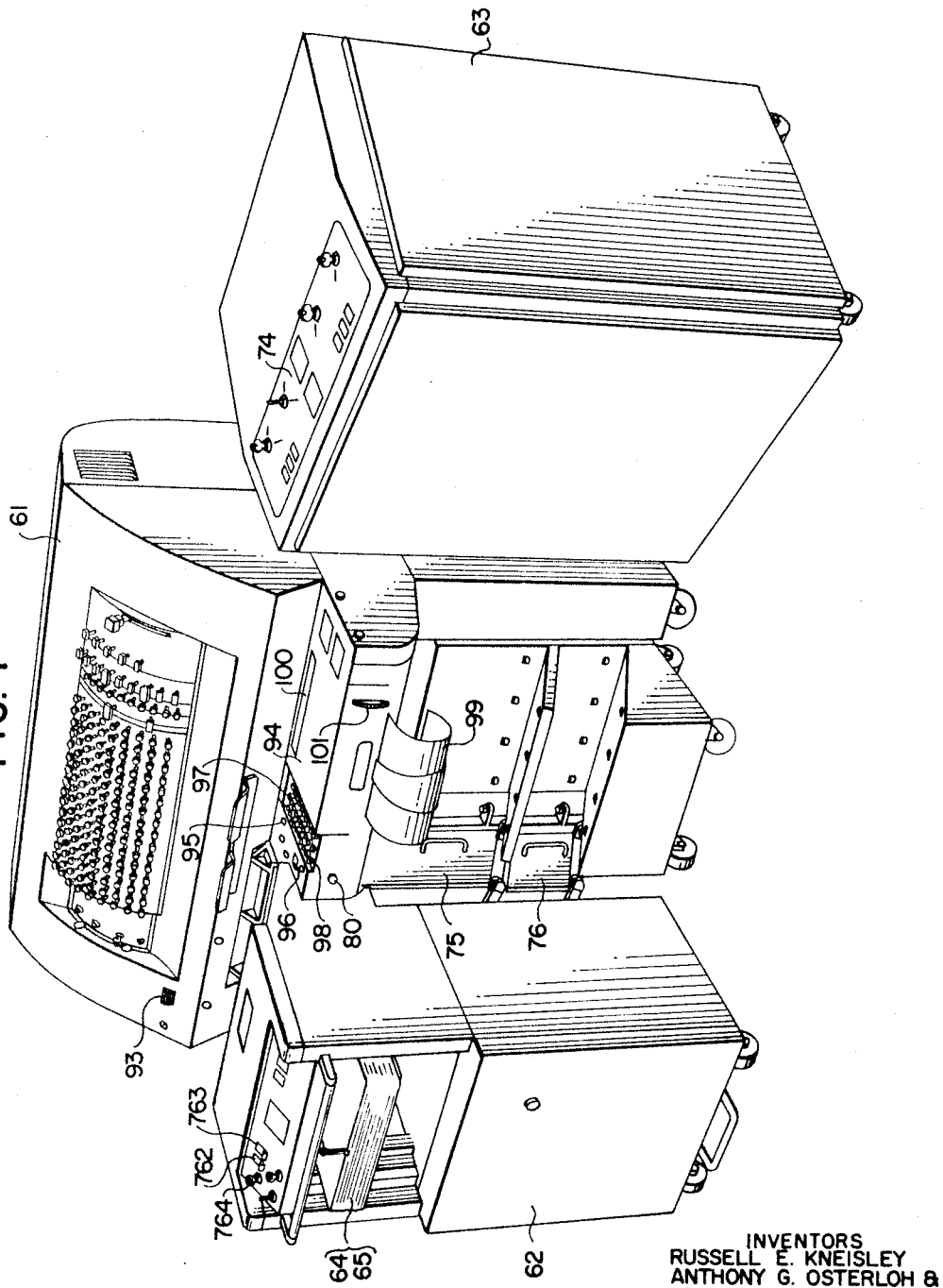
FIG. 1 is a perspective view of the components making up the system of the present invention, including the accounting machine, the ledger card feeding device, and the controller, shown in operative relation.

In FIG. 1, an accounting machine 61 is shown in operative relation to a ledger card feeder 62 and a controller 63. In order to explain clearly the construction and operation of the system of the present invention, it is considered desirable first to describe briefly the functioning of the accounting machine 61 with which the ledger card feeder 62 and the controller 63 are associated in the present embodiment.

Figure 3:
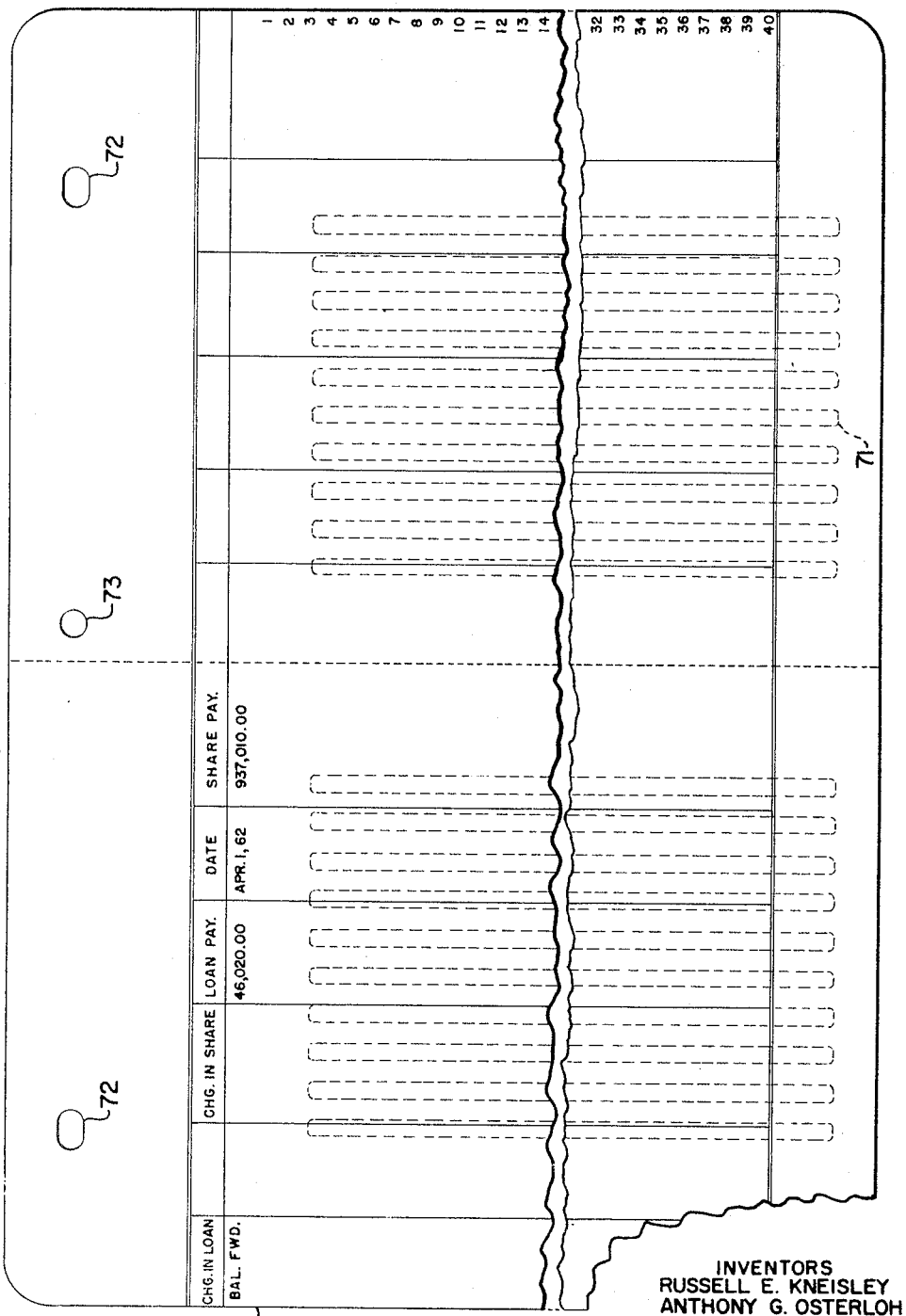
FIG. 3 is a view of a factor memory card supplied with magnetizable areas for controlling the accounting machine.

The accounting machine 61 normally receives input information and records output information on record members 64 and 65 (FIGS. 2 and 3) shown in stacked formation in the feeding device 62.

The record member 64 is commonly called an account card, and contains headings and entries particularly adapted for establishments of the "credit union" type, which are often associated with various types of businesses to enable employees of the businesses to borrow money and to make deposits for purposes of saving and of paying the loans, by means of payroll deductions from their wages. Thus the deposits in this type of institution are normally at regular intervals and of a set amount, although additional deposits may also be customarily made, if desired. The account card 64 is divided into two similar parts by the dotted line 66. If desired, the accounting machine can be set so that the same information pertaining to a transaction can be simultaneously printed in duplicate on both sides of the card, and then, when desired, the card can be divided into two parts, one part being sent to the account-holder, or member, and the other part being retained by the credit union for its records. Alternatively, the accounting machine can be set so that the information pertaining to a given transaction is printed on only one side of the card. This effectively doubles the capacity of the card, from forty lines to eighty line, in the embodiment shown. If it is desired to provide the member with a record, using this system, this can be done by making a copy of the card, by any of a number of well-known reproduction processes.

It will be noted that the various columns of the account card are headed "Loan Entry," "Misc.," "Share Entry," "Loan Bal.," "Date," and "Share Bal." In the "Loan Entry" column are entered all of the entries pertaining to the loan, including the original principal amount of the loan, and the periodic payments for reduction of the principal. In the "Misc." column are entered the interest and any other miscellaneous charges or fees. In the "Loan Bal." column is entered the current loan balance, and, in the "Share Bal." column, is entered the current share (or savings) balance. Along the right side of the card is a vertical column of numbers for the line spaces of the card.

The card 64 is provided on its rear side with twenty strips or areas 67, of magnetizable material, which can be distinctively magnetized to represent data. Each area 67 provides one channel in which data can be stored, which data can be used to control the accounting machine to enter the data therein, or to provide other related controls. On the account card 64, the data magnetically stored includes eight digits of share total information, seven digits of loan total information, a three-digit comparator number to enable a check to be made that the factor memory card and the account card pertain to the same account, two digits of line-finding information to determine the line of the card on which the next printing entry is to be made, and a magnetic "spot" or indication which may be present to indicate that the right side of the card is to be printed upon, if printing is not to be done on both sides of the card simultaneously, said "spot" being located on one of the line-finding strips of the card.

In order that the card 64 may be clamped securely to the card carriage of the accounting machine 61, and in order that the card may be aligned properly with the printing mechanism of such machine, and with the reading and recording heads thereof, the carriage is provided with locating pins adapted to cooperate with holes 68 and 69 near the top of the card, to insure that the card will be fed into and out of the machine in proper alignment with the heads and the printing mechanism. The holes 68 not only insure that the ledger card 104 is correctly positioned with respect to the reading and recording heads, such as 825 (FIG. 63), 826 (FIG. 64), and 914 (FIG. 66), and with respect to the printing mechanism of the accounting machine, but also insure that the ledger card is positioned on the card carriage with the correct side up, the intermediate hole 69 being offset from the center of the card. This intermediate hole 69 acts as the main locating hole, and the two side holes 68 are elongated to allow for slight changes in the width of the ledger card due to temperature and humidity changes and to provide greater bearing area between the pins and the card.

The record member 65 (FIG. 3) is commonly called a factor memory card, and contains headings and entries particularly adapted for establishments of the "credit union" type, as is the case with the account card.

The headings of the various columns of the factor memory card are "Chg. in Loan," "Chg. in Sh.," "Loan Pay.," "Date," and "Share Pay." In the "Chg. in Loan" column are entered the amounts of the changes in the regular payments which the account-holding member makes on his or her loan whenever the amount of the regular payment is changed. In the "Chg. in Sh." column are entered the amounts of the changes in the regular deposits which the account-holding member makes to his or her share account whenever the amount of the regular deposit is changed. In the "Loan Pay." column are included a total of seven digits. The two left-most digits are the first two digits of a book number used in identification of the account, while the five right-most digits are used to designate the amount of the loan payment, which can thus be any amount up to and including $999.99. In the "Date" column appears the date of the entry. In the "Share Pay." column are included a total of eight digits. The three left-most digits are the last three digits of the previously-mentioned book number, which is "split" into two different columns due to the mechanical arrangement of the accounting machine, while the five right-most digits are used to designate the amount of the share payment, which can thus be any amount up to and including $999.99.

Like the account card 64, the factor memory card 65 is provided on its rear side with twenty strips or areas 71 of magnetizable material, which can be distinctively magnetized to represent data. Each area 71 provides one channel in which data can be stored, which data can be used to control the accounting machine to enter the data therein, or to provide other related controls. On the factor memory card, the data magnetically stored includes a five-digit book number, five digits of share payment information, five digits of loan payment information, a three-digit comparator number to enable a check to be made that the factor memory card and the account card pertain to the same account, two digits of line-finding information, a sequence "spot," located on one of the line-finding strips, to identify the card as being a factor memory card rather than an account card, and an indication, or "spot," located on the other of the line-finding strips, which may be present to indicate that the right side of the card is to be printed upon.

The factor memory card, like the account card, is provided with holes 72 and 73 near its top for engagement with pins on the accounting machine carriage, the intermediate hole 73 being offset to insure that the card is positioned on the carriage with the correct side up.

In normal operation of the system, information magnetically encoded on the account cards is entered into the accounting machine totalizers by the same general means disclosed in United States Patent No. 2,947,475, issued Aug. 2, 1960, to Konrad Rauch et al.; that is, by being sensed by sensing heads, and use of the signal thus generated to set pre-selectors which in turn set differential mechanisms to enter the desired information into the totalizers. In the case of the information magnetically encoded on the factor memory cards, however, a different means of entry is employed. The information is sensed by magnetic sensing heads, and the signals thus developed are used to control the differential mechanisms through the pre-selectors. However, the differential mechanisms, in this case, function to enter the information into a series of memory switches, which are selectively operatively associated with the differential mechanisms. The information thus stored in the memory switches is then retained until needed at a subsequent time in the automatic operating sequence, at which time it is entered into the accounting machine by connection of the memory switches in electrical operating circuits with solenoids which are operative to depress selected keys in the accounting machine keyboard, according to the information stored. These keys may also be operated manually where necessary in various non-automatic operations of the system.

The operating sequences during the automatic operations, a number of which are available, are controlled electrically, as will be subsequently fully described. Most of the components for the automatic sequence control are housed in the controller 63 (FIG. 1). A control panel 74 (FIGS. 1 and 27), mounted at the top of the controller, includes a number of indicators and program selection controls.

The accounting machine 61 is provided with a number of safeguards to insure correctness of the pickup operation. One of these safeguards is a check known as a "pawl check" utilized to insure that all of the data has been read from the card. Failure to read any data will prevent the entry of the remaining data into the machine and will cause the feeding device 62 to cease operation.

Another of these safeguards is a check known as a "gate check" utilized to insure that the data which was read has been correctly entered into the machine by comparing the data actually set in the machine with the data recorded on the card being sensed. This is accomplished by first reading the ledger card and controlling the setting of the machine according to the data which was read, and then reading the card a second time and comparing the second reading with the actual setting of the machine. If there is no agreement, further normal operation of the machine is prevented, and only a corrective operation of the machine may take place.

A further safeguard cooperates with the above two to insure that over-printing on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in printing position.

The accounting machine is provided with a further safeguard to insure the correctness of entries. This involves a comparison of account numbers, one account number being provided on each account card and on each factor memory card, the account card and the factor memory card for a particular account both bearing the same account number. In operations involving use of both the account card and the factor memory card, such as the share payment operation and the share transfer operation, the account number sensed from the account card is compared with the account number sensed from the factor memory card, and a proper comparison must be made in order to permit the operation to proceed. Furthermore, a sequence check is performed in order to insure that the factor memory card and the account card for each account are in the correct sequence.

These automatic safeguards and checking means, together with the usual interlocks and controls, insure virtually "error-proof" operations without the necessity for running proofs on work already performed.

The accounting machine is also provided with extremely flexible controls which enable it to perform different types of operations, both manual and automatic, involving sensing and recording operations on the account cards 64 and the factor memory cards 65. For a further, more detailed description of the construction and operation of an accounting machine similar to the accounting machine 61, but designed for manual entry of check and/or deposit information in account-posting operations, reference may be had to the previously-mentioned United States Patent No. 2,947,475.

The feeding device 62 is capable of being moved into and out of operative relation with the accounting machine 61, so that the machine 61 may be used by itself for manual operation, if desired. Associated with the feeding device are two bins 75 and 76, into which cards 64 and 65 may be automatically placed after being ejected from the accounting machine 61 upon completion of an accounting transaction. Either one of the bins 75 and 76 may be selected to receive either an account card 64 or a factor memory card 65 ejected from the accounting machine 61 under control of a signal from said machine. For a more detailed description of the feeding device 62, reference may be had to United States Patent No. 3,079,145, issued Feb. 26, 1963, to Henry Grosnickle, Jr., et al.

*Accounting machine keyboard and controls*

Figure 4:
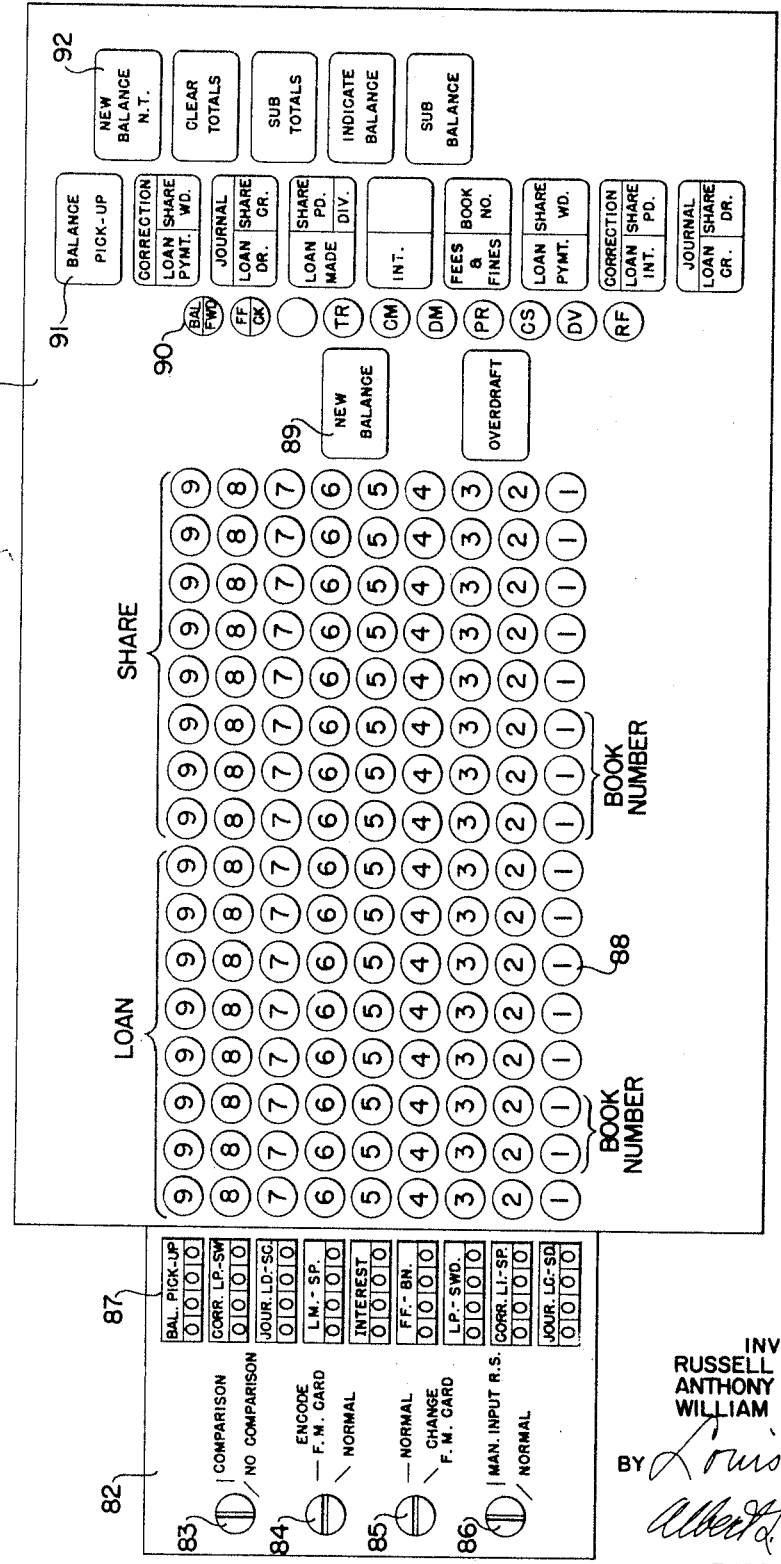
FIG. 4 is a diagrammatic view of the amount and control keyboard for the accounting machine.

The accounting machine embodying the present invention is provided with a keyboard 81, shown diagrammatically in FIG. 4.

At the extreme left of the keyboard is a portion 82, which is recessed with respect to the remainder of the keyboard 81. Mounted in a vertical column on this portion are a plurality of key-controlled switches 83, 84, 85, and 86.

Associated with the switch 83 are the legends "Comparison" and "No Comparison." When the key of the switch 83 is in vertical position, a comparison of account numbers is required between the account card and the factor memory card pertaining to each account processed during an operating sequence, while, with the key in a diagonal position, no such comparison will be required. The switch 83 controls contacts ST2A1, which function in the operating circuitry in a manner to be described subsequently.

Associated with the switch 84 are the legends "Encode F.M. Card" and "Normal." When the key of the switch 84 is in horizontal position, an operating circuit is conditioned to enable information to be encoded on a factor memory card, while, with the key in diagonal position, the condition is not established. The switch 84 controls contacts ST10B1, which function in the operating circuitry in a manner to be described subsequently.

Associated with the switch 85 are the legends "Normal" and "Change F.M. Card." When the key of the switch 85 is in diagonal position, an operating circuit is conditioned to enable the information encoded on a factor memory card to be changed, while, with the key in horizontal position, the condition is not established. The switch 85 controls contacts ST14A1, which function in the operating circuitry in a manner to be described subsequently.

Associated with the switch 86 are the legends "Manual Input R.S." and "Normal." When the key of the switch 86 is in vertical position, an operating circuit is conditioned to enable a manual input entry to be made on the right side of an account card or factor memory card, while, with the key in diagonal position, the condition is not established. The switch 86 controls contacts ST11B1, which function in the operating circuitry in a manner to be described subsequently.

To the right of the vertical column of switches 83, 84, 85, and 86 on the portion 82 of the keyboard 81 is a vertical column containing nine visible item counters 87. These counters count the number of transactions of specified types which the machine carries out, and one of these counters is used in connection with the determination of an "insurance trial balance," as will subsequently be described.

On the left side of the main portion of the keyboard 81 are sixteen rows of amount keys 88, each row containing nine keys, numbered from 1 to 9 inclusive, in the conventional decimal notation. The left-most eight rows of keys are used for indexing loan amounts into the machine, while the right-most eight rows of keys 88 are used for indexing share amounts into the machine. The differential and totalizer mechanisms relating to the various rows of a mount keys are split between the loan and share groups of keys, so that the two groups are, in effect, completely separate. As is conventional in this type of machine, the differential mechanisms of the corresponding rows of the machine are operated in accordance with the information entered thereon by the keys, when it is desired to enter such information manually. These keys may also be depressed by solenoid actuators which are controlled by the settings of memory switches, during automatic sequential operations of the system, as will subsequently be described. In addition, the differential mechanisms may be independently controlled according to information sensed from the magnetic strips on the cards 104 and 105, as will also be subsequently described.

It should be noted that there is no auxiliary differential mechanism for the left-most bank of amount keys of the "loan" group. Therefore this bank is not available for use in storing information on ledger cards, and is used only as an "overflow" bank, and in indexing of certain information which it may be desired to print on the various record members.

The rows of keys 89, 90, 91, and 92 are control keys in control rows 4, 3, 2, 1, respectively, for controlling the various operations of the machine, in accordance with the type of operation indicated on the keys in FIG. 4. The functions of the various keys will be more specifically described in connection with the subsequent descriptions of the various types of operations performed by the system of the present invention.

Near the left side of the accounting machine 61, as shown in FIG. 1, are a plurality of date-selecting knobs 93, positioned so that a portion of the periphery of each knob extends through an opening in the housing of the machine, in order that the correct date may be set up for printing on the various record members.

The machine is also provided with additional control means located in a lower control panel 94, horizontally positioned below the keyboard 81, as shown in FIG. 1. At the left side of the panel 94 is a manual line finding knob (not shown), which may be rotated to select the desired line on an account card or factor memory card inserted manually into the machine.

As may be seen in FIG. 1, the central portion of the lower control panel provides a surface which cooperates with the ledger card feeder 62 to receive account cards and factor memory cards fed to the machine by the feeder. The movable carriage in the accounting machine receives the cards fed onto this surface, and carries them into the accounting machine for processing.

To the right of the central portion on the panel 94 may be seen a comparator input button 95, which may be secured against operation by an associated lock. An indicator is provided in association with the comparator input key.

Below the comparator input button is positioned a new balance key 96. Either this key or the new balance key 89 on the keyboard 81 may be used to initiate a manual new balance operation.

To the right of the comparator button, as seen in FIG. 1, is a comparator keyboard 97, utilizing three rows or banks of keys 98. A comparator number relating to each account may be indexed on the comparator keyboard 97 by means of the keys 98, for manual preparation of an account card or factor memory card.

To the right of the comparator keyboard is located a housing for the journal sheet 99, on which an internal record of all the transactions carried through by the machine is kept. Printing means are provided for printing certain information relating to each transaction on the journal sheet 99. A window 100 is provided in the machine so that the information being printed upon the journal sheet is visible to the operator, and a manually-operable advancing knob 101 is provided to facilitate withdrawal of the journal sheet from the machine when desired.

On the right side of the machine is a function control knob (not shown) having six functional positions: Posting I, Posting II, Transfer, Install, Trial Balance, and Add. This knob may be set to any one of these positions, in order to control the type of operation which it is desired that the accounting machine perform, and may be locked in any position by locking means (not shown).

In addition, the accounting machine is provided with certain other controls, a description of which is not deemed essential to an understanding of the present invention. For a more detailed description of the controls of the accounting machine, reference may be had to the previously mentioned United States Patent No. 2,947,475.

Amount banks and amount differentials

Since the sixteen banks of amount keys 88 and their associated differential mechanisms are all alike, only one of said banks and the differential mechanism associated therewith will be described. This differential mechanism is disclosed in FIG. 5, which is a transverse sectional view of the machine taken just to the right of one of the amount banks, showing the bank and its associated differential mechanism.

Automatic operating means for the amount rows and the control rows are provided for effecting automatic depression of the amount keys 88 and the various control keys. The operating means are of the type shown in United States patent application Ser. No. 840,701, filed Sept. 17, 1959, by William C. Arnold et al., inventors, and employ solenoids, such as the solenoid 104, to effect depression of the individual keys. The keys can also be depressed manually, if desired.

The amount keys 88 are mounted in a key bank frame 110, supported by rods 111 and 112, extending between main side frames 109 (only one of which is shown) of the machine.

Depression of any one of the amount keys 88 rocks a zero stop pawl (not shown), associated with that particular denomination, counter-clockwise out of the path of a reset spider 114, in the manner well known in the art. The reset spider 114 is free on a hub of an amount differential actuator 115, rotatably supported on a bushing 116, extending between two similar support plates 117 (only one shown here), said plates being in turn supported by rods 118 and 119, extending between the main side frames 109. There are a pair of supporting plates 117 for each amount differential, and a tie rod 120 extends through holes in the center of the bushings 116, to secure all of the amount differentials in a compact unit.

A notch in the forward end of the spider 114 engages a stud 121, in the forward extension of a bell crank 122, pivoted on an extension of the actuator 115. Carried by the vertical arm of the bell crank 122 is a stud 123, on which is pivoted a link 124. The link 124 is also pivoted to the upper end of a latch 125, pivotally mounted on the actuator 115. The latch 125 has a foot 126, normally held in contact with the periphery of a driving segment 127, just above a shoulder 128 thereon, by means of a spring (not shown). The driving segment 127 is rotatably supported on the hub of the actuator 115. A link 130 pivotally connects the driving segment 127 to a cam lever 131, pivoted on a stud 132, on the left-hand one of the plates 117, said lever 131 carrying rollers 133 and 134, which coact with the peripheries of cams 135 and 136, respectively, secured on a main shaft 108. Depression of any one of the amount keys 88 moves its lower end into the path of a rounded surface 137 of an extension of the forward arm of the bell crank 122.

In adding operations, the main shaft 108 and the cams 135 and 136 make one clockwise rotation, causing the lever 131 to rock the driving segment 127 first clockwise and then counter-clockwise, back to normal position. Clockwise movement of the segment 127 causes the shoulder 128 thereon, in cooperation with the foot 126 of the latch 125, to carry the latter and the amount actuator 115 clockwise in unison, until the rounded surface 137 contacts the stem of the depressed amount key 88. This rocks the bell crank 122 and, through the link 124, the latch 125 counter-clockwise, to disengage the foot of the latch from the shoulder 128 to arrest clockwise movement of the actuator 115, and to position said actuator according to the value of the depressed amount key 88. This disengagement of the latch 125 moves a rounded extension 143 of the bell crank 122 into engagement with the corresponding one of a series of locating notches 144 in a plate 145, secured between the rod 118 and the upper extension of the left-hand support plate 117.

After the latch 125 is disengaged from the shoulder 128, an arcuate surface 146, on the segment 127, moves opposite the foot 126 to retain the latch disengaged in its set position.

When the lever 131 reaches the terminus of its clockwise movement, a roller 147, carried thereby, coacts with an arcuate surface 148 on a beam 149, pivoted on a stud 150 in the actuator 115, and forces a concave surface on the upper edge of said beam into contact with the hub of the actuator 115 to move the rear end of said beam into a position commensurate with the value of the depressed amount key.

The rear end of the beam 149 is bifurcated to engage a stud 151 on a link 152, the upper end of which link is pivoted to a segment 153, mounted on one of a set of nested sleeves supported by a shaft 155, journaled between the main side frames 109. The lower end of the link 152 is pivotally connected to a segment arm 156, pivoted on a shaft 157, journaled between the side frames 109. The segment arm 156 carries a stud 158, which engages a camming slot in a zero elimination cam plate 159, pivotally mounted on a stud 160 on a segmental gear 161. The segmental gear 161 is rotatably mounted on a shaft 162, journaled between the side frames 109.

The teeth of the segmental gear 161 mesh with external teeth of an external-internal ring gear 163, having internal teeth, which, in cooperation with the periphery of a disk 164, form a rotatable support for said gear 163. The disk 164 is fixed on a shaft 165, and the latter is supported by brackets 166 secured to a cross bar 107 and the main framework of the machine. The internal teeth of the ring gear 163 mesh with a pinion 168, rotatably supported in a boring in the disk 164. The pinion 168 is mounted on a square shaft 169, and the shaft 169 has mounted thereon additional pinions, like the pinion 168, for each columnar position in which an entry is to be made.

The mode of driving the type wheels of the present column-printing mechanism is fully explained in the United States patent to Charles H. Arnold, No. 2,141,332, issued Dec. 27, 1938, and embodies an application of the well-known principle of driving mechanism disclosed in the United States patent to Walter J. Kreider, No. 1,693,-279, issued Nov. 27, 1928.

The external teeth of the external-internal ring gear 163 also mesh with teeth of a second external-internal ring gear 170, which functions to set a memory switch corresponding to the amount row of FIG. 5, in a memory switch line 225 extending across the front of the accounting machine mechanism, and also supported by the brackets 166. The construction and operation of the memory switches in the memory switch line will be fully described subsequently.

To properly align the differential mechanism and the type wheels and memory switches set thereby, there is provided on each of the segments 153 a series of notches 171, engaged by an aligner 172, secured to a shaft 173, journaled in the machine side frames.

The aligner 172 is disengaged from the notches 171 during the differential setting of the type wheels, and, after they have been set under control of the amount keys 88, in the manner just described, the aligner 172 is again moved into engagement with the notches 171 to hold the segments 153 during the printing operation.

Totalizers

The machine embodying this invention has two lines of totalizers, including an upper totalizer line 175 (FIG. 5) and a back totalizer line 176 (FIG. 5). Each of these totalizer lines 175 and 176 is divided into two sides corresponding to the division of the keyboard 81 into a "loan" side on the left and a "share" side on the right.

The totalizer line 175, on both sides, comprises a balance totalizer, often referred to as a "crossfooter," which includes the denominational sets of plus and minus wheels, said plus and minus wheels in each denominational order being reversely geared together, so that, when one wheel is turned in one direction, the other turns in the opposite direction, and vice versa, as is well known in the art and fully described in United States Patent No. 1,619,796, issued to Bernis M. Shipley on Mar. 1, 1927. Keys 1, 2, and 3 of control row 2 of the accounting machine keyboard 81 effect entry of an amount into the "minus" side of the totalizer line 175; key 4 does not cause entry of an amount into the totalizer line 175; and keys 5 to 9 inclusive of control row 2 effect entry of an amount into the "plus" side of the totalizer line 175.

The totalizer line 176, on the left side, includes a plurality of individual totalizers, as follows: new balance loan, total of correction of loan payments, total of loan debits, total of loans made, interest, total of fees and fines, loan payments, total corrections of loan interest, and loan credits. On the right side, the totalizer line includes a plurality of individual totalizers as follows: new balance share, total of correction of share withdrawals, total of share credits, total of shares paid and dividends, book number total (which is not an amount and is provided merely for printing purposes), share withdrawals, total of corrections of shares paid, and share debits. It will be seen that the totalizer designations correspond to the right and left side notations on the row 2 control keys, and that there is no totalizer corresponding to the right side of the No. 5 key of row 2. It will, of course, also be realized that the particular totalizers enumerated above are only illustrative, and that other totalizers may be used with the present invention, if desired or necessary.

The totalizers on the totalizer lines 175 and 176 are selectively engaged with the differential actuators 115 during counter-clockwise movement of the actuators in adding and subtracting operations and during the clockwise movement of the actuators in the second cycle of total and sub-total operations, as fully described in the previously-mentioned Bernis M. Shipley United States Patent No. 1,619,796. The related differential mechanism is controlled during total-taking operations by the totalizer wheel when the wheel is turned to zero. In this position, a stop is moved into a notch 183 in the reset spider 114, to arrest the spider in a position commensurate with the value of a totalizer wheel which is being reset to zero. The reset spider 114, when thus arrested, is effective, through the notch engaging the stud 121, to disengage the latch 125 from the driving segment in the manner well known in the art and fully described in said Shipley patent.

Secured to each segment 153 is an arm 184 (FIG. 5), to which is connected a link 185, the other end of which is connected to a check-back and recording control plate 174, free on a shaft 186, for controlling the operation of certain switches 102 in check-back and recording operations. Said switches are fixed to a shiftable bracket 138 free on the shaft 186. The movement of the bracket 138 is controlled by links 139. The manner in which said switches function is fully described in the previously-cited United States Patent No. 2,947,475. The control plate 174 is provided with aligning teeth 187, engaged by an aligner 188, secured to a shaft 189, which is rocked at the proper time to align the control plate 174 in set position after it has been set under control of the differential mechanism.

The control plate 174 is formed with a smaller diameter, as at 190, and a larger diameter, as at 191, which are interconnected by a rise. As the control plate 174 is set to different positions by the differential mechanism, the rise will be set to different positions to provide the required controls for check-back and recording operations. In order that the point of rise between the smaller diameter and the larger diameter can be accurately set, an auxiliary plate 192, having the smaller diameter, the larger diameter, and a similar rise, is mounted adjacent the control plate 174, for limited movement relative thereto, and is secured in adjusted position relative to the plate 174 by a clamping unit 193. Accordingly, each individual control plate can have its rise accurately adjusted in order that its control over the groups of contacts, such as 102, can be precisely timed with relation to the movement of the ledger card past the reading and recording heads.

*Auxiliary differential mechanism*

The various differential mechanisms of the accounting machine of the present invention are controlled to be differentially set under control of data recorded magnetically on the channels 67 and 71 (FIGS. 2 and 3) on the back of each ledger card 64 and 65. This control is effected by means of the auxiliary differential, or preselector, mechanisms (FIG. 5), one of which is provided for each of the channels on the card. The auxiliary differential mechanisms are differentially settable under control of the data recorded in the channels on the ledger card as the ledger card is being fed into the machine in a balance pick-up operation, and function to store the data temporarily until it is entered into the machine. The electrical controls which are operable to control the setting of the auxiliary differential mechanisms are fully disclosed in the previously-mentioned United States Patent No. 2,947,475.

The auxiliary differential mechanisms are operable to position differentially a plurality of stopping means which cooperate with the reset spiders 114 of certain of the differential mechanisms, to control the setting of these differential mechanisms.

The stopping means for arresting each reset spider 114 (FIG. 5) comprises a differentially-settable stop member 194, pivoted on a differentially-positionable bell crank 196, and also supported near its center by an arm 197, pivoted on a shaft 198. The bell crank 196 is mounted on a shaft 199, supported in the framework of the machine. Supported on the lower arm of the bell crank 196 is a differential latch 200, having a stud 201, projecting into a cam slot 202, formed in a segment 203, also pivoted on the shaft 199. A spring 204, stretched between a stud on the segment 203 and the bell crank 196, normally maintains the stud 201 in the left-hand end of the cam slot 202.

Secured to the shaft 199, for each auxiliary differential mechanism, is a driving member 205, having a cam edge 206, against which the stud 201 on the latch 200 is normally engaged by the action of the spring 204. The shaft 199 is rocked first counter-clockwise, as viewed in FIG. 5, and then clockwise back to its normal position during certain operations of the machine. During the counterclockwise movement of the shaft 199, the driving member 205, engaging the stud 201, carries the latch 200 and the bell crank 196 therewith, to thrust the stop member 194 leftwardly as viewed in FIG. 5.

During the time that the account card or factor memory card is fed into the machine in a balance pick-up operation, the data represented by the respective channels on the card controls the operation of solenoids 103 of the auxiliary differential mechanisms corresponding to these channels. The solenoid 103 for each auxiliary differential mechanism, as fully set forth and described in the previously cited United States Patent No. 2,947,475, is normally energized and therefore holds a spring-urged pawl 177 in its downward position. The pawl 177, which is urged counter-clockwise (FIG. 5) by a spring 178, is pivoted on a stud 209, carried by the framework of the machine, and lies in the plane of notches 210 of the segment 203. A downward extension 179 on the pawl cooperates with a slide 180 to prevent movement of the slide unless the pawl is released by deenergization of the solenoid. In a proper pick-up operation, the pawls 177 of all of the auxiliary differential mechanisms are released, so that movement of the slide 180 is permitted, thus closing a set of contacts SC13B1 (FIG. 61A) in a switch unit 181, to indicate a proper pick-up of information from the account or factor memory card, and thereby permit continuation of operation of the machine in its predetermined sequence.

When, during the operation of the machine, the solenoid 103 is deenergized to release the pawl 177, said pawl, which is biased to move counter-clockwise, as viewed in FIG. 5, is released to engage the particular notch 210, corresponding to a predetermined numerical value, which is in the path of the pawl 177 at the moment when the solenoid 103 is deenergized.

The operation of the segment 203 is synchronized with the movement of the ledger card into the accounting machine, so that, when a control point representing a digit of a certain value reaches the reading and recording head, the solenoid is deenergized as a result of a signal from the card at the moment the notch 210 of the commensurate value is in the path of the pawl 177. When the pawl 177 engages the notch 210, the segment 203 is stopped. However, the bell crank 196 is driven a short distance thereafter by the driving member 205, and during this movement the stud 201, riding in the cam slot 202, causes the latch 200 to be rocked clockwise on the bell cran 196, to disengage the stud 201 from the cam edge 206, thus permitting the driving member 205 to move its full excursion after the segment 203 has been arrested by the pawl 177. The clockwise rocking of the latch 200 causes the stud 201 to engage in one of the locking notches 207 in a locking plate 208.

Disengagement of the latch stud 201 from the driving member 205 causing the bell crank 196 and the stop arm 194 to be arrested in the position commensurate with the value of the digit picked up from the ledger card, and positions an end 213 of the stop arm 194 in the path of a stud 211 on the reset spider 114. Therefore, when the stud 211 is moved upon the rocking of the reset spider 114, said stud, engaging the end 213 of the stop arm 194, arrests the spider 114 in a position commensurate with the valve picked up from the card. The arresting of the reset spider 114, through the stud 121, disengages the latch 125 from the driving segment 127 of the amount differential, thus setting the amount differential into a position commensurate with the value read from the card.

The amount differential thereby sets the printing mechanism and the memory switch in the manner well known in the art, through the beam 149, the link 152, and the segment arm 156.

The bell crank 196 and the stop arm 194 are restored to their normal positions, after the proper entries have been made, by a stud 215 on the driving member 205. During the return stroke of the driving member 205, the stud 215 engages the surface 182 on the latch 200, thus carrying the latch and the bell crank 196 back to the home positions. Near the beginning of the return stroke, the stud 201 is moved into its left-hand, or normal, position within the slot 202, which removes the stud 201 from the notch 207 and into the patch of the cam edge 206.

For a further description of the construction and operation of the auxiliary differential mechanism, reference may be had to the previously-cited United States Patent No. 2,947,475.

*Memory Switch Line*

The memory switch line 225 is shown in FIGS. 6A, 6B, and 7 to 10 inclusive. It consists generally of a plurality of memory switch units for the storage of information, each unit storing one decimal number, and of means for controlling the setting and resetting of the various memory switch units.

A fixed central shaft 226 and two auxiliary fixed supporting shafts 227 and 228 support the memory switch line 225, and in turn are supported by the brackets 166, which are fixed to the accounting machine framework.

In the illustrated embodiment, a total of twenty-eight memory switch units 229 are mounted on the central shaft 226, although it is apparent that in alternate embodiments of the system, either a greater number or a smaller number of switch units could be employed, depending upon the amount and type of information which it is desired to store.

Figure 7:
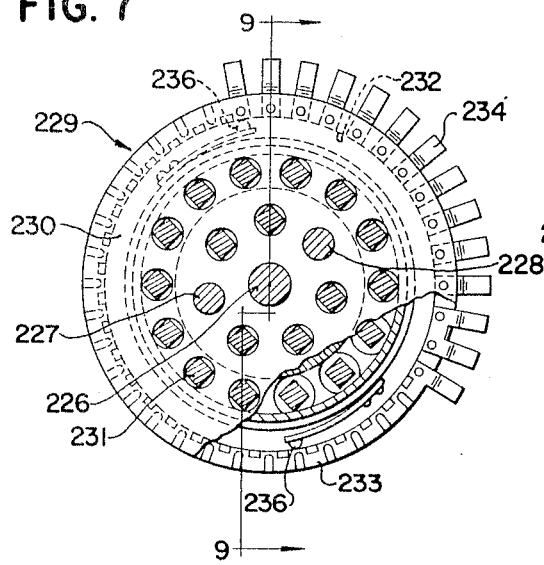
FIG. 7 is an elevational view, partially in section, of one side of a memory switch unit.
Figure 8:
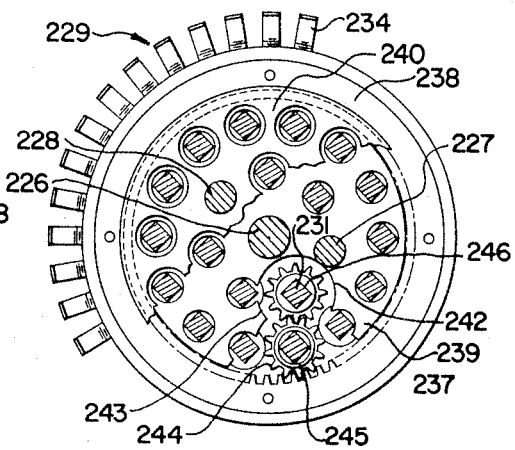
FIG. 8 is an elevational view of a memory switch unit, showing the side opposite that shown in FIG. 7.
Figure 9:
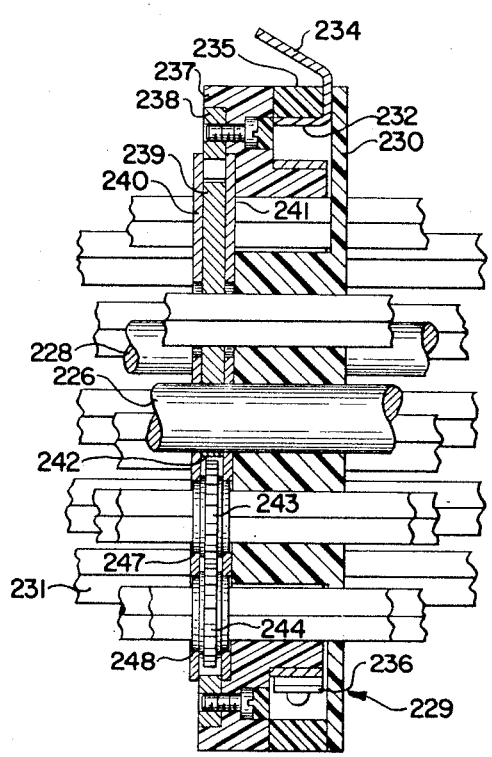
FIG. 9 is an enlarged sectional view taken along line 9—9 of FIG. 7.

The memory switch units 229 are all identical, and the details of construction of one of said units are shown in FIGS. 7, 8, and 9.

Non-rotatably mounted on the central shaft 226 and on the two auxiliary fixed supporting shafts 227 and 228 is a first circular member 230, having a central aperture to receive the central shaft 226, and having a plurality of additional apertures therein to permit square transmission shafts 231 to pass therethrough. These shafts 231 function to transmit the desired amount of differential movement from the external-internal gear 170 (FIG. 5) to the movable portion of the memory switch units 229, in accordance with the setting of the accounting machine differential mechanism, as will be subsequently described. Along the periphery of the member 230 are positioned a plurality of contact elements 232, including a contact element for each digit value from zero to nine, a contact element for a "zero elimination" position, an extra contact element which may be used for special purposes, and two contact elements which are attached to a common strip 233 extending more than half-way around the periphery of the member 230. Each contact element 232 has a terminal portion 234 integral therewith to permit the attachment of wiring. An annular element 235 is positioned to the outside of the contact elements 232 to retain them in the proper location.

Cooperating with the various contact elements 232 are two wipers 236 fixed to an annular member 237 having an internal gear segment 238 attached thereto, which member is rotatably mounted on a circular plate 239 on the central shaft 226 and is retained in proper relation to the plate 239 by two circular retaining elements 240 and 241, also mounted on the central shaft 226. It will be seen that apertures are provided through the plate 239 and the elements 240 and 241 to accommodate the square shafts 231. The plate 239 is provided with a cut-out portion, such as the portion 242, to accommodate one or more pinions, such as the pinions 243 and 244 in FIGS. 8 and 9. In the unit shown, the outermost pinion 244 is an idler pinion with a round central aperture 245 to receive rotatably a square transmission shaft therethrough, while the inner portion 243 is provided with a square aperture 246 to cause it to rotate with the square shaft 231, on which it is mounted. The two pinions 243 and 244 are provided with shoulders 247 and 248, which bear in holes in the elements 240 and 241.

Differential movement of the square shaft 231 is thus transmitted through the pinion 243 and the idler pinion 244 to the internal gear segment 238 attached to the member 237 on which the wipers 236 are mounted, so that one of the wipers is set to a particular contact position, according to the movement of the square transmission shaft 231, while the other wiper rests on the common strip 233. The digital information set in the corresponding differential mechanism is thus stored in the memory switch unit 229. It should be noted that in another memory switch unit of the memory switch line, a pinion with a square opening is mounted on the square shaft which passes through the pinion 244, and the pinion of the other unit is rotated with said square shaft to set the other switch unit according to the movement of said shaft.

Figure 10:
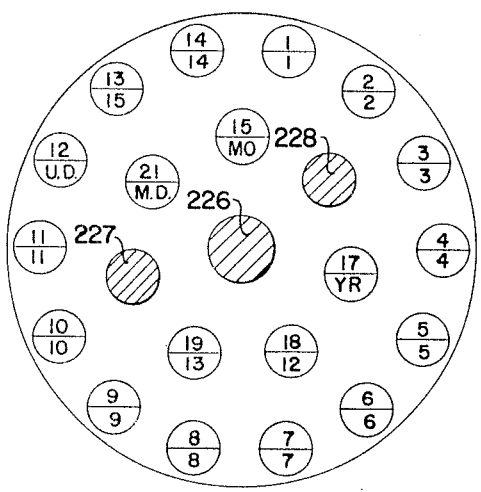
FIG. 10 is a diagrammatic view showing which memory switch line pinions are controlled by the various amount differential mechanisms.

The diagram of FIG. 10 shows the relation of the square shafts in the present embodiment to the memory switch units and differential mechanisms with which they are associated. In each circle, the upper number is an arbitrary number denoting the pinion (or square shaft) position, while the lower number indicates the amount row or date-printing wheel with which the particular pinion and shaft are associated. For example, it will be seen that pinion position 1 is associated with amount row 1. The arrows connecting the circles in the inner group with certain of the circles in the outer group indicate the position of the idler pinion through which movement is transmitted from an inner pinion to the internal gear drive of a memory switch unit. For example, it will be seen that movement transmitted through a square shaft to the number 18 pinion from the number 12 amount bank is transmitted over an idler pinion in the number 6 position to the internal gear drive of one of the memory switch units. In addition, it should be noted that more than one memory switch unit can be controlled from a given amount row differential mechanism merely by placing, on the square shaft associated with said differential mechanism, a drive pinion for each memory switch unit to be controlled.

As shown in FIGS. 5 and 6B, the positioning of the square shafts 231, and consequently the positioning of the wipers of the various memory switch units 229, is controlled by the external-internal gears 170 of the memory switch line 225, which in turn are controlled by the external-internal gears 163 associated with the respective amount differential mechanisms.

Also located on the shafts 226, 227, and 228, but having no functional association with the memory switch line 225, are a plurality of external-internal gears 249 controlled by means of square transmission shafts in the well-known manner from the date knobs 93 (FIG. 1), through external-internal gears 250. The gears 249 mesh with gears 251 on the shaft 165 to drive said gears for effecting setting of date-printing means to cause the printing of the date on the various record members used in the system.

Returning now to consideration of the memory switch line 225, it will be noted that the twenty-eight memory switch units 229 of the line are in two groups, one shown in FIGS. 6A and 6B to the left of a V-shaped break 252 in the square shaft 231, and the other group shown to the right of said V-shaped break. Of the nineteen square shafts 231 extending through the memory switch line 225, thirteen are divided into two parts by V-shaped breaks 252, while six (namely, numbers 12, 13, 14, 15, 17, and 21 of FIG. 10) are unbroken throughout their entire length. The unbroken shafts are those controlled by the four date knobs 93, plus those controlled by the fourteenth and fifteenth amount row differential mechanisms.

As previously mentioned, movement is imparted to the square shafts 231 for setting of the memory switch units 229 by means of the cooperating gears 163 and 170. Therefore the fifteen memory switch units 229 located to the left, as seen in FIGS. 6A and 6B, of the breaks 252 in the shafts 231, are shifted whenever the corresponding differential mechanisms are shifted, and thus always are set according to the setting of the corresponding differential mechanisms. These fifteen memory switch units 229 are associated with amount rows 1 to 15 inclusive of the accounting machine. As will subsequently appear, the switches 229 corresponding to amount rows 1 to 8 inclusive are used in computation of an insurance trial balance, while the switches 229 corresponding to amount rows 9 to 15 inclusive are used in the computation of interest.

The memory switch units 229 to the right of the breaks in the shafts 231 may be set according to the settings of the differential mechanisms and then disengaged therefrom to retain these settings regardless of subsequent resetting of the differential mechanisms. This is accomplished through separation of the two sections of the various square shafts 231 at the breaks 252 by means of disengaging means, to be subsequently described. The thirteen memory switch units 229 to the right of the break in the shafts 231, corresponding to the amount rows 1 to 13 inclusive, and representing five digits of loan information and eight digits of share information, may thus be set according to certain information entered into the accounting machine, and then be disengaged from the differential mechanisms by separation of the shafts 231 to store that information until it is required, regardless of the subsequent movement of the differential mechanisms to new settings.

*Memory switch engaging and disengaging means*

The mechanism for engaging and disengaging certain of the memory switch units 229 of the memory switch line 225 (FIGS. 6A and 6B) with respect to their corresponding differential mechanisms will now be described.

As shown in FIG. 6B, this mechanism is mounted on the machine framework at the right side of the accounting machine. The shafts 231 which are divided into two parts terminate at their right ends in enlarged heads 260, which are positioned between two end plates 261 and 262 (FIGS. 6B and 11 to 16 inclusive) secured together by pins 263 and mounted on the shaft 226. The non-divided shafts 231 extend through holes in both of the plates 261 and 262, and are not affected by movement of said plates. Secured by brazing or other suitable means to the plate 262, and mounted on the shaft 226, is a sleeve 264, to which a stud 265 is fixed. The stud 265 rides in an angled slot 266 in a turned-over portion 267 of a slide 268 mounted for reciprocating movement by means of slots 269 and 270, which receive studs 271 and 272 secured in the machine framework 259. A spring 273, connected between a stud 274 on the slide 268 and a stud 275 in the machine framework, urges the said slide to the left, as viewed in FIGS. 11 and 12. A stud 276 on the slide coacts with the actuator of a switch 277 containing contacts SC93, which function to control a portion of the operating circuitry, as well be described subsequently. Pivotally mounted on a stud 278 on the slide 268 is a cam 279, which is urged by a spring 280 against a stud 281 fixed in the slide 268. A notch 282 in the upper surface of the slide cooperates with a pawl 283, which is pivotally mounted on a stud 284 in the machine framework and is urged clockwise, as viewed in FIGS. 11 and 12, by a spring 285 connected between a stud 286 on the pawl and a stud 287 on the cam 279 to retain the slide 268 in the position in which it is shown in FIG. 11.

The stud 286 on the pawl 283 is positioned in the path of movement of a surface 288 on an arm 289 pivoted on a stud 290 in the machine framework, and urged by a spring 291 to maintain the position in which the arm is shown in FIG. 11. A second surface 292 on the arm 289 is located in the path of movement of a stud 293 fixed in a plate 294, which is pivotally mounted on a stud 295 in the machine framework. The plate 294 is urged clockwise, as viewed in FIG. 11, by a spring 296, and its permissible extent of movement is limited by the cooperation of the surface of a cut-out portion 297 on the plate 294 with a sleeve on a shaft 298 mounted in the machine framework.

Pivotally connected to the plate 294 is a link 299, the other end of which is pivotally connected to a solenoid L23 mounted on the machine framework.

It will be seen that energization of the solenoid L23, by operating circuitry which will be described subsequently, is effective to rock the plate 294 counter-clockwise, as viewed in FIG. 11. This causes the stud 293 to engage the surafce 292 on the arm 289 to rock said arm counter-clockwise about the stud 290, which in turn engages the surface 288 of the arm 289 with the stud 286 on the pawl 283, and causes said pawl to be shifted counter-clockwise about the stud 284 against the force of the spring 285 and out of engagement with the notch 282 in the slide 268. This permits said slide to shift to the left, as shown in FIG. 11, under the urging of the spring 273, to the position in which it is shown in FIG. 12, and causes the slot 266 in the portion 267 of the slide 268 to cam the stud 265 to the right, as viewed in FIG. 14, to the position in which it is shown in that figure. Since the stud 265 is fixed to the sleeve 264, which in turn is fixed to the assembly of plates 261 and 262 between which the ends of the split shafts 231 are secured, the shafts also are caused to move to the right and are thus disengaged from the leftmost portions of the split shafts 231. The memory switch units 229 to the right of the breaks 252 in the shafts 231 are thus operatively disengaged from the differential mechanisms, and can be maintained in the positions to which they have been set, to retain the information represented by their settings, regardless of subsequent shifting of the differential mechanisms.

Means are also provided for resetting and engaging the memory switch units 229 during a new balance operation of the accounting machine. A curved slot 310 in the plate 294 receives a stud 311, which is fixed in one end of a restoring link 312, and which is also positioned on the other side of the link 312 in operative relation to a slot 313 in a drive arm 314 pivoted on the shaft 298. The slot 313 is provided on its lower side with a notch 315, in which the stud 311 can be positioned. The drive arm 314 is driven by means of a slot 306 in said arm, in which is positioned a stud 307 fixed to an arm 308 on a shaft 309, which partakes of regular cyclic operation.

A guide 316, comprising two vertical arms having a roll 316A positioned therebetween, is provided to restrain the link 312 against undesired lateral movement, and a spring 317 is connected between said guide and the link 312 to urge it to the right, as viewed in FIG. 11. At its left-most end, the link 312 is pivotally connected by a stud 319 to a restoring plate 318, which is rotatably mounted on the shaft 226, and which is connected by an extension of the stud 319 and by a cross-member 320 to a second restoring plate 321, also rotatably mounted on the shaft 226.

Between the plates 318 and 321 are thirteen memory switch resetting plates 322, one of which is shown in FIG. 17. These plates correspond to the thirteen memory switch units 229 to the right of the breaks 252 in the shafts 231, and are provided with internal gears adapted to mesh with pinions on the shafts 231, so that the setting of each of the plates 322 corresponds to the setting of one of said thirteen memory switch units 229. Each plate 322 is provided with a projection 323, which is located in the path of movement of the extension of the stud 319.

The manner in which the thirteen disengageable memory switch units are reset to zero position and re-engaged with their corresponding differential mechanisms is as follows. When a new balance operation of the accounting machine is initiated, the solenoid L23, which had previously been deenergized, is energized under control of operating circuitry which will be described subsequently. Energization of the solenoid L23 is effective, through the link 299, to rock the plate 294 counter-clockwise, as viewed in FIG. 11, thus carrying the stud 311 in the slot 310 downwardly onto the notch 315 of the arm 314. When the arm 314 receives its regular counter-clockwise movement by the shaft 309, acting through the arm 308, the stud 307, and the slot 306, the link 312 is shifted to the left, from the position in which it is shown in FIG. 11 to the position in which it is shown in phantom lines in FIG. 12, thus rotating the plates 318 and 321 counter-clockwise. During this movement, the extension of the stud 319 picks up the projections 323 of all of the plates 322 and carries them to the position shown in FIGS. 12 and 17. This movement of the plates 322 is transmitted through their respective square shafts 231 to the corresponding memory switch units 229, and is effective to reset said memory switch units to "eliminate" position.

The "eliminate" position is provided on the accounting machine type wheels and associated mechanism to enable the elimination of printing of non-significant zeros in amounts, as is well known in the art. For a description of the construction and operation of a zero elimination mechanism, reference may be had, for example, to United States Patent No. 2,305,000, issued to Mayo A. Goodbar on Dec. 15, 1942.

The counterclockwise movement of the plate 318 causes a roller 324, mounted thereon, to engage the cam 279 and shift it out of the way against the force of the spring 280, so that, when said movement of the plate 318 is completed, the roller 324 is positioned above the cam 279.

The new balance operation of the accounting machine requires two machine cycles for completion. At the end of the first cycle, all of the amount differential mechanisms are set to "eliminate" position, so that the left portions, as viewed in FIGS. 6A and 6B, of all of the split square transmission shafts 231 are set to "eliminate" position. It will be recalled that the right portions of these shafts are also in "eliminate" position, so that the shafts are in proper condition for reengagement.

Also at the end of the first cycle, the arm 314 is shifted clockwise by the shaft 309, and carries the link 312 with it to the right, through the connection between the stud 311 and the slot 315, which also causes the plate 318 and the roller 324 thereon to be rotated clockwise. The link 312 is restrained against upward movement by the engagement of a surface 312A thereon with the roll 316A. As the roller 324 is moved, it engages the cam 279 and forces said cam, and the slide 268, on which the cam is mounted, to the right, as viewed in FIG. 11. This causes the stud 265 to be shifted to the left, as viewed in FIG. 14, by the angled slot 266, which shifts the assembly including the sleeve 264, the plates 261 and 262, and the right portions of the split shafts 231 to the left, as viewed in FIG. 14, thereby effecting reengagement of the two portions of each of the split shafts 231.

Movement of the slide 268 to the right, as viewed in FIG. 11, also permits the pawl 283, under the urging of the spring 285, to drop into the notch 282 in the slide 268, to retain said slide in the position in which it is shown in FIG. 11. This, of course, also retains the two portions of the split shafts 231 in engaged relation.

*Totalizer engaging means*

The engaging and disengaging mechanism for the totalizer lines 175 and 176 is shown in FIGS. 18, 19, and 20 and is controlled by two selecting plates 326 and 328 (FIGS. 21 and 22), which are mounted on a hub 330 on a shaft 332 in the accounting machine. In addition, a plate 327 (FIG. 23) is also provided, mounted on a hub 329 on the shaft 332, and functions to insure that the pawls used for sensing the plates 326 and 328 do not remain partially engaged with said plates when said plates are being shifted, to cause a drag thereon, as will subsequently be described.

Figure 21:
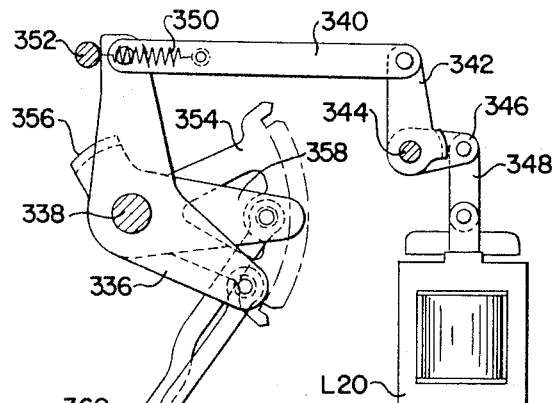
FIG. 21 is a detail view showing one of the selecting plates for controlling the totalizer-engaging means, the means for sensing said plate, and the means for positioning said plate.

Pivoted at one end to the plate 326 (FIG. 21) is a link 334, which is pivoted at its other end to one arm of a bell crank 336, free on a shaft 338 in the machine framework. The other arm of the bell crank 336 is connected by a link 340 to an arm 342 on a shaft 344. Also mounted on the shaft 344 and connected for unitary movement with the arm 342 is an arm 346, connected by a link 348 to the armature of a solenoid L20, fixed in the machine framework. A spring 350, connected at one end to the link 340 and at the other end to a stud 352 in the machine framework, exerts a force to maintain the plate 326, the link 334, the bell crank 336, the link 340, the arms 342 and 346, and the link 348 in the position in which they are shown in FIG. 21, except when the solenoid L20 is energized.

Energization of the solenoid L20 acts through the link 348, the arms 346 and 342, the link 340, the bell crank 336, and the link 334 to rock the selecting plate 326 clockwise, against the force of the spring 350.

Positioning of the plate 328 (FIG. 22) is controlled by the key selected in control row 2 of the accounting machine. The control row 2 differential mechanism (not shown) is positioned according to the selected key, and this positioning is effective to set the control row 2 indicator segment 354 (FIGS. 21 and 22) correspondingly, as described in the previously-mentioned United States Patent No. 2,947,475. Connected to the control row 2 indicator segment 354 for unitary movement therewith, by a yoke 356, is an arm 358, pivotally connected to one end of a link 360, the other end of which is pivotally connected to the selecting plate 328. Key selection in control row 2 is thus effective, through the mechanism described above, to determine the setting of the plate 328.

The peripheries of the selecting plates 326 and 328 are provided with a plurality of notches, such as the notches 362 and 363 on the plate 326, and the various notches 365 on the plate 328. Arranged to sense the peripheries of the selecting plates 326 and 328 are a pair of selecting plate pawls 367 and 369, each having a pair of ends for this purpose. The selecting plate pawls 367 and 369 are pivotally mounted at 407 and 409 on levers 402 and 404 (FIG. 18) of the totalizer-engaging mechanism.

Referring now to FIGS. 18 and 19, the construction of the totalizer-engaging mechanism, and the manner in which the plates 326 and 328 control the operation of said mechanism, will now be described.

Fixed to the main drive shaft 108 are a plurality of cams 366, 368, and 370, which operate the totalizer-engaging mechanism of FIGS. 18 and 19.

Cooperating with the peripheries of the cams 368 and 370 are a pair of rollers 372 and 374 on a bell crank 376, which is rotatably mounted on a shaft 378 in the machine framework. Pivotally connected to one end of the bell crank 376 is a link 380, having a central aperture; upper and lower notches 382 and 384, engageable with pins 386 and 388 on an engaging spider 390; and an elongated slot 391, in which rides a roller 393, which is positioned by mechanism (not shown) associated with control row 1 of the accounting machine. This mechanism acts through the roller 393 to position the link 380 so that the notch 382 is in engagement with the pin 386, as shown in FIG. 19, when the machine is to perform "add" transactions. When control row 1 is set to cause the machine to perform a "reset" transaction, the roller 393 positions the link 380 so that the lower notch 384 is in engagement with the pin 388. The manner in which control row 1 controls the setting of the link 380 is fully described in the previously mentioned United States Patent No. 1,619,796, to Bernis M. Shipley.

The spider 390 is rotatably mounted on the shaft 332 and is provided with a plurality of hooks 392 arranged to cooperate with studs 394 and 396, fixed on links 398 and 400, which are rotatably mounted on the levers 402 and 404, pivotally connected at 403 and 405 to bell cranks 406 and 408, free on shafts 410 and 412, fixed to the machine framework. The bell cranks 406 and 408 are provided with bifurcated portions to receive the ends of two of the arms of a three-armed lever 414, rotatably mounted on the shaft 332. Springs 416 and 418 are connected between two of the arms of the lever 414 and the levers 402 and 404, and urged the ends of the pawls 367 and 369, pivotally mounted on the levers 402 and 404, into engagement with the peripheries of the totalizer-selecting plates 326 and 328.

Also connected to the pivotal connection 405 between the lever 404 and the bell crank 408 is one end of a link 411, the other end of which is pivotally connected to a cam follower 413, free on a shaft 415, having a roll 417, which rides in an internal raceway 419 in the cam 366.

The studs 394 and 396, fixed to one end of each of the links 398 and 400, ride in slots 420 and 422, each of which is provided at one end with a recess 424 and 426, respectively, in a plate 428, fixed in the machine framework. The other ends of the links 398 and 400 are pivotally secured to arms 430 and 432, fixed to shafts 434 and 436, which ride in slots 438 and 440 in plates 442 and 444, fixed in the machine framework. Rollers 446 and 448 on the arms 430 and 432 project into cam slots 450 and 452 in the plates 442 and 444.

The carrying frames for the totalizer lines 175 and 176 are similar, and the frame for the totalizer line 176 is partially shown in FIG. 20. The totalizers of the line 176 are mounted free on a tube 454, carried by an arm 456 and a companion arm (not shown), slidably mounted on the shaft 436. The arm 456 has a slot 458, engaging one of two lugs (not shown), depending upon the position of the totalizers, to prevent the arm 456 and its companion arm from turning on the shaft 436. Connecting the arm 456 and its companion arm is a rod 460, which spaces the two arms a proper distance apart. The two arms mentioned, the rod 460, and the tube 454 form a frame which is slidable on the shaft 436 for the purpose of bringing any desired pinions of the totalizers of the line 176 into engagement with the differential actuator 115 in a manner which is well known in the art and which is described in United States Patent No. 1,394,256, issued to Frederick L. Fuller on Oct. 18, 1921.

The mode of operation of the totalizer-engaging mechanism will now be briefly described. Adjustment of the selecting plate 326 is accomplished at the beginning of a balance pick-up operation under control of the solenoid L20. In the event that an "active" ledger card (that is, one on which an entry is to be made during the operating sequence of the system, such as an account card, in a share payment or a share transfer program) is fed into the accounting machine, the energizing circuit for the solenoid L20, which will be described subsequently, is not completed, and the solenoid is therefore not energized. The selecting plate 326 accordingly remains in the position in which it is shown in FIG. 21, with the notch 362 positioned out of the path of movement of the right end of the pawl 367, and with the notch 363 positioned in the path of movement of the left end of the pawl 369. In the event that an "inactive" card (that is, one on which no entry is to be made during the operating sequence of the system, such as a factor memory card, in a share payment or share transfer program) is fed into the accounting machine, the energizing circuit of the solenoid L20 is completed, and the solenoid L20 energizes. This force acts through the linkage shown in FIG. 21 to rock the selecting plate 326 clockwise, as viewed in FIG. 21, so that the notch 362 in said plate is positioned in the path of movement of the right end of the pawl 367, while a portion of the large notch 363 is still positioned in the path of movement of the left end of the pawl 369.

Figure 22:
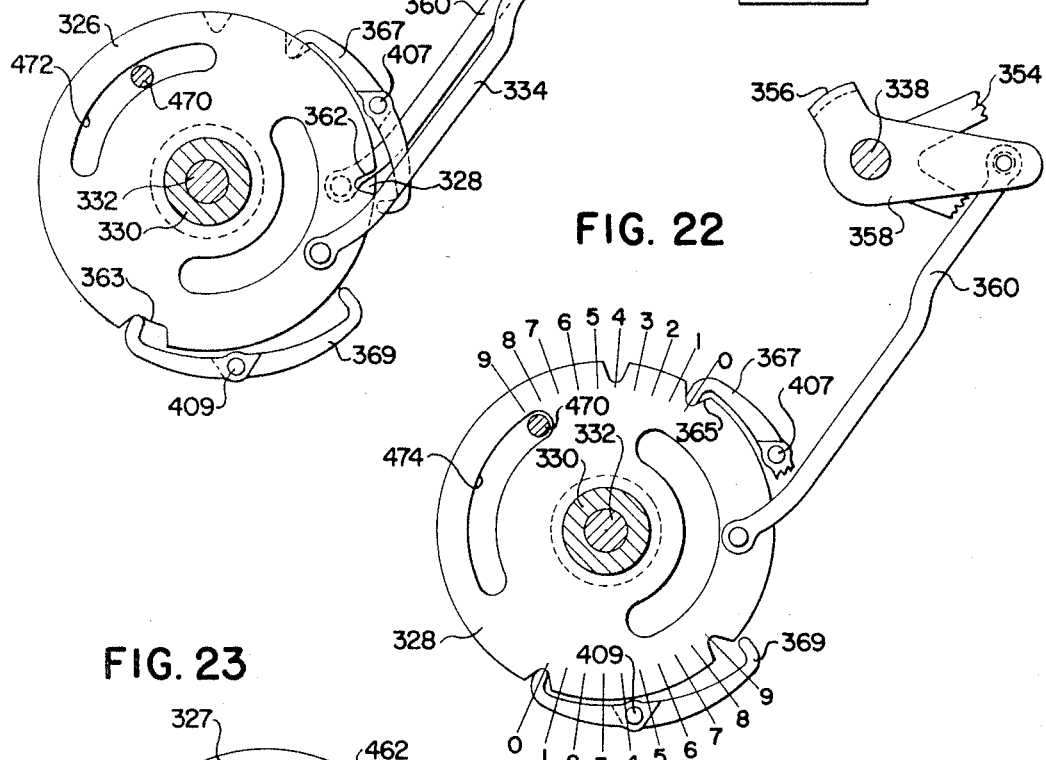
FIG. 22 is a detail view similar to FIG. 21, showing a second selecting plate with its sensing and positioning mechanisms.

As previously stated, the selecting plate 328 is set according to the position of control row 2 of the accounting machine. During a positive balance pick-up operation (no negative balance pick-up is provided for in the present system), control row 2 is set to its position "9," as fully described in the previously-mentioned United States Patent No. 2,947,475. The selecting plate 328 is correspondingly positioned, through the arm 358 and the link 360. Therefore, when a positive balance is picked up from the ledger card, the plate 328 is shifted from the "0" position, in which it is shown in FIG. 22, to a position in which a high portion of the periphery of the plate (indicated in FIG. 22 by a line denoted "9") is located in the path of movement of the left end of the pawl 367. In this position of the plate 328, a notch in the periphery of said plate (also indicated in FIG. 22 by a line denoted "9") is located in the path of movement of the left end of the pawl 369, while the right end of said pawl is located over a high portion of the periphery of the plate 328.

The left end of the pawl 367 is so constructed and arranged that it senses only the periphery of the plate 328, while the right end of said pawl is so constructed and arranged that it senses only the periphery of the plate 326. The right end of the pawl 369 is so constructed and arranged that it senses only the periphery of the plate 328, while the left end of the pawl 369 is of a double thickness and is constructed and arranged to sense the peripheries of both plate 326 and plate 328. It will accordingly be seen that, in order for the pawl 367 to be maintained in its outermost position with respect to the shaft 332 at the center of the plate 326, its left end must be positioned opposite a high portion of the plate 328, and its right end must be positioned opposite a high portion of the plate 326. In order for the pawl 369 to be maintained in its outermost position with respect to the center of the plates 326 and 328, its right end must be positioned opposite a high portion of the periphery of the plate 328, while its left end must be positioned opposite a high portion of the periphery of either the plate 326 or the plate 328.

During positioning of the selecting plates 326 and 328, the cam 366 rocks the cam follower 413 counter-clockwise from the position in which it is shown in FIG. 18, thus moving the link 411 downwardly and rocking the bell cranks 406 and 408 clockwise, and the lever 414 counter-clockwise.

After the plates 326 and 328 have been positioned in the manner described above, the cam 366 rocks the cam follower 413 clockwise to its former position. This moves the link 411 upward and rotates the bell cranks 406 and 408 counter-clockwise and the three-armed lever 414 clockwise, to their former positions. The movement of the bell cranks 406 and 408 moves the pivots 403 and 405 toward the plates 326 and 328, and along with them the pawls 367 and 369. Where high spots on the plates 326 and 328 are located opposite both ends of the pawls 367 and 369, said pawls are held against inward movement, and their pivot points 407 and 409 form fulcrums for the levers 402 and 404, the outer ends of which move the studs 394 and 396 of the links 398 and 400 into engagement with the hooks 392 on the spider 390. Where low spots on the plates 326 and 328 are located opposite either end of the pawls 367 and 369, the ends of the pawls 367 and 369 move into the low spots on the plates 326 and 328, so that the studs 394 and 396 fail to engage the hooks 392 on the spider 390.

When the levers 402 and 404 have completed their movement just described, the cam 370 (FIG. 19) rotates the bell crank 376 and the spider 390 clockwise, pulling with them either or both of the links 398 and 400, whose studs 394 and 396 are engaged with the hooks 392 on the spider 390. The opposite ends of the links 398 and 400 are pivoted to the arms 430 and 432, fastened to the shafts 434 and 436, and pull these shafts toward the differential actuators 115 (FIG. 20), at the same time rotating said shafts sufficiently to remove the aligners (not shown) which are engaged with the totalizer wheels. The totalizers of the totalizer lines 175 and 176, each being mounted on a frame which is in turn mounted on the shafts 434 and 436, as previously described, are moved into engagement with the differential actuators 115.

It will be seen that with the selecting plate 328 in position 9, and with the selecting plate 326 shifted out of the position in which it is shown in FIG. 21, during the processing of an "inactive" account, the right end of the pawl 367 is moved into the notch 362 in the periphery of the plate 326, and the totalizer line 175 accordingly is not engaged with the differential actuators 115. The left end of the pawl 369 is moved into the notch 363 in the periphery of the plate 326, and the right end of the pawl 369 engages a high portion of the periphery of the plate 328. The totalizer line 176 is therefore not engaged with the differential actuators 115 during this operation of the accounting machine.

On the other hand, when an "active" account is processed, the plate 326 remains in the position in which it is shown in FIG. 21, while the plate 328 is set to position 9. In this case, the left end of the pawl 367 engages a high portion of the periphery of the plate 328, while the right end of said pawl engages a high portion of the periphery of the plate 326, and the totalizer line 175 is accordingly engaged with the differential actuators 115 during this operation. The right end of the pawl 369 engages a high portion of the periphery of the plate 328, but the left end of said pawl engages notches in both plates 326 and 328, thus preventing engagement of the totalizer line 176 with the differential actuators 115 during this operation.

The totalizers of the totalizer line 175 and the totalizer line 176 which have been engaged with the differential actuators 115 are disengaged from said actuators, at the end of the operation, by a counter-clockwise movement of the spider 390, under control of the cam 368, which causes this disengaging movement to be commenced at approximately 320 degrees of rotation of the main drive shaft 108 and to be completed at 360 degrees of rotation of said shaft.

As previously mentioned, the plate 327 (FIG. 23) functions to insure that the pawls 367 and 369 are moved out of engagement with the selecting plates 326 and 328 during the time in the cycle of machine operation that said selecting plates may be shifted. This prevents a drag on the selecting plates which might interfere with proper machine operation. Notches 462 and 464 in the periphery of the plate 327 are arranged to receive the ends of the pawl 367, while notches 466 and 468 in the periphery of said plate are arranged to receive the ends of the pawl 369.

Shifting movement of the plate 328, about the shaft 332 and the hub 329, on which it is supported, is supplied by the lever 414 through a stud 470, which is fixed in one arm of the lever 414, extends through slots 472 and 474 in the selecting plates 326 and 328, and is received in a hole in the plate 327.

Figure 23:
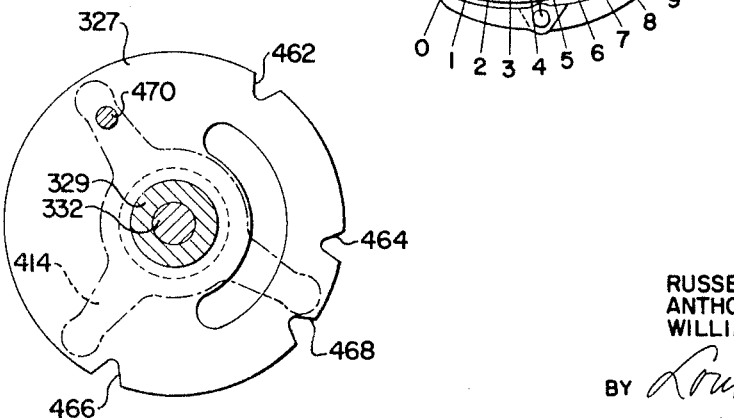
FIG. 23 is a detail view of a third plate, which is employed to insure proper disengagement of the selecting plate pawls from the selecting plates of FIGS. 21 and 22.

It will be seen that when the lever 414 is in its home position, as shown in FIGS. 18 and 23, the plate 327 is positioned so that the notches 462, 464, 466, and 468 are positioned in the paths of movement of the ends of the pawls 367 and 369, and therefore permit said pawls to shift inwardly toward the shaft 332 if notches in the plates 326 and 328 are so located as to permit such movement. During the time that the selecting plates 326 and 328 are being positioned, the lever 414 is rocked counter-clockwise, as previously described, and carries the plate 328 with it in this movement, through the stud 470. The notches 462, 464, 466, and 468 are thus shifted from their positions opposite the ends of the pawls 367 and 369. During this shifting movement, if any of the pawl ends have been positioned in the notches of the plates 326, 327, and 328, they are cammed out of the notches and then held out by the high portions of the periphery of the plate 327.

The subsequent clockwise rocking of the lever 414 shifts the plate 327 back to the position in which it is shown in FIG. 23, in which the notches 462, 464, 466, and 468 are opposite the ends of the pawls 367 and 369 to permit normal sensing movement of said pawls.

It will be seen that means have been described above which provide for engagement of the totalizers of the totalizer line 175 with the differential actuators 115 when a ledger card for an "active" account is fed into the accounting machine, and which provide for engagement of the totalizers of the totalizer line 176 with the differential actuators 115 when a ledger card for an "inactive" account is fed into the accounting machine.

*Zero balance switches*

Zero balance switching means are provided in the accounting machine and are controlled by mechanism in the accounting machine to assume one condition when all of the amount denominations of particular groups are set to zero condition, and to assume a second condition when any one or more of the amount denominations of said groups is set to a condition other than zero.

As previously described in connection with FIG. 5, the links 185 connect an arm 184 secured to a segment 153 for each amount bank to a check-back and recording control plate 174 for that bank. These links 185 are used to control the zero balance switches in a manner to be subsequently described.

Fixed to the frame 109 is an auxiliary frame 480, to which is secured a plate 481 having a cross-sectional configuration including a flat central portion and turned-down edges. An angle member 482 is fastened to the plate 481 and has a number of mounting blocks 483 integral therewith to provide threaded apertures for receiving bolts 484 to secure leaves 485 of one side of a hinge element 486 to the angle member 482. The leaves 487 of the other side of the hinge element 486 have fixed thereto two plates 488 and two plates 489. A block 490 is fixed to the inner side of each of the plates 488 in such a manner that it extends beyond the plate 488 and lies behind the rear side of the adjacent plate 489, so that counter-clockwise movement, as viewed in FIG. 25, of one of the plates 488 also causes the adjacent plate 489 to be moved counter-clockwise.

A switch 491 is fixed to the outer side of each of the plates 488 and 489 by means of a bracket 492. Each switch 491 has an actuator 493, to the end of which is secured, by means of a U-shaped bracket 494, a roller 495, adapted to rest upon one corner of the plate 481.

The operation of the zero balance switching control means is as follows. When all of the amount differential mechanisms are set to zero, all of the links 185 are in the position shown in FIG. 25, and, as a result, all of the switches 491 on the plates 488 and 489 are so positioned that the rollers 495 on their actuators 493 engage the corner of the plate 481, and the switches 491 thus remain in an unoperated condition. However, when any link 185 cooperating with any of the plates 488 or 489 is shifted from zero position by setting of its differential mechanism, then the plate 488 or 489 on which the switch 491 is mounted is carried upward by the link 185 in a counter-clockwise direction, as viewed in FIG. 25, so that the roller 495 is moved upward out of engagement with the corner of the plate 481 to permit the actuator 493 to operate the switch 491. Also, if it is a plate 488 which has been carried upwardly, the plate 489 adjacent the plate 488 is also carried upward by the engagement of the block 490 therewith. As a consequence, the switch 491 on the plate 489 is also operated, due to the roller 495 on its actuator 493 being shifted out of engagement with the corner of the plate 481.

It may be noted, however, that if one of the links 185 located under one of the plates 489 is shifted from zero position, then only the plate 489 and not the adjacent plate 488 will be shifted to cause switch operation.

The five links 185 positioned under the two plates 489 are associated with differential mechanisms controlled by book number information, while the links under the two plates 488 are associated with differential mechanisms controlled by share information and loan information.

The various switches 491 contain contacts SC38B1, SC38AC1, SC39AC1, SC39B1, SC40A1, and SC41A1. A brief summary of the manner in which these contacts function in the operation of the system will now be given.

The contacts SC38B1 open when the seven right-most amount differential mechanisms associated with the "loan" side of the accounting machine keyboard are positioned to zero, to prevent the energization of the gripper solenoid L1 in a manual run of the system.

The contacts SC38AC1 close when the seven right-most amount differential mechanisms associated with the "loan" side of the accounting machine keyboard are positioned to zero, to allow energization of the zero balance relay K542 in an automatic run of the system.

The contacts SC39AC1 close when all of the amount differential mechanisms associated with the "share" side of the accounting machine keyboard are positioned to zero, to allow energization of the zero balance relay K542 in an automatic run of the system.

The contacts SC39B1 open when all of the amount differential mechanisms associated with the "share" side of the accounting machine keyboard are positioned to zero, to prevent energization of the gripper solenoid L1 in a manual operation of the system.

The contacts SC40A1 close when the five right-most amount differential mechanisms associated with the "loan" side of the accounting machine keyboard are positioned to zero, to permit energization of the account bypass relay K561 during a share transfer operation.

The contacts SC41A1 close when the five right-most amount differential mechanisms associated with the "share" side of the accounting machine keyboard are positioned to zero, to permit energization of the account bypass relay K561 during a share payment operation.

Control row 1 operating means

Figure 26:
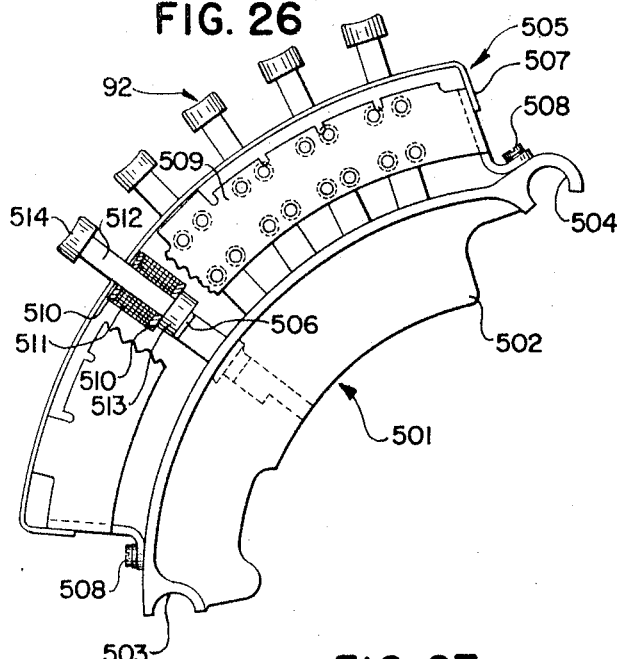
FIG. 26 is a detail view of the control row 1 key bank of the accounting machine.

As has been stated previously, means are provided for effecting automatic depression of the amount keys and control keys of the accounting machine embodying the present invention, said means being of the type shown in the previously-mentioned United States patent application Ser. No. 840,701. In the machine shown in that application, however, automatic operating means were not provided for control row 1, whereas in the present invention, such means for control row 1 are provided, and are shown in FIG. 26.

The control row 1 key bank 501, which is of conventional construction, includes a key frame 502, in which are positioned a plurality of row 1 keys 92, five in the illustrated embodiment. The key bank 501 is mounted in its proper position in the accounting machine by positioning two arcuate surfaces 503 and 504 of said frame on the pair of rods 111 and 112 (FIG. 5), which form a part of the accounting machine structure. Superimposed over this bank and secured thereto is a unit 505 for controlling the keys of the key bank 501 in accordance with information stored in the memory switch units 229.

To adapt the conventional key bank 501 for use with the control pnit 505, a small flat plate 506 is secured to the top end of each key 92 in place of the usual key tips. The control unit 505 is enclosed within a frame 507, which extends over the key bank 501 and is secured thereto at the upper and lower ends by means of screws 508 or other suitable fastening means. A side frame 509 is fixed to the frame 507 and supports a plurality of solenoid brackets 510, two for each key position. A solenoid 511 is contained within each pair of brackets 510 and is provided with suitable wiring for connection to the system circuitry.

Each solenoid 511 is provided with a core 512, to the lower end of which is secured a plate 513. The upper end of the core 512 extends through openings in the bracket 510 and the frame 507, and has attached thereto a key tip 514, of conventional design, on which appropriate indicia, such as a number or a symbol, may be placed.

It will be seen that when power is applied to any one of the solenoids 511 of the control unit 505, the core 512 of that solenoid will be shifted downwardly, so that the plate 513 engages the plate 506 and depresses the key 92 in the same manner as said key would be depressed manually in a conventional accounting machine. The solenoid core 512 may also be shifted downwardly by the key tip 514 to depress the key 92 in the event that a manual operation is desired, in which an operator depresses the key tip 514.

The control unit 505 shown in FIG. 26 therefore provides for electrical operation of the keys of control row 1 of the accounting machine keyboard, while at the same time permitting manual operation of said keys, when appropriate.

Control row 1 switch and interlock means

Figure 28:
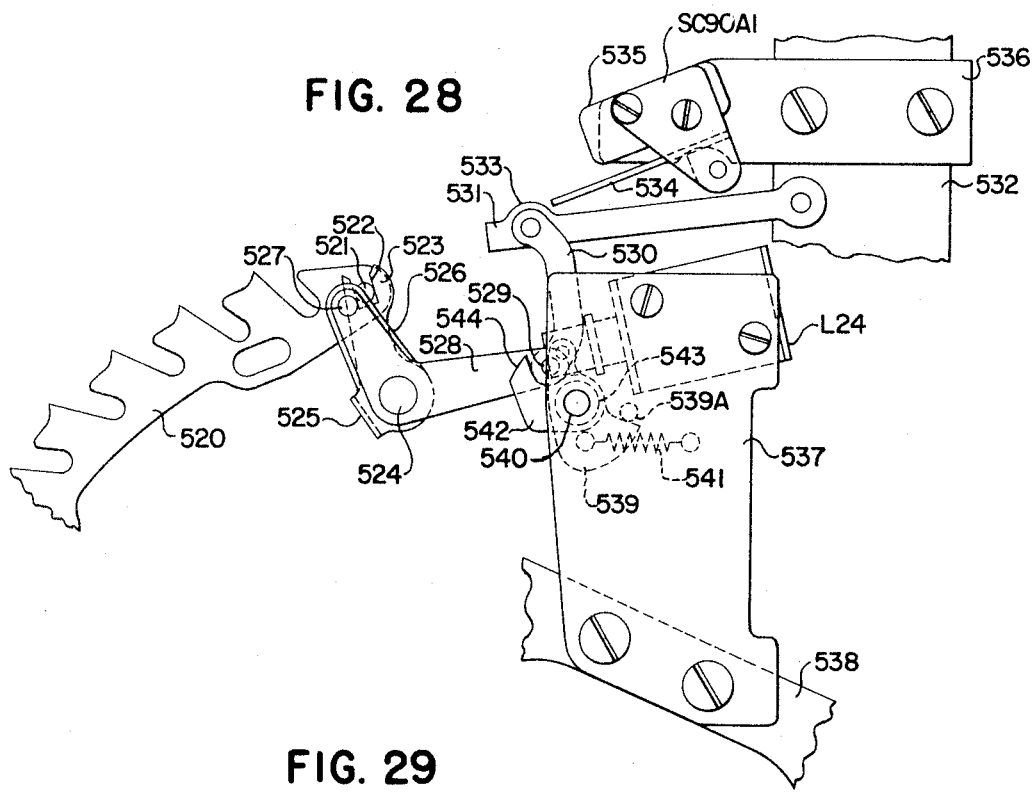
FIG. 28 is a detail view showing key depression interlock means and switch operating means associated with the control row 1 key bank.

In order for the operating circuitry of the machine of the present invention to function in the desired manner, it is necessary that the contacts SC90A1 be caused to close whenever any key of control row 1 is depressed. The mechanism for accomplishing this is shown in FIG. 28 and includes a detent 520 of the control row 1 key bank, having a stud 521 fixed to one end. Said stud rides in a slot 522 of an arm 523 pivotally mounted on a shaft 524 journaled in the machine framework. The arm 523 is integrally connected by a bail 525 to a second arm 526, also mounted pivotally on the shaft 524. A pin 527 connects the arm 526 to one arm of a lever 528, also pivotally mounted on the shaft 524.

The other arm of the lever is provided with a projecting stud 529 and is connected to one end of a link 530, the other end of which is connected to an arm 531, pivotally mounted on a portion 532 of the machine framework. A curved surface 533 on the arm 531 is positioned to be engageable with the free end of an actuator 534 of a switch 535 secured by a bracket 536 to the portion 532 of the machine framework. The switch 535 contains the contacts SC90A1.

When any key 92 of control row 1 is depressed, either manually or by the previously-described solenoid-operating means, the detent 520 is shifted to the left, as viewed in FIG. 28, causing the interconnected arms 523 and 526, and the lever 528, to be rocked counter-clockwise about the shaft 524. This causes the link 530 to be shifted upwardly, rocking the arm 531 counter-clockwise and engaging the surface 533 thereon with the actuator 534 of the switch 535 to close the contacts SC90A1. Subsequent release of the depressed key 92 of control row 1 causes the detent 520 to return to the position in which it is shown in FIG. 28, thus effecting reopening of the contacts SC90A1.

Solenoid-controlled means are provided to retain the detent 520 in its shifted position after a control row 1 key 92 has been depressed, to maintain said key depressed for the necessary period of time to enable the desired machine functions to be performed, as will subsequently be described in greater detail.

Secured by a bracket 537 to a portion 538 of the machine framework is a solenoid L24, the core of which is connected to an arm 539 pivotally mounted on a shaft 540 journaled in the machine framework. The arm 539 is urged counter-clockwise, as viewed in FIG. 28, by a spring 541 connected between said arm and the bracket 537, and its movement is limited by a stud 539A in the bracket 537. The arm 539 is connected for unitary movement with another arm 542 by means of a sleeve 543 on the shaft 540, to which sleeve both arms are fixed. The arm 542 is provided with a curved surface 544, which is engageable with the stud 529 on the lever 528.

When one of the control row 1 keys 92 has been depressed during certain machine operations and it is desired to maintain said key in a depressed position, the solenoid L24 is energized, which rocks the arms 539 and 542 clockwise about the shaft 540, and places the surface 544 of the arm 540 under the stud 529 on the lever 528, thus blocking clockwise movement of said lever and preventing the detent 520 from shifting to the left, as viewed in FIG. 28. This, in turn, is effective to prevent release of the depressed key until such time as the solenoid L24 is deenergized.

Carriage switches

Figure 29:
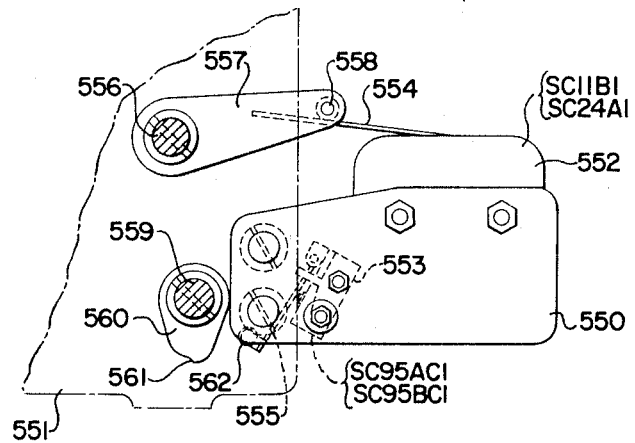
FIG. 29 is a detail view showing switch-operating means associated with the table-positioning and line-finding mechanisms.

Certain switch contacts in the accounting machine circuitry are operated under control of the line-finding and carriage-positioning mechanisms and are shown in FIG. 29.

Mounted on a bracket 550 secured to the machine side frame 551 are two switches 552 and 553. The switch 552 contains the contacts SC11B1 and SC24A1, which are operated by an actuator 554, while the switch 553 contains the contacts SC95AC1 and SC95BC1, which are operated by an actuator 555.

A carriage-positioning shaft 556 is mounted in the machine framework and functions in a conventional manner in the positioning of the accounting machine carriage. An arm 557 fixed to the end of the shaft 556 is provided with a roll 558 at its free end, and said roll is positioned to engage the actuator 554 of the switch 552 to operate the contacts SC11B1 and SC24A1 during clockwise movement of the shaft 556.

Similarly, a differential shaft 559 is mounted in the machine framework and functions in a conventional manner in the line-finding mechanism of the accounting machine, which operates to determine the proper position of the carriage. An arm 560, secured to the end of the shaft 559, is formed with a cam surface 561, which is adapted to cooperate with a roll 562 on the actuator 555 of the switch 553. Accordingly, when the shaft 559 is rotated clockwise during machine operation, the cam surface 561 on the arm 560 engages the roll 562 on the actuator 555 and operates the contacts SC95AC1 and SC95BC1 of the switch 553.

Read-out control switch operating means

Figure 31:
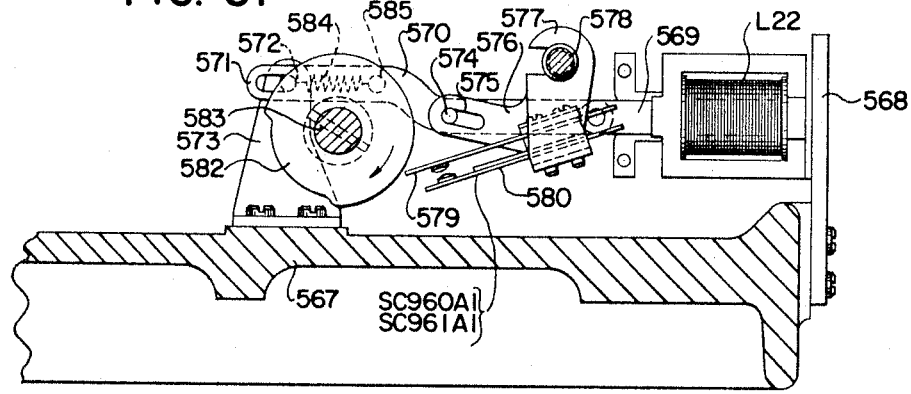
FIG. 31 is a sectional view taken along line 31—31 of FIG. 30.
Figure 30:
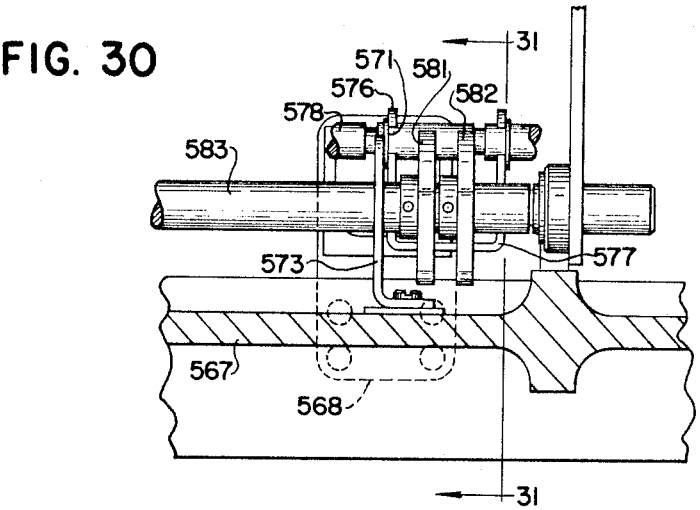
FIG. 30 is a detail view showing the cam-operated read-out switching means.

The contacts SC960A1 and SC961A1 function during an operation of the accounting machine in which information stored in the memory switch units 229 is read out and utilized, and said contacts are periodically closed and reopened while such an operation is proceeding. The mechanism for accomplishing the desired operation of the contacts SC960A1 and SC961A1 is shown in FIGS. 30 and 31.

Secured to the machine base 567 is a bracket 568, on which is mounted a solenoid L22 having an armature 569, to which is connected a link 570. A slot 571 at the other end of the link 570 receives a stud 572 fixed in the upper end of a support member 573 fixed to the base 567. A spring 584 extends between the stud 572 and a stud 585 in the link 570.

Intermediate of the ends of the link 570 is secured a stud 574, which rides in a slot 575 in one arm 576 of a yoke 577, which is rotatably mounted on a shaft 578 journaled in the machine framework. Fixed to the base of the yoke are two sets of contact blades 579, 580, forming the two sets of contacts SC960A1 and SC961A1.

Two cams 581 and 582 are secured to a constantly rotating shaft 583 journaled in the machine framework. The two cams are so positioned on the shaft 583 that each one is engageable with the longer blade 579 of one of the sets of contacts SC960 and SC961 when the yoke 577 is rocked clockwise, as viewed in FIG. 31.

It will be seen that with the yoke 577 in the position in which it is shown in FIG. 31, the two longer blades 579 do not engage the surfaces of the cams 581 and 582, and the contacts SC960 and SC961 therefore remain open. Energization of the solenoid L22 causes its armature 569 to be shifted to the right, as viewed in FIG. 31, drawing the link 570 to the right with it, against the force of the spring 584. This causes the stud 574 to coact with the surface of the slot 575 in the arm 576 of the yoke 577, rocking said yoke in a clockwise direction and bringing the longer blades 579 of the contacts SC960A1 and SC961A1 into engagement with the peripheries of the cams 581 and 582. Said cams are so shaped that, as they rotate, their peripheries cause the blades 579 to be forced downwardly, thus closing the contacts SC960A1 and SC961A1, and then permit the blades 579 to return to the position in which they are shown in FIG. 31, reopening said contacts.

This periodic closing and opening of the contacts SC960A1 and SC961A1 continues until the solenoid L22 is deenergized, at which time the armature 569 and the link 570 are shifted to the left by the spring 584, rocking the yoke 577 counter-clockwise and shifting the contacts SC960A1 and SC961A1 out of engagement with the cams 581 and 582.

Overdraft restoring means

As has been previously described, the balance totalizer line 175 is divided into two sides corresponding to the division of the keyboard 81 into a "loan" side on the left and a "share" side on the right. Overdraft lock mechanisms are provided for each side, which are effective to cause the keys of control row 1 to be locked electrically when either side of the balance totalizer line 175 is "over-run" to produce an overdraft condition.

The machine in which the present invention is embodied does not produce true credit balances. When an overdraft condition occurs on the "share" side of the balance totalizer line 175, the plus side of the totalizer is cleared during the next new balance operation, and the complement value of the balance is printed and magnetically stored on the account card. Due to the electrical design of the machine, it is not possible to extend a complement new balance on the "loan" side of the account card.

For a detailed description of an overdraft mechanism and associated totalizer mechanism similar to that utilized in the machine of the present invention, reference may be had to the United States Patent No. 2,373,510, issued Apr. 10, 1945, to Pascal Spurlino et al.

Shown in FIG. 33 is the highest order totalizer assembly for the "share" side of the balance totalizer line 175. This assembly includes a "plus" wheel 587, a "minus" wheel 588, and an interconnecting gear element 589. These elements function in a well-known manner, so that when one of the wheels is driven in one direction by the differential actuator 115, the other wheel is driven in the opposite direction.

Fixed to one side of the "plus" wheel 587 is a disk 590 having a node 591 on its periphery. Similarly, a disk 592, having a node 593 on its periphery, is fixed to one side of the "minus" wheel 588.

Two overdraft trip arms 594 and 595 are secured together for unitary movement by means of a sleeve 596, and are pivotally mounted on a hanger 597 in the machine framework, so that the arm 595 is engageable with the node 591 of the disk 590 when the "plus" totalizer wheel 587 is engaged with the differential actuator 115 for that denomination, while the arm 594 is engageable with the node 591 when the "minus" totalizer wheel 588 is engaged with said differential actuator, as may best be seen in FIG. 33. A third arm 598, pivotally mounted on a hanger 599 in the machine framework, is engageable with the node 593 of the disk 592 when the "plus" totalizer wheel 587 is engaged with the differential actuator 115.

Secured to the hanger 597 is a transfer arm plate 600 having a bent-over end portion 601. An element 602, having a spring 603 therearound, is pivotally connected to the arm 594 and extends through an opening in the end portion 601. The element 602 and the spring 603 act to yieldably maintain the arm 594, with its associated arm 595, in either of the two positions which it may assume.

Two overdraft lock arms 604 and 605 are fixed to a shaft 606 and are slotted to engage studs 607 and 608 on the arms 594 and 598. Pivotally connected to the arm 605 is a clevis 609, to which is connected a rod 610 capable of operating a switch 611 containing the contacts SC71A1 and SC71B1.

An additional arm 612 is fixed to the shaft 606 and is provided at its free end with a stud 613, which rides in a slot 614 in one end of a link 615, the other end of which is pivotally connected to an arm 616 fixed to a shaft 617. Also pinned to the shaft 617 are arms 618 and 619. The arm 618 is provided with a surface 620 adapted to engage a stud 621 in the machine framework. A spring 622 is connected between the arm 618 and the stud 621 and urges the arm 618 to the position in which it is shown in FIG. 32.

The arm 619 is connected by a link 623 to the actuator 624 of a solenoid L70 mounted by a bracket 625 secured to the machine base 567.

With the balance totalizer line 175 in the position relative to the arms 594, 595, and 598 in which it is shown in FIG. 33, the "plus" totalizer wheel 587 is aligned with the differential actuator 115, but not engaged therewith, and an additive operation into the totalizer line 175 can take place when the totalizer line 175 is shifted into engagement with the actuators 115 and is rotated clockwise by said actuators. In subtracting, the totalizer line 175 is shifted to the left, so that the "minus" wheel 588 is engaged with the differential actuator 115, and is rotated clockwise, as viewed in FIGS. 32 and 34, which imparts counter-clockwise movement, through the gear element 589, to the "plus" wheel 587, to rotate said wheel.

Thus, when an overdraft occurs, the highest order "plus" wheel 587 passes from 0 to 9. As this happens, the disk 590 is rotated counter-clockwise, whereupon the node 591 coacts with the arm 594 to rock said arm clockwise. This causes the arms 604, 605, and 612 and the shaft 606, to be rocked counter-clockwise. The stud 613 in the arm 612 shifts idly in the slot 614 of the link 615. The clevis 609 and the rod 610 are moved downwardly due to the rocking of the arm 605, and operate the switch 611 to cause the contacts SC71A1 to close, and the contacts SC71B1 to open.

An overdraft condition may also be caused during an additive operation by exceeding the capacity of the share side of the balance totalizer 175 by addition, or by adding a complement. In such a case, when the "minus" wheel 588 moves from 8 to 9, the node 593 of the disk 592 coacts with the arm 598 to rock said arm clockwise. This produces an overdraft condition in the same manner as previously described.

The above operations of the contacts SC71A1 and SC71B1 are effective, as will subsequently be described, to effect a halt in the sequence of machine operations, due to the overdraft condition. In order to resume the sequence of operations, it is necessary to restore the share overdraft mechanism, and this can be effected by energization of the solenoid L70, under control of the operating circuitry, as will be described. Such energization shifts the actuator 624 and the link 623 downwardly and rocks the arms 616, 618, and 619 and the shaft 617 clockwise, as viewed in FIG. 32, against the force of the spring 622. The link 615, in turn, is shifted to the left, and the right end of the slot 614 coacts with the stud 613 to rock the arm 612, and with it the shaft 606 and the arms 604 and 605, clockwise.

This rocks the arms 594, 595, and 598 counter-clockwise and restores them to the position in which they are shown in FIG. 32. At the same time, the clevis 609 and the rod 610 are urged upwardly and operate the switch 611 to open the contacts SC71A1, and to close the contacts SC71B1.

When the solenoid L70 is subsequently deenergized, the spring 622 causes the arms 616, 618, and 619 and the shaft 617 to return counter-clockwise to the position in which they are shown in FIG. 32, while the element 602 and the spring 603 are effective to retain the arms 594, 595, and 598 in restored position.

It may be noted that the share overdraft mechanism can also be restored by overcoming the overdraft through addition. During addition operations, the node 591 of the disk 590 is aligned with the arm 595, and as the "plus" wheel 587 passes from 9 to 0, the node 591 coacts with the arm 595 to rock said arm counter-clockwise. This causes the arms 604, 605, and 612, and the shaft 606, to be rocked clockwise, restoring the overdraft mechanism to the position shown in FIG. 32, and causing the contacts SC71A1 to open and the contacts SC71B1 to close.

As has been stated, it is not possible to extend a complement new balance on the loan side of the balance totalizer line 175. Therefore a corrective entry is required in all cases when an overdraft occurs on the loan side of the balance totalizer line 175, and an overdraft restoring mechanism including a solenoid such as the solenoid L70 is not required. However, a switch similar to the switch 611 is provided, which contains the contacts SC70A1 and SC70B1, and which is controlled by whether or not the loan side of the totalizer line is in an overdraft condition. When an overdraft condition occurs, the contacts SC70A1 close and the contacts SC70B1 open, and these contacts remain in the conditions described until the overdraft mechanism is restored by an additive operation, at which time the contacts are also restored.

*Stop pawl disabling mechanism*

The machine in which the present invention is embodied is provided with mechanisms for causing the correct line number of the ledger card to be magnetically stored on the card being processed during new balance operations. Means are provided to advance this mechanism during processing of a ledger card, the advance corresponding to the number of printed entries made on the card. Such mechanism is partially shown in FIGS. 35, 36, and 37 and includes a double ratchet wheel, a feed pawl for advancing the double ratchet wheel, a feed retaining pawl, and a stop pawl to prevent undesired movement of the double ratchet wheel.

In the machine of the present invention, it is necessary to disable the feed pawl, the stop pawl, and the feed retaining pawl at certain times to permit consecutive balance pick-up operations. The mechanism through which this is accomplished will be described in this section.

Figure 35:
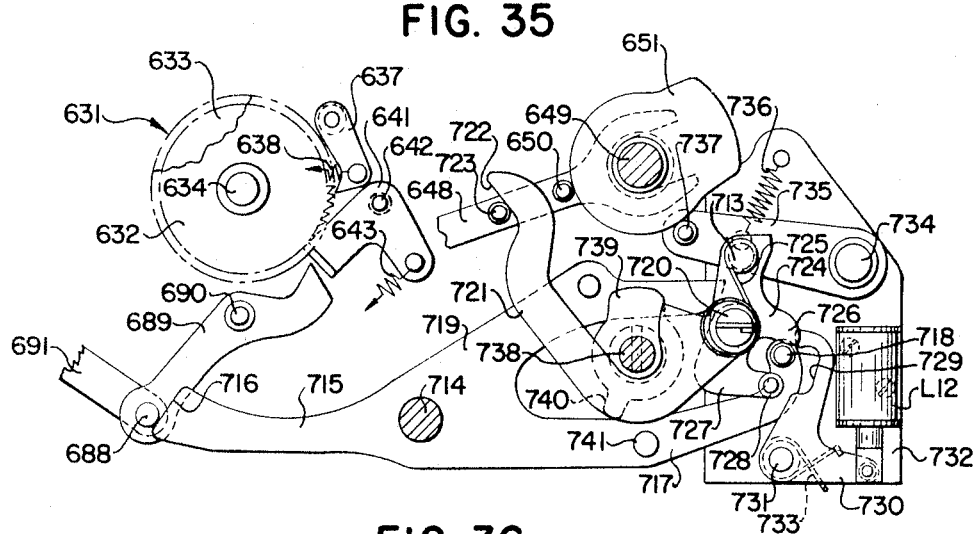
FIG. 35 is a detail view showing part of the pawl disabling means in the line number storage control mechanism.

As shown in FIG. 35, a double ratchet wheel 631 comprising two wheels 632 and 633, fixed with respect to each other and having oppositely-disposed ratchet teeth for cooperation with the various pawls is secured to a shaft 634 of the table-feeding mechanism. An arm 635 is secured to a shaft 636 in axial alignment with the shaft 634, and the ends of the shafts 634 and 636 lie adjacent each other. A feed pawl 637 (FIGS. 35 and 36) is carried by the arm 635 and is urged by a spring 638 to engage the ratchet wheel 632. An arm 639, secured to the pawl 637, coacts with a stud 640 in the machine framework to hold the pawl 637 out of engagement with the ratchet wheel 632 when the arm 635 is rocked counter-clockwise.

During each operation of the machine, the shaft 636 is rocked, as described in the previously-mentioned United States Patent No. 2,947,475, thus carrying the feed pawl 637 far enough in a clockwise direction to advance the wheel 632 the equivalent of one line-space on the ledger card. A non-retrograde pawl 641, pivoted on a shaft 642 in the machine framework, and urged clockwise by a spring 643, coacts with the ratchet wheel 632 to prevent reverse movement of the shaft 634 during line-spacing operations.

The feed pawl 637 and the retaining pawl 641 are shifted out of engagement with the ratchet wheel 632, and thus disabled, by means of a feed control plate 644 rotatably mounted on the shaft 636 and having high surfaces 645 and 646 thereon capable of camming the pawls 637 and 641 out of engagement with the wheel 632. The plate 644 is connected by a stud 647 to a pitman 648 (FIGS. 35 and 36), which is forked at its other end to ride upon the auxiliary cam shaft 649 of the accounting machine, and which is provided with a roller 650 engageable with the periphery of a cam 651 fixed to the auxiliary cam shaft 649.

A portion of the stud 647 rides in a slot 652 in an arm 653 pivotally mounted on a shaft 654. An extension 655 of the arm 653 is provided with a surface 656 adapted to cooperate with a turned-over portion 657 on a slide 658 having slots 659 and 660 therein. The slot 659 receives a stud 661 fixed in the machine framework for guiding the movement of the slide 658. A spring 662 extends between the stud 661 and a stud 663 on said slide, and urges said slide to the right. The slot 660 in the slide 658 receives a stud 664 fixed in an arm 665 secured to a shaft 666, to which is also secured an arm 667 having a surface 668 thereon engageable with a roller 669 fixed to a cam 670 secured to the printer cam shaft 671.

A second arm 672 on the shaft 654 has a surface 673 disposed to engage a stud 674 on the arm 653. A spring 675 extends between the stud 674 and a stud on the arm 672.

Pivotally connected to the lower end of the arm 672 is a link 676, pivotally connected at its other end to a selecting arm 677 rockably mounted on a shaft 678 in the machine framework, and urged counter-clockwise by a spring 679. A selecting pawl 680 is pivoted on the arm 677 and is positioned to sense for high and low spots on the peripheries of a series of selecting plates 681, which are controlled by the setting of the machine keyboard control row differential mechanisms, and by other elements of the machine, in a well-known manner. In this instance, the selecting plates 681 are controlled by the control row 1 differential mechanism and by means which detect when the accounting machine carriage is set to its "line 40" or "last line" position. A slot 682 in the arm 677 receives a stud 683 fixed in an arm 684 pinned to the shaft 678 to provide a flexible connection between the two arms. Periodic rocking of the shaft in a conventional manner is thus effective to permit the arm 677 with its pawl 680 to periodically sense the peripheries of the plates 681.

The plate 644 may be rocked clockwise to shift the feed pawl 637 and the retaining pawl 641 out of engagement with the ratchet wheel 632 either by movement of the pitman 648 to the left or by counter-clockwise rocking of the arm 653 about the shaft 654 under control of the link 676 and the selecting plates 681.

Movement of the pitman 648 may be under control of a finger coacting with a roll on the pitman, as will be subsequently described, and may be under control of the cam 651 on the shaft 649, the periphery of said cam cooperating with the roll 650 on the pitman 648 to impart shifting movement thereto. The shaft 636 rotates during each accounting machine operation in which a magnetic pick-up or storage of information takes place. Disabling of the pawls 637 and 641 under control of the cam 651 occurs during a normal new balance operation of the machine. Such movement of the pitman 648 rocks the plate 644 clockwise, so that the surfaces 645 and 646 cam the pawls 637 and 641 out of engagement with the teeth on the wheel 632. At the same time, the arm 653 is rocked counter-clockwise, so that the surface 656 on the extension 655 drops below the turned-over portion 657 on the slide 658, permitting said slide to shift to the right under the influence of the spring 662 to position the portion 657 over the surface 656 on the extension 655 of the arm 653, thus preventing said arm and the plate 644 from movement, and thereby holding the pawls 637 and 641 out of engagement with the teeth on the wheel 632.

Subsequent release of the arm 653 and the plate 644 from the position in which they are held by the turned-over portion 657 of the slide 658 is obtained by clockwise rotation of the shaft 671 and the cam 670 thereon. This causes the roll 669 to engage the surface 668 on the arm 667, to rock said arm and the arm 665 counter-clockwise, shifting the slide 658 to the left, to move the turned-over portion 657 out of engagement with the surface 656 of the extension 655 on the arm 653, thus permitting said arm and the plate 644 to return to the position in which they are shown in FIG. 36 to permit the pawls 637 and 641 to re-engage the teeth of the ratchet wheel 632.

Disabling of the pawls 637 and 641 may also result from appropriate setting of the selecting plates 681, so that low spots on the peripheries of the plates are positioned opposite the fingers of the pawl 680 on the arm 677. In such a case, when the regular periodic movement of the shaft 678 permits the pawl 680 on the arm 677 to sense the peripheries of the plates, the arm 677 rocks counter-clockwise under the influence of the spring 679, thereby shifting the link 676 to the right, and rocking the arm 672 counter-clockwise about the shaft 654. Engagement of the surface 673 on the arm 672 with the stud 674 on the arm 653 forces said arm 653 to move counter-clockwise also, to rock the plate 644 so that the surfaces 645 and 646 hold the pawls 637 and 641 away from the teeth of the ratchet wheel 632, and to position the surface 656 of the extension 655 under the turned-over portion 657 on the slide 658, in the manner previously described, to retain the pawls 637 and 641 in disabled condition.

Figure 36:
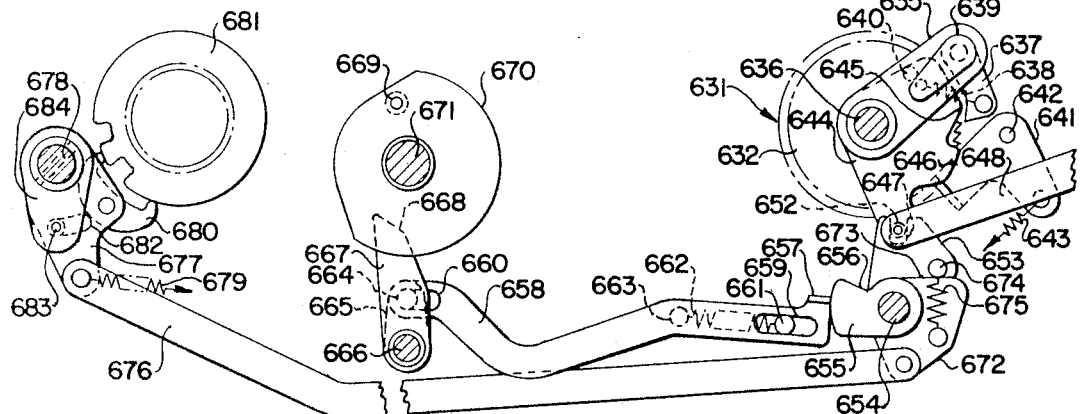
FIG. 36 is a view showing additional details of the feeding and retaining pawl control means in the line number storage control mechanism.

As previously described, return of the parts to the positions shown in FIG. 36 is accomplished by rotation of the shaft 671 and the cam 670, to shift the slide 658 to the left.

It may be noted that in the present embodiment of the invention, disabling of the pawls 637 and 641 under control of the selecting plates 681 takes place during a new balance operation when the table is at a position corresponding to the last line space of the ledger card; during a new balance non-transfer operation which is normally used for corrective purposes; and in a sub-balance operation when the table is at a position corresponding to the last line-space of the ledger card.

Figure 37:
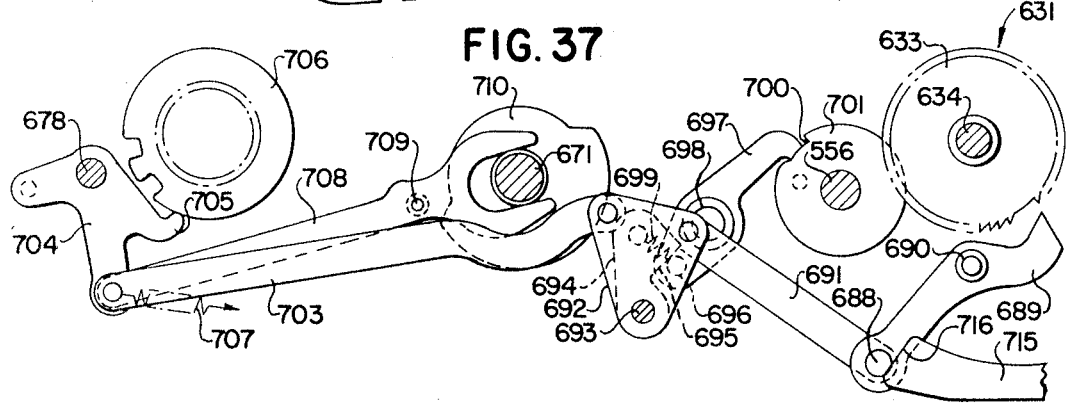
FIG. 37 is a view showing additional details of the stop pawl control means in the line number storage control mechanism.
Figure 40:
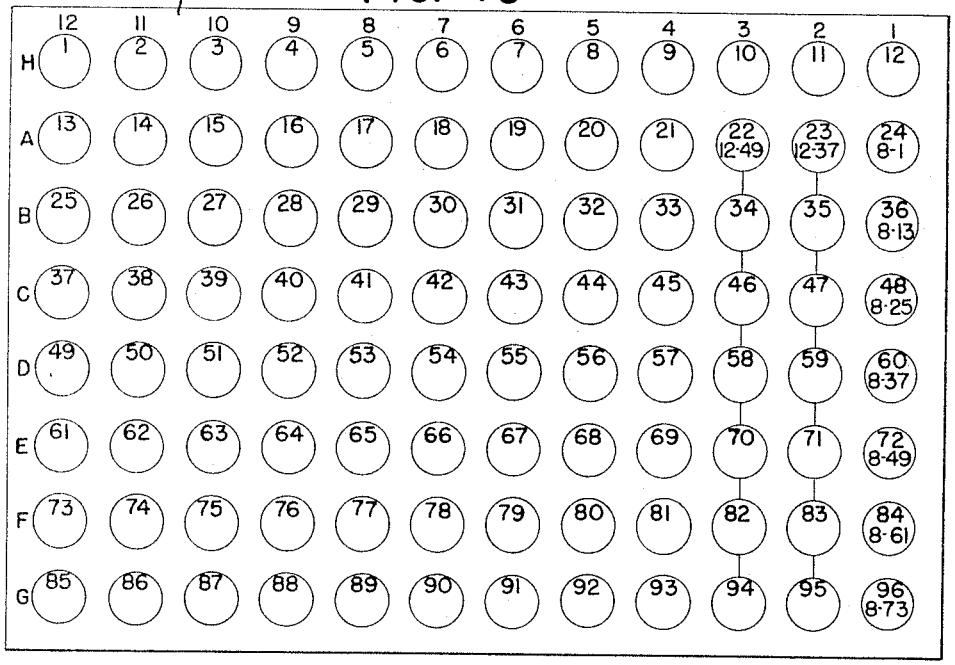
Figure 41:
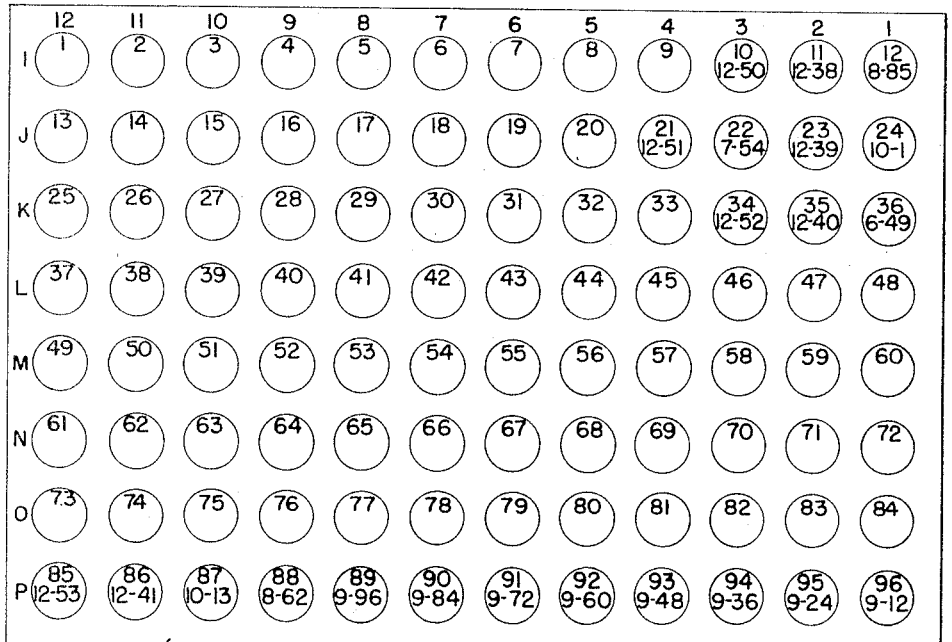
Figure 46:
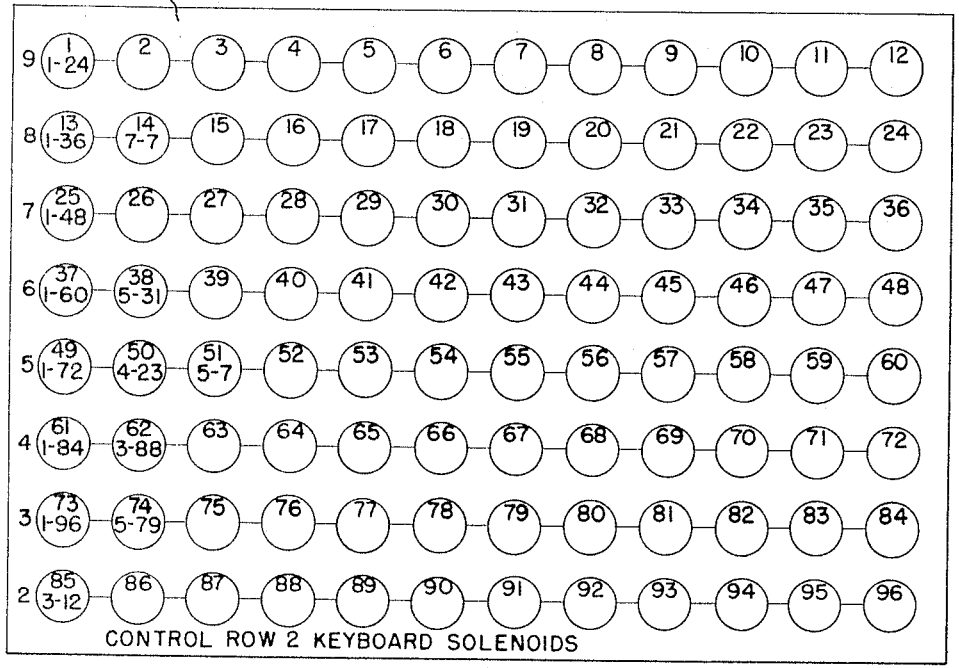
Figure 47:
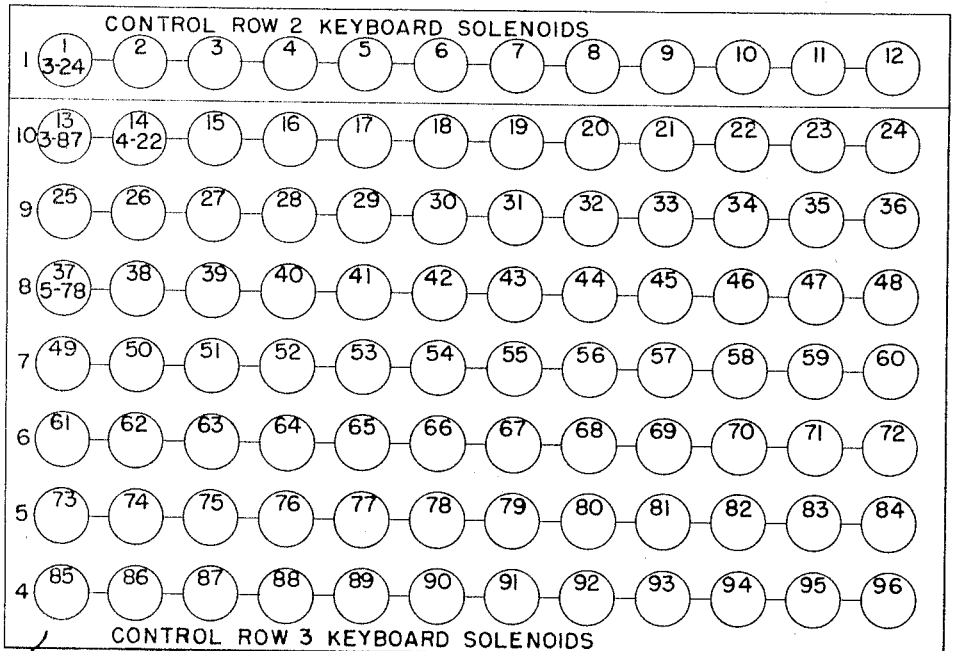
Figure 48:
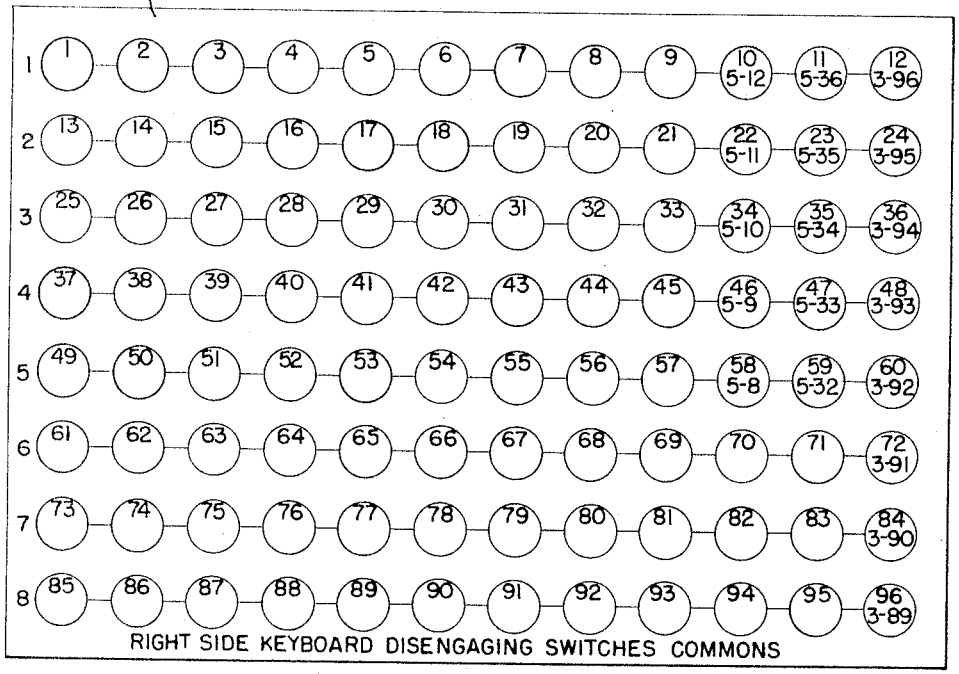
Figure 49:
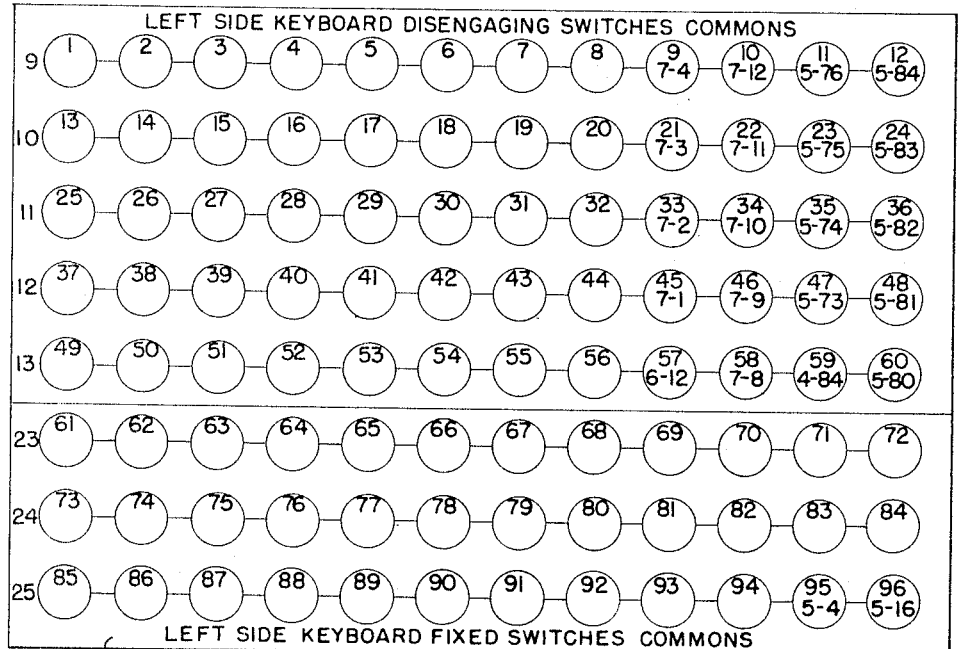
Figure 52:
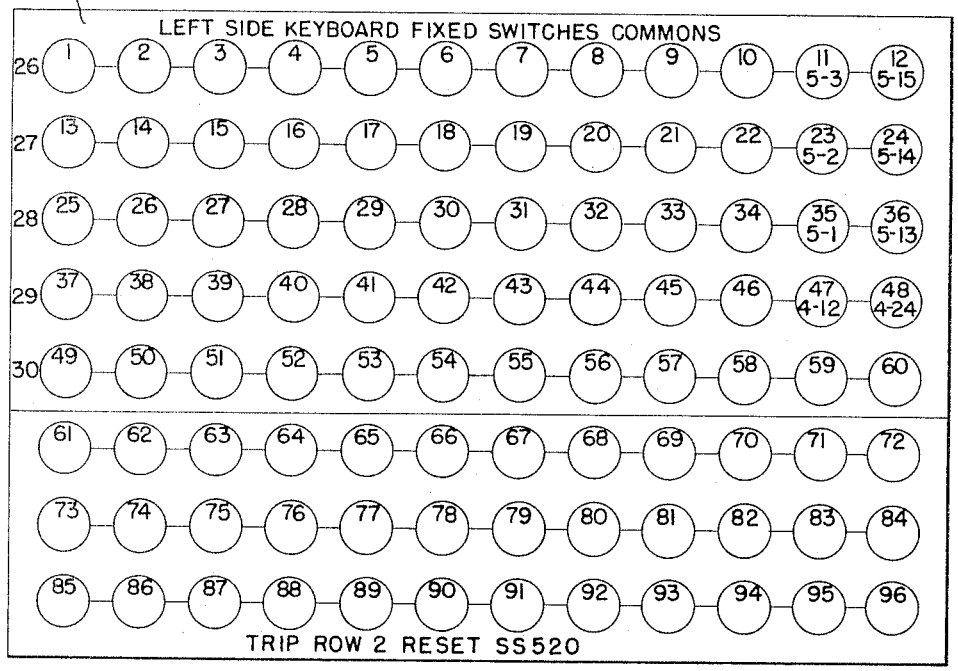
Figure 53:
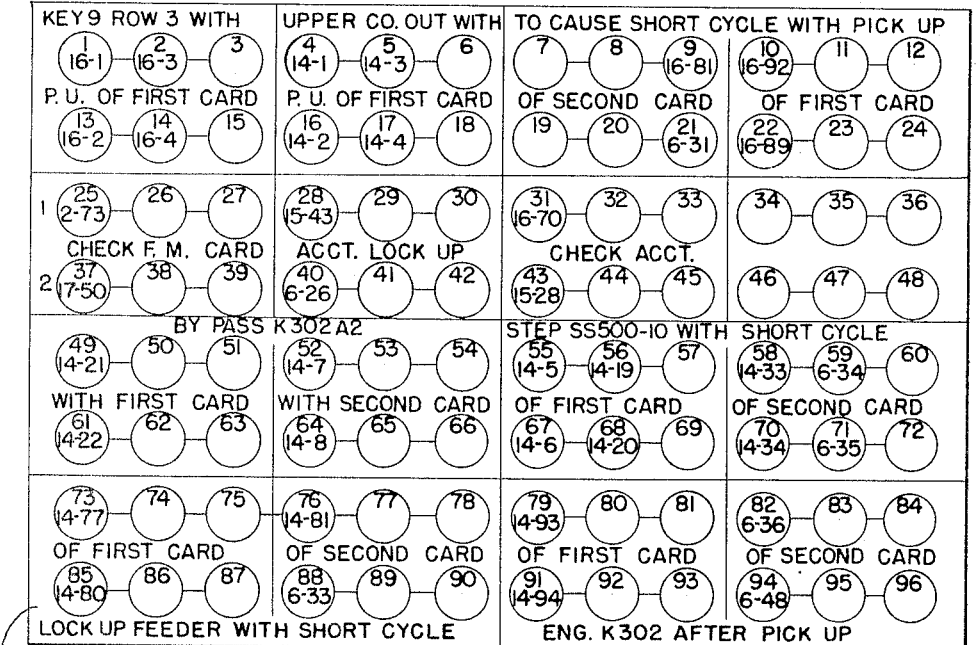
Figure 54:
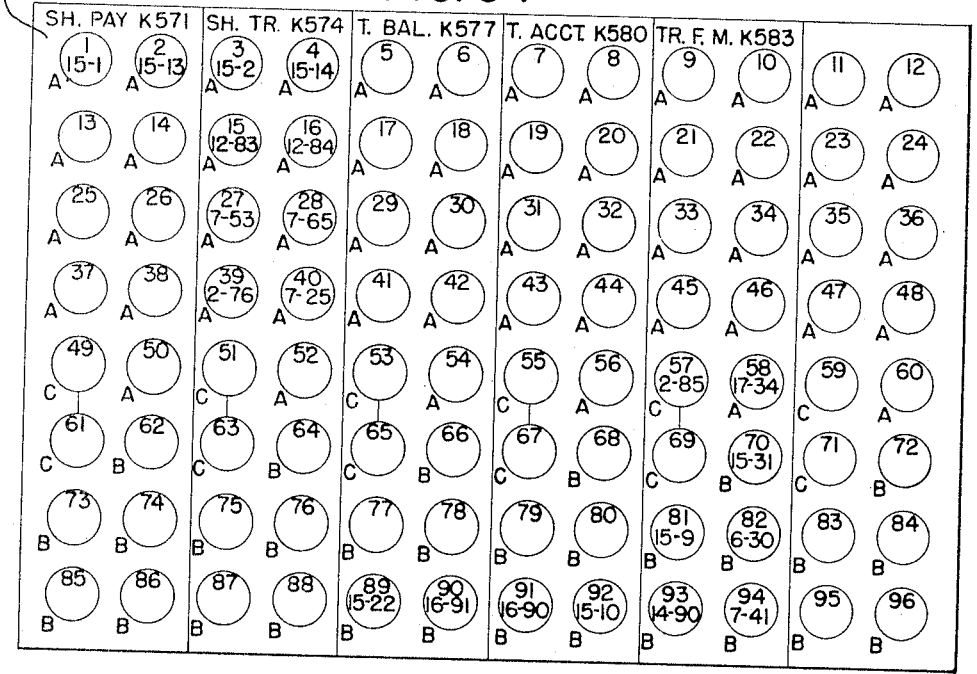
Figure 55:
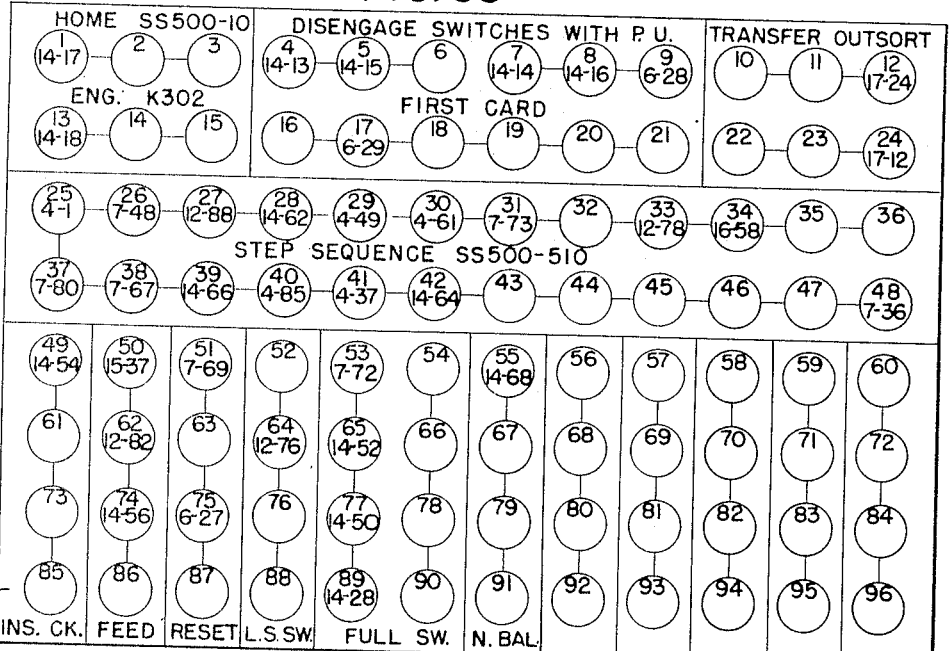

As shown in FIG. 37, a stop pawl 689 is provided to engage the ratchet wheel 633, for the purpose of preventing excessive movement of said wheel, which is fixed to the wheel 632, to comprise the double ratchet wheel 631, and mechanism with which it is associated, during operations in which the accounting machine carriage is positioned. The stop pawl 689 is rotatably mounted on a shaft 690 in the machine framework. At its lower end, the stop pawl is pivotally connected by a stud 688 to one end of a link 691, the other end of which is pivotally connected to an arm 692 rotatably mounted on a shaft 693.

An element 694 is fixed to the arm 692 for rotation therewith and has a surface 695 adapted to engage a stud 696 one one end of a lever 697 pivotally mounted on a shaft 698 and flexibly connected to the element 694 by a spring 699. The other end of the lever 697 is engageable with a notch 700 in the periphery of a plate 701 for positioning of the carriage-positioning shaft 556 (see also FIG. 29) to which said plate is secured.

Returning to the arm 692, this arm is also pivotally connected to one end of a link 703, pivotally connected at its other end to an arm 704 mounted free on the shaft 678. A pawl 705 is integral with the arm 704 and is adapted to sense the periphery of a plurality of selecting plates 706, controlled by control rows 1, 2 and 3 of the keyboard, for high and low spots. Movement of the arm 704 is controlled by a spring 707, which urges it counter-clockwise, and by a pitman 708, pivotally connected to said arm, on which pitman is fixed a roll 709 located to cooperate with the periphery of a cam 710 fixed to the shaft 671.

At the end of a new balance operation, high spots in the selecting plates 706 hold the arm 704 in the position in which it is shown in FIG. 37. Therefore the arm 692 is caused by the link 703 to assume the position in which it is shown, and the lever 697 is positioned in the notch 700 in the plate 701, and held there by the spring 699. Also, the stop pawl 689 is held out of the teeth of the ratchet wheel 633. During the following balance pick-up opertaion, at 180 degrees of rotation of the shaft 671, the high portion of the periphery of the cam 710 contacts the roll 709 of the pitman 708, moving the pitman to the left and freeing the selecting plates 706 to be set. Low spots in said selecting plates are placed in the path of the pawl 705 formed on the arm 704.

Between 195 degrees and 205 degrees of rotation of the printer cam shaft 671, the high part of the cam 710 rides away from the roll 709 on the pitman 708. The spring 707 shifts the pitman to the right, drawing the pawl 705 into the low spots of the plates 706. This movement is transmitted through the link 703 to rock the arm 692 clockwise. The surface 695 of the arm 694 coacts with the stud 696 to rock the lever 697 counter-clockwise, freeing the plate 701 and the shaft 700 for its necessary movement during positioning of the accounting machine carriage.

At the same time, the clockwise rocking of the arm 692 acts through the link 691 to rock the stop pawl 689 counter-clockwise to bring it into engagement with the teeth of the ratchet wheel 633 to prevent an overthrow movement of said ratchet wheel, which might otherwise take place as a result of the table-positioning movement.

On the next machine operation, at 18 degrees of rotation of the shaft 671, the stop pawl 689 is carried out of the teeth of the ratchet wheel 633, and the lever 697 moves into engagement with the notch 700 of the plate 701. The selection plates 706 are positioned with high spots in the path of the pawl 705 and thus hold the stop pawl 689 away from the ratchet wheel 633, and hold the lever 697 in engagement with the notch 700 of the plate 701.

Referring now to FIG. 35, additional means are provided for shifting the stop pawl 689 out of engagement with the teeth of the ratchet wheel 633 and maintaining said pawl in such position. These additional means also act to shift and retain the feed pawl 637 and the retaining pawl 641 out of engagement with the wheel 632. Disabling of these pawls by the mechanism of FIG. 35 is necessary to free the double ratchet wheel 631 for movement at the beginning of each consecutive balance pick-up operation during certain operating sequences of the system of the present invention.

Pivotally supported on a shaft 714 is a stop pawl disabling link 715 having at its left end a surface 716 adapted to engage the stud 688, which pivotally connects the stop pawl 689 to the link 691. To the right of the shaft 714, the link is divided into a lower finger 717, having a roll 718 fixed thereon, and an upper finger 719. Located between the two fingers 717 and 719 is a shaft 720 journalled in the machine framework and having rotatably mounted thereon a pitman eliminating finger 721 having a surface 722 adapted to coact with a roll 723 on the pitman 648. Also mounted on the shaft 720 is a selecting pitman plate 724, having a projection 726 thereon, which is urged clockwise by a spring 725 associated with a stud 713 on said plate and with the shaft 720. In addition, an arm 727 is mounted on the shaft 720 and is fixed to the finger 721 for unitary movement therewith. A roll 728 is positioned on the arm 727.

A notch 729, in an arm 730 pivoted on a stud 731 on a bracket 732 and urged clockwise by a spring 733, is positioned to receive the rolls 718 and 728 when said arm is rocked counter-clockwise by a solenoid L12 secured to the bracket 732.

Pivotally mounted on a shaft 734 journalled in the machine framework is a cam arm 735 urged clockwise by a spring 736 and having a roll 737 positioned thereon to coact with the periphery of the cam 651.

Fixed to a functional control extension shaft 738 is a selecting plate 739 having thereon a projection 740 in the "Install" position of the functional control knob (not shown), which may be shifted, by turning of the functional control knob, into the path of movement of a stud 741 fixed to the stop-pawl-disabling link 715.

The mode of operation of the mechanism shown in FIG. 35 will now be described. It will be recalled that during each balance pick-up operation, from 195 degrees to 215 degrees of rotation of the shaft 671, the stop pawl 689 engages the teeth of the ratchet wheel 633, where it remains until the end of the operation. As the stop pawl 689 is moving, the stud 688 in its lower end engages the surface 716 of the stop-pawl-disabling link 715 to rock said link counter-clockwise. The lower surface of the projection 726 of the plate 724 is held by the spring 725 against the roll 718 on the lower finger 717 of the link 715. Movement of the link 715 thus rocks the plate 724 counter-clockwise, so that the stud 713 thereon is positioned over a surface on the finger 721, and an upper surface on the plate 724 is positioned on the path of movement of the roll 737 extending from one side of the arm 735, while a similar roll, extending from the other side of the arm 735 is positioned over the upper finger 719 of the link 715. Movement of the link 715 thus rocks the plate 724 counter-clockwise, so that the stud 713 thereon is positioned over a surface of the finger 721, and an upper surface on the plate 724 is positioned in the path of movement of the roll 737 extending from one side of the arm 735, while a similar roll, extending from the other side of the arm 735, is positioned over the upper finger 719 of the link 715.

Should another balance pick-up operation take place with the mechanism of FIG. 35 in the position described, the sequence of operation is as follows. From approximately 0 degrees to 50 degrees of rotation of the shaft 649, the high part of the cam 651 contacts the roll 737 on the arm 735, rocking said arm counter-clockwise, and causing the roll 737 and its companion roll on the other side of the arm 735 to engage the plate 724 and the finger 719 of the link 715, and rock said plate counter-clockwise and said link clockwise.

The stud 713 in the plate 724 coacts with the finger 721 to shift said finger counter-clockwise, so that the surface 722 thereon engages the roll 723 on the pitman 648 to shift said pitman to the left, thereby rocking the feed control plate 644 clockwise to disengage the feed pawl 637 and the retaining pawl 641 from the teeth of the ratchet wheel 632. The plate 644 is held in this position by cooperation of the slide 658 and the extension 655 of the arm 653, as previously described.

Clockwise movement of the link 715 causes the surface 716 thereon to engage the stud 688 on the stop pawl 689, rocking the pawl clockwise to disengage it from the teeth of the ratchet wheel 633, which thus is freed for movement.

The pawls 637, 641, and 689 may be retained in disengaged position by energization of the solenoid L12 through operating circuitry which will subsequently be described. Energization of said solenoid rocks the arm 730 counter-clockwise against the force of the spring 733 to position the notch 729 in engagement with the studs 718 and 728 on the finger 717 of the link 715 and on the arm 727 associated with the finger 721, thus retaining said link and said finger in the positions to which they have been set, and holding the pawls 637, 641, and 689 out of engagement with the double ratchet wheel 631 until the solenoid L12 is deenergized.

As previously mentioned, the functional control selecting plate 739 is secured to a shaft 638, which is positioned by a manually-settable function control knob (not shown) located on the exterior of the accounting machine. When the functional control knob is set in "Install" position, the high spot 740 on the plate 739 is in the path of movement of the stud 741 on the disabling link 715, and prevents the link 715 from rocking counter-clockwise, as viewed in FIG. 35. The stop pawl 689 is therefore held disabled and out of engagement with the teeth of the ratchet wheel 633 during an Install sequence of operation.

*Controller control panel*

As has been described, a controller 63 (FIG. 1) for housing most of the electrical components for automatic sequence control is provided in association with the accounting machine 61 and the card feeder 62 in the system forming the illustrated embodiment of the present invention. The control panel 74, having thereon a number of indicators and program selection controls, is shown in FIGS. 1 and 27.

Figure 27:
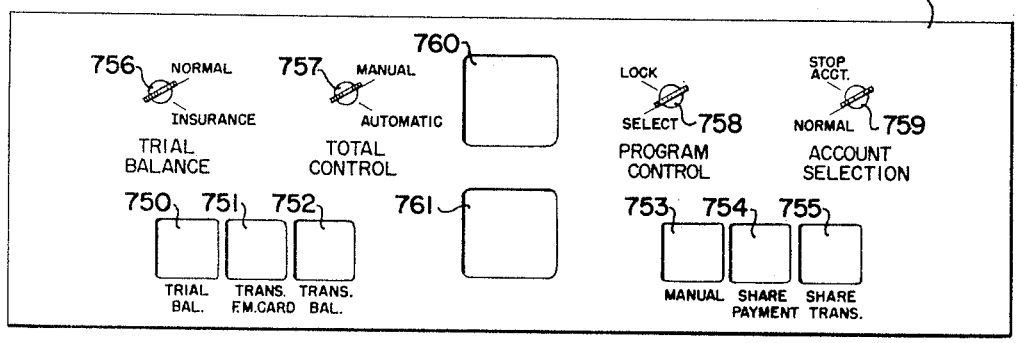
FIG. 27 is a view showing the control panel of the controller unit.

Disposed in the lower left portion of the panel, as viewed in FIG. 27, are three push-button-type switches 750, 751, and 752. The switch 750 has the legend "Trail Balance" below it, and controls the contacts SP576A1 and SP576B2, the contacts SP576A1 being closed and the contacts SP576B2 being opened when the switch is depressed. The switch 751 has the legend "Transfer F.M. Card" below it, and controls the contacts SP582A1 and SP582B2, the contacts SP582A1 being closed and the contacts SP582B2 being opened when the switch is depressed. The switch 752 has the legend "Transfer Balance" below it, and controls the contacts SP579A1 and SP579B2, the contacts SP579A1 being closed and the contacts SP579B2 being opened when the switch is depressed.

Disposed in the lower right portion of the panel are three additional push-button-type switches 753, 754, and 755. The switch 753 has the legend "Manual" below it, and controls the contacts SP542B2, said contacts being opened when the switch is depressed. The switch 754 has the legend "Share Payment" below it and controls the contacts SP570A1, said contacts being closed when the switch is depressed. The switch 755 has the legend "Share Transfer" below it, and controls the contacts SP573A1 and SP573B2, the contacts SP573A1 being closed and the contacts SP573B2 being opened when the switch is depressed.

Disposed in the upper left portion of the panel as viewed in FIG. 27 are two kep-operated switches 756 and 757. Both of these switches may be set in either one of two positions. The switch 756 has the legend "Trial Balance" below it, and the two positions to which it is settable are indicated as "Normal" and "Insurance." This switch controls the contacts ST501AC1, ST501BC1, and ST501A2. When the switch 756 is set to "Normal" position, the contacts ST501BC1 are closed, and when the switch is set to "Insurance" position, the contacts ST501AC1 and ST502A2 are closed.

The switch 757 has the legend "Total Control" below it, and is settable to a first position, designated "Manual," and to a second position, designated "Automatic." This switch controls the contacts ST506A1, which are closed when the switch is set to "Automatic" position and which are open when the switch is set to "Manual" position.

Disposed in the upper right portion of the panel 74 are two additional key-operated switches 758 and 759. The switch 758 has the legend "Program Control" below it, and is settable to a first position, designated "Lock," and to a second position, designated "Select." This switch controls the contacts ST599AC1 and ST599BC1. When the switch is in "Select" position, the contacts ST599AC1 are closed, and when the switch is in "Lock" position, the contacts ST599BC1 are closed.

The switch 759 has the legend "Account Selection" below it, and is settable to a first position, designated "Normal," and to a second position, designated "Stop Account." This switch controls the contacts ST406, which are closed when the switch is in "Stop Account" position and open when the switch is in "Normal" position.

At the center of the panel 74 are two vertically disposed indicator panels 760 and 761. Various portions of these panels are illuminated under appropriate conditions, to illuminate various printed legends giving information as to the condition of the system at that time. Two such legends are provided in the indicator panel 760, and are "Stop Account" and "Insurance Trial." The "Stop Account" legend is illuminated when the switch 759 is set to its "Stop Account" position, adn the system has been stopped according to the programmed instructions. The "Insurance Trial" legend is illuminated when the switch 756 is set to its "Insurance" position.

In the lower indicator panel 761, provision is made for six different legends, which are illuminated according to the condition of the system. These legends are as follows: "Trial Balance"; "Share Transfer"; "Transfer F.M. Card Card"; "Share Payment"; "Transfer Sales"; and "Automatic." The "Automatic" indicator is illuminated whenever the system is performing an automatic operation under programmed instructions, and the other five indicators are illuminated in accordance with the particular type of operation being performed; that is, for example, if a share payment operation is being performed, the "Share Payment" indicator is illuminated.

The manner in which the various contacts controlled by the switches of the panel 74 function in the operation of the system will be fully described in the subsequent explanation of the system circuitry. Similarly, the manner in which the indicator lights for illuminating appropriate portions of the indicator panels 760 and 761 are energized will also be described in the explanation of the system circuitry.

*Programming means*

Diagrammatically shown in FIGS. 38 to 55 inclusive are a plurality of program boards which form an important part of the present invention. In the illustrated embodiment, eighteen program boards, PB500 to PB517 inclusive, each having a total of ninety-six available terminals, are utilized. However, it is obvious that a different number of boards of different capacity could be used, according to the varying programming requirements of a particular system.

In each illustrated program board, ninety-six terminals are arranged in an eight-by-twelve matrix. These terminals extend through the board, and on one side, designated for convenience as the front of the board, the terminals are shaped to facilitate ready connection to and detachment from the ends of removable connectors, or routing wires. These connectors are employed to connect various terminals of the boards, as will subsequently appear, for programming purposes. In the event that it is desired to change the program, the connectors may be detached from the terminals and reconnected to other terminals, to alter the functioning of the system.

The various terminals of the program boards also extend through the program boards to the other sides, or backs, thereof, and these terminal ends are normally provided with permanent connections, some to relay contacts controlled by various relays of the system, some to other programmable terminals of the system, and some to other portions of the system circuitry.

In the subsequent explanation of the system circuitry, and the manner in which it functions during various types of operations, a typical programming arrangement, including the various connections between program board terminals, will be described.

OPERATING CIRCUITRY

A plurality of operating circuits are provided to control the operation of the various components of the system of the present invention, and to enable them to cooperate in a manner to perform the desired accounting operations which are comprehended by the objects of the present invention. Many of the circuits employed in the accounting machine embodying the present invention are identical or similar to the circuits disclosed in the previously-cited United States Patent No. 2,947,475, and a description of such circuits will not be repeated herein. Also, the circuitry relating to the feeder, per se, is fully described in the previously-cited United States Patent No. 3,079,145, and a description of that circuitry will not be repeated herein. Where necessary to the understanding of the operation of the system as a whole, certain portions of the operating circuits of these two components have been incorporated in the circuitry included in this application. In addition, the essential operating circuitry for the controller unit is fully shown.

Figure 57:
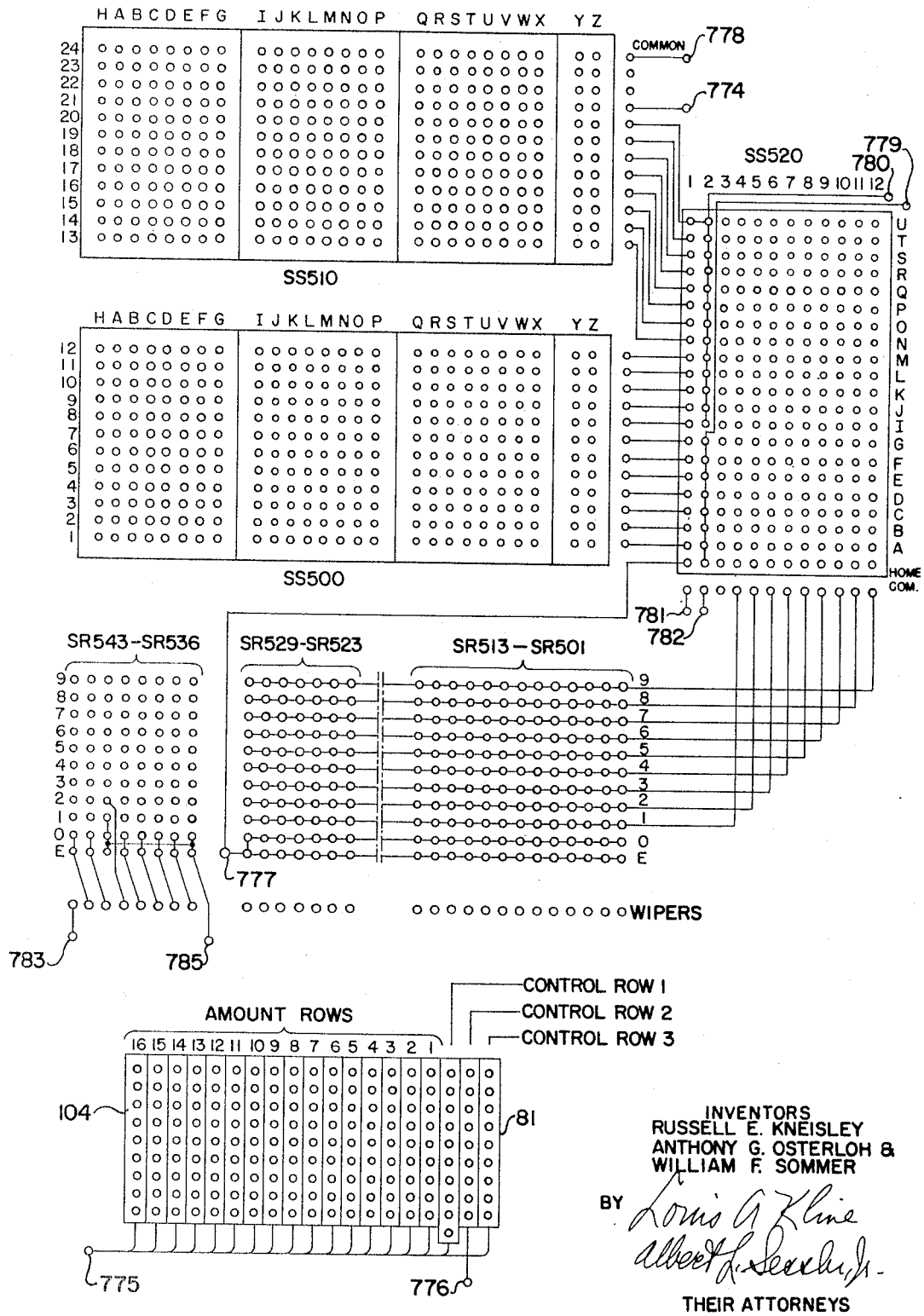

Sequential control of the operation of the system is achieved through the use of three stepping switches SS500, SS510, and SS520 (FIG. 57). Each stepping switch is a multi-level switch of a well-known type, each level having a plurality of contact positions and a wiper which is sequentially stepped through the contact positions of the level. The wipers for the various levels are connected for unitary movement. A switch of this general type is disclosed, for example, in United States Patent No. 2,896,713, issued July 28, 1959, to Elmer A. Gerdemann.

The stepping switches SS500 and SS510 are designated as main stepping switches and exercise a master control over the sequence of whatever operation is selected by the operator to be performed by the system. These two stepping switches are actually one functional unit and could be replaced by one switch, if desired. Two switches are shown in the illustrated embodiment, since the use of two coordinated switches constitutes a convenient way to obtain the necessary switch capacity. The wipers of the two stepping switches move in unison, so that, at a given time, all of the wipers for the various levels of the two switches are in the same relative contact positions. These wipers are connected to various portions of the operating circuitry, as will subsequently appear, their electrical connections appearing in the column designated "common" in FIG. 57.

For convenience in referring to the stepping switches SS500 and SS510, their levels have been numbered from 1 to 12 inclusive, in the case of the switch SS500, and 13 to 24 inclusive, in the case of the switch SS510. Also, the contact positions of the various levels have been designated alphabetically, with the "home" contact position of each level designated H, and the remaining twenty-five contact positions designated with the remaining letters of the alphabet in order, H being omitted, since it is used for home position.

The various contact positions of the levels 1 to 24 inclusive of the main stepping switches SS500 and SS510 have been permanently wired to the backs of corresponding terminals in program boards PB500, PB501, PB502, PB503, PB504, and PB505, and to twenty-four of the terminals in each of the boards PB506 and PB507. For convenience in determining which terminal of the program boards is attached to a given contact position of one of the switches SS500 and SS510, numerical and alphabetical designations corresponding to those of the switches have been placed at the tops and sides of the various program boards to the terminals of which the various contact positions of the switches SS500 and SS510 are connected.

In the diagrammatic representation of the sweep stepping switch SS520, also shown in FIG. 57, the electrical connections for the wipers of the various levels are shown in the horizontal row designated "COM," said levels being numbered from 1 to 12 inclusive. The contact positions of the various levels have been designated alphabetically, with the "home" position of each level designated H. In the switch SS520, only twenty-one contact positions in each level are utilized, and the twenty positions other than "home" position are designated A to U, except for H, which is used for "home" position.

Certain of the contact positions of the sweep stepping switch SS520 are permanently connected to corresponding key-operating solenoids 104 of the rows of amount keys 88 of the accounting machine keyboard 81, according to the following arrangement: the solenoids for the keys of amount rows 1 to 16 inclusive are respectively connected to the contact positions A to Q inclusive (except for H) of levels 4 to 12 inclusive, with the solenoid for the number 1 key of each row connected to a contact position of level 4, the solenoid for the number 2 key of each row connected to a contact position of level 5, the solenoid for the number 9 key of each row connected to a contact position of level 12, etc.

The key-operating solenoids for control rows 1, 2, and 3 of the accounting machine keyboard are permanently connected to the backs of certain terminals in program boards PB506, PB508, PB510, and PB512, as will subsequently be more fully described.

The return paths for the operating solenoids for the amount rows and control rows of the accounting machine keyboard 81 extend over points 775 to 776, in the energizing circuit for a coil check relay K531, as will be fully described during the explanation of operations in which said solenoids are energized for the depression of keys of the keyboard.

The contact positions A to U inclusive (excluding H) of level 1 of the switch SS250 are permanently connected to the wipers of levels 1 to 20 inclusive of the stepping switches SS500 and SS510. The wiper of level 21 of switch SS510 is permanently connected to a source of plus 180 volts D.C. potential at terminal 774. The wiper of level 24 (switch SS510) is permanently connected to the operating circuitry through point 778, as will be fully described subsequently. Levels 22 and 23 of the switch SS510 are not used in the illustrated embodiment of the present invention.

The contact positions H and A to G inclusive of level 2 of the switch SS520 are bussed together and connected to the operating circuitry through point 779, to the operating circuitry, and the contact positions I to U inclusive of level 2 are bussed together and connected to the operating circuitry through point 780.

The wipers of levels 1 and 2 of the switch SS520 are connected to the operating circuitry, as will subsequently be described in detail, through points 781 and 782. Level 3 of the switch SS520 is not used in the present embodiment.

The wipers of levels 4 to 12 inclusive of the sweep stepping switch SS520 are connected to commons which, in turn, connect corresponding digital positions of certain of the various memory switches of the memory switch line 225 (FIGS. 5, 6A, and 6B), including the switches SR501 to SR513 inclusive and SR523 to SR529 inclusive. The wiper of level 4 of the switch SS520 is connected to the common for digital position 1 of the memory switches, the wiper of level 5 of the switch SS520 is connected to the common for digital position 2 of the memory switches, the wiper of level 12 of the switch SS520 is connected to the common for digital position 9 of the memory switches, etc.

The "zero" and "eliminate" positions of the memory switches SR501 to SR513 inclusive and SR523 to SR529 inclusive are connected together by a common conductor which is connected over a point 777 (FIGS. 56B and 57) to the operating circuitry for the relay K532.

The wipers (so designated in FIG. 57) of the memory switches SR501 to SR513 inclusive and SR523 to SR529 inclusive are permanently connected to the backs of certain terminals in program boards PB509, PB511, and PB513, as will subsequently be more fully described.

The various contact positions of the memory switches SR536 to SR543 inclusive, and the wipers of said switches, are interconnected by conductors, and are connected over points 783 and 785 into the operating circuitry of the controller unit in such a manner as to establish one type of condition if the numerical value stored in said switches is greater than a certain predetermined amount, and to establish a second type of condition if said numerical value is less than said certain predetermined amount. This arrangement will be fully explained in the description of the insurance trial balance operation.

It is believed that the remainder of the operating circuitry of the present invention may be described most clearly by explaining the manner in which this circuitry functions during certain types of operations of the system, and this will now be done.

*Clear totals operation*

The first operation to be described is a clear totals operation, which may be performed automatically to clear all of the accounting machine totalizers to zero condition in preparation for performing one of the other types of operations for which the system is designed. In commencing a clear totals operation, it will be assumed that the key-operated power switch 764, which is located on the feeder 62, has been turned on. To perform an automatic clearing of totals, the total control switch 757 (FIG. 27) on the controller control panel 74 is turned to "Automatic" position. Let it be assumed also that the functional control knob (not shown) of the accounting machine is in "Posting I" position, and that the account and factor memory cards 64 and 65 to be operated upon have already been prepared by an "Install" operation of the machine by entry of the appropriate information thereon.

To initiate the clear totals operation, the operator presses the No. 5 key of control row 1, which is the clear totals key 92 (FIG. 4), on the accounting machine keyboard 81. Depression of the clear totals key operates the contacts SC94A1 (FIG. 56C), closing said contacts. Since the contacts ST506A1, which are controlled by the total control switch 757 on the controller control panel 74, are also closed, as are the relay contacts K575B1, the closure of the contacts SC94A1 is effective to energize the relay K506 (FIG. 56B) over a circuit which includes the contacts SC94A1, the contacts ST506A1, a point 790, the contacts K575B1, and the relay K506, and which extends between two common conductors 791 and 792, across which a source of 90 volts D.C. power is applied.

Energization of the relay K506 closes the contacts K506A1 (FIG. 56A) in the energizing circuit for the manual-automatic relays K541, K550, K557, and K558 (FIG. 56A), over a circuit which extends from the conductor 791 over the contacts SP542B2, which are manual sequence contacts and normally closed; the contacts K506A1; and the parallel combination of the four manual-automatic relays K541, K557, K558, and K550 to the conductor 792.

Energization of the relay K506 also causes the contacts K506A4 (FIG. 56D) to close, energizing the solenoid L24, which functions to maintain the clear totals key 92 in control row 1 in its depressed condition. This energizing circuit extends from the conductor 791 over the contacts K506A4, the contacts K505B1, which are closed at this time, and the solenoid L24 to the conductor 792. It may be noted that the solenoid L24 is physically located in the accounting machine, but is shown in the controller circuitry of FIG. 56D because it is electrically connected to the same D.C. power source as the rest of the controller circuitry, rather than to the A.C. power source used for the accounting machine circuitry.

The contacts K506A5, K506AC13, and K506AC14 are also closed by energization of the relay K506, and the contacts K506BC13 and K506BC14 are opened by energization of the relay K506.

Figure 58:
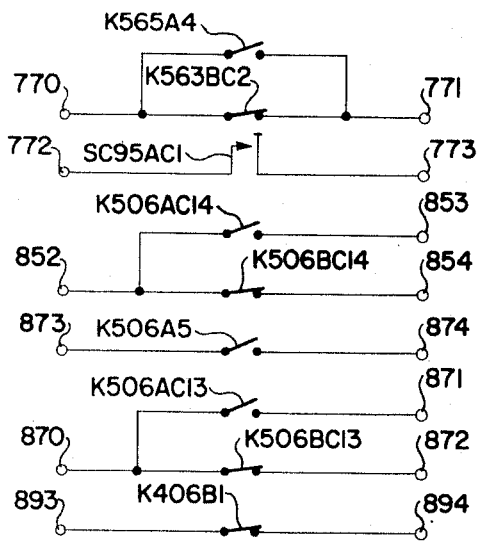

The contacts K506AC14 (FIG. 58) are connected through points 852 and 853 between the backs of terminals 71 and 72 of program board PB507, and are closed by energization of the relay K506, to enable the full sweep relay K521 to be energized in a clear totals operation.

The contacts K506BC14 (FIG. 58) are connected through the point 852 and a point 854 between the backs of terminals 71 and 70 of board PB507, and are opened by energization of the relay K506 to prevent power from being routed to the step sequence circuitry at a given point in the clear totals operation.

The contacts K506AC13 (FIG. 58) are connected through points 870 and 871 between the backs of terminals 68 and 69 of program board PB507, and are closed by energization of the relay K506, to complete a circuit for energizing the reset relay K548 to cause the main stepping switches SS500 and SS510 to be reset to home position.

The contacts K506BC13 (FIG. 58) are connected through the point 870 and a point 872 between the backs of terminals 68 and 67 of program board PB507, and are opened by energization of the relay K506, to prevent power from being routed to the step sequence circuitry at a given point in the clear totals operation.

The contacts K506A5 (FIG. 58) are connected through the points 873 and 874 between the backs of terminals 79 and 80 of program board PB507, and are closed by energization of the relay K506, to complete a circuit to the step sequence circuitry to enable the main stepping switches SS500 and SS510 to step from home position to position A, during a clear totals operation.

As the clear totals operation of the machine is commenced, the wiper of level 24 of the main stepping switch SS510 is in home position, and power is applied thereto from the conductor 791 through normally-closed contacts SC92B1 (FIG. 56B), contacts K500B1, contacts K548B2, and the point 778 (FIGS. 56B and 57), to the aforementioned wiper of level 24 of stepping switch SS510, which is in home position. The "home" contact position of level 24 is permanently wired to the back of terminal 1 of program board PB500, which is in column 24, row H, of the program board PB500, as may be seen in FIG. 38. From the front of terminal 1 of the program board PB500, a routing wire extends to the front of terminal 79 on board PB507, as is indicated by the numbers 7–79 in the circle representing terminal 1 in FIG. 38. On the back of the a board PB507, a set of "A" type contacts—namely contacts K506A5—controlled by the relay K506 ("A" type referring to contacts which are open when the relay having the same numerical designation is deenergized and closed when the relay is energized, and "B" type referring to contacts which are closed when the relay is deenergized, and open when the relay is energized) is connected between terminal 79 and terminal 80. The front of terminal 80 is connected by a routing wire to the front of terminal 37 of board PB517. The back of terminal 37 of board PB517 is permanently wired to a point 793 FIG. 56B) in the (operating circuitry of the machine, on one side of the parallel-connected solenoids SL500 and SL510 (FIG. 56A), which are the stepping solenoids for the main stepping switches SS500 and SS510. A capacitor 794 and a double diode 795 are connected in parallel with said solenoids. These solenoids are connected at their other sides to the conductor 792. Accordingly, the solenoids SL500 and SL510 are energized at this time over the circuit described above, which cocks the stepping switch mechanisms for movement of the wipers of the switches SS500 and SS510 to the next position, and which also closes the contacts SC500A1 and SC510AC1 (FIG. 56B), which is effective to energize the relay K500, over a circuit which extends from the conductor 791 over the contacts SC500A1 and SC510AC1, and the relay K500, to the conductor 792.

Energization of the relay K500 causes its contacts K500B1 (FIG. 56B) to open, thereby cutting off the power to the wiper of level 24 of stepping switch SS510.

This is effective to terminate the power, through the circuit previously described, to the solenoids SL500 and SL510. Deenergization of the solenoids is effective to cause the stepping switch wipers to shift from the home position to position A. The deenergization of the solenoids SL500 and SL510 also causes the contacts SC500A1 and SC510AC1 to open, thereby effecting the deenergization of the relay K500, thus causing the contacts K500B1 to reclose and once more to apply power over the previously-mentioned circuit to the level 24 wiper of the stepping switch SS510. This then applies power to terminal 13 (location A24) on the back side of the program board PB500, since the wipers of the stepping switches SS500 and SS510 have advanced one position. On the front side of the board, a routing wire is connected between the terminal 13 of program board PB500 and terminal 71 of the program board PB507. The back of this terminal is connected to the back of terminal 72 of program board PB507 over a set of "A" type contacts controlled by relay K506; namely, K506AC14. Since relay K506 is energized, the circuit between these two terminals is completed. The front of terminal 72 is connected by a routing wire to terminal 53 on program board PB517. On the back side of the program board PB517, this terminal is permanently connected over a point 796 (FIG. 56B) to an energizing circuit for the full sweep relay K521, which circuit extends through the normally closed relay contacts K522BC1 and the relay K521, to the conductor 792.

Energization of the relay K521 is effective, by causing the opening of contacts K521B1 (FIG. 56B), to prevent energization of the left side sweep relay K522 at this time.

In the operating circuitry for the accounting machine, relay contacts K521A2 (FIG. 61A), controlled by the relay K521, control the energization of the readout solenoid L22, and when these contacts K521A2 close, the solenoid L22 is energized over a circuit extending from a conductor 798 over the contacts K521A2, which are in parallel with the contacts K522A2, the contacts K548B1, and the solenoid L22, to a conductor 799. A source of 115 volts A.C. power is applied across the conductors 798 and 799.

Energization of the solenoid L22 is effective by mechanical means which have been previously described to bring the contacts SC960A1 (FIG. 56B) and SC961A1 (FIG. 56B) into a position where they are controlled by constantly-rotating cams. These contacts are then cyclically opened and closed, remaining closed for a period of approximately 90 milliseconds. During the 90 milliseconds that the contacts SC960A1 are closed, they are effective to energize the solenoid SL520 (FIG. 56B), which controls the positioning of the wiper of the sweep stepper. The energizing path for the solenoid SL520 extends from the previously-mentioned point 796 over the contacts SC960A1 and K523B1, and the solenoid SL520 to the conductor 792. A capacitor 800 and a double diode 801 are connected in parallel with said solenoid.

The contacts SC961A1, previously described, are part of a circuit extending from the conductor 791 over the contacts SC520A1 and SC961A1, a point 802 and the point 781 to the wiper of level 1 of the sweep stepping switch SS520 (FIG. 57), for periodically applying power to said wiper. A resistor 787 and a capacitor 788 are serially connected in parallel with the contacts SC961A1 for arc suppression purposes, and a conductor 789 is connected across the series combination of the contacts SC520A1 and the resistor 787 to provide a circuit path through the contacts SC520A1 for by-passing the resistor 787 to connect the capacitor 788 directly across the contacts SC961A1 for arc suppression purposes when the contacts SC961A1 are opened. A branch of this circuit extends from the point 802 over contacts K532B1 and K531B1, and a coil check relay K530, to the conductor 792. The coil check relay K530 is a slow-energizing relay. The operating circuitry is so designed that if the relay K530 is fully energized, it will stop the system, since such energization means that no key has been pulled down by a key-operating solenoid of the keyboard, as should be the case. Energization of the relay K530 is controlled jointly by contacts K531B1, which in turn are controlled by the key solenoid check relay K531, and by contacts K532B1, which in turn are controlled by the zero check relay K532. One of these two relays must be energized, and thus open one of the two sets of contacts K531B1 or K532B1, in order to prevent the relay K530 from energizing when power is applied over the circuit by closure of the contacts SC961A1. Otherwise, the system will be locked up by energization of the relay K530, as will be subsequently described.

During the time that the solenoid SL520 is energized and the wipers of the switch SS520 are in home position, the zero check relay K532 is energized. Its energizing circuit extends from the conductor 791 over the contacts SC520A1 (FIG. 56B); the contacts SC961A1; the point 802; the point 781 (FIGS 56B and 57); the wiper of level 1 of switch SS520, which is set to the home contact position of said level; a conductor connecting said contact position to the point 777 (FIGS. 56B and 57); and over the relay K532 to the conductor 792. Energization of the relay K532 prevents energization of the relay K530 by opening of the contacts K532B1, as previously described.

As soon as the previously-mentioned 90-millisecond interval of closure of the contacts SC960A1 is terminated, these contacts will open, and the solenoid SL520, which has been energized, will be deenergized, thus causing the wipers of the sweep stepping switch SS520 (FIG. 57) to advance from home position to position A. Subsequent to the stepping of the wipers of the sweep stepping switch to position A, the contacts SC960A1 and SC961A1 will again be energized by the periodically cycling cams, in the manner previously described. The contacts SC961A1 are thus capable of applying power over the circuit previously described to the wiper of level 1 of the sweep stepping switch SS520, which is now in position A. As previously described, position A of level 1 of the sweep stepping switch SS520 is connected by permanent wiring to the wiper of level 1 of the stepping switch SS500. It will be recalled that level 1 of the stepping switch SS500 is in position A, and power is thus applied to that position, which is connected by permanent wiring to the back of terminal 24 (position A1) of the program board PB501.

A routing wire is connected from the front of terminal 24 of program board PB501 to the front of terminal 1 on program board PB508. This terminal is one of a number of terminals bussed together on the back of program board PB508 and connected to one side of the operating solenoid for the No. 9 key of control row 2, the "Balance Pick-Up" key 92, on the accounting machine keyboard. This application of power through the circuit noted above therefore energizes said solenoid and effects depression of the No. 9 key of control row 2 of the accounting machine keyboard. Included in the energizing circuit for the keys of control row 2, including the No. 9 key just described, is the relay K531, which is also energized by the same impulse of power as energizes the solenoid of the No. 9 key in control row 2. Energization of the relay K531 is effective to cause the previously-mentioned contacts K531B1 to open and thus prevent energization of the relay K530, which would otherwise lock up the system. The energizing path for the relay K531 extends from the other side of the operating solenoid for the selected key over the point 776 (FIGS. 57 and 56D), a resistor 803, a point 804, and the relay K531 to the conductor 792.

At the end of the 90-millisecond interval, as previously described, the power is removed from the energizing circuit for the No. 9 key of control row 2, and is also removed from the sweep stepping switch solenoid SL520, to deenergize said solenoid, by the opening of the contacts SC961A1 and SC960A1, respectively. This also, of course, results in the deenergization of the relay K531.

The deenergization of the solenoid SL520 results in the stepping of the wipers of the stepping switch SS520, and advances these wipers to position B. The next closing of the contacts SC960A1 and SC961A1 once more cocks the stepping mechanism for the wipers of the switch SS520 and applies power at the same time to the B position of level 1 of the sweep stepping switch SS520. This power is transmitted over the previously mentioned permanent wiring to position A of level 2 of the stepping switch SS500, and from there by permanent wiring to the back of terminal 23 (position A2) of the program board PB501. The front of this terminal is connected by a routing wire to the front of terminal 37 of the program board PB512. The back of this terminal is connected to the operating circuitry at a point 805 (FIG. 56B) in the energizing circuit of a relay K544, known as the trip row 2 relay. Also included in the energizing circuit are the normally closed contacts K530B2. Application of power to this circuit causes the trip row 2 relay K544 to be energized, which causes the contacts K544A2 (FIG. 61C) in the accounting machine operating circuitry to close. Since the contacts K541AC11 have previously been closed by energization of the relay K541, as previously mentioned, this completes a circuit for energization of the standard control row 2 trip relay K307 (FIG. 61C) in the accounting machine circuitry. Said circuit etxends from the conductor 798 over the contacts SC3A1; SC12B1; SC913A1; SC15B2; SC933A1; K304B3; K301A2; K308AC2; a point 784; contacts K544A2; a point 786; contacts K541AC11; and the relay K307, to the conductor 799. Energization of the relay K307 closes the contacts K307A1 to complete a holding circuit for said relay. Energization of the relay K307 also closes contacts K307AC3 (not shown) to energize the key lock line solenoid L4 (not shown), which causes the accounting machine to trip and initiate a cycle of operation in a well-known manner. The operation performed by the accounting machine is a clear totals operation, in which the totals of both the "share" and "loan" new balances are cleared from the totalizers, which are set to zero, in a conventional manner.

It will be noted that the contacts K530B1 in the energizing circuit for the relay K544 are controlled by the previously-mentioned safety relay K530, so that, if the relay K530 is energized, as results from no key being depressed, then the relay K544 is prevented from energizing, and consequently the accounting machine cannot trip.

During the time that the accounting machine is cycling, the contacts SC960A1 and SC961A1 are again periodically operated by the cams in the manner previously described. This causes the wipers of the sweep stepping switch SS520 to step forward to the next position, which is position C. Power is then applied over the previously-described circuit to the wiper of level 1 of switch SS520, to contact position C of said level, and over the previously-described permanent wiring to the wiper of level 3 of switch SS500, which wiper is set to contact position A, which is permanently wired to the back of terminal 22 (position 3A) on the program board PB501. The front of the terminal 22 is connected by means of a routing wire to the front of terminal 49 on program board PB512. The back of that terminal is permanently wire to a point 806 (FIG. 56B) in the energizing circuit of the relay K523, which is the reset relay for the stepping switch solenoid SL520. The application of power in this manner to the energizing circuit for the relay K523 is effective to energize said relay, which is connected at its other side to the conductor 792.

Energization of the relay K523 closes the contacts K523A3 (FIG. 56B) to establish a holding circuit to maintain said relay energized, the holding circuit extending from said relay through the contacts K523A3, K500B2, K500B1, and SC92B1, to the conductor 791. The contacts K523B1 (FIG. 56B) are opened to interrupt a circuit path which would otherwise extend to the solenoid SL520. Also the relay contacts K523A2 (FIG. 56B) are closed by energization of the relay K523, to complete a self-interrupting circuit for the sweep stepping switch solenoid SL520, which extends from the conductor 791 over the contacts SC92B1, which are gate check contacts; the contacts K500B1; the contacts K500B2; the contacts K523A2; the contacts SC521A1, which are open-at-home contacts of the switch SS520; the contacts K523A2; the contacts SC520B2, which are self-interrupter contacts for the stepping switch solenoid SL520; and the solenoid SL520, to the conductor 792.

As soon as the stepping mechanism controlled by the solenoid SL520 cocks, the contacts SC520B2 open, to permit the stepping switch to step, by deenergizing the stepping switch solenoid SL520. Deenergization of the solenoid SL520 causes the contacts SC520B2 to reclose, so that a self-interrupting action is perpetuated to maintain the stepping switch wipers in a stepping condition. This stepping is terminated when the stepping switch wipers reach home position by opening of the contacts SC521A1, which are "open-at-home" contacts, and which are closed in all positions except home position.

It may be noted that the resetting of the sweep stepping switch SS520 is completed before the completion of the cycling of the accounting machine. Near the completion of the cycling of the accounting machine, the contacts SC952A1 (FIG. 56A) close at 320 degrees and open again at 350 degrees. When these contacts close, a circuit is completed to energize the main stepping switch solenoids SL500 and SL510. This circuit extends from the conductor 791 over the contacts SP542B2, which are normally closed manual sequence contacts; the contacts K506A1, which are closed by energization of the relay K506; the contacts SC952A1; the normally closed contacts K543BC2; and the solenoids SL500 and SL510 in parallel, to the conductor 792.

When the contacts SC952A1 reopen at 350 degrees of the cycle of accounting machine operation, the solenoids SL500 and SL510 deenergize, to permit the wipers of the main stepping switches, which are cocked by the energization of these solenoids, to advance one step to position B. The advancing of the wipers of the stepping switches SS500 and SS510 to the position B removes power from the terminal 53 on the program board PB517, to which power was applied for energization of the relay K521 initially. This termination of power is caused during cocking of the stepping mechanism for the switches SS500 and SS510 by energization of the relay K500 (FIG. 56B) under control of the contacts SC509A1 and SC510AC1, as previously described, which is effective to open the contacts K500B1 in the circuit path over which power is applied to the wiper of level 24 of the stepping switch SS510. Opening of the contacts K500B1 also interrupts the holding circuit for the relay K523 and causes said relay to deenergize.

The previously-described deenergization of the relay K521 (FIG. 56B) is effective to cause the contacts K521A2 (FIG. 61A) to open and thus deenergize the readout solenoid L22 of the accounting machine. This is effective to shift the contacts SC960A1 and SC961A1 away from their cam actuators, so that these contacts are no longer periodically closed.

The above description illustrates the manner in which the total is cleared from the new balance loan and share totalizers corresponding to the No. 9 key of control row 2. The manner in which the totalizers corresponding to the numbers 8, 7, 6, 5, 4, 3, and 2 keys of control row 2 are cleared is similar to that described above and takes place as the wipers of the main stepping switches SS500 and SS510 step sequentially through positions B, C, D, E, F, G, and I.

Terminals 13, 25, 37, 49, 61, 73, and 85 of board PB500, and terminals 1, 13, and 25 of board PB502, are all bussed together, with an external buss connecting terminal 85 of board PB500 and terminal 1 of board PB502. These terminals correspond to contact positions A to K of level 24 of the switch SS510, and therefore, when the wiper of level 24 of said switch SS510 is in any one of these positions, power can be transmitted through the wiper and the bussed contact positions over the previously-described path over the routing wire through the contacts controlled by the relay K506 to the energizing circuit for the solenoids SL500 and SL510. Consequently no need is seen to repeat the description for each set of totalizers.

The manner in which the totalizer corresponding to No. 1 key of row 2 is cleared is also similar to the above, with one exception. In this program, provision is made for release of the clear totals key of control row 1 by deenergization of the solenoid L24. This is done prior to the reset operation which returns the wipers of the sweep stepping switch SS520 to their home position. At this time, the wipers of the main stepping switches SS500 and SS510 are at position J, and the wipers of the sweep stepping switch SS520 are stepped from position B to position C. When power is applied over the previously-described permanent wiring connecting contact position C of level 1 of stepping switch SS520 to the wiper of level 3 of the switch SS500 set to contact position J, and from that contact position to the back of the terminal 22 (position 3J) of program board PB503, it is transmitted over a routing wire to terminal 54 of program board PB507.

The back of that terminal is connected to a point 807 (FIG. 56C) in the energizing circuit for the relay K505, said circuit extending over the relay K505 to the conductor 792. The relay K505 is thus energized over the circuit described above, and the contacts K505B1, controlled by said relay, open upon its energization and interrupt the energizing circuit for the solenoid L24, thus freeing the clear totals key of control row 1 to enable it to release at the end of the cycle of operation of the accounting machine. Energization of the relay K505 also causes closing of the contacts K505A3 (FIG. 56C) and K505A4 (FIG. 56C), which complete holding circuits to maintain the relays K505 and K506 in energized condition. The relay K506 would otherwise be deenergized by opening of the contacts SC94A1, which are controlled by the clear totals key of control row 1, and which open when said key is released at the end of the cycle of accounting machine operation.

The holding circuit for relays K505 and K506 extends from the conductor 791 over the contacts SC511A1 (FIG. 56C), which remain closed until the main stepping switches return to home position; the contacts K505A4; and one of two parallel paths, the first including the relay K505, and the second including the contacts K505A3, the contacts K575B1, and the relay K506; to the conductor 792.

The wipers of the sweep stepping switch SS520 then step to position D, under the control of the contacts SC960A1 (FIG. 56B). Position D is a reset position in which a reset operation is caused to take place in the same manner as previously described above.

Near the conclusion of the cycle of operation of the accounting machine, the contacts SC952A1 (FIG. 56A) close and then open, in the manner previously described, to cause the wipers of the main stepping switches SS500 and SS510 to be advanced one more position, to position K. Another clear totals operation then takes place, which is the same as the operation described in detail, except that the No. 6 key of control row 1 is depressed by its operating solenoid to clear its corresponding totalizers. Terminal 36 (position 1K) of program board PB503 is connected by a routing wire to terminal 49 in program board PB506, which in turn is connected at the back of the program board directly to the solenoid for the No. 6 key of control row 1, and the solenoid is thus energized in order to accomplish the desired depression of that key.

Near the end of the cycle of accounting machine operation, while the wipers of the main stepping switches SS500 and SS510 are in position K, the contacts SC952A1 are closed in the manner previously described, which causes the wipers to advance to position L. Terminal 37 (position 24L) of program board PB502 is connected by a routing wire to terminal 68 of program board PB507. The back of this terminal is connected over a set of "A" type contacts—namely, K506AC13—controlled by the relay K506, closed at this time, to the back of terminal 69 of program board PB507. The front of terminal 69, in turn, is connected by means of a routing wire to the front of terminal 51 of the program board PB517, which is connected by permanent wiring to a point 808 (FIG. 56C) in the energizing circuit for the reset relay K548, said circuit extending over the relay K548 to the conductor 792.

Application of power over the circuit described above causes the energization of the relay K548, which in turn causes closure of the contacts K548A4 to complete a holding circuit for the relay K548, which circuit extends from the conductor 791 over the contacts SC511A1, the contacts K548A4, and the relay K548 to the conductor 792.

The contacts K548A3 (FIG. 56B) are also closed to complete an energizing circuit for the solenoids SL500 and SL510, which extends from the conductor 791 over the contacts SC92B1, K500B1, K548A3, K500B11, and the solenoids SL500 and SL510 (FIG. 56A) to the conductor 792. As the solenoids SL500 and SL510 energize, the contacts SC500A1 and SC510AC1 (FIG. 56B) close, to energize the relay K500, thus opening the contacts K500B1, and interrupting the energizing circuit for the solenoids SL500 and SL510. This in turn causes the contacts SC500A1 and SC510AC1 to reopen, thus acting through the circuit combination described above to once more close the contacts K500B1 and reenergize the solenoids SL500 and SL510. This self-interrupting circuit continues until the wipers of the main stepping switches SS500 and SS510 are returned to home position, at which time the contacts SC511A1 open and deenergize the relay K548, thus opening the contacts K548A3 in the energizing circuit for the solenoids SL500 and SL510, and causing the wipers of the main stepping switches to remain in home position.

Energization of the relay K548 also closes the contacts K548A12 (FIG. 56B), which completes an energizing circuit for the reset SS520 relay K523, said circuit extending from the conductor 791 over the contacts K548A12 and the relay K523 to the conductor 792. This insures that the relay K523 will be energized, if it has not been previously energized, to cause the wipers of the switch SS520 to be returned to home position in the manner previously described.

It may be noted that contacts K548B1 (FIG. 61A), controlled by the relay K548, are placed in the energizing circuit for the solenoid L22, in order to prevent the energization of said solenoid while the relay K548 is energized.

The above constitutes the complete description of the clear totals operation of the system. An additional set of contacts K548B2 (FIG. 56B) are provided in the circuit for supplying power to lever 24 of the main stepping switch SS510. These contacts are controlled by the relay K548 and serve to prevent the application of power to level 24 of the switch SS510 while a resetting operation of the main stepping switches SS500 and SS510 is taking place. Return of the main stepping switches to home position, and consequent opening of the contacts SC511A1, also causes interruption of the energizing circuit for the relays K505 and K506 and causes said relays to be deenergized. Deenergization of the relay K506 causes opening of contacts K506A1 and consequent deenergization of the manual auto relays K541, K550, K557, and K558.

Share payment operation

The next operation to be described will be the share payment operation, in which payments are credited to the share accounts of the credit union members.

To summarize briefly, the share payment operation for each account consists of a sequentially-controlled program including a balance pick-up operation on a factor memory card to pick up the amount of the share payment and store it in the memory switches of the accounting machine; a balance pick-up operation on an account card to pick up the loan and share balances and other information and enter said balance in the totalizers; an item operation in which the share payment amount stored in the memory switches is entered into the machine and added into the share balance totalizer; and a new balance operation, in which the loan balance and the new share balance, together with other information, are stored magnetically on the ledger card and printed out on said card and on the journal sheet, the memory switches also being reset at this time.

In the description of this operation, it will be assumed that a series of ledger cards are fed by a ledger card feeder into the accounting machine, and that for each account to be processed, a factor memory card 65 will be first fed into the accounting machine, followed by an account card 64. It will also be assumed that the functional control knob (not shown) of the accounting machine is at "Posting I" or "Posting II" position; that the feeder "on-off" switch 762 (FIG. 1) has been turned to "on" position; that the control switch 763 has been turned to "Automatic"; that the power switch 764 has been turned to "on"; and that the "Share Payment" switch 754 (FIG. 27) on the controller control panel 74 is depressed to initiate operation of the system according to the program to be followed.

Depression of the share payment switch 754 closes the contacts SP570A1 (FIG. 56A), which completes an energizing circuit for the share payment relays K570 and K571 (FIG. 56A) over a circuit which extends from the conductor 791 over the manual sequence button SP542B2, which are normally closed; the contacts ST599, which are controlled by the switch 758 (FIG. 27) and are closed when said switch is in "select" position; the contacts SC501C2, which are controlled by the stepping switch SS500 and are closed when said switch is in home position; the function control switch SR1I, which is controlled by the functional control knob (not shown) of the accounting machine; the contacts SP570A1; the relays K570 and K571; and a series of contacts SP573B2, SP576B2, SP579B2, and SP582B2, which are controlled by the previously-described push button switches 755, 750, 752, and 751, respectively, of the controller control panel 74 (FIG. 27), all of which contacts must be closed; to the conductor 792.

Energization of the relay K570 closes the contacts K570AC11, to complete a holding circuit for the relays K570 and K571, which extends from the conductor 791 over the contacts SP542B2; the contacts K570AC11; the relays K570 and K571; and the contacts SP573B2; SP576B2; SP579B2; and SP582B2, to the conductor 792.

Energization of the relay K570 also closes contacts K570A1 (FIG. 60) to cause illumination of the "Share Payment" light 896, the illuminating circuit extending between conductors 883 and 884, and including the contacts K570A1 and the light 896.

Energization of the relay K571 causes closure of the contacts K571A1 (FIG. 56A) to complete a circuit which extends from the conductor 791 over the contacts SP542B2; the contacts K571A1; and the parallel combination of the manual auto relays K541, K550, K557, and K558, to the conductor 792, for energization of these relays.

Figure 62:
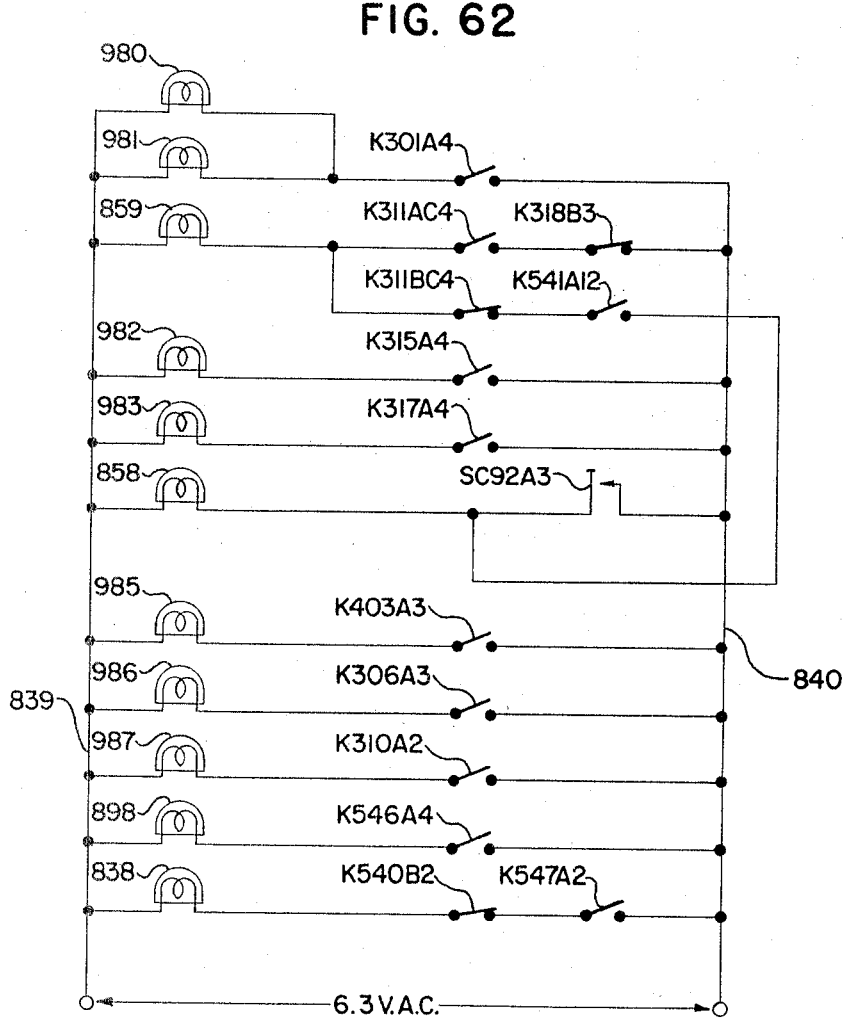

Energization of the relay K541 causes opening of the following contacts: K541 (FIG. 61B), K541BC2 (FIG. 61A), and K541BC11 (FIG. 61C). These relay contacts serve to interrupt certain circuits to disable manual operation of the machine. Energization of the relay K541 also causes closure of the following contacts: K541AC2 (FIG. 61A), K541A3 (FIG. 56C), K541AC11 (FIG. 61C), and K541A12 (FIG. 62). Closure of these contacts serves to complete certain circuits for automatic operation of the system.

Energization of the relay K550 causes closing of the contacts K550A2 (FIG. 61B), which condtitions one of the circuits of the system for automatic operation, as will be described.

Figure 60:
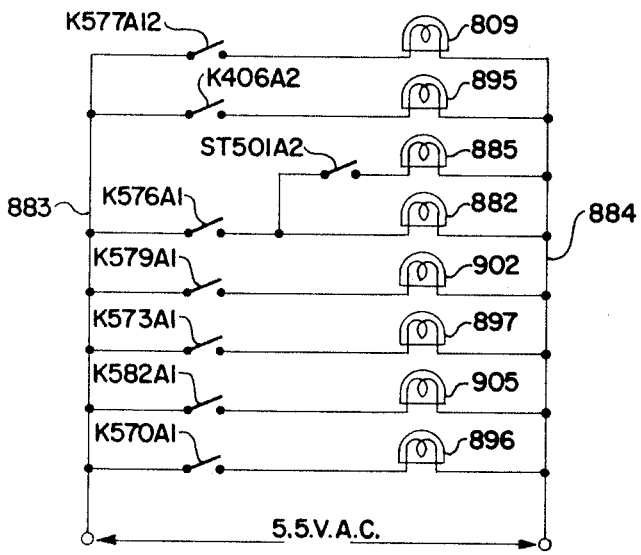

Energization of the relay K557 causes the following contacts to open: K557B1 (FIG. 61B), K557BC2 (FIG. 61B), and K557BC11 (FIG. 61B), and opening of these contacts causes disabling of certain circuits for manual operation of the machine. Energization of the relay K557 also causes closure of the following contacts: K557AC2 (FIG. 56C), K557A3 (FIG. 61C), G557AC11 (FIG. 61B), and K557A12 (FIG. 60). Closure of these contacts completes certain circuits for automatic operation of the system.

Energization of the relay K558 causes opening of the following contacts: K558B1 (FIG. 56C), K558BC2 (FIG. 61C), and K558BC11 (FIG. 61B), which disable certain circuits for manual operation of the system. Energization of the relay K558 also causes closure of the following contacts: K558AC2 (FIG. 61C), K558A3 (FIG. 61C), and K558AC11 (FIG. 61B). Closure of these contacts conditions certain circuits for automatic operation of the system.

The previously-mentioned contacts K557A12 (FIG. 60) are in the circuit for the "AUTO" light 809, located on the controller control panel, and closure of these contacts by energization of the relay K557 completes a circuit extending between conductors 883 and 884, to which conductors a source of 5.5 volts A.C. power is applied, said circuit including the contacts K557A12 and the light 809, to cause said light to become illuminated.

The previously-mentioned contacts K557AC11 (FIG. 61B), controlled by the relay K557, are effective to complete an energizing circuit for the gripper solenoid L1 in the accounting machine operating circuitry. This energizing circuit extends from the conductor 799 over the solenoid L1 and the contacts K557AC11, SC23B2, K307B2, K302A2, K305B2, SC941A1, SC921A1, K312B1, and K308AC4, to the conductor 798. It will be noted that the contacts K557BC2 and K557BC11, which are opened at the same time that the contacts K557AC11 are closed, effectively isolate a certain part of the normal operating circuit for the gripper solenoid L1 from said circuit.

It will also be noted that the gripper solenoid L1 can also be energized manually, as may be required during certain manual corrective operations where it is necessary to remove a ledger card from the machine. This is accomplished by depressing the gripper release button 80 (FIG. 1), which closes the contacts SP1A1 (FIG. 61B) to complete an energizing circuit extending from the conductor 798 over the contacts SP1A1 and K312B2, and the solenoid L1, to the conductor 799.

Energization of the gripper solenoid L1 causes a card to be fed into the accounting machine, by means of the normal operating circuitry of the accounting machine and the ledger card feeder. The stack of cards in the feeder is so arranged that the card which is fed is a factor memory card.

It will be assumed that the last operation of the accounting machine completed before the present share payment operation is commenced was a new balance non-transfer operation. Therefore the relay K302 is energized, and the previously mentioned contacts K302A2 in the energizing circuit for the gripper solenoid L1 are closed, as are the contacts K302A4 (FIG. 56D) in the controller circuitry, which causes energization of the relay K554 over a circuit extending from the conductor 791 over the contacts K302A4 and the relay K554 to the conductor 792.

Energization of the relay K554 causes closure of the contacts K554A12 (FIG. 64) in the energizing circuit for the relay K405, and effects the energization of said relay. The energizing circuit for the relay K405 extends from a 250-volt D.C. terminal 812 over the relay K405 in parallel with a capacitor 823, the contacts K549B1, the contacts K554A12, the contacts ST11A1, a resistor 810, and one side of a tube 811, which may be of type 6SN7, and which is rendered conducting by the application of plate voltage thereto over the circuit previously described. The cathode of the tube 811 is connected to a base reference potential, shown here as ground. The control electrode of this side of the tube 811 is connected into sensing circuitry for determining the presence of a magnetic "spot" on the card to determine the location of printing on the card. The manner in which the presence or absence of such a magnetic "spot" on a ledger card controls the location of printing is described in United States Patent No. 3,060,846, issued Oct. 30, 1962, to William F. Sommer and Dean B. Jackson.

It may be noted at this point that the contacts K549B1 in the above circuit are controlled by the line 40 relay K549 (FIG. 56C), which, in turn, is controlled, together with the line 40 relay K553, by the condition of the line 40 contacts SC99A2. These contacts close when the accounting machine carriage is set to a position in which printing will take place on line 40 of the ledger card thereon. Closure of said contacts completes an energizing circuit for the relays K549 and K553, said circuit extending from the conductor 791 over the contacts SC99A2 and the relays K549 and K553 in parallel, to the conductor 792.

Energization of the relay K549 opens the contacts K549B1 (FIG. 64) in the previously-described energizing path for the relay K405, to prevent said relay from being energized over that path.

Energization of the relay K553 closes contacts K553A3 (FIG. 56C) to establish a holding circuit for maintaining the relays K549 and K553 energized, said circuit extending from the conductor 791 over the contacts K551B1 and K553A3, and over the relays K549 and K553, to the conductor 792. This circuit will be subsequently interrupted by opening of the contacts K551B1 as the relay K551 energizes during the next balance pick-up operation.

Energization of the relay K553 also causes the contacts K553B2 (FIG. 64) to open to permit storage of a magnetic "spot" in the multiples line finding magnetic strip of the ledger card, to cause printing to take place on the right side of the card, as will be subsequently explained.

Energization of the relay K553 also causes closure of the contacts K553A11 (FIG. 61B) in the energizing circuit for the print control solenoid L21, to permit energization of said solenoid, as will be subsequently described.

Returning now to the relay K405, energization of this relay closes the contacts K405A1 in a holding circuit for the relay K405 which extends from the terminal 812 over the relay K405, the contacts K405A1, the contacts ST11A1, the resistor 810, and the tube 811 to ground.

Contacts K405B3 (FIG. 61B), in the energizing circuit for the print control solenoid L21, are opened by energization of the relay K405.

Contacts K405A4 (FIG. 56B) are closed by energization of the relay K405 and cause energization of the left-right print relay K563 over a circuit which extends from the conductor 791 over the contacts K405A4 and the relay K563 to the conductor 792.

Certain other contacts are operated by energization of relay K405, but do not affect the operation of the circuit at this point of the operating sequence, and therefore will not be described at the present time.

With the factor memory card in transport from the feeder 62 to the accounting machine 61, the relay K303 (not shown) in the operating circuitry of the accounting machine energizes in a conventional manner. Energization of the relay K303 causes closure of the contacts K303A4 (FIG. 56D), which in turn energizes the relay K551 over a circuit extending from the conductor 791 over the contacts K303A4 and the relay K551 to the conductor 792. A number of other contacts of the relay K303 are also operated at this time and function in the operating circuitry in the normal manner. Energization of the relay K551 causes closure of the contacts K551A12 (FIG. 63) in the energizing circuit for the relay K320 to effect the energization of said relay, said energizing circuit extending from a 250-volt D.C. terminal 813 over the relay K320 in parallel with a capacitor 824, the contacts K551A12, the "Posting I" position of the switch SR1I, a resistor 851, and the other side of the tube 811, which is rendered conducting by the application of plate voltage thereto over the circuit described above. The cathode of the left side of the tube 811 is connected to ground. The control electrode of the left side of the tube 811 is connected into sensing circuitry for determining whether a card being sensed is an account card or a factor memory card. Energization of the relay K551 also causes closure of the contacts K551A2 (FIG. 56A) in the energizing circuit for the solenoids SL500 and SL510 of the main stepping switches.

In addition, energization of the relay K551 causes closing of the contacts K551A3 (FIG. 61A) to energize the overdraft restoring solenoid L70 over a circuit which extends from the conductor 798 over the contacts SC934A1, controlled by the printer cam line and closed from 345 degrees to 15 degrees of rotation; the "Posting I" position of the switch SR1E; the contacts K551A3; and the solenoid L70, to the conductor 799. Energization of the solenoid L70 acts to restore any existing overdraft condition in the share totalizers, as previously described.

An energizing circuit for the solenoids SL500 and SL510 extends from the conductor 791 over the contacts SP542B2, K571A1, K540B11, K551A2, and the solenoids SL500 and SL510, to the conductor 792, and energizes the solenoids SL500 and SL510. This cocks the stepping switch mechanisms of the main stepping switches SS500 and SS510 for movement from home position to position A, and subsequent deenergization of the solenoids SL500 and SL510 takes place shortly, when the relay K303 (not shown) deenergizes in the normal course of operation of the machine, thereby deenergizing the relay K551, and causing the contacts K551A2 in the energizing circuit for the solenoids SL500 and SL510 to open, thus deenergizing said solenoids and causing the stepping mechanisms of the main stepping switches to cause the wipers of said switches to be shifted from home position to position A.

The previously-mentioned energization of the relay K320, held in an energized condition over a circuit including the contacts K320A1, which are in parallel with the contacts K551A12, causes closure of the contacts K320A3 (FIG. 56D) in the energizing circuit for a parallel combination of auto sequence relays K552, K559, and K560. The energizing circuit for these relays extends from the conductor 791 over the contacts K320A3, and the parallel combination of the relays K552, K559, and K560, to the conductor 792.

It should be noted that the previously-mentioned deenergization of the relay K303 is effective to commence the initiation of the balance pick-up cycle of the accounting machine, through the normal operation of the conventional circuitry of the accounting machine.

As the wiper of the level 24 of the main stepping switch SS510 is stepped to position A, power is applied to that position over a circuit extending from the conductor 791 through contacts SC92B1 (FIG. 56B), K500B1, K548B2, the point 778, and the wiper of level 24. Position A is permanently wired to the back of terminal 13 (position A24) on the back side of the program board PB500. The front of said terminal is connected by means of a routing wire to the front of terminal 71 in program board PB507, as has been previously described. On the back side of the program board PB507, this terminal is connected by means of a set of "B" contacts of the relay K506, which contacts are closed, since the relay is not energized at this time, to terminal 70 of the program board PB507. The front of terminal 70 is connected by means of a routing wire to the front of terminal 92 of program board PB507. This terminal is permanently wired on the back of the program board to terminal 80 of program board 507. The front of terminal 80 is connected by a routing wire to the front of terminal 37 of program board PB517. The back of terminal 37 is permanently wired to the point 793 (FIG. 56B) in the energizing circuit for the stepping switch solenoids SL500 and SL510. This energizes the solenoids SL500 and SL510, thereby cocking the stepping mechanisms for their switches.

In the manner previously described, the energization of the solenoids SL500 and SL510 causes the contacts SC500A1 and SC510AC1 (FIG. 56B) to close, thereby energizing the relay K500, which in turn opens the contacts K500B1, thereby interrupting power to the wiper of level 24 of the main stepping switch SS510. This then causes the deenergization of the solenoids SL500 and SL510, causing the wipers to be stepped to position B.

Since the solenoids are deenergized, the contacts SC500A1 and SC510AC1 are opened once more, thereby deenergizing the relay K500 and causing the contacts K500B1 to close, once more applying power to level 24 of the main stepping switch SS510 and reenergizing the solenoids SL500 and SL510.

The aforementioned stepping continues so that the stepping switches SS500 and SS510 step through levels A, B, C, D, E, F, G, I, J, K, and L. It will be recalled that terminals 13, 25, 37, 49, 61, 73, and 85 (board PB 500) and terminals 1, 13, and 25 (board PB502), corresponding to contact positions A, B, C, D, E, F, G, I, J, and K of level 24 of switch SS510, are bussed together. When the wiper of the main stepping switch SS510 is positioned to position L of level 24, power is applied from that contact position over permanent wiring to the back of terminal 37 of program board PB502. From the front of terminal 37, a routing wire extends to the front of terminal 68 of program board PB507. The back of terminal 68 of program board PB507 is connected to the back of terminal 67 of the same board over a set of "B" contacts of relay K506, said contacts being closed, since said relay is not energized at this time. A routing wire connects the front of terminal 67 of the board PB507 to the front of terminal 38 on program board PB517. Terminal 38 is connected at the back side of the program board to the point 793 (FIG. 56B) in the energizing circuit for the solenoids SL500 and SL510.

The wipers of the main stepping switches SS500 and SS510 are then stepped from position L to position M by the circuit functioning in the manner described above, and at position M, said wipers are caused to step again, to position N, where they halt until the end of the cycle of operation of the accounting machine. Near the end of the cycle of operation of the accounting machine, at 320 degrees of rotation of the main cam line, in the manner previously described, the contacts SC952A1 close for a short time and then open, thus momentarily energizing the solenoids SL500 and SL510, and advancing the wipers of the main stepping switches SS500 and SS510 another position, to position O.

It will be recalled that potential is applied over terminal 774 to the wiper of level 21 of switch SS510. During the stepping of the switches SS500 and SS510 through positions A to N inclusive, potential is applied from the wiper of level 21 through contact positions A to N inclusive to corresponding terminals of program boards PB500 and PB502. However, these terminals are not connected into the operating circuitry, and therefore the application of potential to the wiper of level 21 has no effect. When the wiper of level 21 steps to contact position O, potential is applied to terminal 76 of program board PB502, corresponding to position O of level 21. The front of this terminal is connected by a routing wire to the front of terminal 39 of program board PB516, and the back of said terminal is connected to one side of a set of "A" type contacts controlled by the share transfer relay K574. Since said relay is not energized at this time, these contacts are open, and the circuit path is interrupted and has no effect on the operation. This same circuit path may be completed during a share transfer operation, however, to energize the relay K564, for a purpose which will be described subsequently.

As the wipers of the main stepping switches SS500 and SS510 are stepping from home position to position N, the accounting machine is proceeding through a "balance pick-up" operation on the factor memory card. Information is sensed by the magnetic heads of the accounting machine from the magnetic strips on the card and is entered into the machine in the manner described in the previously-cited United States Patent No. 2,947,475. The information sensed from the factor memory card includes a five-digit share amount; a five-digit loan amount; a five-digit book number; a three-digit account number; two digits of units and multiples line finding information; sequence information, if any, stored in the units line finding channel; and left-right information, if any, stored in the multiples line finding channel. The five-digit share amount, five-digit loan amount, and five-digit book number information is entered into the memory switch unit by the differential mechanism during the operation, in the manner previously described. However, only the share amount information will subsequently be read out of the switches during the share payment operation.

It may be noted at this time that the comparator relay K318 (FIG. 61C) is caused to be energized by energization of the manual auto relay K558. It will be recalled that the relay K558 was energized at the beginning of the operation. This closes the contacts K558AC2 in the energizing circuit for the comparator relay K318, and energizes said relay over a circuit which extends from the conductor 798 over the contacts K558AC2 and the relay K318 to the conductor 799. The contacts ST2A1 controlled by the switch 83 on the accounting machine keyboard 81, and the contacts SP4A1 controlled by an additional manually-operable switch (not shown), are connected in parallel with the contacts K558AC2, and can be used to energize the relay K318 in manual operations where it is desired to disable the comparison means. At the same time, the comparator circuitry (not shown), associated with the circuit of FIG. 61C over the contacts K314B4 and a point 862, is disconnected from the comparator relay K318 by opening of the contacts K558BC2, which are also controlled by the relay K558. It may be noted that the comparator circuitry is also associated with the feeder circuitry in a conventional manner over a point 814.

During the time that the units and multiples line finding information is being sensed from the respective channels on the factor memory card, the contacts SC927 and SC930 in the units and multiples line finding sensing circuits (FIGS. 63 and 64) are open, while the contacts SC929 and SC926 in those circuits are closed. This isolates the energizing circuits for the relays K320 and K405 from the line-finding sensing circuits, and these sensing circuits thus function in a complete conventional manner, as described in the previously-mentioned United States Patent No. 2,947,475, and cause the respective pre-selector latches 815 and 816 to be operated at the proper time to enter the correct line position information into the accounting machine.

At 110 degrees of rotation of the auxiliary cam line of the accounting machine, the contacts SC929 and SC926 open, and at 115 degrees of the rotation of the auxiliary cam line of the accounting machine, the contacts SC927 and SC930 close, thus conditioning for operation the branch circuits which are provided for energization and deenergization of the relays K320 and K405, associated with the units and multiples line finding sensing circuits. Now, if the sequence "spot" is sensed from the units line finding channel, or a left-right "spot" is sensed from the multiples line finding channel, the respective relays K320 and K405 will be deenergized. It will be recalled that these relays were initially energized at the beginning of the cycle of accounting machine operation.

Deenergization of the relay K320 causes the contacts K320A3 (FIG. 56D) to open, thereby deenergizing the auto sequence relays K552, K559, and K560, which, it will be recalled, were energized when the relay K320 was energized.

Similarly, when and if the relay K405 is deenergized, the contacts K405A4 (FIG. 56B) are opened, thereby causing the left-right print relay K563 to be deenergized. This relay, it will be recalled, was energized when the relay K405 was energized.

Deenergization of the relay K560 conditions a circuit for energization of the solenoid 104 (FIG. 5) associated with the No. 9 key of row 3 of the accounting machine keyboard for depression of that key. This circuit is actually energized when the auxiliary cam line of the accounting machine reaches 145 degrees of its rotation. The energizing circuit extends from the conductor 791 over the normally closed contacts K556B13 (FIG. 56D), the contacts K560B13, the contacts SC907, which are connected in parallel with an arc-suppressing capacitor 822, the contacts SC15A3, and a point 817, which is connected to the back of terminal 13 of program board PB515. From the front of terminal 13 on program board PB515, a routing wire is connected to the front of terminal 2 on program board PB516. On the back of the board PB516, terminal 2 is connected to one side of a set of type "A" contacts controlled by the share payment relay K571, which contacts are closed at this time, due to the energization of said relay. The other side of the "A" type contacts is connected to the back of terminal 1 of program board PB516. A routing wire is connected from the front of terminal 1 of program board PB516 to the front of terminal 1 of program board PB515. The back of terminal 1 of program board PB515 is permanently connected to the back of terminal 25 of program board PB510, which in turn is directly connected to one side of the operating solenoid of key 9, control row 3 of the accounting machine keyboard, the other side of which solenoid is connected to a base reference potential, such as ground. Consequently, when the contacts SC907 close at 145 degrees of the operation of the auxiliary cam line of the accounting machine, the solenoid for key 9 of control row 3 is energized, and that key, which is designated "FF/CK" in FIG. 4, is depressed. Depression of this key causes printing of the five-digit book number on the journal sheet 99 (FIG. 1) by the accounting machine during the balance pick-up operation.

At about the same time, the pawl check relay K309 (FIG. 61A) is normally energized by closing of the contacts SC919, which are also controlled by the auxiliary cam line of the accounting machine, and which close at 145 degrees.

The pawl check relay K309 is provided to prevent a complete balance pick-up cycle of the accounting machine in the event that all of the magnetically stored information on the ledger card being processed is not read from said card. The path for energization of the relay K309 extends from the conductor 798 over the balance pick-up control contacts SC15A1; the contacts K318A2, which are closed, since the relay K318 is energized, as previously described; the contacts SC1B1; the contacts SC919; the contacts SC13B1, which are closed when the pawls 177 for all of the auxiliary differential mechanisms of the accounting machine have been released by their respective solenoids; the contacts K552BC11, which are closed due to the deenergization of the relay K552; and over a point 818 by permanent wiring to the back of terminal 22 of program board PB515. The front of terminal 22 of board PB515 is connected over a routing wire to the front of terminal 89 of program board PB516. The back of terminal 89 is connected to the back of terminal 90 on board PB516 over "B" type contacts of the relay K577. These relay contacts are closed, since the relay K577 is energized only during trial balance runs. Terminal 90 of board PB516 is connected at its front to the front of terminal 91 of board PB516 over a routing wire. The back of terminal 91 of board PB516 is connected to the back of terminal 92 of that board over "B" type contacts controlled by the transfer account relay K580, which relay is energized only during transfer balance runs, so that these "B" type contacts are closed at the time described. From the front of terminal 92 of board PB516, a routing wire extends to the front of terminal 10 of program board PB515. The back of terminal 10 of program board PB515 is, in turn, connected over a point 819 (FIG. 61A) to one side of the relay K309, the other side of said relay being connected to the conductor 799. Accordingly, the relay K309 is energized over the circuit described above when the contacts SC919 are closed.

It may be noted that, in the case of a non-automatic manual input operation of the accounting machine, it is also necessary to energize the relay K309, and this is accomplished by closing of the contacts K316A4, under control of the manual input relay K316 (not shown) to complete a circuit extending from the conductor 798 over contacts SC15A1; K316A4; and the relay K309, to the conductor 799.

The energization of the relay K309 closes the contacts K309A1 to complete a holding circuit for maintaining the relay K309 in energized condition, said circuit extending from the conductor 798 over the contacts SC15A1; K309A1; and the relay K309 to the conductor 799.

Energization of the relay K309 also causes the contacts K309B2 (FIG. 61A) in the energizing circuit for the pawl check relay K311 to open. Opening of these contacts prevents energization of the relay K311, which, if energized, would prevent further automatic operation of the system. Additional circuitry, which will be described subsequently is utilized to prevent undesired operation of the relay K311 during other types of operation.

Energization of the relay K309 also closes contacts (not shown) in the energizing circuit for the key lock line solenoid L4 (not shown) to prepare said solenoid for energization. This energization takes place in a conventional manner at 170 degrees of rotation of the auxiliary cam line when contacts controlled by said cam line are closed. The energization of the key lock line solenoid L4 trips the key lock line of the accounting machine to commence rotation of the main cam line of the machine. The solenoid L4 is subsequently deenergized by opening of certain contacts (not shown) when the key lock line commences its shifting movement.

At the same time, energization of the relay K309 causes contacts (not shown) to open in the energizing circuit for the solenoid L3 (not shown), thereby interrupting the energizing circuit for said solenoid to prevent its reenergization. Therefore the auxiliary cam line will not continue its rotation, but will stop at 180 degrees, due to operation of the auxiliary clutch, in a conventional manner.

At 30 degrees of rotation of the main cam line of the accounting machine, the counter select solenoid L20 and the solenoid L12 (FIG. 61B), which are connected in parallel, are energized by closing of the cam control contacts SC955, over a circuit which extends from the conductor 798 over contacts SC955; the functional control switch SR1C, in the "Posting I" position; the contacts K556B12; and the contacts K552B1, over a point 820 permanently wired to the back of terminal 5 on program board PB515, which terminal is permanently connected to the back of terminals 4 and 6 of program board PB515. In a similar manner, terminals 16, 17, and 18 of the board PB515 are permanently connected at their backs, and from terminal 17 the energizing circuit extends over a point 821 (FIG. 61B) and the solenoids L12 and L20 (in parallel) to the conductor 799. Two alternative circuit paths are provided between the sets of bussed terminals in the energizing circuit. One circuit path, which is used in the share payment operation, is completed by connecting a routing wire from terminal 4 of program board PB515 to terminal 1 on board PB514. On its back, terminal 1 of board PB514 is permanently connected to one side of a set of "A" type contacts controlled by the share payment relay K570. The other side of the "A" type contacts is connected to the back of terminal 2 on program board PB514. From the front of terminal 2 of board PB514, a routing wire is connected to the previously-mentioned terminal 16 of board PB515, to complete the energizing circuit for the solenoids L12 and L20, since the share payment relay K570 is energized and the contacts connecting terminals 1 and 2 of board PB514 are thus closed. An alternative path, which is not used at this time, is also provided and extends between terminal 5 of program board PB515 by means of a routing wire to terminal 3 of program board PB514, the back of which is connected to one side of a set of "A" type contacts controlled by the share transfer relay K573. The other side of said "A" type contacts is connected to the back of terminal 4 of board PB514. The front of terminal 4 of board PB514 is connected by a routing wire to terminal 17 of board PB515. As previously mentioned, this circuit path is not completed during the share payment operation, since the share transfer relay K573 is not energized at this time.

At 155 degrees of rotation of the main cam line, the auxiliary clutch solenoid L3 (not shown) is reenergized to cause the auxiliary cam line of the accounting machine to complete its cycle of operation. Reenergization of the solenoid L3 and consequent continued movement of the auxiliary cam line cause the table of the accounting machine to be swept outwardly, carrying the ledger card with it. As the card sweeps outwardly, in the units and multiples line finding channels, the sequence "spot" and the left-right "spot," if any, will be sensed by the magnetic sensing heads 825 (FIG. 63) and 826 (FIG. 64) of the accounting machine. These "spots," in their respective channels, will be sensed before the line-finding information in these channels is sensed.

The sequence storage switch contacts SC724 (FIG. 63) and the units line finding storage switch contacts SC701 are connected in series over a point 830 with the anode of the units line finding gate check tube (not shown), which may be of tube type 6H6, and these contacts also are connected to the amplifying circuit which includes serially-connected tubes 827, 828, and 829, which may be of types 12AX7, 6SL7, and 6H6, respectively, said tubes being serially connected in turn to the sensing head 825. The cam controlling the sequence storage switch contacts SC724 is shaped so that the contacts SC724 open at the time during the travel of the accounting machine table corresponding to the point on the ledger card in which a sequence "spot" is stored, thus interrupting the circuit to the anode of the gate check tube while the sequence signal is being amplified. The contacts SC724 then close to complete the circuit to the anode of the gate check tube, so that the units line finding "spot" can be checked. At the same time that the units line finding "spot" passes over the sensing head 825, the units line finding storage switch contacts SC701 open, breaking the circuit to the gate check tube at the precise time that the units line finding signal is being amplified, if the units line finding signal was read correctly during the insweep of the card at the initial balance pick-up of the information from the ledger card. It will thus be seen that if either the sequence "spot" or the units line finding "spot" is stored at an improper position on its magnetic storage strip on the ledger card, or if any additional "spots" are stored in the magnetic storage strip corresponding to the units line finding channel, a positive pulse resulting from sensing of such spots by the sensing head 825 will pass through the circuit described above and will appear on the plate of the gate check tube, thus causing a gate check lock-up in a conventional manner. For a complete showing and description of the structure and operation of the gate check circuitry, reference may be had to the previously-mentioned United States Patent No. 2,947,475.

The contacts SC702 and SC725 (FIG. 64) are placed in series in the multiples line-finding circuitry and function in a similar manner, with the contacts SC725 opening when a left-right "spot," if any, is sensed from the multiples channels, and the contacts SC702 opening when the multiples line finding information "spot" is sensed from the channel. The contacts SC702 and SC725 are connected over a point 831 to the gate check circuitry for the multiples line-finding channel. These contacts are also connected to the amplifying circuit which includes serially-connected tubes 832, 833, and 834, which may be types 12AX7, 6SL7, and 6H6, respectively, said tubes being serially connected in turn to the sensing head 825.

At 297 degrees of rotation of the main cam shaft of the accounting machine, the contacts SC951A1 (FIG. 61A) close to energize the switch disengaging and reset solenoid L23. As has been previously described, energization of this solenoid causes certain of the square shafts 231 of the memory switch line 225 to be separated, thus isolating certain of the memory switches 229, to retain the information which has been stored in said switches. The energizing circuit for the solenoid L23 extends from the conductor 798 over the contacts SC14A1 (FIG. 61A); the contacts SC19A1, the switch SR1B, set to "Posting I" position, and the contacts SC951A1 to a point 835 permanently wired to the back of terminal 17 on the program board PB517. The front of terminal 17 is connected by a routing wire to the front of the terminal 29 on the program board PB506. The back of terminal 29 is connected to the back of terminal 28 on program board PB506 through "B'" type contacts of the inactive account relay K561. These contacts are closed if the account is active, as it is assumed to be in this case. The front of terminal 28 of program board PB506 is connected over a routing wire to the front of terminal 9 of program board PB517. The back of terminal 9 is permanently wired to terminals 7 and 8 of the board PB517. The front of terminal 7 of program board PB517 is connected by a routing wire to the front of terminal 14 of program board PB514. If desired, terminal 14 of program board PB514 could be connected directly to terminal 28 of program board PB506. The back of terminal 14 of program board PB514 is permanently wired to one side of a set of "A" type contacts controlled by the share payment relay K570. The other side of the "A" contacts is permanently wired to the back of terminal 13 of program board PB514. These contacts are closed during share payment runs, such as the one being described. The front of terminal 13 of program board PB514 is connected to the front of terminal 4 of program board PB517 by a routing wire. The back of terminal 4 of program board PB517 is permanently wired to a point 836 (FIG. 61B) in the energizing circuit for the solenoid L23, said circuit extending from the point 836 through contacts K559B1, K550A2, and the solenoid L23, to the conductor 799.

It will be recalled that at 320 degrees of operation of the main cam line of the accounting machine, the wipers of the main stepping switches SS500 and SS510 step from position N to position O.

With the wipers of the main stepping switches SS500 and SS510 set to position O, a sequence check is next performed to determine whether or not a factor memory card has been processed immediately preceding the processing of an account card, which will take place next. If the factor memory card was, in fact, processed first, the feed relay K540 (FIG. 56B) will be energized to prepare for the feeding of an account card, while if an account card was processed first, the system will be prevented from further operation, and a verify sequence relay K547 (FIG. 56D) will be energized to cause a light to be illuminated on the accounting machine keyboard, telling the operator to "verify sequence."

In order to accomplish this, a routing wire is used to connect terminal 73 on program board PB502 (corresponding to contact position O of level 24 of switch SS510) and terminal 25 on program board PB515, which is permanently connected at its back over paths which will be described to the operating circuitry for both the feed relay K540 and the verify sequence relay K547.

The circuitry described above extends from the back of terminal 25 of board PB515 to a point 837 (FIG. 56D) from which two branches extend. The first of these branches extends over the contacts K560AC2 and the relay K547 to the conductor 792. In the even that the relay K560, which is an auto sequence relay, has not been deenergized by sensing of a sequence "spot" from a factor memory card, this circuit will be completed and the relay K547 will be energized. Energization of this relay causes the contacts K547A2 (FIG. 62) in the accounting machine circuitry to close and illuminate the "Verify Sequence" light 838 on the accounting machine over a circuit extending between two conductors 839 and 840, across which a potential of 6.3 volts A.C. is applied, said circuit including the contacts K547A2, K540B2 and the light 838. This informs the operator that the sequence should be verified. On the other hand, if the relay K560 has been deenergized by the proper sensing of a sequence "spot" on the factor memory card, the contacts K560BC2 (FIG. 56D) in the second of the two branches will be closed, and the circuit will extend through these contacts and over a point 841 to the back of terminal 37 on program board PB515. The front of the terminal 37 on board PB515 is connected by a routing wire to the front of terminal 50 on program board PB517. The back of this terminal is connected over a point 842 (FIG. 56B) and the relay K540 to the conductor 792. It will thus be seen that the relay K540 is energized over this branch of the energizing circuit described above, and said relay is held in energized condition by closing of the contacts K540A13 (FIG. 56D) in its energizing circuit.

In order to make two consecutive balance pick-up operations of the accounting machine, first the pick-up of the factor memory card and then the pick-up of the account card, it is necessary for the relay K302 (FIG. 61B) to be energized before the account card is fed. The energizing circuit for the relay K302 extends from the conductor 798 over the contacts K308AC4; K312B1; SC921A1; SC941A1; SC305B2; points 843 and 844; contacts ST14B2; a point 845; contacts K558AC11; a point 846; contacts K540A3, which were just closed by the energization of the relay K540; points 847 and 848; contacts K559BC2; and a point 849, to terminal 91 on program board PB515, which terminal is permanently wired to the backs of terminals 92 and 93 of that board. The front of terminal 91 is connected to the front of terminal 94 on program board PB514 by a routing wire. The back of terminal 94 is connected over "B" type relay contacts controlled by the relay K582 to the back of terminal 93 on program board PB514. The relay K582 is the transfer factor memory card relay, which is open only during transfer operations on factor memory cards, and is thus closed at the present time. The front of terminal 93 of program board PB514 is connected over a routing wire to the front of terminal 79 of program board PB515. The back of the terminal 79 is permanently wired to terminals 80 and 82 of that board, to terminals 13 and 14 of program board 517, and to a point 850 permanently connected to one side of the relay K302, the other side of which is permanently wired to the conductor 799. The relay K302 is thus energized over the circuit just described above.

Energization of the relay K302 completes a circuit for energization of the gripper solenoid L1 (FIG. 61B), which releases the grippers on the factor memory card which has been processed in the accounting machine. The energizing circuit for the solenoid L1 extends from the conductor 798 over the contacts K308AC4; K312B1; SC921A1; SC941A1; SC305B2; the point 843; the contacts K302A2, which were just closed; K307B2; SC23B2; a point 855; contacts K557AC11; a point 856; and the solenoid L1, to the conductor 799. The solenoid L1 is thus energized.

In order to cause the feeder to feed the next card, it is necessary to energize the relay K101 (not shown) in the feeder circuitry. This relay is energized over a circuit which includes the relay K101 and which extends from the feeder over a point 857 (FIG. 61C) and the contacts K557A3; a point 858; contacts K540A12; a point 859; contacts SP1B2; contacts SC9BC1, which are closed as a result of energization of the solenoid L1; contacts SC12B1; and contacts SC3A1, to the conductor 798. In parallel with the contacts K540A12 between the points 858 and 859 are serially connected contacts K555B1 and contacts SC501B1 controlled by the position of the stepping switch SS500 to be open when the wipers of the switch SS500 are away from home position. Energization of the relay K101 in the feeder then causes the feeder to commence feeding of the account card, and this in turn is effective to cause ejection of the factor memory card from the accounting machine.

Feeding of the account card from the feeder to the accounting machine is effective to initiate a balance pick-up operation of the accounting machine in a completely conventional manner, to accept the account card and sense the information magnetically stored thereon.

As is fully explained in the previously-mentioned United States Patent No. 2,947,475 and in United States Patent No. 2,954,159, issued Sept. 27, 1960, to Edward S. Stork and William C. Arnold, inventors, comparator means are provided in the accounting machine for insuring that entries are posted to the proper accounts by requiring a comparison of account or reference numbers between the entries and the accounts. In the present invention, this comparator means has been modified to cause a comparison to be made between the account numbers of the account cards and the factor memory cards. In the balance pick-up cycle for the account card, the mechanism which would release the comparator storage means from their previous settings, in a balance pick-up operation of the accounting machine when the accounting machine is used without the automatic system of the present invention, is prevented from releasing by energization of the comparator liner solenoid L8 (FIG. 61B), due to energization of the feed relay K540. The energizing path for the solenoid L8 extends from the conductor 798 over contacts K315BC2; contacts K540A4, which are closed by energization of the relay K540, and which contacts are in parallel with contacts K313A4, open at this time; contacts SC925A1; and the solenoid L8, to the conductor 799. Retention of the comparator liner in position by energization of the solenoid L8 causes retention of the comparator storage means in the positions in which they were set by pick-up of comparator information from the factor memory card, and enables them to be used in comparing comparator numbers of the factor memory card and of the account card, as will be described subsequently.

Also, at the same time, the contacts K540B1 (not shown) are opened by energization of the feed relay K540 to break the 250-volt supply to the energizing circuits for the operating solenoids for the comparator auxiliary differential mechanisms, or pre-selectors, to cause these pre-selectors to remain set in the same position as they were in the previous operation from the factor memory card, to keep the pre-selectors from shifting during the balance pick-up operation on the account card, which would cause shifting of the position of the comparator storage means.

During the insweep of the account card into the accounting machine, information pertaining to share amounts, loan amounts, comparison, and line finding is sensed from the account card in a conventional manner, and all but the comparison information is entered into the machine, the comparison pawl solenoids having already been deenergized, as previously described.

Just before the balance pick-up operation commences, the left-right print relay K405 (FIG. 64) is energized by closing of the contacts K554A12, which in turn were closed by energization of the relay K554 (FIG. 56D), in turn energized by closing of the contacts K302A4, which closed when the relay K302 was energized. The relay K563 (FIG. 56B) is energized at the same time as the relay K405, due to the closing of the contacts K405A4.

Also at about this time, the relay K303 (not shown) is energized, as previously described, and the relay contacts K303A4 close to complete a circuit for energizing the relay K551 (FIG. 56D). This closes the contacts K551A12 (FIG. 63) to energize the relay K320. Contacts K320A3 (FIG. 56D) close to reenergize the auto sequence relay K552, K559, and K560.

Figure 63:
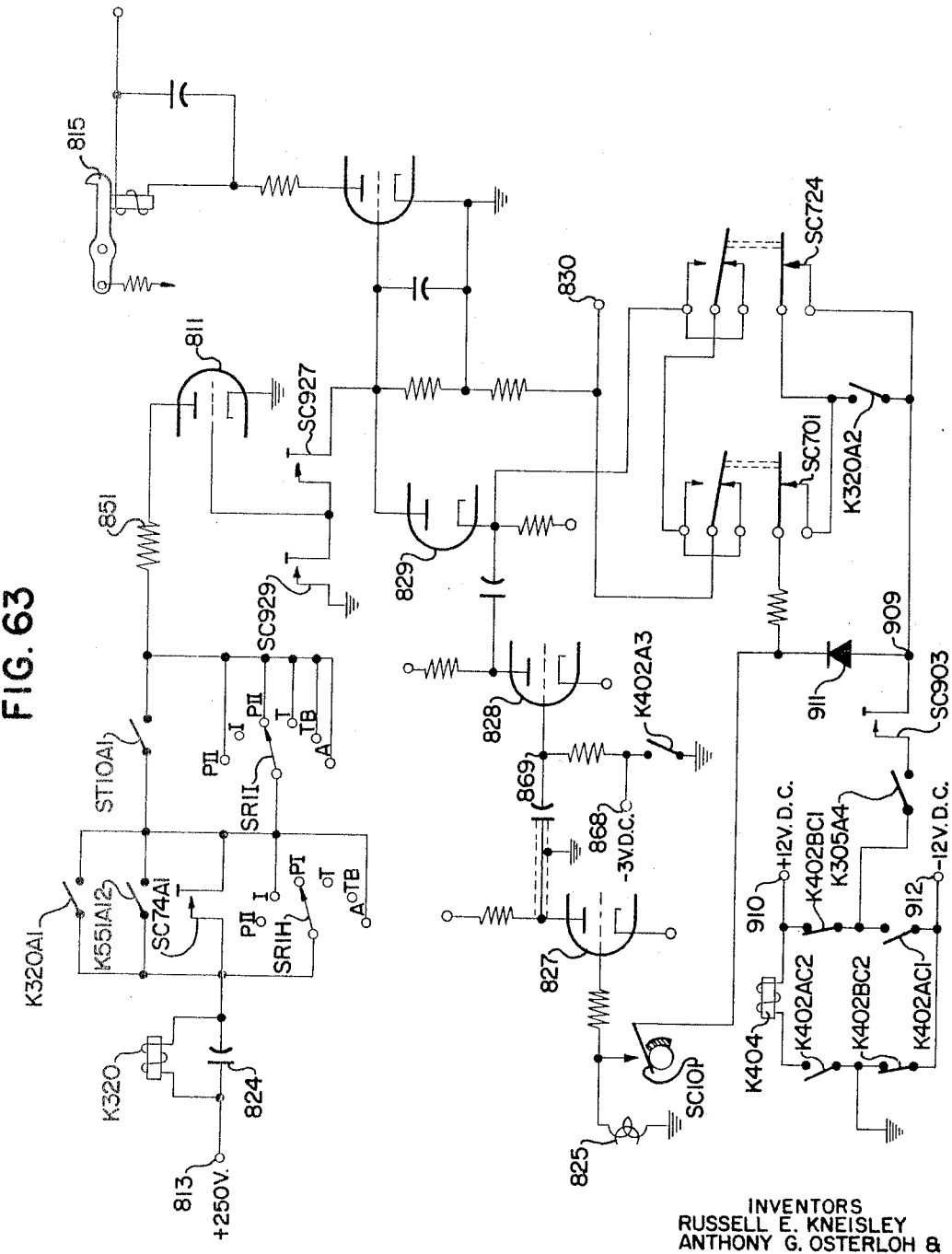

During the cycle of operation in which the account card is retained in the accounting machine the sequence relay K320 and its associated relays K552, K559, and K560 will remain energized, since no sequence "spot" is present on the account card to be sensed by the units line finding channel sensing head 825 (FIG. 63). Also the relay K405 (FIG. 64) will remain energized unless a left-right print "spot" is sensed from the multiples line-finding channel sensing head 826, in which case the relay K405 will be deenergized.

During this cycle of operation, the inactive account solenoid L12 and the counter select solenoid L20 (FIG. 61B) remain deenergized, due to the fact that the contacts K552B1 in the energizing circuit for said solenoid remain open, because of the energized condition of the relay K552.

Similarly, the switch disengaging and reset solenoid L23 (FIG. 61B) remains deenergized during this cycle of operation, due to the fact that the relay contacts K559B1 in the energizing circuit for the solenoid L23 remain open, because of the energization of the relay K559.

During the balance pick-up operation on the account card, the pawl check relay K309 (FIG. 61A) is energized at the same time as a factor memory card cycle. However, the energization is over a different path, extending from the conductor 798 over contacts SC15A1; K318A2; SC1B1; SC919, which close at 145 degrees of operation of the auxiliary cam line to energize the relay K309; contacts SC13B1; and contacts K552AC11, which are closed at this time due to energization of the auto sequence relay K522, to a point 857, which is permanently wired to the back of terminal 21 of program board PB515. A routing wire extends from the front of terminal 21 to the front of terminal 31 of program board PB506. Connecting the back of terminal 31 with the back of terminal 30 of board PB506 are a set of "B" type contacts controlled by the inactive account relay K561, which is deenergized during a share pay operation, unless all zeros are sensed in the share amount information on the factor memory card. From the front of terminal 30, a routing wire extends to the front of terminal 82 of program board PB516. Connecting the back of terminal 82 to the back of terminal 81 of program board PB516 are a set of "B" type contacts controlled by the transfer factor memory relay K583, which is deenergized at this time, causing these contacts to remain closed. The front of terminal 81 is connected by a routing wire to the front of terminal 9 of program board PB515. The back of terminal 9 is permanently wired to the backs of terminals 7 and 8, and to the point 819 (FIG. 61A). From point 819, the circuit extends over the relay K309 to the conductor 799 for energizing said relay.

The pawl check failure relay K311 (FIG. 61A) is prevented from energizing due to opening of the relay contacts K309B2 as the relay K309 is energized.

In the same manner as previously described, the key lock line solenoid L4 (not shown) is now energized by contacts (not shown) which are closed at 170 degrees of rotation of the auxiliary cam line, after said circuit is conditioned for energization by closing of the contacts (not shown) controlled by the relay K309.

Also, the opening of certain contacts (not shown) in response to the energization of the relay K309 prevents the energization of the auxiliary clutch solenoid L3 (not shown) and thereby prevents the auxiliary cam line from completing the second 180 degrees of its rotation at this time. The operation of both the solenoids L3 and L4 is as described in connection with the balance pick-up operation of the factor memory card.

Subsequently, at 156 degrees of rotation of the main cam line, certain contacts (not shown) are closed to reenergize the auxiliary clutch solenoid L3, to cause the auxiliary cam line to complete the second half of its cycle of rotation, so that both the auxiliary cam line and the main cam line rotate to complete their cycles of operation during this period.

During the second half of the rotation of the auxiliary cam lie, a gate check operation is performed to test the validity of the information sensed from the account card. This gate check operation is conventional, except for the gate check of the comparison information. As previously mentioned, the comparison storage means have been maintained in the positions to which they were set according to the information sensed from the factor memory card. Now this setting is checked against the comparison information sensed from the account card, during its outsweep, in the same manner as a conventional gate check is performed. A failure of comparison causes deenergization of the relay K308 (not shown) to close the contacts K308BC4 (FIG. 61C) and thus cause energization of the gate check solenoid L5 (FIG. 61C) in a conventional manner, to lock up the system against another operation. Also the gate check failure light 858 (FIG. 62) on the accounting machine will be illuminated by closing of the gate check failure switch SC92A3 controlled by the gate check solenoid L5, to complete a circuit including the light 858 and the switch SC92A3 extending between the conductors 839 and 840, as will the verify comparator light 859 (FIG. 62) on the accounting machine, over a circuit extending from the conductor 840 over the contacts SC92A3, K541A12, and K311BC4 and the light 859, to the conductor 839.

Since the solenoid L20 (FIG. 61B), controlling totalizer selection, is not energized during the cycle of operation of the accounting machine, the loan balance and the share balance are entered into the machine totalizers during the rotation of the main cam line of the machine. Also these two balances are printed on the journal sheet 99.

At 320 degrees of rotation of the main cam line of the machine, the contacts SC952A1 (FIG. 56A), in the energizing circuit for the main stepping switch solenoids SL500 and SL510, close to energize these solenoids and cock the stepping switch mechanism for advance to the next position. At 350 degrees of rotation of the main cam line, the contacts SC952A1 open, thereby deenergizing the solenoids SL500 and SL510, and causing the stepping switch mechanism to advance the wipers of the main stepping switches SS500 and SS510 from position O to position P.

With the main stepping switch wipers positioned to position P, power is applied from the conductor 791 over the contacts SC92B1 (FIG. 56B), K500B1, K548B2, the point 778, and the wiper of level 24 of the main stepping switch SS510 to terminal 85 of program board PB502. The front of this terminal is connected by a routing wire to the front of terminal 57 of program board PB516. The back of terminals 57 and 69 are bussed together and are connected over type "A" and "B" contacts, respectively, to terminals 58 and 70 of board PB516, said "A" and "B" contacts being controlled by the transfer factor memory card relay K583 (FIG. 56A), which is deenergized at this time, so that the "B" contacts are closed and the circuit extends to terminal 70. A routing wire extends from the front of terminal 70 to the front of terminal 31 of program board PB515. The backs of terminals 31, 32, and 33 of program board PB515 are bussed together and are connected over a point 860 (FIG. 56D) to an operating circuit between contacts K560BC1 and K560AC1, which are controlled by the automatic sequence relay K560. Since the relay K560 is energized at this time, due to the fact that a sequence "spot" has not been sensed from the account card, the contacts K560BC1 are opened, thereby interrupting the circuit in that direction, while the contacts K560AC1 are closed, thus connecting the terminal 31 over a point 861 (FIG. 56D) to terminal 43 on program board PB515. If the relay K560 were deenergized at this time, the contacts K560AC1 would be open, and the contacts K560BC1 would be closed, thus completing a circuit over the contacts K560BC1 and the verify sequence relay K547 to the conductor 792, thereby energizing the relay K547.

From the front of terminal 43, to which terminals 44 and 45 are bussed, a routing wire is connected to the front of terminal 28 on program board PB515. The back of the terminal 28 is connected to one side of "B" type contacts; namely, contacts K406B1, controlled by the account select relay K406. The other side of these "B" contacts is connected to the back of terminal 40 of program board PB515. These "B" contacts will be closed except when the account select relay K406 is energized. The circumstances under which relay K406 is energized will be described subsequently, and for the moment it will be assumed that said relay is deenergized, so that the "B" contacts controlled by said relay are closed, thus permitting the circuit to be maintained between the terminals 28 and 40. From the front of terminal 40, a routing wire extends to the front of terminal 26 on program board PB 506. The back of terminal 26 is connected to the back of terminal 25 over a set of "B" type contacts, and to the back of terminal 27 over a set of "A" type contacts. Both of these sets of contacts are controlled by the inactive account relay K561. Since it is assumed that the present account is not an inactive one, the relay K561 is deenergized, and the circuit is completed from the terminal 26 to the terminal 25. The front of the terminal 25 is connected over a routing wire to terminal 53 of program board PB514. The back of terminal 53 is connected by a set of "A" type contacts to terminal 54, and by a set of "B" type contacts to terminal 66. These contacts are controlled by the trial balance relay K576. Since this relay is deenergized at the present time, the circuit is completed between terminals 53 and 66. From the front of terminal 66, a routing wire is connected to the front of terminal 39 on program board PB517. Terminal 39 is directly connected at its back to a number of other terminals, including terminal 26 of board PB517, which is connected at its back to the point 793 (FIG. 56B) of the energizing circuit for the stepping switch solenoids SL500 and SL510. In the manner previously described, these solenoids are momentarily energized and then deenergized, so that the stepping mechanism is cocked and then advanced to position the wipers of the main stepping switches SS500 and SS510 to position Q.

At this point, the description of the sequence of operations will be interrupted to provide an explanation of the mode of operation of the account select relay K406 (FIG. 61C). It will be recalled that in the preceding description of the sequence of operation it was assumed that this relay was deenergized.

The operating circuit for the account select relay K406 is utilized when it is desired to condition the machine to cause it, during an automatic posting run, to stop automatically when the account card for a particular predetermined account is fed into the machine. One reason for doing this might be to single out a card for an account on which the account holder was not paid during a particular pay period, so that no share payment should be made for that account. In order to condition the machine to accomplish this, the manually-operable contacts ST406A1 (FIG. 61C) are closed by turning the "Account Selection" key switch 759 on the controller panel 74 (FIG. 27) to the "Stop Account" position, and the comparator number of the desired account is indexed on the comparator keyboard 97 (FIG. 1) of the accounting machine 61.

For the purpose of example, let it be assumed that it is desired to stop operation of the system when the account card pertaining to account No. 123 is fed into the accounting machine. The operator therefore closes the contacts ST406A1 by operation of the "Account Selection" switch and indexes the number 123 into the comparator keyboard. This causes a first set of comparator switching means corresponding to the keyboard denominations to be set to positions 3, 2, and 1, respectively, in a manner described in the previously-mentioned United States Stork and Arnold Patent No. 2,954,159.

When the factor memory card for the account number 123 is entered into the machine, a second set of comparator switching means corresponding to the various denominations is set to positions 3, 2, and 1, respectively, in a manner described in the above-cited United States Patent No. 2,954,159. At the time of positioning of the second set of comparator switches to the selected account number, the relay K406 is energized over a circuit which extends from a conductor such as the conductor 798, over a serial combination of the first and second sets of comparator switching means, as disclosed in the above-cited United States Patent No. 2,954,159; a point 862 (FIG. 61C); contacts K314B4; a point 863; the contacts K558A3, which are controlled by the manual auto relay K558; the contacts ST406A1; and the relay K406, to the conductor 799.

Energization of the relay K406 opens the contacts K406B1 (FIG. 58), which are connected between points 893 and 894 across the backs of terminals 28 and 40 of program board PB515. This interrupts the operating circuitry of the system and prevents advancement of the main stepping switch wipers from position P to position Q in the program being described. This feature can be employed in a different manner in other programs. Automatic operation of the system is resumed, following whatever operation is necessary on the selected account, by deenergization of the relay K406. This may be accomplished by making a manual operation of the machine, or by turning the "Account Selection" switch 759 back to "Normal" position, thus opening the contacts ST406A1, or by changing the number indexed on the comparator keyboard. Energization of the relay K406 closes the contacts K406A2 (FIG. 60) to complete a circuit for illuminating a "Stop Account" indicator light 895 on the controller control panel, said circuit extending between the conductors 883 and 884, and including the contacts K406A2 and the light 895 in series.

As previously described, the wipers of the stepping switches SS500 and SS510 are now set to position Q of the stepping switches. Power is now applied over the previously described circuit through the wiper of level 24 of stepping switch SS510 to the back of terminal 1 of program board PB504. From the front of terminal 1, a routing wire is connected to the front of terminal 25, on program board PB517. Terminal 25 is connected at its back to the point 793 (FIG. 56B) in the energizing circuit for the stepping switch solenoids SL500 and SL510, and these solenoids are then energized and deenergized to step the wipers of stepping switches SS500 and SS510 one additional step to position R, in the manner previously described.

Power is now applied over the previously-described circuit through the wiper of level 24 of stepping switch SS510 to the back of terminal 13, program board PB504, which is connected at its front by a routing wire to the front of terminal 35, board PB507. The back of terminal 35 is connected to one side of a set of "B" type contacts controlled by the card-filled relay K564, the other side of said contacts being connected to the back of terminal 34, of board PB507. The front side of the terminal 34 is connected by a routing wire to terminal 75, of board PB512.

The back of terminal 75 is connected to one side of a set of "B" type contacts controlled by the share transfer relay K574, the other side of said contacts being connected to the back of terminal 88, of program board PB512. The front side of terminal 88 is connected by a routing wire to terminal 27, program board PB517, the back of which terminal is connected to the point 793 (FIG. 56B) in the energizing circuit for the solenoids SL500 and SL510, to cause energization and deenergization of these solenoids in the manner previously described, to advance the wipers of the stepping switches SS500 and SS510 from position R to position S.

The "B" type contacts controlled by the relays K574 and K564 do not serve any function in the program being described, but exert certain controls in other programs, which employ the wiring system described in common with the present program, and these contacts are therefore included in the circuit paths for that reason. Alternatively, however, completely different levels of the stepping switches could be used for different programs, in which case the above routing would not have been necessary in the share payment program.

With the wipers of switches SS500 and SS510 set to position S, power is applied through the previously-described circuit, including the wiper of level 24, to the back of terminal 25 of program board PB504. The front of terminal 25 is connected by a routing wire to the front of terminal 49, program board PB514. The back of terminal 49 is permanently connected to the back of terminal 50, program board PB514, over "A" type contacts controlled by the share payment relay K570, which contacts are closed at this time, since the relay is energized. The front of the terminal 50 is connected by a routing wire to the front of the terminal 77, of program board PB517. The back of terminal 77 is bussed to the backs of terminals 53, 65, and 89 of board PB517, and is connected to the point 796 (FIG. 56B) in the energizing circuit for the full sweep relay K521. That relay is accordingly energized over a circuit extending from the point 796 over the contacts K522BC1, and the relay K521 to the conductor 792.

Energization of the relay K521 opens the contacts K521B1 (FIG. 56B), which prevents the left side sweep relay K522 from energizing.

Energization of the relay K521 also closes the contacts K521A2 (FIG. 61A) in the energizing circuit for the read-out solenoid L22, to energize said solenoid over a circuit extending from the conductor 798 over the contacts K521A2, the contacts K548B1, and the solenoid L22, to the conductor 799. Energization of the solenoid L22 brings the contacts SC960A1 (FIG. 56B) and SC961A1 (FIG. 56B) into operative relation with a pair of regularly rotating cams to effect the periodic opening and closing of these contacts, in the manner previously described in connection with the clear totals operation. Closing of the contacts SC960A1 completes an energizing circuit for energizing the sweep stepping switch solenoid SL520, which circuit extends from the point 796 (FIG. 56B) over the contacts SC960A1, the contacts K523B1, and the solenoid SL520, to the conductor 792. As the contacts SC960A1 subsequently open, the solenoid SL520 is deenergized. This is effective to advance the wipers of the stepping switch SS520, which were cocked by energization of the solenoid SL520, from their home position to position A.

After the wipers of the stepping switch SS520 are set to position A, they are re-cocked by closing of the contacts SC960A1, and consequent reenergization of the solenoid SL520. At the same time that the contacts SC960A1 close, the contacts SC961A1 also close, as previously described. This conditions a circuit for applying power to the wipers of the stepping switch SS520, which are set to position A. When the wiper mechanism cocks, the contacts SC520A1 (FIG. 56B) close to complete the circuit for application of power from the conductor 791 to the wiper of level 1 of the switch SS520, the circuit extending from the conductor 791 over the contacts SC520A1, the contacts SC961A1, and the point 781 (FIGS. 56B and 57) to the wiper of level 1 of switch SS520. Since the wiper of level 1 of stepping switch SS520 is now set to position A, the application of potential to the wiper causes the circuit path to be extended over permanent wiring from contact position A of level 1 of switch SS520 to the wiper of level 1 of the stepping switch SS500, and thence to contact position S of level 1, to which the wiper of switch SS500 is now positioned. This contact position is permanently connected to the back of terminal 36 on program board PB505. From the front of terminal 36, a routing wire extends the circuit to the front of terminal 11 of program board PB509. The back of terminal 11 of board PB509 is bussed together with terminals 1 to 12 inclusive of program board PB509, and terminal 1, at its back, is permanently wired to the wiper of storage switch SR501 (FIG. 57). This switch corresponds to the first amount row of the accounting machine keyboard. It will be recalled that the various switches SR501 to SR513 have been set according to information sensed from the factor memory card during the first operating cycle of the accounting machine, and now retain this information. Let it be assumed that the share amount stored on the factor memory card is $21.50. In such case, the wiper of switch SR501 is set to its zero position, the wiper of switch SR502 is set to its number 5 position, the wiper of switch SR503 is set to its number 1 position, the wiper of switch SR504 is set to its number 2 position, and the wiper of the switch SR505 is set to zero.

It will be recalled that the various corresponding digital contact positions of the storage switches SR501 to SR513 inclusive are bussed together, and that these digital positions are then connected to the wipers of corresponding levels of the stepping switch SS520. It will also be recalled that the zero and "Eliminate" positions of the various switches SR501 to SR513 are also bussed together and are connected over a point 777 (FIGS. 56B and 57) to one side of the relay K532, the other side of which is connected to the conductor 792. In addition, this zero and "eliminate" bus circuit is connected to terminal 61 on program board PB512, said terminal being bussed to terminals 62 to 72 inclusive of the board PB512.

Since it was stated that the wiper of switch SR501 is set to zero position, it will be seen that power is carried through the wiper of the switch SR501 and its zero contact position, over the relay K532 to the conductor 792, thereby energizing the relay K532. Energization of the relay K532 causes the contacts K532B1 (FIG. 56B) in the energizing circuit for the relay K530 to open, thereby preventing energization of the relay K530, which is a slow-energizing relay, and preventing a resulting lock-up of the system. It will be recalled that the relay K530, which is the coil check relay, is operable, when energized, to lock up the system. This is done in order to prevent operation of the system using erroneous information.

As the contacts SC960A1 and SC961A1 (FIG. 56B) subsequently re-open under the influence of their respective cams, the power to the wiper of level 1 of the stepping switch SS520 is cut off, and the stepping switch solenoid SL520 is deenergized, which causes the wipers of the stepping switch SS520 to advance in the manner previously described, so that these wipers are now set to position B.

With the wipers in position B, the contacts SC960A1 and SC961A1 close, and function, as previously described, to energize the solenoid SL520, thus cocking the wiper-advancing mechanism, and to apply power once more to the wiper of level 1 of the switch while it is in position B. This power is transmitted through position B of level 1 of the stepping switch SS520 over a permanently wired connection to the wiper of level 2 of the stepping switch SS500, and thence to contact position S of level 2, to which the wipers are set. From there, a permanent wired connection carries power to the back of terminal 35 of program board PB505. The front of terminal 35 is connected to a routing wire to the front of terminal 23 of program board PB509. As was the case with terminal 11 of program board PB509, the terminal 23 is bussed to all of the other terminals in its row; namely, terminals 13 to 24 inclusive, and terminal 13 is permanently connected to the wiper of storage switch SR502. As previously described, the wiper of switch SR502 is set to position number 5. As also previously described, position 5 is connected by permanent wiring to the wiper of level 8 of stepping switch SS520. Since the wiper of level 8, in common with the other wipers of the stepping switch, is set to position B of the stepping switch, power is applied to position B of level 8 of the stepping switch SS520, which position is permanently connected to the solenoid for operating key 5 of amount row 2 of the accounting machine keyboard. Key 5 of amount row 2 of the accounting machine keyboard is accordingly depressed by energization of the solenoid. As has been described, the return circuit for all of the operating solenoids of the amount rows is connected over a point 775 (FIGS. 56D and 57) on one side of a coil check relay K531, the other side of which is connected to the conductor 792. This relay, when energized, causes the contacts K531B1 (FIG. 56B) in the energizing circuit for the relay K530 to open. Opening of these contacts prevents energization of the relay K530 and thus prevents locking up of the system in the manner previously described.

In a similar manner, information is read from the remaining three right-most storage switches, SR503, SR504, and SR505, and the corresponding amount key of the accounting machine keyboard is depressed for entry of this amount into the accounting machine. In the case of zeros, as previously described, no key is depressed, since the differential mechanism automatically is set to zero during operation of the accounting machine, in the absence of depression of a key. It should be noted that the switches SR501 to SR505 inclusive, in which share amount information is stored, are the only ones which are used in the share payment operation. It is consequently not necessary to read information from the switches SR560 to SR513 at this time, and this is not done.

During the reading of the storage switches SR501 to SR505 inclusive, the wipers of the stepping switch SS520 have been stepped to position F, where they are now set. As the contacts SC960A1 and SC961A1 are closed, with the wipers in this position, the wipers are cocked for further movement, and power is applied to the wiper of level 1 of the stepping switch SS520. This circuit extends from position F of level 1 of the switch SS520 to the wiper of level 6 of the main stepping switch SS500, the wiper of which is positioned to position S, as previously stated. This contact position of the main stepping switch SS500 is wired to the back of terminal 31 of program board PB505. The front of terminal 31 is connected by a routing wire to the front of terminal 38 of program board PB508. The back of terminal 38 is bussed to the backs of terminals 37 to 48 inclusive, and this bus is connected directly to the operating solenoid for key 6 of control row 2. Energization of this solenoid causes key 6 of control row 2 on the accounting machine keyboard to be depressed.

The row 2 common return path from the row 2 solenoids extends over the point 776 (FIGS. 56D and 57) through a 10-ohm resistor 803 to one side of the relay K531, the other side of which is connected to the conductor 792, and energizes said relay to open the contacts K531B1 (FIG. 56B) to prevent energization of the relay K530, for the purpose previously described. As the contacts SC960A1 and SC961A1 again open and reclose, the stepping mechanism for the stepping switch SS520 causes the wipers to be advanced to position G and cocked, and power is applied to the wiper of level 1 of the stepping switch. Position G of the level 1 of stepping switch SS520 is permanently connected to the wiper of level 7 of the main stepping switch SS500. Since the wipers of stepping switch SS500 are still set to position S, power is applied through the corresponding contact position to the back of terminal 30 of program board PB505. The front of terminal 30 is connected by a routing wire to the front of terminal 44 of program board PB512, the back of which terminal is bussed to the corresponding backs of terminals 37 to 48 inclusive. The back of terminal 37 is permanently connected over the point 805 (FIG. 56B) to the energizing circuit for the trip row 2 relay K544. Consequently, the relay K544 is energized over the circuit previously described, which extends through contacts K530B2 and the relay K544 to the conductor 792. It may be noted that, if the coil check relay K530 is energized, the contacts K530B2 will be open, and the relay K544 cannot energize, thus preventing tripping of the accounting machine for a cycle of accounting machine operation.

Energization of the relay K544 causes the contacts K544A2 (FIG. 61C) to close in the energizing circuit for the relay K307. This circuit extends from the conductor 798 over the contacts SC3A1, SC12B1, SC913A1, SC15B2, SC933A1, K304B3, K301A2, K308AC2, a point 784, the contacts K544A2, a point 786, the contacts K541AC11, and the relay K307, to the conductor 799. Energization of the relay K307 causes the contacts K307AC3 (not shown) to close, to energize the key lock line solenoid L4 (not shown), as previously described, to initiate a cycle of operation of the accounting machine.

This cycle of operation of the accounting machine causes the share payment amount which has been indexed into the accounting machine keyboard by the keyboard solenoids—namely, $21.50 in the example described—to be entered into the accounting machine by the differential mechanism, to be added into the totalizers in which the share amount total sensed from the account card is stored, and to be printed in the proper column and line on the front of the account card, and also on the journal sheet 99.

During the time that the accounting machine is cycling, the contacts SC960A1 and CC961A1 open and reclose, to cause the wipers of the stepping switch SS520 to advance from position G to position I.

With the wipers in position I, power is applied to the wiper of level 8 of the main stepping switch SS500, which is still set to position S of that stepping switch. Power is thus applied to terminal 29 of program board PB505, corresponding to contact position S in level 8 of the stepping switch SS500. The front of terminal 29 is connected by a routing wire to the front of terminal 56 of program board PB512. The back of terminal 56 of board PB512 is bussed to the backs of terminals 49 to 60 inclusive of program board PB512, all of said terminals being connected to the point 806 (FIG. 56B) in the energizing circuit for the reset sweep stepping switch relay K523. Relay K523 is thus energized over this circuit, which extends through the previously mentioned terminal and the relay K523 to the conductor 792.

Energization of the relay K523 causes the contacts K523B1 (FIG. 56B) in the energizing circuit for the solenoid SL520 to open, thus preventing further energization of the solenoid SL520 when the contacts SC960A1 close once more over the circuit including those contacts.

Energization of the relay K523 also causes contacts K523A3 (FIG. 56B) to close, to complete a holding circuit to maintain the relay K523 in an energized condition, said circuit extending from the conductor 791 over the contacts SC92B1, K500B1, K500B2, K523A3, and the relay K523 to the conductor 792.

Energization of the relay K523 also causes closing of the contacts K523A2 (FIG. 56B), which establish a self-interrupter energizing circuit for the solenoid SL520 of the stepping switch SS520. This interrupting circuit functions in the manner previously described to cause the solenoid SL520 to be periodically energized and interrupted sufficient times to step the stepping switch wipers for the stepping switch SS520 to home position, at which time a set of contacts SC521A1 (FIG. 56B), which open when the wipers of the switch SS520 reach home position, interrupt the circuit to terminate further stepping. This energizing circuit extends from the conductor 791 over the contacts SC92B1, K500B1, K500B2, K523A3, SC521A1, K523A2, SC520B2, and the solenoid SL520 to the conductor 792.

It will be recalled that, during this time, the accounting machine has been completing a cycle of operation. Near the end of the cycle of accounting machine operation, the contacts SC952A1 (FIG. 56A) close for a short time and then reopen. Closure of these contacts completes an energizing circuit for the solenoids SL500 and SL510 over a circuit which extends from the conductor 791 over the contacts SP542B2, K571A1, SC952A1, K543BC2, and the solenoids SL500 and SL510 to the conductor 792. Energization of the solenoids SL500 and SL510 causes cocking of the stepping mechanisms for the stepping switches SS500 and SS510, and causes closure of the contacts SC500A1 (FIG. 56B) and SC510AC1, in the energizing circuit for the sequence control relay K500. This relay is energized over a circuit extending from conductor 791 over the contacts SC500A1, SC510AC1, and the relay K500, to the conductor 792. Energization of the relay K500 causes opening of the contacts K500B1 (FIG. 56B), which interrupts the holding circuit for the relay K523 ad causes said relay to deenergize.

When the contacts SC952A1 open at 350 degrees of the rotation of the printer cam line during the cycle of accounting machine operation, the solenoids SL500 and SL510 are deenergized, causing the stepping switch wipers of the stepping switches SS500 and SS510 to advance from position S to position T.

It should also be noted that opening of the contacts K500B1 by energization of the relay K500 interrupts the power to the wiper of level 24 of the stepping switch SS510, which terminates the power applied to the terminal 53 of program board PB517, and thus causes the deenergization of the full sweep relay K521.

Deenergization of the relay K521 causes the contacts K521A2 (FIG. 61A) to open, thereby deenergizing the solenoid L22 and causing the contacts SC960A1 (FIG. 56B) and SC961A1 to be removed from operative relationship with their respective cams, so that these contacts now remain in an open position. With the wipers of the main stepping switch SS510 shifted to position T, the contacts SC500A1 and SC510AC1 open, thereby deenergizing the relay K500 and causing the contacts K500B1 to close, thus applying power to the wiper of level 24 of the stepping switch SS510 in position T. This contact position is connected to the back of terminal 37 of program board PB504. The front of terminal 37 of program board PB504 is connected by a routing wire to terminal 41 of program board PB517. The back side of terminal 41 is bussed in a common connection with the terminals 25 to 48 inclusive of program board PB517, and the back of terminal 26 of this group is permanently connected over the point 793 (FIG. 56B) to the energizing circuit for the solenoids SL500 and SL510 (FIG. 56A), so that these two solenoids are energized, over the circuit previously described. The solenoids SL500 and SL510 are subsequently deenergized over the circuit previously described, which includes the contacts K500B1, controlled by the relay K500, controlled in turn by the contacts SC500A1 and SC510AC1 (FIG. 56B), thus causing the stepping switch wipers for the stepping switch SS510 and the stepping switch SS500 to advance from position T to position U.

This contact position of level 24 of the stepping switch SS510 is connected to terminal 49 of program board PB504 at the back. The front of terminal 49 is connected over a routing wire to terminal 29 of board PB517. This terminal is in the same group as described in the last step, and causes the solenoids SL500 to SL510 to be once again energized and deenergized to step the wipers of the stepping switches SS500 and SS510 from position U to position V.

In the same manner, the wipers are stepped from position V to position W. In these positions, the terminals to which the contact positions are connected on the program board are terminals 61 and 73 of program board PB504. From the front of terminal 73 of program board PB504, a routing wire is connected to terminal 47 of program board PB507. The back of terminal 47 is connected to the back of terminal 48 over a set of "A" type contacts controlled by the filled card relay K564, and is also connected to the back of terminal 46 over a set of "B" type contacts controlled by said relay K564. It may be noted that, if the relay K564 were energized, the circuit would extend over the "A" type contacts controlled by the relay K564 to the back of terminal 48 of board PB507, and thence from the front of terminal 48 to the front of terminal 26 of board PB517 to initiate a stepping operation to step the wipers of switches SS500 and SS510 from position W to position X. Assuming, however, that the relay K564 is not energized, the circuit path extends from the front of terminal 46 over a routing wire to the front of terminal 51 of board 514.

The back of terminal 51 of board PB514 is connected to the back of terminal 64 of board PB514 over a pair of "B" type contacts controlled by the share transfer relay K573, which are closed at this time, since said relay is not energized. The front of terminal 64 of board PB514 is connected by means of a routing wire to the front of terminal 42 of board PB517. This last terminal is one of the same group described above for causing a step function to take place, and causes the energization of the solenoids SL500 and SL510, and subsequent de-energization of these solenoids, to step the wipers of the main stepping switches SS500 and SS510 from position W to position X. It may be noted that the programming through the contacts of the relays K564 and K573 would not be required for this particular program, but is used in the programming for the share transfer program. Alternatively, different levels could be used for the different programs, in which case the programming through these contacts could be eliminated for the share payment program.

With the wipers of the main stepping switches SS500 and SS510 in position X, power is applied to terminal 85 of program board PB504, and this terminal is connected in the same manner as those described above to cause a step function to step the wipers of the stepping switches SS500 and SS510 from position X to position Y.

As noted before, potential is applied over terminal 774 (FIG. 57) to the wiper of level 21 of switch SS510. When the wiper of level 21 steps to contact position Y, potential is applied to terminal 4 of program board PB506, corresponding to position Y of level 21. The front of this terminal is connected by a routing wire to the front of terminal 37 of program board PB507. The back of terminal 37 is connected to a circuit extending between points 770 and 771 (FIG. 58) and including a parallel combination of contacts K563BC2, controlled by the left-right print relay K563, and contacts K565A4, controlled by the both sides of print relay K565.

From the point 771, the circuit extends to the back of terminal 38 of program board PB507. The front of terminal 38 is connected by a routing wire to the front of terminal 51 of program board PB507, the back of which terminal is connected to a circuit extending between points 772 and 773 (FIG. 58) and including contacts SC95AC1, which are controlled by mechanism in the accounting machine which also controls positioning of the carriage on which the ledger cards are held. When said mechanism is so set as to cause the carriage, on its next movement, to be positioned so that printing would take place on the bottom line of the card, then the contacts SC95AC1 are closed.

From point 773, the circuit extends to the back of terminal 52 of program board PB507. The front of terminal 52 is connected by routing wire to the front of terminal 33 of board PB507, the back of which terminal is connected to point 769 (FIG. 56D) in the energizing circuit for the filled card relay K564, said circuit extending over a point 768 and the relay K564 to the conductor 792.

The purpose of the filled card relay K564 is to insure that there are sufficient lines remaining on the account card to accommodate entries for all possible operations of a given plan, thereby eliminating the need for stopping the system in mid-operation due to a filled card. The relay is therefore energized when a possible filled card situation arises. One such situation arises with the switches SS500 and SS510 at position O at the time of read-out of share transfer information from the memory switches during a share transfer operation when a possible overdraft condition, and its necessary corrective entry, could result in a two-line entry, which would exceed the capacity of the card if only one line-space were left for printing. The read-out operation is thus prevented, and out-sorting of the card takes place, as will subsequently be described in connection with the share transfer operation. Such a situation cannot arise during a share payment operation, since an overdraft condition will never arise in such an operation.

It is possible, both in the case of the share payment operation and in the case of the share transfer operation, that the concluding new balance operation on a particular account will fill the card for that account. This card should therefore be outsorted, so that the operator will be advised to provide a new card for the account, and the circuit described above is provided to cause this.

In the above circuit, the parallel combination of contacts K563BC2 and K565A4 is provided to enable the filled card relay K564 to be energized when the system is set to print simultaneously on both sides of that face of the ledger card which is printed on, and the last line of the card is reached; or, alternatively, when the system is set so that printing is done first on the left side and then on the right side of that face of the ledger card which is printed on (which doubles the effective capacity of the card), and printing is taking place on the right side of the card, and the last line of the card is reached.

Energization of the relay K564 causes closing of the contacts K564A4 in a holding circuit for said relay, extending from the conductor 791 over the contacts SC23B4, the contacts K564A4, the point 768, and the relay K564 to the conductor 792. This retains the relay K564 energized until the contacts SC23B4 open during the next balance pick-up operation.

Energization of the relay K564 also causes the contacts K564A5 in the sort control circuit of FIG. 65 to close, to condition said circuit for an out-sorting of the card, in a manner which will be described subsequently. In addition, certain other contacts are controlled by the filled card relay K564, and these contacts are connected between the backs of terminals of the "filled card" section of program board PB507, so that they can be incorporated into the programs for various operations of the system by appropriate programming connections.

Figure 59:
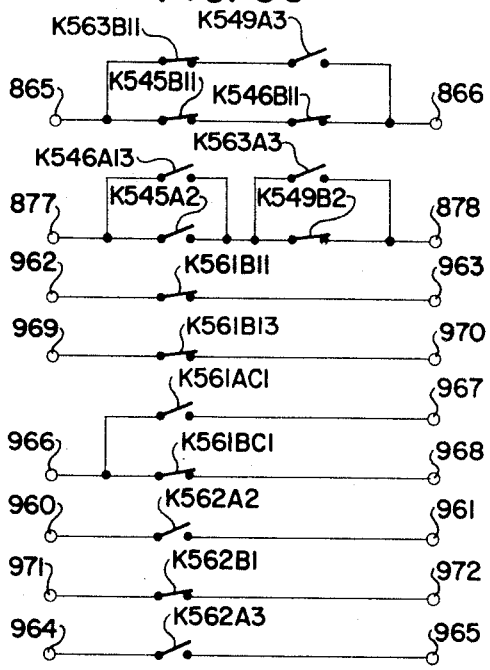

With the wiper of level 24 of the stepping switch SS510 set to position Y, power is applied from the front of terminal 1 of program board PB506 over a routing wire to the front of terminal 74 of program board PB507. The back of terminal 74 of program board PB507 is connected over a point 865 (FIG. 59) to a portion of the operating circuit extending between the point 865 and a point 866 which includes a first branch, in which contacts K545B11, controlled by the loan overdraft relay K545, and contacts K546B11, controlled by the share overdraft relay K546, are connected in series, in parallel with a second branch, in which contacts K549A3, controlled by the line forty relay K549, and contacts K563B11, controlled by the left-right print relay K563, are connected in series. The path between points 865 and 866 is completed over the contacts K545B11 and K546B11 in the operation being described, since it is assumed that there is no overdraft condition. However, this path might be interrupted in another type of operation, depending upon whether or not an overdraft condition exists. The circuit extends from the point 866 to the back of terminal 73 of program board PB507. From the front side of terminal 73 of board PB507, a routing wire extends to terminal 31 on program board PB517. This terminal is one in the group of terminals which are bussed together and connected over the points 793 (FIG. 56B) to provide a step sequence, by energizing the solenoids SL500 and SL510 to step the wipers of the stepping switches SS500 and SS510 one additional step; namely, from step Y to step Z.

With the wiper of level 24 in position Z, power is applied to terminal 13 of program board PB506. The front of terminal 13 of program board PB506 is connected by a routing wire to terminal 77 of program board PB512. The back of terminal 77 is connected to the back of terminal 90 of program board PB512 over a set of "B" type contacts controlled by the trial balance relay K577. This relay is deenergized at this time, so that this path is not interrupted. The front of terminal 90 of board PB512 is connected by a routing wire to the front of terminal 81 of program board PB512. The back of terminal 81 is connected to the back of terminal 94 of program board PB512 over "B" type contacts controlled by the transfer factor memory card relay K583. This relay is not energized at this time, so that these contacts are closed. The front of terminal 94 is connected by a routing wire to the front of terminal 55 of board PB514. The back of terminal 55 is connected to the back of terminal 68 over a set of "B" type contacts controlled by the transfer account relay K579, which is deenergized at this time, so that these contacts are closed and the circuit is not interrupted at this point. The front of the terminal 68 is connected over a routing wire to the front of terminal 55 of program board PB517. The back of terminal 55 of program board PB517 is permanently wired to a point 867 (FIG. 56B) in the energizing circuit for the new balance elay K543 over a path which extends through contacts K555A2,, controlled by the switch check relay K555, energized at this time, and through the relay K543 to the conductor 792. The relay K543 is thus energized.

Energization of the relay K543 causes closing of the contacts K543A14 in a holding circuit for maintaining the relay K543 in energized condition. The circuit extends from the conductor 791 over the contacts SC510BC1, controlled by the switch SS510 to be closed when the stepping mechanism is relaxed and open when said mechanism is cocked; over the contacts K543A14; and over the relay K543, to the conductor 792.

The contacts K555A2 in the energizing circuit described above for the relay K543 are closed, since the relay K555 (FIG. 56D) is energized at this time. This relay is energized by closing of the contacts SC93A1 over an energizing circuit which extends from the conductor 791 over the contacts SC93A1 and the relay K555 to the conductor 792. The contacts SC93A1 are closed when the storage switches SR501 to SR513 inclusive are disengaged after pick-up of information from the factor memory card. It will be recalled that the disengagement of the storage switches is under the control of the solenoid L23, as shown in FIG. 11.

It may be noted that the contacts K555B1 (FIG. 61C) are also controlled by the relay K555. These contacts are located in one branch of the operating circuit for energizing the feeder relay K101. Since the relay K555 is not energized at the time that the factor memory card is to be fed into the accounting machine, the contacts K555B1 are closed, and the energizing circuit for the relay K101 of the feeder is enabled to be energized over that branch containing the contacts K555B1. However, after the factor memory card has been entered into the machine, the relay K555 is energized, thus opening the contacts K555B1 and interrupting that branch of the energizing circuit, so that the relay K101 must be energized for feeding of an account card over a parallel branch of the energizing circuit, said parallel branch including the contacts K540A12, controlled by the feed relay K540.

Energization of the relay K555 also causes closing of the contacts K555A3 (FIG. 61B) in a circuit for reenergizing of the solenoid L23 for the purpose of reengaging the memory switches and resetting them to zero during the operation of the accounting machine on the account card.

Also in the energizing circuit for the solenoid L23 are the contacts K543A4, which are closed by the energization of the relay K543, just described.

Energization of the relay K543 also closes the contacts K543A3 (FIG. 61A) in the energizing circuit for the new balance solenoid L7. This solenoid is energized over a path extending from the conductor 798, over the contacts SC934A1; the function control switch contacts SR1E, set to "Posting I" position; over the contacts K541AC2 and SC70B1, in parallel; then back to a single path, including the contacts K543A3; the contacts SC20A1; and the solenoid L7, to the conductor 799.

The new balance solenoid L7 may also be energized manually during manual operations by operation of one of two new balance keys on the accounting machine, controlling the contacts SP5A1 and SP8A1, which are connected in parallel. This energizing circuit extends from the conductor 798 over the contacts SC934A1; the switch SR1E in "Posting I" position; the contacts SC70B1; K541BC2; SP5A1 or SP8A1; SC20A1; and the solenoid L7, to the conductor 799.

The solenoid L7, when energized, depresses a new balance key element in control row 1, to condition the machine for a new balance operation.

This is effective to close the contacts SC90A1 in the energizing circuit for the solenoid L23. Since the contacts K555A3 and K543A4 are also closed at this time, due to the energization of their respective relays, as previously described, the solenoid L23 is reenergized over a path extending from the conductor 798 over the contacts SC90A1, K555A3, and K543A4, and the solenoid L23, to the conductor 799.

Energization of the solenoid L7 is also effective to close the contacts SC21A1 (FIG. 61C) in the energizing circuit for the rows 1 and 2 relay K307. This relay is then energized over a circuit which extends from the conductor 798 over the contacts SC3A1; SC12B1; SC913A1; SC15B2; SC933A1; K304B3; K301A2; K308A3, and the switch SR1C in "Position II" position, which position of said switch is in parallel with the contacts K308A3; K311B2; SC16B2; SC21A1; K543A12; the point 786; the contacts K541AC11; and the relay K307, to the conductor 799.

Energization of the relay K307 closes the contacts K307AC3 (not shown) in the energizing circuit for the key lock line solenoid L4 (not shown), which is thereby energized.

Energization of the solenoid L4 trips the accounting machine for a conventional two-cycle new balance operation, during which the memory switches are reset to zero, and line-position information, left-right print information, the three-digit comparator number, the loan balance, which has not changed, and the new share balance, including the payment credited thereto, and magnetically stored on the back of the account card. Also, the loan balance, the new share balance, and the date are printed in the proper line and columns on the front of the account card, and the loan and share balances are printed on the journal sheet 99.

Energization of the new balance relay K543 causes the contacts K543BC2 (FIG. 56A) to open, thus preventing the contacts SC952A1 from energizing the stepping switch solenoids SL500 and SL510 near the end of the cycle of machine operation. Instead, these solenoids are energized over another circuit, which is prepared by closing of the contacts K543AC2 (FIG. 56B) under control of the relay K543. This circuit extends from the conductor 791 over the contacts SP542B2 (FIG. 56A), K571A1, SC906A1 (FIG. 56B), K543AC2, and the solenoids SL500 (FIG. 56A) and SL510 to the conductor 792.

Energization of the solenoids SL500 and SL510 is effective in the same manner as previously described to cause the wipers of the stepping switches SS500 and SS510 to be cocked and then stepped, as the solenoids SL500 and SL510 are deenergized, back to home position of the stepping switches SS500 and SS510.

Energization of the new balance relay K543, as described above, also causes closure of the contacts K543A13 (FIG. 56C) in the circuit for energization of the zero balance relay K542. However, the zero balance relay K542 is not normally energized during a share payment operation, and this relay and its operation will therefore be described at a subsequent time.

At the end of the new balance operation of the accounting machine, the gripper solenoid L1 (FIG. 61B) is energized, as previously described, to cause the card to be released from the table of the accounting machine.

Energization of the solenoid L1 also causes the contacts SC9BC1 (FIG. 61C) to close in the energizing circuit for the relay K101 in the feeder, and this causes the feeding of another card from the feeder, and the ejection of the account card from the accounting machine, so that the next factor memory card for the next account to be processed is fed into the accounting machine for a repetition of a share payment operation, as described above.

*Share transfer operation*

The next operation which will be described is a share transfer operation. In this operation, a fixed loan payment amount is subtracted from the share balance of each account, and is also subtracted from the loan balance outstanding of the account. In addition, the interest charges pertaining to the loan can be computed at the rate of one percent and added into the loan balance outstanding of the account. In most common usage, the share payment is credited to each account weekly, in a share payment operation, such as has been previously described, and the share transfer operation is carried out on a monthly basis. However, the share payment operation can be carried out at other intervals, if desired. Also, it is possible to program the system being described so that the share payment and the share transfer operation can be carried out in a single operation of the system for each account.

The present machine is capable of performing three different variations of the share transfer operation, according to the manner in which it is programmed. These three variations are Discount Plan, Residue Plan, and Level Payment Plan.

In the Discount Plan, fixed share payments are posted weekly to the accounts having loans outstanding, and, on a monthly basis, a fixed amount is transferred automatically from the share account of each account to apply as a payment to the corresponding Loan account.

In the Residue Plan, fixed share payments are posted weekly to the accounts having loans outstanding, and on a monthly basis, a fixed principal payment is subtracted from the loan account balance; interest at the rate of one percent is determined and posted; and the total of principal payment plus interest is withdrawn from the share account.

In the Level Payment Plan, which is the most widely used plan, fixed share payments are posted weekly to the accounts having loans outstanding, and on a monthly basis, interest at the rate of one percent is automatically determined and added to the loan balance, and a fixed amount is then transferred from the share account to apply as a total payment, including both principal and interest, to the loan account.

For purposes of illustration herein, only an operation of the system program for the Level Payment plan will be described, since it is believed that the manner in which the other two plans may be carried out will be obvious to one skilled in the art from the description of the one plan.

For purposes of this description of the functioning of the system in a share transfer operation, it will be assumed that all totals in the accounting machine have been cleared, the power key switch 764 on the feeder 62 is turned to the "On" position to supply power to the system components, the feeder control switches 762 and 763 are turned to "On" and "Manual" positions, respectively, the functional control knob of the accounting machine is set to "Posting I" or "Posting II" position, and the "Share Transfer" switch 755 (FIG. 27) on the controller panel is operated.

Operation of the "Share Transfer" switch 755 closes contacts SP573A1 (FIG. 56A), which completes an energizing circuit for relays K573, K574, and K575. This energizing circuit extends from the conductor 791 over the contacts SP542B2; ST599, SC501C2; the function control switch SR1I; the contacts SP573A1; the relays K573, K574, and K575, said relays being connected in parallel; the contacts SP576B2; SP579B2; and SP582B2, to the conductor 792.

Energization of the relay K573 closes the contacts K573AC11 to establish a holding circuit for maintaining the relays K573, K574, and K575 in energized condition, the holding circuit extending from the conductor 791 over the contacts SP542B2; K570BC11; K573AC11; the relays K573, K574, K575 in parallel; the contacts SP576B2; SP579B2; and SP582B2, to the conductor 792.

Energization of the relay K573 also closes the contacts K573A1 (FIG. 60) to complete a circuit for illuminating a "Share Transfer" light 897 on the controller control panel, said circuit extending between conductors 883 and 884, and including the contacts K573A1 and the light 897.

Energization of the relay K574 closes the contacts K574A1 (FIG. 56A) in the energizing circuit for the manual auto relays K541, K550, K557, and K558. The path for energization of these relays extends from the conductor 791 over the contacts SP542B2; K574A1; and the relays K541, K550, K557, and K558, in parallel, to the conductor 792.

Energization of the relay K541 causes closing of the following contacts: K541AC2 (FIG. 61A), K541A3 (FIG. 56C), K541AC11 (FIG. 61C), and K541A12 (FIG. 62). The contacts K541AC2 serve to bypass the contacts SC70B1 in the energizing circuit for the new balance solenoid L7 (FIG. 61A), during an automatic run of the system. The contacts K541A3, when closed, prepare the energizing circuit for the zero balance relay K542 (FIG. 56C). The contacts K541AC11, when closed, serve to bypass the contacts SC71B1 and K310B1 during an automatic run of the system, in the energizing circuit for the relay K307 (FIG. 61C). The contacts K541A12, when closed, permit the verify comparator light 859 (FIG. 62) to be eliminated during a gate check condition.

Energization of the relay K541 also causes the following contacts to open: K541B1 (FIG. 61B), K541BC2 (FIG. 61A), and K541BC11 (FIG. 61C). The contacts K541B1 perform no function in the share transfer operation. Opening of the contacts K541BC2 prevents the energization of the solenoid L7 by the manual depression of the New Balance key. Opening of the contacts K541BC11 prevents the energization of the rows 1 and 2 relay K307 by the manual depression of a control row 2 key.

Energization of the manual auto relay K550 causes closure of the contacts K550A2 (FIG. 61B) to permit the switch and disengaging reset solenoid L23 to be energized in an automatic run, during the pick-up of a factor memory card.

Energization of the relay K557 causes closure of the contacts K557AC2 (FIG. 56C), K557A3 (FIG. 61C), K557AC11 (FIG. 61B), and K557A12 (FIG. 60). The contacts K557AC2 are in the energizing path for the zero balance relay K542, and their closure conditions said relay for energization. The closure of contacts K557A3 conditions the energizing circuit for the feeder relay K101 for energization of said relay to permit the feeder to function during an automatic run. Closure of the contacts K557AC11 conditions the gripper solenoid L1 (FIG. 61B) for energization. Closure of the contacts K557A12 illuminates the light 809 (FIG. 60) to indicate an automatic operation of the accounting machine.

Energization of the relay K557 also causes opening of the contacts K557B1 (FIG. 61B), K557BC2 (FIG. 61B), and K557BC11 (FIG. 61B). Opening of the contacts K557B1 in the energizing circuit for the switch disengaging and reset solenoid L23 (FIG. 61B) conditions the solenoid L23 for energization under proper conditions in the automatic run. Opening of the contacts K557BC2 and K557BC11 removes the zero balance contacts SC38B1 and SC39B1 from the energizing circuit for the gripper solenoid L1 (FIG. 61B) during an automatic run.

Energization of the relay K558 closes the contacts K558AC2 (FIG. 61C), K558A3 (FIG. 61C), and K558AC11 (FIG. 61B). Closure of the contacts K558AC2, in an automatic run, energizes the comparator relay K318 (FIG. 61C). Closure of the contacts K558A3 places the account selection relay K406 (FIG. 61C) under the control of the contacts ST406A1 and the switches controlled by the comparator keyboard, as well as the switches controlled by the comparator auxiliary differential mechanisms, as previously described. Closure of the contacts K558AC11 conditions the relay K302 (FIG. 61B) for energization under certain circumstances.

Energization of the relay K558 causes opening of the contacts K558B1 (FIG. 56C), K558BC2 (FIG. 61C), and K558BC11 (FIG. 61B). Opening of the contacts K558B1 interrupts one of the energizing paths for the reset sequence relay K548 (FIG. 56C). Opening of the contacts K558BC2 disconnects the relay K318 (FIG. 61C) from one energizing path extending through the various comparator switches. Opening of the contacts K558BC11 interrupts one of the energizing paths for the relay K302 (FIG. 61B).

In order to commence the operation of the system in a share transfer operation, the Manual-Auto button 763 on the feeder 62 is pressed to Auto position. This closes contacts in the feeder to energize the relay K101 over a path which extends through conventional feeder circuitry to the point 857 (FIG. 61C) and over the contacts K557A3; K555B1; SC501B1; SP1B2; SC9BC1; SC12B1; and SC3A1, to the conductor 799. Energization of the relay K101 causes a factor memory card to be transported by the feeder into the accounting machine.

The feeding of the factor memory card from the feeder to the accounting machine causes the energization and subsequent deenergization of the relay K303 (not shown), in a conventional manner. Energization and deenergization of the relay K303 causes the closing and subsequent reopening of the contacts K303A4 (FIG. 56D) in the energizing circuit for the relay K551, thus causing energization and subsequent deenergization of the relay K551. The contacts K551A2 (FIG. 56A) are thus caused to close and subsequently reopen in the energizing circuit for the main stepping solenoids SL500 and SL510. The energizing circuit for these solenoids extends from the conductor 791 over the contacts SP542B2, K574A1, K540B11, K551A2, and the solenoids SL500 and SL510, to the conductor 792. Energization of these solenoids cocks the stepping switch wiper mechanism for stepping, and the subsequent deenergization of the solenoids causes the wipers of the switches SS500 and SS510 to advance from the home position, in which they were set, to contact position A.

With the wipers of the main stepping switches SS500 and SS510 set to position A, operation of the system proceeds in exactly the same manner as described for the share payment operation, for positions A to N inclusive of the main stepping switches SS500 and SS510. Thus the factor memory card for the account being processed is fed into the accounting machine; the information stored on the factor memory card, including a five-digit book number, a five-digit share payment amount, a five-digit loan payment amount, two digits of line-finding information, and a three-digit comparator number, is magnetically sensed and entered into the accounting machine; the share amount, the loan amount, and the book number are stored in the storage switches; and the book number is printed on the journal sheet.

When the wiper of level 21 of switch SS510 steps to contact position O, potential is applied from the terminal 774 (FIG. 57), as previously described, to the back of terminal 76 of program board PB502, corresponding to position O of level 21. A circuit path proceeds from the front of this terminal over a routing wire to the front of terminal 39 of program board PB516, and the back of said terminal is connected to one side of a set of "A" type contacts controlled by the share transfer relay K574. The other side of these contacts is connected to the back of terminal 40 of board PB516. Since the relay K574 is energized during a share transfer operation, these contacts are closed. It will be recalled that they are open during a share payment operation, thus interrupting this circuit path. From the front of terminal 40, the circuit path is extended over a routing wire to the front of terminal 25 of program board PB507, which is bussed to terminal 37 of the same board.

As previously described, the back of terminal 25 is connected to point 770 (FIG. 58) in a circuit extending between points 770 and 771, and including the parallel-connected contacts K563BC2 and K565A4 controlled by the left-right print relay K563 and the both sides print relay K565, respectively, which relays may or may not be energized, depending upon the manner in which printing is being done upon the card. The point 771 of said circuit is connected to the back of terminal 38 of program board PB507, the front of which terminal is connected by a routing wire to the front of terminal 51 of program board PB507.. As previously described, the back of terminal 51 is connected to point 772 (FIG. 58) in a circuit extending between points 772 and 773, and including contacts SC95AC1 controlled by the carriage positioning mechanism, which contacts may or may not be closed, depending upon whether or not the card-retaining carriage is to be set to a position in which the last available line space on the card will be printed upon. The point 773 is connected to the back of terminal 52 of board PB507, the front of which terminal is connected by a routing wire to the front of terminal 33 of board PB507. The back of terminal 33 is connected to the point 769 (FIG. 56D) in the energizing circuit for the relay K564. Said relay is energized over the path described, if contacts in said path are closed in response to a condition arising from the capacity of the card being processed being less than the maximum number of entries on said card which might automatically be made in the event of an overdraft condition.

The manner in which the energization of the filled card relay K564 affects the subsequent sequence of operation of a share transfer operation will be described as the description of the share transfer operation proceeds.

Also, with the wipers of the stepping switches SS500 and SS510 set to position O, a sequence check is performed, as previously described in connection with the share payment operation. In addition, the feeder 62 (FIG. 1) is caused to feed the next card, which is an account card, to the accounting machine 61, so that a balance pick-up operation on the account card can be performed, and so that the previously-processed factor memory card will be ejected from the accounting machine.

As previously described, the information stored on the account card, including an eight-digit share balance, a seven-digit loan balance, a three-digit comparator number, a left-right print "spot," if any, and two digits of line-finding information, is sensed and entered into the accounting machine; the presence of an account card rather than a factor memory card is verified by the absence of a sequence "spot" on the account card; a comparison is made of the comparator numbers of the factor memory card and the account card to determine that they pertain to the same account; and the share and loan balances are printed on the journal sheet. Near the end of the balance pick-up operation on the account card, the solenoids SL500 and SL510 are deenergized, thereby advancing the wipers of the main stepping switches from position O to position P, from which position they are stepped again to position Q by means of a stepping circuit described in the description of the share payment operation.

With the wiper of the stepping switch SS510 set to position Q, power is applied over the circuit described in the share payment operation to the back of terminal 1 of program board PB504. From the front of terminal 1, a routing wire extends to the front of terminal 25 of program board PB517, which is one of the bussed terminals connected directly over point 793 (FIG. 56B) to the energizing circuit for the stepping switch solenoids SL500 and SL510. The solenoids SL500 and SL510 are thus energized for cocking of the stepping switch mechanism. Cocking of the stepping switch mechanism, in the manner previously described, causes the contacts SC500A1 and SC510A1 to close in the energizing circuit for the relay K500, which opens the contacts K500B1 to interrupt the power applied to the wiper of level 24 of the stepping switch SS510. This operation is accomplished in the same manner as described previously for the share payment operation.

The interruption of power causes the solenoids SL500 and SL510 to be deenergized, thus causing the stepping mechanism for the stepping switches SS500 and SS510 to advance the wipers from position Q to position R.

Power is then applied over the same circuit to the back of terminal 13 of program board PB504, corresponding to position R of level 24 of the stepping switch SS510. The front of terminal 13 is connected by a routing wire to the front of terminal 35 of program board PB507. The back of terminal 35 is connected by a set of "A" type contacts to the back of terminal 36 of board PB507, and by a set of "B" type contacts to the back of terminal 34 of board PB507. The "A" and "B" type contacts are controlled by the filled card relay K564 (FIG. 56D), which is assumed not to be energized at this time, so that the "B" type contacts are closed and do not interrupt the circuit.

It may be noted that if the filled card relay K564 is energized at this time, due to insufficient remaining line capacity for printing on the card being processed, then the read-out circuit path described above, over the "B" type contacts of said relay, is interrupted to prevent a read-out operation. The "A" type contacts controlled by the relay K564 are closed and cause a circuit path to be extended from the back of terminal 35 to the back of terminal 36 of board PB507. The front of terminal 36 is connected over a routing wire to the front of terminal 48 of board PB517. As previously described, the back of terminal 48 is bussed to the back of terminals 25 to 47 inclusive, and this bus is connected to point 793 (FIG. 56B) in the energizing circuit for the stepping switch solenoids SL500 and SL510. These solenoids energize, and are subsequently deenergized, in the manner previously described, to cock and advance the wiper mechanism for these two stepping switches to advance the wipers from position R to position S. It may also be noted that when the filled card relay K564 is energized, the card being processed will be out-sorted at the end of the operation sequence, under control of the sorting circuitry of FIG. 65, which will subsequently be described.

Returning to the original circuit path, the front of terminal 34 of program board PB507 is connected by means of a routing wire to the front of terminal 75 of program board PB512. The back of terminal 75 of program board PB512 is connected to the back of terminal 76 of the same program board, over a set of "A" type contacts controlled by the share transfer relay K574, which is energized at this time, so that these contacts are closed. The front of terminal 76 is connected by means of a routing wire to the front of terminal 64 of program board PB517. The back of terminal 64 is bussed to terminals 52, 64, 76, and 88 of program board PB517, and is further connected to a point 875 (FIG. 56B) in the energizing circuit for the left side sweep relay K522. The relay K522 is energized at this time over this circuit, which extends from the point 875 over the contacts K523B11, a point 876, the contacts K521B1, and the relay K522, to the conductor 792.

Energization of the relay K522 closes the contacts K522A2 (FIG. 61A) to complete an energizing circuit for the read-out solenoid L22, said circuit extending from the conductor 798 over the contacts K522A2, K548B1, and the solenoid L22, to the conductor 799.

Energization of the relay K522 also closes the contacts K522AC1 (FIG. 56B), which prepares a circuit for stepping the wipers of the stepping switch SS520 sequentially across contacts associated with keyboard solenoids of the accounting machine keyboard, as will subsequently be described in greater detail.

Energization of the relay K522 also opens the contacts K522BC1 (FIG. 56B) to prevent energization of the full-sweep relay K521.

Application of power to terminal 52 of program board PB517, in the manner previously described, also completes a circuit which extends from the point 876 (FIG. 56B) over the point 782 (FIGS. 56B and 57) to the wiper of level 2 of the stepping switch SS520. Positions home to G inclusive of level 2 of the stepping switch SS520 are bussed together and are connected over the point 779 (FIGS. 56B and 57) into the energizing circuit for the solenoid SL520, which steps the stepping switch SS520, said circuit extending from point 779 over the contacts SC520B2 and the solenoid SL520 to the conductor 792. It will be seen that since the wipers of the stepping switch SS520 are in home position, this circuit is completed to energize the stepping switch solenoid SL520. Energization of the stepping switch solenoid SL520 causes the stepping mechanism to cock, thus opening the contacts SC520B2 in said energizing circuit, and deenergizing the solenoid SL520, to advance the stepping switch wipers from home position to position A of the stepping switch SS520. The contacts SC520B2 serve an interrupting function in the energizing circuit for the solenoid SL520, described above, so that this solenoid continues to energize and deenergize as the wipers of the stepping switch SS520 step through positions A, B, C, D, E, F, and G to position I, which positions, it will be recalled, are bussed together.

With the wipers of stepping switch SS520 set to position B during the previously-described stepping movement, power is supplied over a previously-described circuit to the wiper of level 1 of the stepping switch SS520, and thence over permanent wiring connecting contact position B of level 1 of switch SS520 to the wiper of level 2 of switch SS500, which, it will be recalled, is set to contact position R of level 2 of the stepping switch SS500. Said contact position is permanently connected to the back of terminal 23 of program board PB505, the front of which terminal is connected by a routing wire to the front of terminal 65 of program board PB512. The back of terminal 65 is connected in a common bus connecting terminals 61 to 72 inclusive of program board PB512. The back of terminal 61 is also connected directly over the point 777 (FIG. 56B) to one side of the relay K532, which is connected at its other side to the conductor 792. The relay K532 is thus energized over the circuit described above. Energization of the relay K532 opens the contacts K532B1 (FIG. 56B) in the energizing circuit for the coil check relay K530 to prevent energization of the relay K530, which would halt operation of the system.

Also during the previously-described stepping movement of the wipers of stepping switch SS520, the relay K532 is energized by circuits including terminals 21, 19, and 17 of program board PB505, as said wipers step through positions D, F, and I, respectively.

The last deenergization of the stepping switch solenoid SL520, under control of the self-interrupting circuit described above, steps the wipers of the stepping switch SS520 from position G to position I. Since power is still applied to the wiper of level 2 of the stepping switch SS520, with the wiper set to position I, a circuit is completed, over the bus which connects contact positions I through U of level 2, which circuit extends over the point 780 (FIGS. 56B and 57) to the energizing circuit of the solenoid SL520 over the contacts K522AC1, SC960A1, K523B1, and the solenoid SL520, to the conductor 792. Therefore, energization of the solenoid SL520 and stepping of the wipers of the stepping switch SS520 will now be under control of the contacts SC960A1, which it will be recalled, are cam-controlled contacts opening and closing periodically with each cycle of the shaft 583 (FIGS. 30 and 31). Opening of the contacts SC960A1 causes deenergization of the solenoid SL520, which steps the wipers of switch SS520 from position I to position J, after which the contacts SC960A1 again close, reenergizing the solenoid SL520 to recock the stepping mechanism of the switch SS520.

With the wiper of level 1 of the stepping switch SS520 set to position J of said stepping switch, power is applied from said wiper over the position J to the wiper of level 9 of the stepping switch SS500. Since the wipers of stepping switch SS500 are still set to position R, power is applied over position R of level 9 to the back of terminal 16 of board PB505. The front of terminal 16 of program board PB505 is connected to the front of terminal 96 of program board PB511 over a routing wire. The back of terminal 96 is bussed to the backs of terminals 85 to 95 inclusive, and is also connected through this bus to the wiper of storage switch SR525.

This circuit path, together with others to be subsequently described, is used for entry into the accounting machine of the amount of interest computed at one percent, due on the loan balance. Since the loan balance has been entered into the switches SR523 to SR529 inclusive, during the previously-described balance pick-up operation on the account card, due to the operative connection of these switches to the accounting machine differential mechanisms, it is possible to compute the interest due, at the rate of one percent, merely by shifting the balance two denominations to the right and entering it into the accounting machine keyboard by energization of the appropriate keyboard solenoids 104.

Let it be assumed, for purposes of illustration, that the outstanding loan balance of the particular account being processed is $657.23. The information stored in the "cent" and "dime" storage switches, which, in the example, are the digits 3 and 2, is dropped in entry of the interest, and the information stored in the dollars, tens, and hundreds switches is used to energize keyboard solenoids 104 in the cents, dimes, and dollars amount rows, respectively, of the accounting machine keyboard, so that an interest entry of $6.57 will be made.

In accordance with the above example, the wiper of the storage switch SR525 is set to the No. 7 position, and the previously-described circuit patch accordingly extends from the wiper over the No. 7 common of the group of storage switches, to level 10 of the stepping switch SS520. Since the wipers of the stepping switch SS520 are now set to position J, power is supplied to contact position J of level 10 of stepping switch SS520, which contact position is connected to one side of the keyboard solenoid 104 for the amount key 7 in the amount bank 9 of the accounting machine keyboard, which is the "cent" bank of the loan side of the keyboard. This causes energization of said solenoid and consequent depression of this key.

As previously described, the return path for the energized solenoid is connected through the point 775 (FIGS. 56D and 57) and the relay K531 to the conductor 792, so that the relay K531 is also energized when the keyboard solenoid is energized. This causes the contacts K531B1 (FIG. 56B) to open in the energizing circuit for the coil check relay K530, and prevents energization of said relay, which would cause locking up of the machine system, as has been described.

Subsequent to the energization of the key bank solenoid 104, the contacts SC960A1 and SC961A1 again open in their regular periodic movement, thereby interrupting the power to level 1 of stepping switch SS520 and also interrupting the energizing circuit for maintaining the stepping switch solenoid SL520 energized. As a result of this, the wiper mechanism of the stepping switch SS520, which has been cocked by the energization of the solenoid SL520, is operated to advance the wipers of said switch from position J to position K.

Subsequent closing of the contacts SC960A1 and SC961A1 once more is effective to reenergize the stepping switch solenoid SL520 to cock the wiper mechanism, and is also effective to apply power once more to the wiper of level 1 of the stepping switch SS520, which now is at position K, and application of power to contact K of level 1 of stepping switch SS520 causes the application of power to the wiper of level 10 of the stepping switch SS500. Since this wiper is set to position R of the stepping switch SS500, power is applied to the back of the connected terminal 15 of program board PB505. The front of terminal 15 is connected by a routing wire to the front of terminal 12 of program board PB513. The back of terminal 12 of board PB513 is bussed in common with terminals 1 to 12 inclusive, and that bus is carried to the wiper of the storage switch SR526, which corresponds to the "ten-dollar" row of the loan side of the accounting machine keyboard. Since, in the illustrative example given, the "ten-dollar" row of the loan side of the accounting machine keyboard was set to 5, the wiper of the storage switch SS526 is correspondingly set to 5, and a circuit path is continued from the wiper over the common line connecting the 5 position of all of the storage switches to the wiper of level 8 of the stepping switch SS520. Since the wipers of the stepping switch SS520 are set to position K, this means that power is applied through the selected contact position of the stepping switch SS520 to the keyboard solenoid 104 associated with the No. 5 key of the No. 10 amount row on the accounting machine keyboard, corresponding to the "dimes" row of the loan side of the keyboard. The selected solenoid 104 is thereby energized, and the No. 5 key of that row is depressed. The return circuit for the solenoid includes, as previously described, the relay K531, which relay also energizes, thereby opening the contacts K531B1 in the energizing circuit for the relay K530 and preventing energization of that relay.

The contacts SC960A1 and SC961A1 are now reopened, as previously described, to interrupt the power to the wiper of level 1 of the stepping switch SS520, and to step the wipers of that stepping switch from position K to position L. These contacts then close, to reapply power to the wiper of level 1 and to energize the solenoid SL520 in preparation for the next stepping movement of the wipers of the stepping switch SS520. Application of power to level 1 with the wiper set to position L causes power to be applied to the level 11 wiper of the stepping switch SS500, and thence to the terminal connected to position R of that level, which is terminal 14 of program board PB505. The front of terminal 14 is connected over a routing wire to the front of terminal 24 of program board PB513. The back of terminal 24 is connected in a bus to the backs of terminals 13 to 23 inclusive, of program board PB513. This bus is in turn connected to the wiper of the storage switch SR527, which corresponds to the "hundred-dollar" row of the loan side of the accounting machine keyboard.

Since, in the illustrative example, this switch is set to position 6, the circuit path is continued over the common for the No. 6 position of the storage switch group to the wiper of level 9 of the stepping switch SS520. Since the wipers of the stepping switch SS520 are set to position L, the circuit path continues to the solenoid 104 of the No. 6 key of the eleventh amount row of the accounting machine keyboard, and energizes said solenoid to cause said key to be depressed, said key being the "$6.00" key in the loan side of the accounting machine keyboard, as set up in this system. Energization of the above-mentioned solenoid also causes energization of the relay K531, as previously described, to open the contacts K531B1 in the energizing circuit for the relay K530, thereby preventing the energization of the relay K530, as previously described.

In the same manner as described above, through periodic stepping of the stepping switch wipers of the stepping switch SS520 through contact positions M and N, power is applied to the wipers of the storage switches SR528 and SR529. However, since these storage switches are set to zero in the illustrative example, no key is depressed in the accounting machine keyboard, and the zero coil check relay K532 is energized instead. Energization of this relay is over the same circuit as described previously.

With the operations briefly described above completed, the wipers of the stepping switch SS520 are set to position O. Now, when the contacts SC960A1 and SC961A1 again close, the solenoid SL520 is again energized to cock the wiper mechanism for an additional step, and power is reapplied to the wiper of level 1 of the stepping switch SS520 and thence, through position O, to level 2 of the main stepping switch SS510. Since the wipers of this stepping switch are still set to position R, power is therefore applied to terminal 23 of the program board PB504.

The front of terminal 23 is connected over a routing wire to the front of terminal 50 of program board PB508. The back of terminal 50 is connected to a bus which connects terminals 49 to 60 inclusive of that program board, and which is connected directly to one side of the solenoid for causing the depression of the "Interest" key No. 5 of control row 2 of the accounting machine keyboard, thereby causing the energization of that solenoid and the depression of that key. The return path for that solenoid is connected over the point 776 (FIGS. 56D and 57), the resistor 803, and the relay K531, to the conductor 792, to energize said relay, for the purpose previously described.

Now the contacts SC960A1 and SC961A1 again open to once more deenergize the solenoid SL520 and thus advance the wipers of the stepping switch SS520 from position O to position P. At the same time, power is interrupted in the circuit to the wiper of level 1 of the stepping switch SS520. When the contacts SC960A1 and SC961A1 again close in their regular movement, the solenoid SL520 is reenergized in preparation for the next stepping movement, and power is reapplied to the wiper of level 1 of the stepping switch SS520. Since said wiper is now at position P, the power is transmitted over permanent wiring to the wiper of level 3 of the stepping switch SS510, which is still set to position R. This applies power to the terminal 22 of program board PB504. The front of terminal 22 is connected by a routing wire to the front of terminal 14 of program board PB510. The back of terminal 14 is connected to a bus including terminals 13 to 24, inclusive, of the program board PB510, which is in turn connected to one side of the energizing solenoid for the "Balance Forward" key No. 10 of control row 3 of the accounting machine keyboard, thus causing the energization of said solenoid and the depression of said key. The solenoid for the return path again extends over terminal 775 and through the relay K531, to energize said relay for the purpose described previously. The purpose of depression of the No. 10 key of control row 3 is to exercise a control for column selection for printing.

The contacts SC960A1 and SC961A1 again open, interrupting power to the solenoid SL520, to deenergize said solenoid, and step the wipers of the stepping switch SS520 from position P to position Q. Also the power is interrupted to the wiper of level 1 of said stepping switch. With said wiper set to position Q, the contacts SC960A1 and SC961A1 again close and energize the solenoid SL520 once more for recocking of the stepping switch mechanism for stepping switch SS520. Also, power is again applied to the wiper of level 1 of the stepping switch SS520, which is now set to position Q. Power is thus transmitted over a permanent connection to level 4 of the main stepping switch SS510, and thence to position R of said switch and to terminal 21 of board PB504. The front of terminal 21 is connected by means of a routing wire to the front of terminal 43 of board PB512. The back of terminal 43 is connected to a bus extending from terminals 37 to 48 inclusive, and thence over the point 805 (FIG. 56B) to the energizing circuit for the row 2 trip relay K544. It will be recalled that said circuit extends from the point 805 over the contacts K530B2 and the relay K544 to the conductor 792. The relay K544 is thus energized over this circuit.

Energization of the relay K544 is effective to cause initiation of a cycle of accounting machine operation in the manner previously described, thus causing an interest entry to be made of $6.57 in the loan totalizers, and also causing printing of the amount of the interest entry on the journal sheet and on the account card in the proper line and column.

Once again the contacts SC960A1 and SC961A1 open to deenergize the solenoid SL520 and to interrupt the power to the wiper of level 1 of the switch SS520. Deenergization of the solenoid SL520 causes the wipers to be advanced from position Q to position R. Subsequent closing of the contacts SC960A1 and SC961A1 reapplies power to level 1 of the stepping switch SS520 and, through contact position R, to level 5 of the main stepping switch SS510. Since the wiper of level 5 of the stepping switch SS510 is still set to position R, power is applied to the back of terminal 20 of program board PB504. The front of terminal 20 is connected by means of a routing wire to the front of terminal 55 of program board PB512. The back of terminal 55 is connected to a bus extending over terminals 49 to 60 inclusive, and thence to the point 806 (FIG. 56B) in the energizing circuit for the reset relay K523. This is effective to initiate a reset operation of the stepping switch SS520 to step the wipers of said stepping switch back to home position, in a manner which has been previously described.

Energization of the relay K523 also causes opening of the contacts K523B11 (FIG. 56B) in the energizing circuit for the left side sweep relay K522, thereby deenergizing said relay.

Deenergization of the relay K522 causes opening of the contacts K522A2 (FIG. 61A) to deenergize the read-out solenoid L22. Deenergization of the solenoid L22 is effective to remove the contacts SC960A1 and SC961A1 from operative relation to their corresponding cams, so that said contacts are no longer periodically opened and closed, but remain in an open condition.

The resetting of the stepping switch SS520 is completed before the operation of the accounting machine is concluded. Near the end of the cycle of operation of the accounting machine, the contacts SC952A1 (FIG. 56A) close, in an energizing circuit for the solenoids SL500 and SL510, said circuit extending from the conductor 791 over the contacts SP542B2, K574A1, SC952A1, K543BC2, and the solenoids SL500 and SL510, to the conductor 792. Subsequent reopening of the contacts SC952A1 deenergizes the solenoids SL500 and SL510 and causes the wipers of the stepping switches SS500 and SS510 to advance from position R to position S.

It may be noted that when the solenoids SL500 and SL510 energize, the contacts SC500A1 (FIG. 56B) and SC510AC1 close, to energize the relay K500, to open the contacts K500B2 (FIG. 56B) and thus interrupt the holding circuit for the reset relay K523, thereby deenergizing said relay.

With the wipers of the main stepping switches SS500 and SS510 set to position S, power is applied over the previously-mentioned circuit extending from the conductor 791 over the contacts SC92B1 (FIG. 56B), K500B1, K548B2, and the point 778 (FIGS. 56B and 57) to the wiper of level 24 of the stepping switch SS510, and thence over contact position S to terminal 25 of program board PB504.

From the front of terminal 25, a routing wire extends to the front of terminal 49 of program board PB514. The back of terminal 49 is connected to the back of terminal 62 over a set of "B" type contacts controlled by the share payment relay K570, which relay is not energized at this time, so that this path is completed. The front of terminal 62 is connected over a routing wire to the front of terminal 28 of program board PB517. The back of terminal 28 is connected to a bus extending over the backs of terminals 25 to 48 inclusive of program board PB517, and from there extends to the point 793 (FIG. 56B) in the energizing circuit for the solenoids SL500 and SL510. Energization of these solenoids causes cocking of the stepping switch mechanism for the stepping switches SS500 and SS510, and also causes the contacts SC500A1 (FIG. 56B) and SC510AC1 to close, thereby energizing the relay K500 to open the contacts K500B1 (FIG. 56B), thus interrupting power to level 24 of the stepping main switch SS510, and causing deenergization of the solenoids SL500 and SL510, to advance the stepping switch wipers of the stepping switches SS500 and SS510 from position S to position T.

Power is subsequently reapplied to the wiper of level 24 of stepping switch SS510, which is set to position T, thus causing the application of power to the back of terminal 37 of program board PB504. The front of terminal 37 is connected by a routing wire to the front of terminal 41 of board PB517. The back of terminal 41 is connected in a bus which connects terminals 25 to 48 inclusive in program board PB517, and which is connected to the point 793 (FIG. 56B) in the energizing circuit for the solenoids SL500 and SL510. These solenoids are thus caused to be energized and deenergized, over the interrupting circuit described above, to advance the stepping switch wipers from position T to position U. Stepping from position U to position V, and from position V to position W is carried on in exactly the same manner as described above for the stepping of the wipers from position T to position U.

With the wipers of the stepping switches SS500 and SS510 set to position W, power is applied over the wiper of level 24 to the back of terminal 73 of program board PB504. The front of terminal 73 is connected by means of a routing wire to the front of terminal 47 of program board PB507. The back of terminal 47 is connected by a set of "A" type contacts to the back of terminal 48 of board PB507, and by a set of "B" type contacts to the back of terminal 46 of board PB507. The "A" and "B" type contacts are controlled by the filled card relay K564 (FIG. 56D), which is assumed not to be energized at the present time, so that the "B" type contacts are closed and do not interrupt the circuit path.

It may be noted that if the filled card relay K564 is energized at this time, for reasons previously described, the read-out circuit path described above, which extends over "B" type contacts of the relay K564, is interrupted, thus preventing a read-out operation. The "A" type contacts controlled by this relay are closed and cause a circuit path to be extended from terminal 47 to terminal 48, the front of which is connected by a routing wire to the front of terminal 26 of program board PB517. This terminal is connected, as previously described, to the energizing circuit for the stepping switch solenoids SL500 and SL510, to cause the wipers of these stepping switches to step from position W to position X.

Returning to the original circuit path, the front of terminal 46 is connected by means of a routing wire to the front of terminal 51 of program board PB514. The back of terminal 51 is connected to the back of terminal 52 over a set of "A" type contacts controlled by the share transfer relay K573 (FIG. 56A), which is energized at this time. The "A" type contacts controlled by that relay are, therefore, closed, and do not interrupt the circuit path. The front of terminal 52 is connected by a routing wire to the front of terminal 65 of program board PB517. The terminal 65, at its back, is connected by means of a bus to terminals 53, 54, 66, 77, 78, 89, and 90. This bus is directly connected to the point 796 (FIG. 56B) in the energizing circuit for the full sweep relay K521. The relay K521 is thus energized over this circuit, which extends from the point 796 over the relay contacts K522BC1, closed at this time, and the relay K521, to the conductor 792.

Energization of the relay K521 causes the contacts K521A2 (FIG. 61A) to close in the energizing circuit for the read-out solenoid L22. Energization of the solenoid L22, it will be recalled, shifts the contacts SC960A1 and SC961A1 into operative engagement with a pair of cams operated from the auxilary cam line, so that the contacts SC960A1 and SC961A1 are periodically opened and closed.

Closing of the contacts SC960A1 causes energization of the stepping switch solenoid SL520 for the stepping switch SS520 over a circuit extending from terminal 53 of program board PB517, to which power was applied, as previously described, over the point 796 (FIG. 56B), the contacts SC960A1, K523B1, and the stepping switch solenoid SL520, to the conductor 792. It will be recalled that the wipers of the stepping switch SS520 are at home position at this time. The subsequent reopening of the contacts SC960A1 interrupts the energizing circuit for the solenoid SL520 and causes the wipers of the stepping switch SS520 to step from the home position to position A. During the time that the stepping switch wipers were in home position, power was applied from the conductor 791 over the contacts SC520A1 (FIG. 56B) and SC961A1 to the point 781 connected to the wiper of level 1 of switch SS520, set to home position, and over a direct connection from the home contact position of level 1 of the stepping switch SS520 to a point 777 (FIG. 56B) in the energizing circuit for the zero coil check relay K532. Energization of this relay is effective to open the contacts K532B1 (FIG. 56B) in the energizing circuit for the coil check relay K530, to prevent energization of said coil check relay, which would lock the system, as previously described.

With the wipers stepped to position A of the stepping switch SS520, power is applied to level 1 over the circuit previously described, and thence to the wiper of level 1 of the stepping switch SS500, the wipers of that stepping switch being in position W. Power is accordingly applied over permanent wiring to the back of terminal 84 of program board PB505. The front of terminal 84 of program board PB505 is connected by means of a routing wire to the front of terminal 12 of program board PB511. The back of terminal 12 of program board PB511 is bussed to terminals 1 to 12 inclusive of program board PB511, which bus is connected to the wiper of the storage switch SR509.

The next phase of operation of the share transfer program is to read out the loan payment amount information stored in the storage switches SR509 to SR513 inclusive. It will be recalled that the loan payment amount picked up from the factor memory card, previously in this operation, was stored in these switches, which have been disengaged from the accounting machine differential mechanisms to retain the stored information.

Let it be assumed that the loan amount stored in the switches SR509 to SR513 inclusive is $85.00. This information is now read out twice from the switches and is used to energize solenoids to depress corresponding amount keys, first on the share side of the accounting machine keyboard and then on the loan side of the accounting machine keyboard. A subtraction operation of the accounting machine is then initiated to subtract the loan amount from both the share balance and the loan balance of the account being processed.

With the assumed amount of $85.00 stored in the switches SR509 to SR513 inclusive, the wiper of the switch SR509 is set to the zero position. Consequently, power is supplied from the wiper of switch SR509 over the point 777 (FIG. 56B) to the zero coil check relay K532, which energizes said relay and opens the contacts K532B1 to prevent energization of the coil check relay K530, as previously described.

The contacts SC960A1 and SC961A1 are now closed and opened again, which advances the wipers of the stepping switch SS520 from position A to position B, in the manner previously described, and applies power over the wiper of level 1 of said stepping switch to the wiper of lever 2 of the stepping switch SS500, which is positioned to position W. This applies power to the back of terminal 83 of program board PB505. The front of terminal 83 of program board PB505 is connected by means of a routing wire to the front of terminal 24 of program board PB511. The back of terminal 24 is bussed to the terminals 13 to 23 inclusive of program board PB511, and this bus is connected to the wiper of storage switch SR510, which applies power to said wiper. With the assumed amount of $85.00 stored in the switches SR509 to SR513 inclusive, the wiper of the switch SR510 is set to the zero position. Consequently, as was the case with the storage switch SR509 above, power is applied from the wiper of switch SR510 over the point 777 to the zero coil check relay K532, which energizes said relay and opens the contacts K532B1 to prevent energization of the relay K530, as previously described.

The contacts SC960A1 and SC961A1 now open and close again, to effect deenergization and subsequent reenergization of the stepping switch solenoid SL520 to advance the wipers of the stepping switch SS520 from position B to position C, and to apply power to the wiper of level 1, set to position C. This applies power over permanent wiring to the wiper of level 3 of the stepping switch SS500, set to position W, which position is permanently wired to the back of terminal 82 of program board PB505. The front of terminal 82 is connected over a routing wire to the front of terminal 36 of program board PB511. The back of terminal 36 is connected to a bus, which includes terminals 25 to 35 inclusive, said bus being connected to the wiper of the storage switch SR511.

With the assumed amount of $85.00 stored in the switches SR509 to SR513 inclusive, the wiper of the switch SR511 is set to the No. 5 position. Consequently, power is applied from the wiper of switch SR511 to the common connecting the No. 5 positions of the storage switches SR501 to SR513 inclusive, and from there to the wiper of level 8 of the stepping switch SS520, which, it will be recalled, is set to position C. This contact position of stepping switch SS520 is connected to one side of the operating solenoid 104 associated with key No. 5 of amount bank 3 of the accounting machine keyboard. Said solenoid is thus energized, depressing the No. 5 key of row 3. This solenoid is connected at its other side to the point 775 (FIG. 56D) in the energizing circuit for the relay K531, thus causing the energization of said relay and the opening of the contacts K531B1 in the energizing circuit for the coil check relay K530, to prevent the energization of the relay K530, as previously described.

The contacts SC960A1 and SC961A1 now open and close again, according to their regular movement. This causes the deenergization and reenergization of the stepping switch solenoid SL520 to step the wipers of the stepping switch SS520 from position C to position D, and causes the application of power to the wiper of level 1. This power is carried from contact position D of level 1 of switch SS520 over the system wiring to the wiper of level 4 of the main stepping switch SS500, which is set to position W, and thence to the back of terminal 81 of program board PB505. The front of terminal 81 is connected by means of a routing wire to the front of terminal 48 of program board PB511. This terminal is bussed to terminals 37 to 47 inclusive and is connected to the wiper of the storage switch SR512.

With the assumed amount of $85.00 stored in the switches SR509 to SR512 inclusive, the wiper of the switch SR512 is set to the No. 8 position. Consequently, power is applied from the wiper of the switch SR512 to the No. 8 common connected to the No. 8 positions of the switches SR501 to SR513 inclusive, and thence to the wiper of level 11 of the stepping switch SS520, which is set, it will be recalled, in position D. Power is thus applied to the solenoid 104 for the No. 8 key of amount row 4, to energize said solenoid and cause the depression of said key. This also energizes the relay K531 to prevent energization of the relay K530, as previously described.

The contacts SC960A1 and SC961A1 now open and close again to effect the deenergization and reenergization of the solenoid SL520, thereby stepping the wipers of the stepping switch SS520 from position D to position E, and applying power to the wiper of level 1 of said stepping switch at position E. This is transmitted over permanent wiring to the wiper of level 5 of the stepping switch SS500, still set to position W, and thence to the back of terminal 80 of program board PB505. The front of terminal 80 is connected by means of a routing wire to the front of terminal 60 of program board PB511. The back of terminal 60 is connected to a bus, including terminals 49 to 59 inclusive, and thence to the wiper of the storage switch SR513.

With the assumed amount of $85.00 stored in the switches SR509 to SR513 inclusive, the wiper of the switch SR513 is set to the zero position. Consequently, power is applied from the wiper of switch SR513 to the zero coil check relay K532, which energizes said relay and opens the contacts K532B1, to prevent energization of the relay K530, as previously described.

The contacts SC960A1 and SC961A1 open and close once more, to advance the wipers of the stepping switch SS520 to position F and to apply power to the wiper of level 1 when set to position F.

This applies power to the wiper of level 6 of the stepping switch SS500, which is still set to position W, and therefore applies power to the back of terminal 79 of program board PB505. The front of terminal 79 is connected by means of a routing wire to the front of terminal 74 of program board PB508. The back of terminal 74 is connected to the back of terminals 73 to 84 inclusive of program board PB508, which is connected to one side of the operating solenoid 104 associated with the "Loan Payment/Share Withdrawal" key 3 of the No. 2 control row of the accounting machine keyboard. Said solenoid is energized over this circuit, and depresses said control key, the relay K531 also being energized at this time to prevent energization of the relay K530, as previously described.

The "Loan Payment/Share Withdrawal" key mentioned above controls the accounting machine to effect a subtraction operation of the accounting machine when said accounting machine is subsequently tripped for a cycle of operation.

The contacts SC960A1 and SC961A1 next open and close once more under the influence of their respective cams, which advances the wipers of the stepping switches SS520 to position G and applies power to the wiper of level 1 of said stepping switch, in position G. This in turn applies power over permanent wiring to the wiper of level 7 of the stepping switch SS500 in position W, which is transmitted to the back of terminal 78 of program board PB505. The front of terminal 78 is connected by means of a routing wire to the front of terminal 37 of program board PB510. The back of terminal 37 is connected to terminals 38 to 48 inclusive by means of a bus connection and from there is connected to the solenoid 104 associated with the key No. 8 of control row 3. Said solenoid is, therefore, energized to depress this key, and in the same operation the relay K531 is energized to prevent energization of the relay K530, as previously described.

The purpose of the control row 3 key depression in the above operation is to control the correct column selection for printing, and to prevent the carriage from feeding an additional position.

The contacts SC960A1 and SC961A1 are once more opened and closed under control of their respective cams, to advance the stepping switch wipers of stepping switch SS520 to position I, and to apply power to the wiper of level 1 of stepping switch SS520 set to position I. This in turn applies power to the wiper of level 8 of stepping switch SS500, set to position W, which in turn applies power to the back of terminal 77 of program board PB505. The front of terminal 77 is connected by means of a routing wire to the front of terminal 62 of program board PB512. The back of terminal 62 is connected to a bus connection, which connects terminals 61 to 72 inclusive of program board PB512, and which in turn is connected to the zero coil check relay K532, to energize said relay and thus prevent energization of the coil check relay K530, as previously described.

The contacts SC960A1 and SC961A1 are opened and closed once again to advance the stepping switch wipers of stepping switch SS520 from position I to position J, and to apply power to the wiper of level 1 of said stepping switch, which is effective to apply power to the wiper of level 9 of the stepping switch SS500, still set to position W. This, in turn, applies power to the back of terminal 76 of program board PB505. The front of terminal 76 is connected by a routing wire to the front of terminal 11 of program board PB511. The back of terminal 11 is connected to terminals 1 to 12 inclusive of program board PB511 and is also connected to the wiper of the storage switch SR509.

As previously described, a read-out of the amount of $85.00 from the storage switches SR509 to SR513 inclusive is now repeated, and this amount is entered into the accounting machine keyboard in amount rows 9 to 12 inclusive, relating to the loan amount. This read-out and entry of information is accomplished in the same manner as described for the previous read-out and entry of the amount of $85.00 on the share side of the accounting machine keyboard. During this operation, the wipers of the stepping switch SS520 advance through positions J, K, L, M, and N.

Now the contacts SC960A1 and SC961A1 open and close once again to advance the wipers of the stepping switch SS520 from position N to position O and to apply power to the wiper of level 1 of the stepping switch SS520, set to positon O. This supplies power to level 2 of the stepping switch SS510, the wipers of which are still set to position W. Power is accordingly applied to the back of terminal 83 of program board PB504. The front of terminal 83 is connected by means of a routing wire to the front of terminal 42 of program board PB512. The back of terminal 42 is connected in a bus connecting terminals 37 to 48 inclusive of the program board PB512, which in turn is connected to the point 805 (FIG. 56B) in the energizing circuit for the row 2 relay K544, said circuit extending from the point 805 over the closed coil check relay contacts K530B2 and the relay K544 to the conductor 792. Energization of the relay K544 initiates the cycle of operation of the accounting machine in the same manner as previously described, and effects the entry of the amount of $85.00 subtractively in both the share balance totalizer and the loan balancer totalizer.

Now the contacts SC960A1 and SC961A1 open and close once again to advance the wipers of the stepping switch SS520 from position O to position P and to apply power to the wiper of lever 1, set to position P. This in turn applies power to the wiper of level 3 of the stepping switch SS510, which at this time is still set to position W, and, accordingly, applies power to the back of terminal 82 of program board PB504. The front of terminal 82 is connected over a routing wire to the front of terminal 54 of program board PB512. The back of terminal 54 is connected to a bus connecting the backs of terminals 49 to 60 inclusive of program board PB512, and is also connected to the point 806 (FIG. 56B) in the energizing circuit for the relay K523, which is the reset sweep stepping switch relay. Energization of the relay K523 is effective to initiate a self-interrupting cycle of operation for the solenoid SL520, by means of a circuit previously described, to cause the wipers of the stepping switch SS520 to be reset to their home position.

During the time that the accounting machine is cycling, the previously-mentioned reset operation of the stepping switch SS520 is completed, and, near the end of the cycle of operation of the accounting machine, the contacts SC952A1 (FIG. 56A) close and open again to cock and advance the wipers of the stepping switches SS500 and SS510 by means of energization and subsequent deenergization of the solenoids SL500 and SL510, in the manner previously described.

As the wiper stepping mechanisms of the main stepping switches SS500 and SS510 are cocked by energization of the solenoids SL500 and SL510, the contacts SC500A1 (FIG. 56B) and SC510AC1 are closed, to energize the relay K500, and to thereby open the contacts K500B1 and K500B2 to interrupt the holding circuit for the relay K523 (FIG. 56B), thus deenergizing said relay.

Opening of the contacts K500B1 and K500B2 is also effective to cause deenergization of the full sweep relay K521 (FIG. 56B) by interruption of its energizing path.

This in turn causes deenergization of the read-out solenoid L22 (FIG. 61A), which shifts the contacts SC960A1 and SC961A1 out of operative relation with their operating cams.

The wipers of the stepping switches SS500 and SS510 are now in position X, following the last stepping movement.

Next, power is reapplied to the wiper of level 24 of stepping switch SS510 and is transmitted through contact position X of that level to the back of terminal 85 of program board PB504. The front of terminal 85 is connected by means of a routing wire to the front of terminal 40 of program board PB517. The back of terminal 40 is connected to a bus connecting terminals 25 to 48 inclusive of program board PB517. This bus is connected to the point 793 (FIG. 56B) in the energizing circuit for the solenoids SL500 and SL510. These solenoids are thus energized and are subsequently deenergized over a previously-described circuit, to advance the wipers of the stepping switches SS500 and SS510 from position X to position Y.

As previously mentioned, potential is applied over terminal 774 (FIG. 57) through the wiper of level 21 of switch SS510 and contact position Y to the back of terminal 4 of program board PB506. From terminal 4, a previously-described circuit path is provided which effects the energization of the filled card relay K564 under appropriate conditions. Energization of the relay K564 closes the contacts K564A4 (FIG. 56D) to retain the relay in energized condition until the next balance pick-up operation, and also closes the contacts K564A5 (FIG. 65) in the sort control circuit to condition said circuit to cause the out-sorting of the card being processed, as will subsequently be described. In addition, certain other contacts controlled by the relay K564 are operated, but have no effect on the operation of the system at this time.

Power is once more applied to the wiper of level 24 of stepping switch SS510 over the circuit previously described, and is carried through contact position Y to the back of terminal 1 of program board PB506. The front of terminal 1 is connected by means of a routing wire wire to the front of terminal 74 of program board PB507.

The back of terminal 74 is bussed to the backs of terminals 75, 86, and 87 of program board PB507, and is connected to the back of one of two terminals 73 or 76 of the program board PB507 over alternative circuit paths. The first of these circuit paths extends between terminals 74 and 73 and includes, between the points 865 and 866 (FIG. 59), a first serial combination of contacts K545B11 and K546B11, in parallel with a second serial combination of contacts K549A3 and K563B11. The second of these alternative paths extends between terminals 75 and 76 and includes, between points 877 and 878 (FIG. 59), a first parallel combination of contacts K549B2 and K563A3, in series with a second parallel combination of contacts K545A2 and K546A13.

In explanation of the above-described circuit paths, it may be noted that if there is no overdraft condition in either the share totalizer or the loan totalizer of the accounting machine, the relays K545 and K546 will not be energized, and therefore the circuit path will be completed between terminals 73 and 74, while the circuit path between terminals 75 and 76 will be interrupted, due to the fact that the contacts K545A2 and K546A13 will remain open. However, if either or both of the share totalizer and loan totalizer contains an overdraft condition, then the relay relating to that particular totalizer, either the loan overdraft relay K545 or the share overdraft relay K546, or both, will be energized, and the circuit path between terminals 73 and 74 will accordingly be opened at that point, while the circuit path between terminals 75 and 76 will be closed, so far as those particular relay contacts are concerned. Additionally included in the circuit paths described above are contacts controlled by the line forty relay K549 and the left-right print relay K563. These contacts are provided to determine the operation of the system in accordance with whether or not the last printing space on the ledger cards has been exhausted. If the relay K549 is energized, as a result of the carriage of the accounting machine having been set to line forty position of the ledger card, and if the relay K563 has been deenergized, indicating that the card is being printed on its right side rather than its left side, then it is necesary to prevent an overdraft correcton operation at this time, even if an overdraft condition exists, since no printing space is left on the ledger card. Accordingly, the circuit between terminals 75 and 76, which is completed to effect such an overdraft correction operation, is interrupted, and the circuit between terminals 73 and 74, which causes stepping of the stepping switch wipers to the next position, position Z, of the stepping switches SS500 and SS510, is completed.

If both of the relays K549 and K563 are not energized, however, then the overdraft relays K545 and K546, acting through their contacts K545B11, K546B11, K545A2, and K546A13, control whether the path between the terminals 73 and 74, or the path between the terminals 75 and 76 is completed.

If the path to terminal 73 is completed, the circuit then extends from terminal 73 over a routing wire to terminal 31 of board PB517, which is included in a bus connecting terminals 25 to 48 inclusive, and which is connected to the point 793 (FIG. 56B) in the energizing circuit for the solenoids SL500 and SL510, to cause said solenoids to energize and deenergize, thus stepping the stepping switch wipers of the stepping switches SS500 and SS510 from position Y to position Z.

If, alternatively, an overdraft condition exists, and the printing space on the ledger card has not been exhausted, then the circuit extends to terminal 76, and from there to terminal 27 of the program board PB514, over a routing wire. The back of terminal 27 is connected to one side of a set of "A" type contacts, which are connected at their other side to terminal 28. These "A" type contacts are controlled by the share transfer relay K573, which is energized at the time, so that this circuit is completed. The front of terminal 28 is connected by a routing wire to the front of terminal 89 of program board PB517. Terminal 89 is bussed to terminals 53, 54, 65, 66, 77, 78, and 90 of program board PB517. This bus is connected to the point 796 (FIG. 56B) in the energizing circuit for the full sweep relay K521.

Energization of the full sweep relay K521, over the circuit described above, causes a double read-out of the storage switches SR509 to SR513 inclusive, to depress corresponding amount keys in the share and loan sides of the accounting machine keyboard, in the same manner as has been previously described. The only difference in such an operation is that in control row 2 the No. 8 key, the "Loan Payment/Share Withdrawal Correction" key, is depressed rather than the No. 3 key, the "Loan Payment/Share Withdrawal" key. The effect of this operation is to re-enter the amount stored in the switches SR509 to SR513 inclusive, in the share and loan totalizers, and thus eliminate the overdraft condition. At the end of this operation, the wipers of the main stepping switches SS500 and SS510 are stepped to position Z in a manner which has previously been described.

It may be noted that the share overdraft relay K546 (FIG. 56C) is energized over a circuit which extends from the conductor 791 through the contacts SC71A1, which are controlled by the condition of the share totalizers to close when an overdraft condition exists; the contacts SC954, controlled by the main cam line to close at 320 degrees and to open at 330 degrees; and through the relay K546, to the conductor 792.

Energization of the relay K546 causes the contacts K546A4 (FIG. 62) to close, illuminating a "Share Overdraft" light 898 on the accounting machine. The illuminating circuit for this light extends between the conductors 839 and 840, and includes the contacts K546A4 and the light 898.

Once the relay K546 has been energized, it may optioanlly be held energized for the purpose of controlling the out-sorting of the account card, to be subsequently described, over a circuit which extends from one side of the relay K546, over holding contacts K546A3, a point 879, permanently connected to the back of terminal 41 on program board PB507, a routing wire connecting the front of terminal 41 to the front of terminal 40 on program board PB507, and a permanent connection from the back of terminal 40 to a point 880 (FIG. 56C) in a path which extends over contacts K551B1 to the conductor 791. The contacts K551B1 are controlled by the balance pick-up relay K551 (FIG. 56C), which energizes, under control of the contacts K303A4, during the transport, from the feeder to the accounting machine, of the factor memory card pertaining to the next account.

The loan overdraft relay K545 (FIG. 56C) is energized over a circuit extending from the conductor 791 through the contacts K310A3, which are controlled by energization of the solenoid K310, in response to closing of contacts controlled by the condition of the loan totalizer; the contacts SC956, controlled by the main cam line and closing at 320 degrees of the cycle to reopen at 350 degrees; and the relay K545, to the conductor 792. This circuit also is provided with an optional holding circuit, which may be used in the event that it is desired to maintain the relay K545 energized to control the out-sorting of cards. The holding circuit extends from one side of the relay K545 over the holding contacts K545A12; a point 881 (FIG. 56C) permanently connected to the back of terminal 27 of program board 507; a routing wire extending from the front of terminal 27 to the front of terminal 28 of program board PB507; a permanent connection from the back of terminal 28 to the point 880 (FIG. 56C); and the contacts K551B1 to the conductor 791. The contacts K551B1 function in the same manner as described in connection with the holding circuit for the share overdraft relay K546.

Now, with the stepping switch wipers of the stepping switches SS500 and SS510 in position Z, power is applied to the wiper of level 24 of the stepping switch SS510, and thence to the back of terminal 13 of program board PB506. The front of terminal 13 is connected over a routing wire to the front of terminal 77 of program board PB512. The back of terminal 77 is connected across a set of "B" type contacts to the back of terminal 90 of program board PB512. These "B" type contacts are controlled by the trial balance relay K577, which is normally not energized at this time, thus maintaining this circuit path uninterrupted. The front of terminal 90 is connected over a routing wire to the front of terminal 81 of program board PB512. The back of terminal 81 is connected to the back of terminal 94 over "B" contacts controlled by the transfer factor memory card relay K583. These contacts will normally be closed, since the transfer factor memory card relay is normally not energized at this time. The front of terminal 94 is connected by a routing wire to the front of terminal 55 of program board PB514. The back of terminal 55 is connected to the back of terminal 68 over "B" type contacts controlled by the transfer account relay K579, which is not energized at this time, so that these contacts are closed. The front of terminal 68 is connected by a routing wire to the front of terminal 55 of program board PB517. The back of terminal 55 is connected by a bus to the back of terminals 67, 79, and 91 of program board PB517. This bus in turn is connected to the point 867 in the energizing circuit for the new balance relay K543 (FIG. 56B), and causes energization of said relay.

Energization of the relay K543 causes the accounting machine to make a new balance operation, in a manner previously described.

When an automatic new balance operation takes place, the new share balance and the loan balance are computed, stored magnetically on the account ledger card, printed on the journal sheet, and printed on the account card, together with the date; the account ledger card is ejected from the machine; the memory switches are reset; the next factor memory card is fed into the machine; and the stepping switch wipers of the stepping switches SS500 and SS510 are advanced from position Z to home position, in the same manner previously described, thus conditioning the machine system for a further share transfer operation on the next account.

In the event that the filled card relay K564 has been energized during the share transfer operation on the account being processed, the appropriate card will be out-sorted from the group of cards pertaining to the accounts being processed.

Also at this time, the zero balance relay K542 (FIG. 56C) is energized in the event of a zero loan balance or a zero share balance in the account being processed. As has been previously described, the contacts SC38AC1 are closed if the seven right-most amount differential mechanisms for the "loan" side of the accounting machine keyboard are positioned to zero; and the contacts SC39AC1 are closed if all of the amount differential mechanisms for the "share" side of the accounting machine keyboard are positioned to zero. Also, in a new balance operation, the contacts K543A13, controlled by the new balance relay K543, are closed, as are the contacts K541A3, controlled by the manual-auto relay K541, and the contacts K557AC2, controlled by the manual-auto relay K577.

When the cam-controlled contacts SC953A1 close at 165 degress of the cycle of accounting machine operation, a circuit for energizing the relay K542 is completed, which extends from the conductor 791 over the contacts SC953A1, the contacts K557AC2, either the contacts SC38AC1 or SC39AC1, the contacts K541A3, the contacts K543A13, and the relay K542, to the conductor 792.

Energization of the relay K542 causes closing of the contacts K542A3 (FIG. 56C) to complete a holding circuit for maintaining the relay K542 in energized condition, said circuit extending from the conductor 791 over the contacts K551B1, the contacts K542A3, and the relay K542, to the conductor 792.

Energization of the relay K542 also causes closing of the contacts K542A2 (FIG. 65) in the sort control circuitry to cause out-sorting of the account card having the zero balance, in a manner which will be described subsequently.

The relay K542 remains energized until a balance pick-up operation initiated on the factor memory card of the next account. The relay K551 is energized in such an operation and causes opening of the contacts K551B1 in the holding circuit for the relay K542, thus causing said relay to be deenergized.

This concludes the description of the share transfer operation.

Insurance trial balance

The next operation to be described is an insurance trial balance operation. This resembles a conventional trial balance operation, in which a total is taken of all of the share and loan balances of the various individual accounts as adjusted by posting, with the addition, however, of the provision of another total of all share balances of the various accounts exceeding a given amount, which in the illustrated embodiment disclosed herein is $2,000.00 for each account. This additional total is used by the organization employing the system to determine the insurance premium payable by said organization to an insurer to insure all share accounts up to the given maximum, which in this case was stated to be $2,000.00. It should be noted that the system described herein could readily be modified to use some figure other than $2,000.00 as the maximum value to which accounts are insured, if desired.

In the following description of an insurance trial balance operation of the system, it will be assumed that a clear totals operation of the system has been made prior to commencement of this operation, that all of the visible item counters 87 (FIG. 4) have been reset to zero by operation of a manual reset lever (not shown) on the accounting machine keyboard, and that the operation is commenced with the control settings described below. First of all, the functional control knob (not shown) is set to "Trial Balance" position. The "Trial Balance" key 756 (FIG. 27) on the controller control panel 74 is turned to its "Insurance" setting. The "Trial Balance" program switch 750 on the control panel 74 is operated, closing contacts SP576. The feeder control is then set to "Auto" position to commence operation of the system.

Energization of the trial balance relays K576 and K577 is accomplished over an energizing circuit which extends from the conductor 791 over the contacts SP542B2 (FIG. 56A), which are manually controlled contacts closed at this time; contacts ST599, SC501C2, the "Trial Balance" position of the function control switch SR1I, the trial balance contacts SP576A1, the relays K576 and K577, the transfer account contacts SP579B2, and the transfer factor memory contacts SP582B2, to the conductor 792.

The contacts K576AC11, controlled by the trial balance relay K576, close to complete a holding circuit extending from the conductor 791 over the contacts SP542B2; K570BC11; K573BC11; K576AC11; the relays K576 and K577; and the contacts SP579B2 and SP582B2 to the conductor 792, to maintain the relays K576 and K577 in energized condition.

Energization of the relay K577 causes the contacts K577A1 (FIG. 56A) to close in the energizing circuit for the manual auto relays K541, K550, K557, and K558. The energizing circuit for these relays extends from the conductor 791 over the contacts SP542B2, the contacts K577A1, and over the previously-mentioned relays K541, K550, K557, and K558, to the conductor 792.

Energization of the relay K576 causes the contacts K576A1 (FIG. 60) to close in the circuit for illuminating the "Trial Balance" light 882, on the controller control panel. This circuit extends from the conductor 883 over the contacts K576A1 and the light 882 to the conductor 884.

Energization of the relay K577 also causes contacts K577A2 (FIG. 56B) to close to prepare an energizing circuit for the full sweep relay K521.

A number of other contacts controlled by the relays K576 and K577 open and close at this time, and these relay contacts are wired into the program boards, so that their functions will be described at the time that the various circuits passing through the program boards are described.

The previously-described turning of the key switch 756 closes the contacts ST501AC1, in the insurance check circuit, to be subsequently described.

The contacts ST501A2 (FIG. 60) are also closed and complete a circuit for illuminating the insurance trial balance light 885, said circuit extending from the conductor 883 over the contacts K576A1 and ST501A2, and the light 885, to the conductor 884.

Actual operation of the system in an insurance trial balance operation is initiated by setting of the feeder control switch 763 (FIG. 1) on the feeding device 62 to "auto" position. This initiates the feeding of the first factor memory card into the accounting machine.

The relay K303 (not shown) is sequentially energized and deenergized during the feeding of each ledger card from the ledger card feeder into the accounting machine. Energization and deenergization of the relay K303 in turn effects energization and deenergization of the balance pick-up relay K551 (FIG. 56D) by means of the contacts K303A4.

Energization and deenergization of the relay K551 effects closing and opening of the contacts K551A2 (FIG. 56A) in the energizing circuit for the stepping switch solenoids SL500 and SL510. Energization and deenergization of the stepping switch solenoids SL500 and SL510 under control of the relay contacts K551A2, in the manner previously described, causes the wipers of the stepping switches SS500 and SS510 to step from home position to position A.

As the factor memory card is fed into the accounting machine, a magnetic sequence "spot" stored thereon is sensed from said card, in the manner previously described, to deenergize the relay K320 (FIG. 63). This opens the contacts K320A3 (FIG. 56D) and causes the auto sequence relays K552, K559, and K560 to deenergize, which closes contacts K552BC11 (FIG. 61A) in the energizing circuit for the pawl check relay K309. However, in an insurance trial balance operation, it is desired that the factor memory card be "short cycled"; that is, be fed into the accounting machine and immediately ejected without any information from the card being retained in the machine, and without any entries being made on the card, since the information is to be picked up only from the account ledger cards, for the insurance trial balance operation which is to be made. Therefore, it is desired that the relay K309 not be energized. Accordingly, the previously-described energizing circuit for the relay K309 is not completed, since the trial balance relay K577 is energized, and "B" type contacts controlled by that relay and connected between terminals 89 and 90 of program board PB516 in the energizing circuit for the relay K309 are held open, thereby preventing the energization of said relay.

It will be recalled that failure of the pawl check relay K309 to energize maintains the contacts K309AC3 (not shown) open in the energizing circuit for the key lock line solenoid L4 (not shown) and thus prevents that solenoid from energizing to trip the accounting machine for a full cycle of operation, while the contacts K309BC3 (not shown) remain in closed condition in the energizing circuit for the auxiliary clutch solenoid L3 (not shown), and permit said solenoid to reenergize, thus permitting a short cycle operation to take place, in which the factor memory card is ejected from the accounting machine.

Since the pawl check relay K309 did not energize, the contacts K309B2 (FIG. 61A) remain closed. Accordingly, an energizing path for energization of the relay K311 is prepared, which path extends from the conductor 798 over the contacts SC15A1, which are balance pick-up control contacts, closed by energization of the line-finding solenoid L2 (not shown) during a balance pick-up operation, which stay closed until 342 degrees of rotation of the auxiliary cam line; the contacts SC914A1, controlled by the auxiliary cam line, and closed from 165 degrees to 205 degrees; the contacts K309B2; and the relay K311, to the conductor 799. Closing of the contacts SC914A1 at 165 degrees of rotation of the auxiliary cam line completes the path to energize the relay K311. The contacts K311A1 are closed by energization of the relay K311 to complete a holding circuit for maintaining the relay K311 in energized condition, said circuit extending from the conductor 798 over the contacts SC934A1, controlled by the main cam line and closed from 345 degrees to 15 degrees of its rotation; the contacts K311A1; and the relay K311, to the conductor 799.

The energization of the relay K311 causes the contacts K311B2 (FIG. 61C) in the energizing circuit for the relay K307 to open. The opening of these contacts prevents an operation of the accounting machine under the control of control row 1 from taking place until a proper balance pick-up operation has been made.

The contacts K311AC4 (FIG. 62) close in the illuminating circuit for the verify comparison light 859, but this light is not illuminated at this time, since the contacts K318B3 in the same branch are open. Similarly, the contacts K311BC4 controlled by the relay K311 open in another illuminating circuit for the verify comparison light 859, but the contacts K541A12 in the same branch are open, and thus no illuminating circuit for the light 859 is completed over the path including those relay contacts.

In addition, the contacts K311A3 (not shown) are closed by energization of the relay K311, and these contacts function to ground the control electrode of the gate check tube in order to prevent a gate check failure simultaneously with energization of the pawl check failure relay.

A pawl check relay K105 (not shown) is also provided in the feeder 62 and normally functions to prevent further operation of the feeder in the case of a pawl check failure in the accounting machine and subsequent energization of the relay K311. The energizing circuit for the relay K105 is connected to the energizing circuit for the relay K311.

It is desired to prevent energization of the pawl check relay K105 in the trial balance operation even though the relay K311 is energized, because energization of the relay K105 would lock up the feeder and prevent feeding of further cards. Therefore the energizing circuit for the relay K105 is programmed to include a set of contacts controlled by the trial balance relay K576, which contacts will be open and thus prevent energization of the relay K105.

The energizing circuit for the relay K105 extends from one side of a source of 115 volts A.C. potential (not shown) over said relay (not shown); the contacts K108A1 (not shown) controlled by the comparator relay K108 (not shown) in the feeder, which will be energized at this time to close said contacts over permanent wiring including a point 891 (FIG. 61A) to the back of terminal 85 of program board PB515; over a routing wire connecting the front of terminal 85 and the front of terminal 80 of program board PB514; from the back of terminal 80 to the back of terminal 79 of program board PB514 over "B" type contacts controlled by the transfer account relay K579, which is deenergized at this time so that the contacts are closed; from the front of terminal 79 over a routing wire to the front of terminal 78 of program board PB514; from the back of terminal 78 to the back of terminal 77 over "B" type contacts controlled by the trial balance relay K576, which is energized at this time so that these contacts are open and thus interrupt the circuit, which circuit extends from the front of terminal 77 over a routing wire to the front of terminal 73 of program board PB515; from the back of terminal 73, which is bussed to terminals 74 to 78 inclusive, by permanent wiring to a point 886 (FIG. 61A) on one side of the contacts K552BC2 controlled by the auto sequence relay K552, which contacts are closed at this time, since said relay is deenergized due to the pick-up of a factor memory card; over to a common point 887 in the energizing circuit for the relay K311, and over the previously-described contacts K309B2; SC914A1; and SC15A1 to the conductor 798.

Since the pawl check relay K105 in the feeder is not energized over this circuit at this time, due to the contacts controlled by the trial balance relay K576 being open, as described, the operation of the feeder is not disabled and can be continued.

It may be noted that because there is no read-out of the factor memory card, this card is immediately fed from the machine by a short cycle operation, and the solenoids L20 and L23 are not energized at this time.

The previously-described energization of the relay K576 also closes a set of "A" type contacts to complete an energizing path for energizing the relay K302 (FIG. 61B), which was already energized at that time over a path previously completed during the previous cycle of machine operation.

This second energizing path for the relay K302 extends from the conductor 798 over the contacts K308AC4; K312b1; SC921A1; SC941A1; K305B2; the points 843 and 844; the contacts ST14B2; the point 845; the contacts K558AC11; the point 846; and the contacts SC511B2, which are closed when the stepping switches SS500 and SS510 are in home position, to a point 888, which is permanently connected to the back of terminal 1 of program board PB517; over a routing wire from the front of terminal 1 to the front of terminal 17 of board PB514; over "A" type contacts of the energized trial balance relay K576, which contacts connect terminal 17 to terminal 18 of board PB514; from the front of terminal 18 by a routing wire to the front of terminal 13 of board PB517, from the back of terminal 13 by permanent wiring to point 850 (FIG. 61B) on one side of the relay K302; and over said relay to the conductor 799.

It may be noted that in the case of a manual trial balance operation, the relay K302 is energized over a path extending from the conductor 798 over contacts K308AC4; K312B1; SC921A1; SC941A1; K305B2; the points 843 and 844; contacts ST14B2; point 845; contacts K541B1; switch SR1E in "Trial Balance" position; and the relay K302 to the conductor 799.

Energization of the relay K302 causes the contacts K302A2 (FIG. 61B) to close in the energizing circuit for the gripper solenoid L1, so that said solenoid is energized, as previously described. Energization of the relay K302 also causes contacts K302A1 (not shown) to close in the energizing circuit for the balance pick-up relay K303 (not shown), so that said relay K303 is energized, as previously described.

Also the contacts K302A4 close to energize the relay K554 (FIG. 56D), which is the K302 sequence relay.

Also the relay contacts K302B3 (FIG. 61A) open in the energizing circuit for the new balance solenoid L7.

At the same time that a short cycle of the factor memory card is being completed by the accounting machine, the stepping switch wipers of the main stepping switches SS500 and SS510 are being advanced, in the same manner as previously described in connection with the share payment and share transfer operations, from position A to position N.

With the wipers of stepping switches SS500 and SS510 at position N, power is applied to the solenoids SL500 and SL510 over a circuit extending from the conductor 791 over the contacts SP542B2 (FIG. 56A); K577A1; and SC906A1 (FIG. 56B) to the point 889; from said point to the back of terminal 55 of board PB515, which is bussed to terminals 56, 57, 58, 59, and 60; from the front of terminal 55 by a routing wire to the front of terminal 5 of board PB514; through "A" type contacts controlled by the trial balance relay K576 from the back of terminal 5 to the back of terminal 6 of board PB514; from the front of terminal 6 by a routing wire to the front of terminal 67 of board PB515; from the back of terminal 67, which is bussed to terminals 68 and 69, over a permanent connection to a point 890 (FIG. 56B); from said point over contacts K559BC11; and over the solenoids SL500 and SL510 (FIG. 56A) to the conductor 792. Energization of these solenoids cocks the mechanisms for stepping the wipers of the switches SS500 and SS510. Said solenoids are then deenergized by opening of the contacts SC906A1 (FIG. 56B) to cause the wipers of the switches SS500 and SS510 to be stepped from position N to position O.

With the wipers of the main stepping switches SS500 and SS510 in position O, a check is made, utilizing the sequence "spot" stored on the factor memory card, as described in connection with the share payment and share transfer operations, to determine whether or not the card checked is, in fact, a factor memory card. If not, the system will cease automatic operation, and a manual operation is then required. If the card being processed is a factor memory card, then the feed relay K540 is energized, and the feeding of the next card, which should be an account card, is initiated, as previously described.

A balance pick-up operation on the account card is now made in the same manner as described for the share payment and share transfer operations. At the end of the balance pick-up operation, the stepping switch solenoids SL500 and SL510 are energized and deenergized, in the manner previously described, to step the wipers of the stepping switches SS500 and SS510 from position O to position P.

With the wipers of the main stepping switches SS500 and SS510 set to position P, power is applied over level 24 of the stepping switch SS510 to the back of terminal 85 of program board PB502. From the front of terminal 85, a circuit extends over a routing wire to the front of terminal 57 of program board PB516. From the back of terminal 57, the circuit extends to the back of terminal 70 of program board PB516 over "B" type contacts controlled by the deenergized transfer factor memory card relay K583. From the front of terminal 70, the circuit extends over a routing wire to the front of terminal 31 of program board PB515. From the back of terminal 31, the circuit extends to the back of terminal 43 of program board PB515 over "A" type contacts controlled by the auto sequence relay K560, said contacts being closed at this time.

From the front of terminal 43 of program board PB515, a routing wire extends to the front of terminal 28 of program board PB515. The back of terminal 28 is connected to the back of terminal 40 of program board PB515 over "B" type contacts controlled by the account select relay K406, which relay is deenergized at this time, so that these contacts are closed. The front of terminal 40 is connected over a routing wire to the front of terminal 26 of program board PB506, the back of which terminal is connected to terminal 25 of program board PB506 over "B" type contacts controlled by the bypass account relay K561, said relay being deenergized at this time so that these contacts are closed.

The front of terminal 25 is connected by means of a routing wire to the front of terminal 53 of program board PB514, the back of which terminal is connected to terminal 54 of program board PB514 over "A" type contacts controlled by the trial balance relay K576, which is energized at this time, so that the contacts are closed. The front of terminal 54 is connected by means of a routing wire to the front of terminal 49 of program board PB517, the back of which terminal is connected to terminals 61, 73, and 85 by means of a bus, and is also connected to the insurance checking circuit, consisting of the insurance read-out switches. The circuit extends from the previously-mentioned bus to a point 901 (FIG. 56C) and over the contacts ST501C1, in the "A" position, to the point 783 (FIGS. 56C and 57) connected to the wiper of common storage switch SR543, which is one of the storage switches SR536 to SR543 inclusive. These switches are controlled by the corresponding amount differential mechanism, which have been set to the share amounts stored magnetically on the back of the account ledger card.

The insurance trial balance operation with respect to the particular account card being processed may be completed in either one of two different ways, depending upon whether the share balance of the account is either less than or equal to the maximum amount to which each share account is insured, or whether the share balance is greater than the maximum amount to which each share account is insured. For purposes of illustration, it will be assumed herein that each share account is insured to a maximum of $2,000.00.

Two examples of operation will be given, corresponding to the two possible cases mentioned above. In the first example, it will be assumed that the share balance is $1,543.67, or less than $2,000.00, so that the account is insured in its entirety. In the second example, it will be assumed that the share balance is $3,124.56, so that the account is not insured in its entirety.

It is believed to be in order at this time to describe the manner in which the various contact positions of the storage switches SR536 to SR543 are wired together, in order that the desired differentiation between accounts of $2,000.00 or under, and accounts of over $2,000.00, may be made. While the wiring described below is particularly designed for the amount of $2,000.00, it will be obvious to one skilled in the art that this wiring can be altered in a simple manner to provide for any other amount as the maximum insured amount for each account. As described above, a circuit is connected from the "A" side of the switch ST501C1 over the point 783 to the wiper of the storage switch SR543. The contact positions 1 to 9 inclusive of switch SR543 are not wired in any manner, but the zero and "eliminate" positions of the switch SR543 are wired together and are wired to the wiper of the switch SR542. In a similar manner, the contact positions 1 to 9 inclusive of switch SR542 are not wired together, but the zero and "eleminate" contact positions of that switch are wired together and are wired to the wiper of the switch SR541. It may be noted that the switch SR541 corresponds to the thousands denomination of the share amount. The contact positions 3 to 9 inclusive of switch SR541 are not wired together, but the number 2 contact position of switch SR541 is wired to the wiper of the switch SR540, and the "eliminate," zero, and 1 contact positions of the switch SR541 are wired together and are connected to the zero and "eliminate" positions of the switch SR536. The connection of the zero and "eliminate" positions of switch SR536 to the remainder of the circuit will be subsequently described. In the case of each of the switches SR536, SR537, SR538, SR539, and SR540, the contact positions 1 through 9 are not wired in any way. However, in the case of the switches SR537, SR538, SR539, and SR540, the zero and "eliminate" positions are wired together and are in turn wired to the wiper of the switch corresponding to the next smaller denomination; that is, the zero and "eliminate" positions of the switch SR540 are wired to the wiper of the switch SR539; the zero and "eliminate" positions of the switch SR539 are wired to the wiper of the switch SR538; the zero and "eliminate" positions of the switch SR538 are wired to the wiper of the switch SR537; and the zero and "eliminate" positions of the switch SR537 are wired to the wiper of the switch SR536.

As mentioned above, the "eliminate," zero, and 1 positions of the switch SR541 are wired to the "eliminate" and zero positions of the switch SR536, and these in turn are wired permanently over points 785 (FIG. 57) and 808 (FIG. 56C) to the energizing circuit for the reset relay sequence relay K548.

Now, assuming that the wiper of the switches SR543 to SR536 inclusive are set to the numbers 00154367, respectively, representing the amount $1,543.67, the application of power to the wiper of switch SR543, as mentioned above, results in the application of power over a circuit extending from the zero position of switch SR543, to the wiper of switch SR542, to the zero position of switch SR542, to the wiper of switch SR541, to the number 1 position of switch SR541, thence over the circuit mentioned above to the one side of the relay K548, and over the relay K548 to the conductor 792. This energizes the relay K548, to initiate a reset operation of the wipers of the main stepping switches SS500 and SS510.

It will be recalled that energization of the relay K548 causes closing of the contacts K548A4 (FIG. 56C) to establish a holding circuit for maintaining the relay K548 energized, causes opening of the contacts K548B2 (FIG. 56B) to interrupt power to level 24 of the main stepping switch SS510, and closes the contacts K548A3 (FIG. 56B) to establish a self-interrupting circuit for energization of the stepping switch solenoids SL500 and SL510, to enable the wipers of the corresponding main stepping switches to be reset to home position.

Also the contacts K548B11 (FIG. 56B) open in the energizing circuit for the full sweep relay K521 to prevent said relay from energizing, thus preventing a read-out operation of the amounts stored in the storage switches SR536 to SR543 inclusive.

With the wipers of the main stepping switches SS500 and SS510 reset to home position, the system is now in condition to accept the next factor memory card to continue the insurance trial balance operation.

It should be noted in the case given above, in which the share amount balance is less than $2,000.00, that the pick-up of the loan and share balances by the accounting machine from the account ledger card in a trial balance operation causes the loan and share amounts to be added in a conventional manner into the respective totalizers, which function during the trial balance run to accumulate loan and share totals. However, in the previous example, there is no read-out operation for reading out the switches SR501 to SR508 to energize the appropriate amount keys on the keyboard for entry of the amounts stored in the switches into the insurance totalizer, which is an additional totalizer distinct from the totalizers in which the loan and share amounts have been entered, as described above, since the amount of the share account in the example above was not greater than $2,000.00.

In the second example, however, the share balance of the account is greater than $2,000.00—namely, $3,124.56—and it is therefore desired to read this amount from the storage switches SR536 to SR543 inclusive, and and to effect the entry of this amount into the insurance totalizer of the accounting machine. The manner in which this is accomplished is described below. Let it now be assumed that with the switches SR543 to SR536 inclusive set to the numbers 00312456, power is applied to the wiper of switch SR543, as described above. The circuit in this case is continued from zero position of the switch SR543 to the wiper of switch SR542, and from the wiper of switch SR542 to the zero position of said switch, and thence to the wiper of switch SR541. However, since the wiper of switch SR541 in this example is set to contact position 3 of that switch, the circuit is interrupted at this point, and, as a consequence, the relay K548 is not energized. Since the relay K548 does not energize in this operation, the contacts K548B11 (FIG. 56B) remain closed, and the full sweep relay K521 accordingly is energized over a circuit which extends from the back of terminal 49 of program board PB517, to which it will be recalled that power was applied, over point 901 (FIG. 56C), over the "A" side of the contacts ST501C1, point 783 (FIGS. 56B and 56C), the contacts K577A2, the contacts K548B11, the contacts K522BC1, and the relay K521, to the conductor 792.

Energization of the full sweep relay K521 causes the commencement of a read-out operation in which information is read out from the storage switches SR501 to SR508 inclusive and entered in amount rows 1 to 8 inclusive of the accounting machine keyboard by energization of the appropriate key stem solenoids, through action of the successive movement of the wipers of the stepping switch SS520, in a manner previously described. The appropriate connections to enable the depression of these various keys to be accomplished are shown numerically on the various program boards and will not be described in detail herein, since they resemble the various circuits which were described before in connection with the share payment and share transfer read-out operations.

After the information contained in the storage switches SR501 to SR508 inclusive has been read out and indexed in the accounting machine keyboard, the stepping of the wipers of the stepping switch SS520 is effective to cause the number 4 key of control row 2 of the accounting machine keyboard designated "Fees & Fines/Book No.," to be depressed, after which the number 10 key of control row 3 of the accounting machine keyboard is depressed for purposes of column selection. Following this, a trip operation is initiated by energization of the relay K544, which in turn energizes the relay K307 in the accounting machine circuitry, as has been previously described. Following this, a reset operation of the sweep stepping switch solenoid SL520 is initiated by energization of the relay K523, which closes the contacts K523A1 to complete a self-interrupting circuit for stepping the wipers of the switch SS520 back to home position.

Near the conclusion of the cycle of operation of the accounting machine, the contacts SC952A1 close and reopen to energize and then deenergize the stepping switch solenoids SL500 and SL510 to cause the wipers of the main stepping switches SS500 and SS510 to be advanced from position P to position Q.

With the wipers of the main stepping switches SS500 and SS510 set at position Q, power is applied from level 24 of stepping switch SS510 to the back of terminal 1 of program board PB504. The front of terminal 1 is connected by means of a routing wire to the front of terminal 25 of program board PB517. The back of terminal 25 is connected by means of a bus to the backs of terminals 26 to 48 inclusive of program board PB517, said bus being further connected over point 793 (FIG. 56B) to the energizing circuits for the solenoids SL500 and SL510 for the stepping mechanisms of the main stepping switches SS500 and SS510. The stepping switch solenoids SL500 and SL510 are accordingly energized, and then deenergized by energization of the relay K500, as previously described, to cock and step the wiper mechanisms for the stepping switches SS500 and SS510 from position Q to position R.

In a similar manner, circuits are provided through connections on the program boards to continue stepping of the wipers of the main stepping switches SS500 and SS510 through their various positions back to home, thus concluding the insurance trial balance operation on this account, and conditioning the system to receive the factor memory card for the next account.

The manner in which the insurance trial balance operation is utilized to determine the total amount of insurance required is as follows. At the conclusion of the insurance trial balance operation, the visible indicator 87 designated "FF.-BN" on the accounting machine keyboard (FIG. 4) is inspected visually to determine the number of times the No. 4 key of control row 2 has been depressed. It will be recalled that this key was depressed during each operation in which the share balance of an account was determined to be over $2,000.00, and was read out and entered into the accounting machine, for entry into the insurance totalizer. The number on this indicator is then multiplied by the operator by a factor of $2,000.00, and this product is added to the total of all share accounts which has been accumulated in the share totalizer. Then, from this total is subtracted the total which has been accumulated on the insurance totalizer, of all accounts over $2,000.00. The resulting difference is the total amount of insurance which must be obtained to provide the necessary coverage for the share accounts.

Transfer balance operation

The transfer balance operation is used when it is desired to transfer the share and loan balances of the individual accounts from an old account ledger card to a new ledger card. This is customarily done when the old ledger cards are filled by entries, or when it is desired to send the old ledger cards as statements to the account holders.

In order to accomplish a transfer balance operation, it is necessary first to add a new ledger card following each account ledger card in the stack being processed. There are thus three cards for each account when the transfer balance operation is commenced; namely, a factor memory card, an old account ledger card, and a new ledger card. During the transfer balance operation, the share and loan balances for each account are transferred from the old account card to the new card, and the old account card is out-sorted from the stack. Thus at the end of a transfer balance operation, there are two cards for each account; namely, a factor memory card and a new account ledger card which bears the share and loan balances for the account.

In the following description of the functioning of the system in a transfer balance operation, it will be assumed that a clear totals operation has previously been carried out, that the function control knob is in "Transfer" position, and that the account selection switch 759 on the controller panel 74 (FIG. 27) is in "Normal" position.

Initiation of the transfer balance operation is then effected by switching of the feeder control switch 763 (FIG. 1) to "Auto" position and operation of the "Transfer Balance" switch 752 (FIG. 27) on the controller panel 74.

Operation of the "Transfer Balance" switch 752 closes the contacts SP579A1 (FIG. 56A), which energizes the transfer balance relays K579 and K580. At the same time, the contacts SP579B2 are opened by depression of said switch 752, to deenergize any program relays which were previously energized, such as the trial balance relays K576 and K577, if the previous operation was a trial balance operation.

Energization of the relays K579 and K580 is accomplished over a circuit which extends from the conductor 791 over the contacts SP542B2, the contacts ST599, the contacts SC501C2, the "Transfer" position of the function control switch SR1I, the contacts SP579A1, the relays K579 and K580, and the contacts SP582B2, to the conductor 792.

Energization of the relay K580 causes the contacts K580A1 (FIG. 56A) to close in the energizing circuit for the manual auto relays K541, K550, K557, and K558, and causes their energization over a circuit which extends from the conductor 791 over the contacts SP542B2, the contacts K580A1, and the relays K541, K550, K557, and K558, to the conductor 792.

Energization of the relay K579 causes closing of the contacts K579AC11 (FIG. 56A), which complete a holding circuit for maintaining the relays K579 and K580 in energized condition, said circuit extending over the contacts SP542B2, K570BC11, K573BC11, K576BC11, K579AC11, the relays K579 and K580, and the contacts SP582B2, to the conductor 792.

Energization of the relay K579 also causes closing of the contacts K579A1 (FIG. 60), which complete an illuminating circuit for a transfer balance light 902 on the controller control panel, said circuit extending from the conductor 883 over the contacts K579A1 and the light 902 to the conductor 884.

The relay K302 is energized at this time, due to the fact that the last preceding operation was a new balance non-transfer operation, which maintains the relay K302 energized in a conventional manner.

The gripper solenoid L1 (FIG. 61B) is energized over a previously-described circuit by closing of the contacts K557AC11 in response to the energization of the manual auto relay K557.

With the feeder control switch 763 depressed, a card is now fed from the ledger card feeder 62 to the accounting machine 61, and causes energization and subsequent deenergization of the relay K303 (not shown), as previously described, which is effective to cause initiation of a balance pick-up operation of the accounting machine, and which also causes stepping of the wipers of the main stepping switches SS500 and SS510 from home position to position A, as has also been previously described.

It will be recalled that during the previously described trial balance operation, the pawl check relay K309 (FIG. 61A) is prevented from energizing during the feeding of a factor memory card by the fact that trial balance relay contacts are open in the energizing circuit for the relay K309 and thereby prevent its energization. In a similar manner, in the transfer balance operation now being described, contacts controlled by the transfer balance relay K580 are maintained in open position, and thus prevent energization of the relay K309.

Also in this operation, as in a trial balance operation, the pawl check failure relay K311 (FIG. 61A) is energized, but it is desired to prevent energization of the pawl check relay K105 (not shown) in the ledger card feeder. Therefore contacts controlled by the transfer balance relay K580 in the energizing circuit for the relay K105 are maintained in an open condition and prevent energization of said relay.

With the relay K309 deenergized, a short cycle operation takes place on the factor memory card, in the same manner as that described in the trial balance operation.

Also, as was the case with the trial balance operation, the wipers of the main stepping switches SS500 and SS510 are stepped from position A to position N by means of step sequence programming on the program boards.

With the wipers of switches SS500 and SS510 set to position N, power is applied to the solenoids SL500 and SL510 over a circuit extending from the conductor 791 over the contacts SP542B2 (FIG. 56A); K580A1; and SC906A1, to the point 889 (FIG. 56B); from said point to the back of terminal 56 of board PB515, which is bussed to terminals 55, 57, 58, 59, and 60; from the front of terminal 56 to the front of terminal 19 of board PB514 by a routing wire; from the back of terminal 19 to the back of terminal 20, board PB514, over "A" type contacts controlled by the energized relay K579; from the front of terminal 20 over a routing wire to the front of terminal 68 of board PB515; from the back of terminal 68, which is bussed to terminals 67 and 69, over a permanent connection to the point 890 (FIG. 56B); over the contacts K559BC11; and over the solenoids SL500 and SL510 to the conductor 792. Energization of these solenoids cocks the mechanism for stepping the wipers of the switches SS500 and SS510. Said solenoids are then deenergized by opening of the contacts SC906A1 (FIG. 56B), to cause the wipers of the switches SS500 and SS510 to be stepped from position N to position O.

With the wipers of the main stepping switches SS500 and SS510 in position O, a circuit is completed in the manner previously described to verify that the card on which a short cycle operation was performed was in fact a factor memory card. This checking circuit extends to energize the feed relay K540, which is effective to initiate the feeding of a second card; namely, the account ledger card for the particular account being processed.

Feeding of this account card to the accounting machine causes initiation of a balance pick-up operation of the accounting machine on the account ledger card.

This causes the share and loan balances on the account card to be sensed from the card by the accounting machine and entered into the appropriate totalizers in a conventional manner.

Near the completion of the cycle of machine operation comprising the balance pick-up operation on the ledger card, the contacts SC952A1 (FIG. 56A) are closed and reopened, thereby causing the stepping switch solenoids SL500 and SL510 to be energized and deenergized, and stepping the wipers of the main stepping switches SS500 and SS510 from position O to position P.

With the wipers of the main stepping switches SS500 and SS510 set to position P, power is applied to terminal 85 of program board PB502, corresponding to position P of level 24 of stepping switch SS510, and from there over a programmed circuit to initiate a step sequence to advance the wipers of the stepping switches SS500 and SS510 from position P to position Q. Successive positions of the stepping switches SS500 and SS510 are stepped through by similar step sequence programming, so that the wipers of the stepping switches SS500 and SS510 are advanced to position Z.

With the wipers of the stepping switches SS500 and SS510 set to position Z, power is applied by the wiper of level 24 of stepping switch SS510 to the back of terminal 13 of program board PB506. The front of terminal 13 is connected by means of a routing wire to the front of terminal 77 of program board PB512. The back of terminal 77 is bussed to the back of terminal 89, which is connected to terminal 90 of program board PB512 over "B" type contacts controlled by the trial balance relay K577, which is not energized, so that these contacts are closed at the present time. The front of terminal 90 is connected by means of a routing wire to the front of terminal 81 of program board PB512, and the back of terminal 81 is bussed to the back of terminal 93 of board PB512, which is connected to the back of terminal 94 of program board PB512 through "B" type contacts controlled by the transfer factor memory relay K583, which relay is deenergized at this time, so that these contacts are closed. The front of terminal 94 is connected by means of a routing wire to the front of terminal 55 of program board PB514. The back of terminal 55 is connected to the back of terminal 56 over "A" type contacts controlled by the transfer account relay K579, which is energized at this time, so that these contacts are closed. The front of terminal 56 is connected over a routing wire to the front of terminal 74 of program board PB517. The back of terminal 74 is bussed to the backs of terminals 50, 62, and 86 of program board PB517, which in turn are connected over the point 842 (FIG. 56B) to one side of the feed relay K540, the other side of which is connected to the conductor 792. The relay K540 is thus energized.

Energization of the relay K540 closes contacts K540A14 (FIG. 61C) to prepare an energizing path for the relay K307.

The energization of the relay K540 closes the contacts K540A3 (FIG. 61B) in an energizing circuit for the gripper solenoid L1. The circuit path extends from the conductor 798 over the contacts K308AC4; K312B1; SC921A1; SC941A1; K305B2; the points 843 and 844; the contacts ST14B2; the point 845; the contacts K558AC11; the point 846; the contacts K540A3; the points 847 and 848; the contacts K559AC2; to a point 903 permanently wired to the back of terminal 52 of program board PB515; from the front of terminal 52 over a routing wire to the front of terminal 7 of program board PB514; from the back of terminal 7 to the back of terminal 8 of board PB514 over "A" type contacts controlled by the transfer account relay K579, which is energized at this time, so that the contacts are closed; from the front of terminal 8 over a routing wire to the front of terminal 64 of board PB515; from the back of terminal 64 over a bus connecting terminals 61 to 66 inclusive of board PB515, to a point 904 (FIG. 61B); over the contacts K307B2; SC23B2; the point 855; the contacts K557AC11; the point 856; and the solenoid L1, to the conductor 799.

The gripper solenoid L1 is thus energized. Energization of the solenoid L1 causes the contacts SC9BC1 (FIG. 61C) to close in the energizing circuit for the feeder relay K101.

Energization of the relay K540 also causes the contacts K540A12 (FIG. 61C) to close in the energizing circuit for the feeder relay K101 (not shown), and that circuit is thus completed, to energize the relay K101, over a circuit which extends from a source of 115 volts A.C. power through conventional circuitry in the feeder to a point 857, and over the contacts K557A3; the point 858; the contacts K540A12; the point 859; the contacts SP1B2; SC9BC1; SC12B1; and SC3A1 to the conductor 798.

Energization of the relay K101 in the feeder circuitry causes the initiation of a card-feeding operation by the feeder 62. The card being fed, while in transport, causes energization of the relay K103 (not shown) in a conventional manner, and this causes the contacts K103A2 (FIG. 61A) to close in the energizing circuit for the new balance solenoid L7, in order to energize said solenoid. The energizing path for the solenoid L7 extends from the conductor 798 over the contacts SC934A1; the function control switch SR1E, set to "Transfer" position; the contacts K541AC2; K302B3; K103A2; SC20A1; and the solenoid L7, to the conductor 799.

Energization of the solenoid L7 closes the contacts SC21A1 (FIG. 61C) to complete a path for energizing the relay K307, said path extending from the conductor 798 over the contacts SC3A1; SC12B1; SC913A1; SC15B2; SC933A1; K304B3; K301A2; K308A3; and the parallel switch SR1C in "Posting I" position; K311B2; SC16B2; SC21A1; K540A14; K541AC11; and the relay K307, to the conductor 799. As previously described, energization of the relay K307 closes contacts (not shown) in the energizing circuit for the solenoid L4 (not shown) to energize said solenoid and thus initiate a new balance operation.

It should be noted that the new balance operation is performed on the new card which was fed into the machine, rather than on the old account ledger card which had been in the machine, and which was caused to be ejected by the feeding of the new card. By means of a sorting circuit which will be subsequently described, the old account ledger card is caused to be ejected into a receptacle separate from the receptacle into which the factor memory card and the new account ledger card for each account are ejected.

As a consequence of the new balance operation, the balance is printed on the "balance forward" line of the new account ledger card, so that this card now carries the account record for the particular account being processed.

Near the completion of the cycle of accounting machine operation, the contacts SC952A1 (FIG. 56A) close and reopen to momentarily reenergize the stepping switch solenoids SL500 and SL510, and then deenergize said solenoids, so that the stepping switch mechanisms are cocked and released to advance the wipers of the stepping switches SS500 and SS510 from position Z to home position. The system is thus conditioned to receive the next factor memory card for continuing the transfer balance operation.

The cycle of machine operation causes the new balance sequence contacts SC6A1 (FIG. 61B) to be closed in the energizing circuit for the sequence relay K302, so that said relay is energized over a circuit which extends from the conductor 798 over contacts K308AC4, K312B1, SC921A1, SC941A1, K305B2, points 843 and 844, contacts SC6A1, and the relay K302, to the conductor 799. This in turn causes energization of the gripper solenoid L1, which in turn causes feeding of the next card in the stack into the accounting machine. Since the next card is the factor memory card for the next account, the transfer balance operation thus proceeds.

*Transfer factor memory card operation*

The next operation to be described is the transfer factor memory card operation. This operation is used when it is desired to transfer the share and loan factor information and book number information for each individual account from an old ledger card to a new ledger card. This is customarily done when the old factor memory cards have become worn from repeated usage, or where the cards have been filled, although the latter possibility is unlikely, since the same factor information for each account is used over and over, unless it is necessary for some reason to change it.

In order to accomplish a transfer factor memory card operation, it is necessary first to add a new ledger card following each factor memory card of the stack being processed. There are thus three cards for each account when the transfer factor memory card operation is commenced; namely, a factor memory card, a new ledger card, and an account ledger card. During the transfer factor memory card operation, the share and loan factors, the book number, a three-digit comparator number, two digits of line-finding information, and a sequence "spot" for each account are transferred from the old factor memory card to the new card, and the old factor memory card is out-sorted from the stack. Thus at the end of a transfer factor memory card operation, there are two cards for each account; namely, a new factor memory card, which bears the share and loan factors and the book number for the account, and an account ledger card.

In the following description of the functioning of the system in a transfer factor memory card operation, it will be assumed that a clear totals operation has previously been carried out, that the function control knob (not shown) is in "Transfer" position, and that the "Account Selection" switch 759 on the controller panel 74 (FIG. 27) is in "Normal" position.

Initiation of the transfer factor memory card operation is then effected by switching of the feeder control switch 763 to "Auto," and operation of the "Transfer Factor Memory Card" switch 751 on the controller panel 74.

Operation of the "Transfer Factor Memory Card" switch 751 on the controller panel causes the contacts SP582B2 (FIG. 56A) to open and thus deenergize any control relays which remain energized from previous operations; and also causes closing of the contacts SP582A1 (FIG. 56A) to complete an energizing path for the transfer factor memory card relays K582 and K583 over a path which extends from the conductor 791 over the contacts SP542B2; ST599; SC501C2; the function control switch SR1I in the "Transfer" position; the contacts SP582A1; and the relays K582 and K583 to the conductor 792.

Energization of the relay K582 causes the contacts K582AC11 to close to complete a holding circuit for maintaining the relays K582 and K583 in energized condition. This holding circuit extends from the conductor 791 over the contacts SP542B2; K570BC11; K573BC11; K576BC11; K579BC11; K582AC11; and the relays K582 and K583 to the conductor 792.

Energization of the relay K583 causes the contacts K583A1 (FIG. 56A) to close in the energizing circuit for the manual auto relays K541, K550, K557, and K558. This energizing circuit extends from the conductor 791 over the contacts SP542B2; K583A1; and the relays K541, K550, K557, and K558, to the conductor 792.

Energization of the relay K582 causes the contacts K582A1 (FIG. 60) to close in the illuminating circuit for the transfer factor memory light 905 on the controller control panel, and causes said light to be illuminated, over a circuit extending between the conductors 883, 884 and including the contacts K582A1 and the light 905 in series.

It will be assumed that the relay K302 has been energized at the end of a previous clear totals operation by closing of the contacts SC8A1 (FIG. 61B) in an energizing path for said relay. This energizing path extends from the conductor 798 over the contacts K308AC4; K312B1; SC921A1; SC941A1; K305B2; the points 843 and 844; the contacts SC8A1; and relay K302 to the conductor 799.

The gripper solenoid L1 (FIG. 61B) is also energized, due to the closing of the contacts K302A2, over a previously-described energizing path.

The energization of the solenoid L1 closes the contacts SC9BC1 (FIG. 61C) in the energizing path for the feeder relay K101 (not shown) and causes the feeding of a card, which is the old factor memory card for the account being processed, from the feeder into the accounting machine.

The card being fed, while in transport, initiates a balance pick-up operation of the accounting machine, in a manner which has been previously described. This causes the share and loan factors, and the book number, on the factor memory card to be sensed from the card by the accounting machine and entered into the appropriate totalizers in a conventional manner. The initiation of a balance pick-up operation, through energization and deenergization of the relay K303 (not shown), is also effective, through the contacts K303A4 (FIG. 56D), to cause energization and deenergization of the relay K551, which closes and reopens the contacts K551A2 (FIG. 56A) in the energizing circuit for the solenoids SL500 and SL510, which control the stepping mechanism for the main stepping switches SS500 and SS510, thereby causing the wipers of said stepping switches to advance from home position to position A.

During the time that the balance pick-up cycle is being performed by the accounting machine, the stepping switch wipers are being stepped, by means of programming through the program boards, from position A to position N, in a manner which has previously been described. At the end of the pick-up cycle, because of the closing and opening of the contacts SC952A1, the wipers are stepped one further position, in a manner previously described, from position N to position O.

With the wipers of the stepping switches SS500 and SS510 set to position O, programming is such that a check is made to determine whether or not the card fed into the machine is a factor memory card, and to energize the feed relay K540 if the card fed into the machine by the balance pick-up operation is, in fact, a factor memory card. This checking and energization of the feed relay K540 is accomplished in exactly the same manner as has been previously described.

Energization of the relay K540 closes the contacts K540A3 (FIG. 61B) in the energizing circuit for the gripper solenoid L1, to energize said solenoid. This energizing circuit extends from the conductor 798 over the contacts K308AC4; K312B1; SC921A1; SC941A1; K305B2; the points 843 and 844; the contacts ST14B2; the point 845; the contacts K558AC11; the point 846; the contacts K540A3; the points 847 and 848; the contacts K559BC2; over the point 849, which is permanently wired to the back of terminal 49 of board PB515; over a routing wire extending from the front of terminal 49 to the front of terminal 21 of board PB514; over "A" type contacts extending between the back of terminal 21 and the back of terminal 22 of board PB514, said contacts being controlled by the transfer factor memory card relay K582 which is energized at this time, so that the contacts are closed; from the front of terminal 22 over a routing wire to the front of terminal 61 of program board PB515, the terminal 61 being bussed to terminals 61 to 66 inclusive; from the back of terminal 61 over a permanent connection to the point 904 (FIG. 61B); over contacts K307B2; SC23B2; and K557AC11; over the point 856; and over the solenoid L1, to the conductor 799.

The feed relay K101 in the feeder is now energized by the closing of contacts SC9BC1 (FIG. 61C) under control of energization of the solenoid L1, over a circuit which has been previously described. Energization of the feeder relay K101 causes another card, which is the new factor memory card, to be fed from the feeder into the accounting machine, and causes the card now in the accounting machine, which is the old factor memory card, to be out-sorted.

The movement of the card being fed, in transport, causes energization of the feeder relay K103 (not shown), which in turn causes the contacts K103A2 (FIG. 61A) to close, thus completing an energizing circuit for the new balance solenoid L7, and energizing said solenoid to initiate a new balance operation. The energizing circuit for the solenoid L7 is the same as previously described, and therefore will not be described here.

During the new balance operation, the information pertaining to share factor, loan factor, book number, comparator number, line finding, and sequence, which was picked up from the old factor memory card during the balance pick-up operation, is stored on the new factor memory card. Near the conclusion of the cycle of accounting machine operation, the contacts SC952A1 (FIG. 56A) close and then open, so that the solenoids SL500 and SL510 are energized and then deenergized, thus cocking and advancing the stepping switch wipers for the stepping switches SS500 and SS510 from position O to position P.

Due to the new balance operation of the accounting machine, the contacts SC6A1 are closed in the energizing circuit for the sequence relay K302, and said relay is accordingly energized over a circuit which was previously described. Since the relay K302 is energized, the gripper solenoid L1 is also energized, over a circuit previously described, which includes the contacts K302A2.

With the wipers of the stepping switches SS500 and SS510 at position P, power is applied, over a previously described circuit, to the wiper of level 24 of stepping switch SS510, and thence to the back of terminal 85 of program board PB502. A routing wire connects the front of terminal 85 to the front of terminal 57 of program board PB516. The back of terminal 57 is connected to the back of terminal 58 of program board PB516 over "A" type contacts controlled by the transfer factor memory card relay K583, said relay being energized and the contacts therefore being closed. From the front of terminal 58, a routing wire extends to the front of terminal 34 of program board PB517. The back of terminal 34 is connected to the backs of terminals 25 to 48 inclusive by means of a bus. This bus is connected to the point 793 (FIG. 56B) on one side of the solenoids SL500 and SL510, and these solenoids are thereby energized to cock the wiper mechanism for the stepping switches SS500 and SS510, said solenoids then being deenergized, as previously described, to advance the wipers of the stepping switches SS500 and SS510 from position P to position Q.

The wipers of the stepping switches SS500 and SS510 are then stepped from position Q to position Z by means of step sequence programming, in a manner which has been previously described.

With the wipers of the stepping switches SS500 and SS510 set to position Z, power is applied over level 24 of the stepping switch SS510 to terminal 13 of program board PB506. The front of terminal 13 is connected by means of a routing wire to the front of terminal 77 of program board PB512. The back of terminal 77 is bussed to the back of terminal 89 of program board PB512, which is connected to terminal 90 of program board PB512 over "B" type contacts of the trial balance relay K577, which is deenergized at this time, so that these contacts are closed. The front of terminal 90 is connected by means of a routing wire to the front of terminal 81 of program board PB512. The back of terminal 81 is connected to the back of terminal 82 by means of "A" type contacts controlled by the transfer factor memory card relay K583, which is energized at this time, so that these contacts are closed. The front of terminal 82 is connected by means of a routing wire to the front of terminal 62, program board PB517. The back of terminal 62 is connected to terminals 50, 74, and 86 by means of a bus, and this bus is connected to point 842 (FIG. 56B) in the energizing circuit for the feed relay K540, which relay is energized over the circuit described above.

Energization of the relay K540 causes the contacts 540A12 (FIG. 61C) in the energizing circuit for the feeder relay K101 to close, thereby effecting the energization of the relay K101 over a previously-described circuit, since the gripper solenoid L1 has previously been energized, thus closing the contacts SC9BC1. Energization of the relay K101 is effective to initiate feeding of an account ledger card from the stack in the feeder 62 into the accounting machine, and thus to cause ejection of the new factor memory card from the accounting machine.

Transport of the account ledger card is effective to energize the relay K103, which in turn causes the initiation of a balance pick-up operation of the accounting machine.

This is a short cycle operation, for reasons to be subsequently described, and at the end of the short cycle operation, the contacts SC906A1 (FIG. 56B) close and reopen to effect the energization and deenergization of the solenoids SL500 and SL510 to step the wipers of the main stepping switches SS500 and SS510 from position Z to home position. The energizing circuit for the stepping switch solenoids SL500 and SL510 extends from the conductor 791 over the contacts SP542B2 (FIG. 56A); K583A1; SC906A1 (FIG. 56B); and the point 889, to the back of terminal 58 of program board PB515. The back of terminal 58 is bussed to terminals 59 and 60 of program board PB515. From the front of terminal 58, a routing wire is connected to the front of terminal 33 of program board PB514. The back of terminal 33 is connected to the back of terminal 34 over "A" type contacts of the transfer factor memory card relay K582, which contacts are closed due to the energization of said relay. The front of the terminal 34 is connected by means of a routing wire to the front of terminal 70 of program board PB515. The back of terminal 70 is connected to a bus also including terminals 71 and 72, which bus is connected to a point 906 (FIG. 56B) on one side of contacts K559AC11 controlled by the auto sequence relay K559. That relay is energized, so that these contacts are closed, and the energizing circuit being described extends from the other side of said contacts over the stepping switch solenoids SL500 and SL510 to the conductor 792, thereby energizing said solenoids, as previously described, to return the stepping switch wipers to home position.

The short cycle operation of the accounting machine is caused by the fact that the pawl check relay K309 (FIG. 61A) did not energize. Failure of the relay K309 to energize at this time is due to interruption of its normal energizing path, said normal energizing path extending from the conductor 791 over contacts SC15A1; K318A2; SC1B1; SC919; SC13B1; K552AC11; over point 857 to the back of terminal 21 of program board PB515; from the front of terminal 21 to the front of terminal 31 of program board PB506 by means of a routing wire; from the back of terminal 31 to the back of terminal 30 of board PB506 over "B" type contacts controlled by the bypass account relay K561, not energized at this time, so that these contacts are closed; from the front of terminal 30 by means of a routing wire to the front of terminal 82 of program board PB516; from the back of terminal 82 to the back of terminal 81 of board PB516 over "B" type contacts controlled by the transfer factor memory card relay K583; from the front of terminal 81 to the front of terminal 9 of board PB515 by a routing wire; from the back of terminal 9 over a bus to terminals 7 and 8 and to the point 819; and from said point over the relay K309 to the conductor 799.

It will be noted that in the above circuit, the "B" type contacts controlled by the transfer factor memory card relay K583 are opened, so that this circuit is interrupted, and the relay K309 therefore cannot energize. As previously explained, failure of the relay K309 to energize causes a short cycle operation of the accounting machine.

A normal energizing path for energizing the feeder pawl check relay K105 (not shown) is prevented from being completed by the energization of the transfer factor memory card relay K582.

The energizing circuit for the relay K105 extends from one side of a source of 115 volts A.C. potential over said relay and the contacts K108A1 to the point 891 (FIG. 61A), as previously described, and over contacts K552AC2, controlled by the auto sequence relay K552, to the point 886, which is connected by permanent wiring to the back of terminals 73 to 78 inclusive of board PB515, as previously described. From the front of terminal 76, a routing wire extends the circuit to the front of terminal 81 of board PB514, the back of which terminal is connected to one side of "B" type contacts controlled by the transfer factor memory card relay K582. The other side of said contacts are connected to the back of terminal 82 of board PB514. Since the relay K582 is energized at this time, these contacts are open, and interrupt the normal energizing path for the relay K105. From the front of terminal 82, a routing wire extends the circuit to the front of terminal 32 of board PB506. The back of terminal 32 is connected to one side of "B" type contacts controlled by the account bypass relay K562, which is not energized, so that these contacts are closed. These contacts are connected at the other side to the back of terminal 33 of board PB506, the front of which is connected by a routing wire to the front of terminal 88 of board PB515. The back of terminal 88 is connected to point 892 (FIG. 61A). From this point, the circuit extends over point 887; contacts K309B2; SC914A1; and SC15A1, to the conductor 798.

The account ledger card is accordingly ejected from the machine by reason of the short cycle operation, and the system is conditioned to accept the next old factor memory card in continuing the transfer factor memory card operation.

Install operation

An install operation, as the name implies, is performed to effect the installation of the account information necessary on ledger cards for all of the accounts processed by the system of the present invention. Normally, an install operation is carried out first when the accounting procedure is converted to use with the system of the present invention, and then is carried out individually for any new accounts which are subsequently established. In the system being described, installation must be carried out for both factor memory cards and account cards.

During an install operation for a factor memory card, the following information is magnetically stored on the back of the ledger card and printed on the front of the ledger card: A numerical value entered into amount rows 1 to 5 inclusive of the accounting machine keyboard, representing the amount of the share payment; a numerical value entered into the amount rows 6 to 8 inclusive with the accounting machine keyboard, representing the units, tens, and hundreds digits of the book number; a numerical value entered into amount rows 9 to 13 inclusive of the accounting machine keyboard, representing the amount of the loan payment; and a numerical value entered into amount rows 14 and 15 of the accounting machine keyboard, representing the thousands and ten-thousands digits of the book number. In addition, two digits of line finding and a three-digit comparator number are magnetically stored on the back of the card, as is a sequence "spot," identifying the card as a factor memory card.

During an install operation for an account card, the following information is magnetically stored on the back of a ledger card, and is printed on the front of said ledger card: a numerical value entered into amount rows 1 to 8 inclusive of the accounting machine keyboard, representing the amount of the share balance; and a numerical value entered into amount rows 9 to 15 inclusive of the accounting machine keyboard, representing the loan balance. In addition, two digits of line finding and a three-digit comparator number are magnetically stored on the back of the account card.

In the normal sequence of an initial install operation, installation will be performed on all factor memory cards pertaining to the various accounts first, and then installation will be performed on all of the account cards pertaining to the various accounts. The order of performance of these operations is purely a matter of choice, since the installation could obviously be performed on the account cards first and then on the factor memory cards.

The install operation is a manual type of operation, and normally is made with the feeder 62 disengaged from the accounting machine 61. Also, although the controller 63 continues to be connected to the accounting machine, no program is selected for this operation, and the controller performs no function as such, but is left in its "manual" condition of operation.

To condition the accounting machine for an install operation, the function control knob is set to "Install" position. Also the "Balance Forward" key 90 of control row 3 of the accounting machine keyboard is depressed and is locked down.

When the function control switch is set to "Install" position, the wiper of switch SR1E (FIG. 61B) is set to its "Install" position to complete a circuit for energizing the gripper solenoid L1, said circuit extending from the conductor 798 over the contacts K308AC4; K312B1; SC921A1; SC941A1; K305B2; the points 843 and 844; the contacts ST14B2; the point 845; the contacts K541B1; the switch SR1E in "Install" position; the contacts K307B2; SC23B2; the point 855; the contacts K557BC11; SC39B1; SC38B1; K557BC2; the point 856; and the solenoid L1, to the conductor 799. Energization of the gripper solenoid L1 enables a ledger card to be positioned on the accounting machine carriage, so that an install operation can be performed on said card. This same circuit for energizing the solenoid L1 is used in a manual transfer operation to enable the positioning of a card on the accounting machine carriage.

With the function control switch set to "Install" position a circuit is prepared for energization of the auto sequence relay K320 (FIG. 63), which bypasses the contacts K320A1, K551A12, and SC74A1 in parallel with the function control switch SR1H. The contacts SC74A1 are included in this circuit to insure that the relay K320 is energized during all manual operations in which a ledger card is remade. The relay K320 is energized in an install operation when installing of account cards takes place, but is not energized in an install operation when installing of factor memory cards takes place.

The key switch 84 on the accounting machine keyboard labeled "Normal" and "Encode FM" is set to "Encode FM" position. The contacts ST10A1 (FIG. 63) open as a result of the setting of this switch, and prevent the relay K320 from energizing, or, if K320 is already energized, cause the deenergization of that relay, since the contacts ST10A1 are connected in series with the function control switch SR1H and the relay K320. Since the relay K320 is not energized, the contacts K320A2 (FIG. 63), which are in parallel with the sequence storage switch SC724, are open, and permit a magnetic spot to be stored in the "sequence" area of the units line-finding strip of the factor memory ledger card.

The installation operation for a factor memory card is continued by indexing the book number in amount rows 6, 7, 8, 14, and 15 of the accounting machine keyboard; indexing the amount of the loan payment in rows 9 to 13 inclusive; indexing the amount of the share payment in rows 1 to 5 inclusive; indexing a three-digit comparator number in the comparator keyboard; and then manually depressing key 9 in control row 2 of the accounting machine keyboard, which will cause energization of the relay K307 (FIG. 61C) to initiate a cycle of operation of the accounting machine in the manner previously described, to install the necessary information on the ledger card being processed.

Depression of key No. 9 of control row 2 closes the contacts SC22A1 (FIG. 61C) to energize the relay K307 over a path which extends from the conductor 798 over the contacts SC3A1; SC12B1; SC913A1; SC15B2; SC933A1; K304B3; K301A2; K308AC2; the switch SR1B in "Install" position; SC5B1; SC22A1; K541BC11; the point 786; the switch SR1G in "Install" position, and the relay K307, to the conductor 799.

It may be noted at this point that a number of additional contacts are included in various energizing paths for the relay K307, including contacts SP3A1, K308BC2, SC16A1, SC11B1, SC4A1, SP9A1, SC71B1, K310B1, SC24A1, and K312A4. These contacts find use in various manual operations of the accounting machine to enable the relay K307 to be energized under various conditions. However, such energizing circuits are not normally utilized during automatic operations performed by the system of the present invention, and therefore no detailed description of them is given herein.

As is more fully described in the previously-mentioned United States Patent No. 2,947,475, magnetic storage of information in the various magnetic strips on the rear of a ledger card is accomplished during a new balance operation by first erasing the information previously stored on the strips by applying a potential of one polarity to the reading and recording heads of the accounting machine as the ledger card is moved in one direction in an insweep past the heads, then applying potential of an opposite polarity to all heads, and selectively removing the potential of an opposite polarity from the heads at various times according to the value of the various items of information to be stored, as the card is moved in the opposite direction in an out-sweep past the heads.

In the case of the units line-finding reading and recording head and associated circuitry, shown in FIG. 63, the erasing circuit extends from a terminal 910, to which is applied a plus 12-volt D.C. potential, over the contacts K402BC1, controlled by the relay K402 (not shown), which is deenergized at this time; over the contacts K305A4, which are controlled by the storage relay K305 (not shown), energized at this time; over the cam-controlled contacts SC903; over a point 909; over a diode 911, which is oriented so that when the plus 12-volt potential is applied thereto it has a low impedance and allows an erasing current to flow through the head 825 during the entire in-sweep of the ledger card, regardless of the condition of the control contacts SC701 and SC724; over the cam-controlled contacts SC101, which are closed during erasing and recording operations; over the recording head 825 to a base reference potential, shown here as ground; and over the contacts K402BC2, to the terminal 912, to which is applied a minus 12-volt D.C. potential.

When the accounting machine ledger card carriage has finished its in-sweep, the relay K402 is energized to open the contacts K402BC1 and to close the contacts K402AC1, so that the circuit path to the head 825 from the terminal 910 is interrupted, and a new circuit path is completed, which extends from a terminal 912, to which is applied a minus 12-volt D.C. potential, over the contacts K402AC1; K305A4; and SC903, to the point 909.

Energization of the relay K402 also closes the contacts K402A3 to change the bias at a point 869 in the reading circuitry of the various channels from minus 3 volts D.C. to 0 volt, by connecting the minus 3 volts D.C. potential supply at the terminal 868, over the contacts K402A3, to ground or zero volts potential.

It may be noted that the terminals 910 and 912 and the contacts K402AC1, K402BC1, K305A4, and SC903 are common to the reading and recording circuitry for all of the channels.

With minus 12 volts applied to the circuit, the diode 911 has a high impedance, and the head 825 is therefore energized over the recording control contacts SC901 and SC274, according to the information to be stored. It may be noted that the contacts K320A2, controlled by the sequence relay K320, are in parallel with the sequence storage contacts SC724, so that when the contacts K320A2 are closed, the contacts SC724 are effectively removed from the recording circuit. Since the relay K320 is deenergized during the operation being described, however, as stated above, the contacts K320A2 are open, and the sequence storage contacts SC724 and the units line-finding storage contacts SC701 are effectively in series in the recording circuit for the units line-finding pick-up and storage head 825. During the early portion of the storage cycle, as the card is swept outwardly, the contacts SC724, which are mounted on the bracket 138 (FIG. 5), as they undergo their regular movement, are opened by a fixed sequence storage cam 913, which interrupts the recording circuit to the head 825 and produces a magnetic discontinuity, or "spot," in the "sequence" area of the units line-finding storage strip on the rear of the card.

As the storage contacts SC724 are moved along the periphery of the storage cam, the contacts close once more, which again completes the circuit to the head 825, and causes another discontinuity, or "spot," to be stored. However, this spot is of an opposite polarity change and is not amplified during a pick-up or gate check operation of the accounting machine.

Also, during a proper storage cycle, a storage check relay K404 (FIGS. 63, 64, and 66) is energized. This relay, through its contacts, exerts a control on the machine operating circuitry, to prevent further system operation, unless the relay K404 is energized, thus indicating that a proper storage operation has been made. The relay K404 is energized over a path that extends from the plus 12-volt D.C. terminal 910 over the relay K404 and contacts K402AC2 to a ground connection; from another ground connection over the various reading and recording heads and their recording circuits in parallel, to the point 909 (or point 928 in the circuit of FIG. 66); over the contacts SC903; K305A4; and K402AC1, to the minus 12-volt terminal 912. In the case of the circuit of FIG. 63, the path through the recording circuitry extends from the head 825 over the contacts SC101; SC701; and SC724, to the point 909. It may be noted that if several of the heads such as 825 fail to function, then insufficient current is carried by the circuit to enegrize the relay K404, and the system will accordingly be halted by failure of said relay to energize.

The units line-finding channel continues to receive the minus 12-volt potential until the units line-finding storage contacts SC701 are opened by the units line-finding storage cam, to store a "spot" corresponding to the position of the units line-finding storage cam.

In a similar manner, storage is accomplished, on the card being processed, of a "spot" corresponding to the position of the multiples line-finding storage cam, by the reading and recording head 826 (FIG. 64) and associated circuitry.

As has been stated, the terminals 910 and 912 and the contacts K40AC1, K402BC1, K305A4, and SC903 are common to the reading and recording circuitry for all channels. It will be seen that the erase operation of the multiples line-finding channel is carried out in exactly the same manner as described for the units line-finding channel.

With regard to recording, the multiples line-finding channel of FIG. 64 is used to record a left-right print "spot," when appropriate, as well as multiples line-finding information, and the left-right print contacts SC725 are therefore provided in series with the multiples line-finding contacts SC702 in the reading and recording circuit of FIG. 64. The contacts SC702 and SC725 are controlled in exactly the same manner as described for the contacts SC701 and SC724 in the circuit of FIG. 63.

Since a left-right print "spot" is to be stored only under certain conditions, a number of circuit paths are provided to bypass the contacts SC725 and thus render them ineffective under certain conditions to cause the storage of a "spot" in the multiples line-finding channel, which will result in printing only on the right side of the ledger card.

A first such circuit path includes the contacts SC73A1 in parallel with the contacts SC725. The contacts SC73A1 are set, by the "both sides print" control (not shown) of the accounting machine, to close, thus preventing storage of a "spot" under control of contacts SC725, when it is desired to print on both sides of the ledger card simultaneously.

Two additional circuit paths are provided in parallel with the contacts SC725. In the first of these, contacts K405BC2 and K306AC4 are connected in series, and in the second contacts K405AC2, K553B2, and K306BC4 are connected in series. In an install operation, the left-right print relay K405 is always energized, over a circuit which extends from the terminal 812 over the relay, the switch SR1G in "Install" position, the contacts ST11A1, and the tube 811. Accordingly, the contacts K405BC2 are open in one of said circuit paths, while the contacts K405AC2 are closed in the other path, as are the contacts K553B2 and K306BC4, so that this path is completed, bypassing the contacts SC725 in an install operation, and preventing recording of a left-right print "spot." It may be noted that the contacts K553B2 and K306BC4 are controlled by the line forty relays K553 and K306, respectively. These relays are not energized, since the accounting machine table is not to set to line forty position in an install operation. Therefore, left-print "spot" is never stored in an install operation.

The numerical information relating to book number, share amount, and loan amount is store magnetically on the back of the factor memory card in a conventional manner.

The manner in which installation is made on an account ledger card is generally similar to that in which installation is made, as described above, on a factor memory card, with the exceptions that different information is entered, and that no sequence "spot" is stored on the account ledger card. In order to perform an install operation on an account ledger card, the function control knob (not shown) is placed or left in the "Install" position, the "Balance Forward" key 90 in control row 3 of the accounting machine keyboard is depressed and locked down, and the "Encode F.M. Card-Normal" switch 84, controlling the contacts ST10A1, is shifted to the "Normal" position.

When the function control knob (not shown) is placed in the "Install" position, the wiper of the switch SR1H is set to the "Install" contact position, preparing the energizing circuit for the auto sequence relay K320, as described above. Now, when the switch 84 is set to normal position, the contacts ST10A1 close, completing the energizing path for the relay K320 (FIG. 63) and energizing said relay. When the relay K320 energizes, the contacts K320A2 (FIG. 63) close in the units line-finding pick-up and storage head circuit, thereby bypassing the storage contacts of the sequence storage switch SC724, so that when this switch is opened by its storage cam during the machine cycle in an install operation, it will have no effect on the circuit for the units line-finding pick-up and storage head 825, as has been previously described.

The amount of the loan balance and the amount of the share balance are indexed in the appropriate amount rows of the accounting machine keyboard, three digits of comparator number information are indexed in the comparator keyboard, and the "Balance Pick-Up" key No. 9 is depressed in control row 2, to initiate an install operation of the accounting machine. The information required is printed on the front of the account card and stored magnetically on the back of the account card in the conventional manner.

*Miscellaneous Manual Operations*

Although the system of the present invention is designed for completely automatic operation in most instances, a number of different types of manual operations may be made by the machine operator, in order to take care of special situations which may arise, and some of these manual operations will now be described.

When an account holder changes the amount which he wishes to be credited to his share account on a periodic basis, or when his loan payment amount is changed, the factor memory card for this account holder must be changed accordingly. This is accomplished by a manual operation of the accounting machine.

In order to effect such an operation, the ledger card feeder 62 must be placed in manual control by operation of the switch 763, the "Manual" switch 753 on the controller panel is operated, the function control knob (not shown) is set to the "Posting I" position, the switch 85 on the accounting machine keyboard is set to "Change F.M. Card" position, the account number is indexed on the comparator keyboard, and a balance pick-up operation is initiated, in which the factor memory card to be changed is carried into the accounting machine.

The amounts of the loan payment and share payment are then magnetically sensed from the card and added into totalizers in the accounting machine in a conventional manner during this pick-up operation, but the book number is not entered into the accounting machine, as will be described subsequently.

Next, the amount of the change in the share payment or the loan payment is indexed manually on the amount keys on the appropriate side of the keyboard, and the proper control key in control row 2 is depressed. The amount of the change in the share payment or the loan payment will increase or decrease the amount in the totalizers in which the initial balance was stored, depending upon whether the change is an increase or a decrease. For example, if an account holder is currently paying $10.00 per week to his share account, and wishes to increase this by $5.00 per week, then the amount of $5.00 is indexed on the share side of the keyboard, and the "Share Paid" key 6 of control row 2, or the "Journal Debit" key 7 of control row 2, is depressed. During this operation, the amount of the share payment in the totalizers will be increased by the amount of $5.00.

To conclude the change operation, the new balance key of the accounting machine is depressed, to initiate a new balance operation. During this operation, the loan payment and the changed share payment in the example above are printed on the factor memory card and are magnetically stored in the channels on the back of the card. It should be noted that the book number is not affected in this operation because the reading and storage circuits for the channels relating to the book number are disconnected from their respective circuits.

The operation of the electrical circuitry relating to this type of operation will now be briefly described. Since the functional control knob is set to "Posting I" position, the wiper of the switch SR1I (FIG. 63) is set to "Posting I" position, which prepares an energizing path for the relay K320.

When the balance pick-up operation of the accounting machine is initiated, the relay K303 (not shown) is energized in the manner described previously, and the contacts K303A4 (FIG. 56D) close, energizing the relay K551, which in turn causes the contacts K551A12 (FIG. 63) to close. These contacts are in the energizing circuit for the relay K320, and their closure causes the energization of said relay, over a path extending from the terminal 813 over the relay K320, the contacts K551A12, the switch SR1I in "Posting I" position, the resistor 851, and the tube 811, to ground. Said relay is then maintained in energized condition by closing of its holding contacts K320A1.

Since the switch 85 has been set to the "Change F.M. Card" position, the contacts ST14A1 (FIG. 56D) close in an energizing circuit for the relay K556, which is the change F.M. card relay, and said relay is thus energized over a circuit path extending from the conductor 791 over the contacts ST14A1 and the relay K556 to the conductor 792.

Energization of the relay K556 causes closing of the contacts K556A3, which are connected in parallel with the contacts SC13B1 in the energizing circuit for the pawl check relay K309, to energize said relay, even though the pawls for the book number channels are not released to permit the contacts SC13B1 to close, as will be subsequently described.

Energization of the relay K556 also causes the contacts K556B12 (FIG. 61B) to open in the energizing circuit for the counter select solenoids L12 and L20, which prevents said solenoids from energizing and thus causes the previously mentioned share and loan totalizers to engage on the balance pick-up operation, to cause the share and loan payment information picked up from the factor memory card to be entered into the totalizers.

Shown in FIG. 66 is a schematic view of a portion of the reading and recording circuitry associated with one of the channels which are used to read and record book number information on factor memory cards, and which are also used to read and record share or loan balance information on account cards. These channels are generally similar to the remaining amount channels, except that means controlled by the relay K556 are provided to disable the book number channels in machine operations which are made to change the share or loan payment amount on the factor memory card.

In normal operations, such as a share payment or share transfer operation, a signal sensed by reading and recording head 914 of FIG. 66 is sent through a preamplifier tube 915, a further amplifier tube 916, and a gate diode 917 to a control tube 918, to cut off the control tube. In series with the anode of the control tube 918 is a solenoid 919, which is normally energized, and retains a pawl 920 away from an auxiliary differential mechanism similar to that shown in FIG. 5. When the control tube is cut off by the signal from its related channel on the card, it will deenergize its solenoid 919, to release the pawl 920, which arrests the auxiliary differential mechanism in a position corresponding to the data which was read. A complete description of the above reading circuitry may be found in the previously-mentioned United States Patent No. 2,947,475. Similarly, a complete description may be found in the above patent of the manner in which the head 914 is controlled in recording operations by storage cam-operated contacts, such as the contacts 921.

Means for preventing reading of book number information during change operations on factor memory cards are included in a circuit extending from the anode of the tube 916 over a 270,000-ohm resistor 922, a point 923, and over two branches, one of which branches extends from the point 923 over contacts K556BC2, K317BC2, and K319B3 to a terminal 924, to which is applied a source of plus 250 volts D.C. potential; and the other of which branches extends over contacts K556AC2 and a 270,000-ohm resistor 925 to a connection to a base reference potential, shown here as ground.

Energization of the relay K556 causes the contacts K556AC2 to close, thereby grounding the anodes of the tubes in the reading circuits for the book number channels, while the contacts K556BC2 open in the plate circuits for these channels. Therefore, the signals sensed from the book number channels on the magnetic ledger card are not amplified during this balance pick-up operation.

Means for preventing recording of book number information during change operations on factor memory cards are included in a circuit extending from point 912, which is a source of minus 12 volts D.C. potential, over contacts K40AC1, K305A4, SC903, a point 928, and over two branches, one of which branches extends from the point 928 over the contacts K556BC1, to a point 927, on one side of the contacts SC921; and the other of which branches extends from the point 928 over the contacts K556AC1 and an 80-ohm resistor 931, to a connection to a base reference potential, shown here as ground.

Energization of the relay K556 causes the contacts K556BC1 to open in the recording circuits for the pick-up heads, such as the head 914, of the book number channels, thus interrupting those circuits and preventing recording on the corresponding magnetic strips of the ledger card being processed.

In addition, energization of the relay K556 causes the contacts K556AC1 to close, thereby bringing the load resistor 931 into the circuit containing the relay K404, to replace the various pick-up heads, such as the head 914, that are removed from the circuit by the opening of the contacts K556BC1. Addition of this resistor to the energizing circuit for the storage check relay K404 causes said circuit to carry sufficient current that said relay K404 will energize to prevent lock-up of the machine, even though the reading and recording heads, such as the head 914, have been effectively removed from the circuit. The energizing circuit for the relay K404 extends from the terminal 910 over the relay K404; the contacts K402AC2; through ground; over the resistor 931; the contacts K556AC1; the point 928; and the contacts SC903; K305A4; and K402AC1, to the minus 12-volt terminal 912.

The sequence "spot" is stored in the units line finding channel during the storage cycle of the new balance operation, in the manner previously described.

As the ledger card sweeps into the accounting machine, the sequence "spot" which is on said card as a consequence of its being a factor memory card is sensed, and the resulting signal causes the relay K320 to be deenergized, as previously described, thus preparing the storage circuit which will restore the sequence "spot" during a new balance operation.

Certain additional manual operations will now be described. These are in the nature of corrective operations.

The following description of corrective manual operations is divided into two sections, dealing with manual runs and automatic runs of the system, and is further subdivided in each instance into operations involving the factor memory cards and operations involving the account cards.

With respect to manual operations involving the factor memory cards during a manual run, the only manual operation in which a failure could occur is the changing of information contained on a factor memory card, in the manner previously described.

If a short cycle results from a change operation on a factor memory card, it will be from one of three causes:

(1) A key being depressed when a pick-up cycle is initiated;

(2) Failure of comparison;

(3) Failure to read a spot in any one of the twenty storage channels.

The first condition may be corrected by pulling down the key release lever of the accounting machine and making another balance pick-up operation. The second condition is indicated by illumination of the "Verify Comparison" light 859 (FIG. 62) and may be corrected by examination to determine whether an error has been made in indexing the comparator keyboard 97, and, if so, by making the appropriate correction, or by depressing the comparator bypass button on the table area of the accounting machine, or by turning the "Comparison-No Comparison" switch 83 on the accounting machine 61 to "No Comparison" position. The third condition may be corrected by making a manual input operation. In doing this, it would be necessary to turn the "Normal/Change F.M. Card" switch 85 to "Normal" position and to turn the "Encode F.M. Card/Normal" switch 84 to "Encode F.M. Card" position.

If a gate check lock-up results from the change of a factor memory card, it will be caused by failure of the accounting machine mechanism to be set in accordance with the information stored on the card. This is corrected by making a new balance non-transfer operation under control of the designated key in control row 1 of the accounting machine, and then making a manual input operation, as described above.

With respect to manual operations involving account cards during manual runs, any number of miscellaneous operations might occur, such as posting of dividends, etc., in which errors could arise which would necessitate corrective manual operations.

If a short cycle or gate check results during a manual operation involving an account card, the same causes and corrections may be applied as described above in connection with a factor memory card, with the exception that in the case of an account card, both the "Normal/Change F.M. Card" switch 85 and the "Encode F.M. Card/Normal" switch 84 would be set to "Normal" position.

If there is a failure during an automatic run, the recommended procedure is to remove the ledger card producing the error, and its complementary card (that is, both of the factor memory and account cards pertaining to the particular account), and then continue the automatic run on the remaining cards in the stack, with the erroneous card to be corrected later in the same manner as described above for errors occurring during manual runs.

In the case of an unwanted short cycle operation during an automatic run, the following procedure is employed to clear the cards for the offending account from the system, in order to enable the automatic operation to continue. First, the "Manual" switch 753 on the controller panel 74 is operated. This opens the contacts SP542B2 (FIG. 56A), which interrupts the energizing circuit for the manual auto relays K541, K550, K557, and K558, as well as the energizing circuit for whichever ones of the program relays are energized according to the program being performed. The closing of the contacts K558B1 (FIG. 56C) in response to deenergization of the relay K558 causes the energization of the relay K548, over a path which extends from the conductor 791, over the contacts SC511A1, the contacts K558B1, and the relay K548, to the conductor 792. The wipers of the main stepping switches SS500 and SS510 are now reset to home position by means of a self-interrupting circuit which has been previously described and which includes the contacts K548A3 (FIG. 56B).

The control switch 763 on the feeder 62 is now operated, and this renders the feeder inoperative, in a manner previously described, to feed further cards.

A new balance non-transfer must next be made on the accounting machine.

At this point, the factor memory card and the account ledger card for the offending account are removed from the system. Then the automatic run can be resumed on the remainder of the cards in the stack by operating the switch for the desired automatic program on the controller panel, and by operating the control switch 763 on the feeder.

In the case of a gate check operation, the following procedure is employed to clear the cards for the offending account from the system to enable the automatic operation to continue. First, the "Manual" switch 753 on the controller panel is operated to reset the wipers of the main stepping switches SS500 and SS510 in the manner just described above. Then the switch 763 on the feeder 62 is depressed to render the feeder inoperative to feed further cards. Next, a "new balance non-transfer" operation is made by depression of key No. 6 in control row 1 of the accounting machine. This removes the stored amount information from the totalizer in which it has been stored and returns the machine to "home" position. Next, the factor memory card and the account card for the offending account are removed from the system, after which an automatic operation is resumed by operating the switch for the desired program on the controller, and operating the switch 763 on the feeder.

One further condition may arise which may require removal of the cards of a given account from the system during an automatic run. This condition is indicated by the lighting of the "Verify Sequence" light 838 (FIG. 62), and the procedure for correcting this condition is exactly the same as that described above for the correction of the gate check condition.

Note that in the case of the gate check condition, both the "Verify Pick-Up" and "Verify Comparison" lights 858 and 859 (FIG. 62) are illuminated.

In addition to the indicator lights described above, located on the accounting machine, certain additional indicating lights for indicating various operating conditions are also located on the accounting machine, and their illuminating circuitry is shown in FIG. 62. Since these lights are used for indicating operating conditions which can exist on the accounting machine 61 when used alone, and are not directly concerned with the operation of the automatic system of the present invention, they will not be described in detail. However, it may be briefly mentioned that said lights include two "Warm-Up" lights 980 and 981 controlled by contacts K301A4; a "Comparator Input" light 982 controlled by contacts K315A4; a "Manual Line Finding" light 983 controlled by contacts K317A4; a "Verify Storage" light 985 controlled by the contacts K403A3; a "Line 40" light 986 controlled by the contacts K306A3; and a "Loan Overdraft" light 987 controlled by the contacts K310A2.

*Sorting circuitry*

The circuitry for controlling sorting operations of the system of the present invention will now be described. The system may be programmed or controlled to out-sort certain ledger cards, under certain conditions, from the stack being processed.

A brief summary of the conditions under which out-sorting of cards takes place with the illustrated embodiment of the system functioning in its contemplated mode of operation will now be given. In a transfer balance operation, as previously described, the old account card is out-sorted from the stack in each account processed. In the transfer factor memory card operation, as previously described, the old factor memory card for each account is out-sorted from the stack. In the case of the share payment and share transfer operations, whenever there is no room for further entries on an account card, it is out-sorted from the stack being processed. Also, in the system as programmed, in the case of a share transfer operation, cards having an overdraft or zero share account balance or loan account balance, after a given operation, are out-sorted.

Out-sorting in each case is accomplished by energization of the solenoid L103 (FIG. 65) in the feeder, which functions in a manner described in the previously-mentioned United States Patent No. 3,079,145, to control the sorting mechanism to cause a selected card to be out-sorted into a small lower bin of the feeder, while the remainder of the cards are sorted into a large upper bin of the feeder. It may be noted that the solenoid L103 is energized only in the case of out-sorting, so that where cards are not to be out-sorted, the solenoid L103 is not energized, and these cards are sorted into the upper bin as described.

The sorting circuit is connected between two terminals 940 and 941 to which is applied a source of 115 volts A.C. potential. From the terminal 940, a circuit path extends over the solenoid L103 to a point 942, to which point are connected several branches of the circuit.

A first branch of the circuit extends from the point 942 over contacts K554B1, which are normally closed contacts controlled by the balance pick-up sequence relay K554, which is in turn controlled by the relay K302, to the "Transfer" contact position of the function control switch SR1A, the wiper of which is connected to the terminal 941.

A second branch of the circuit extends from the point 942 over normally open contacts K546A12, which are controlled by the share overdraft relay K546, over a point 943, over normally open contacts ST103A1 controlled by the sort control switch (not shown) and over a point 944, to the "Posting I" and "Posting II" contact positions of the function control switch SR1A. A third branch extends from the point 942 over normally open contacts K545A3, which are controlled by the loan overdraft relay K545, to a point 945, which is directly connected to the point 943. From the point 945, the circuit extends to a point 946, which is directly connected to the back of terminal 30 on program board PB507.

A fourth branch of the circuit extends from the point 942 over the normally open contacts K542A2, controlled by the zero balance relay K542, to a point 947, which is directly connected to the front of terminal 31 of program board PB507.

A fifth branch of the circuit extends from the point 942 over the normally open contacts K564A5, controlled by the filled card relay K564 to a point 948, which is directly connected over a point 949 to the back of terminal 32 of program board PB507. The point 948 is also directly connected to the point 944.

As previously mentioned, the contacts ST103A1 are controlled by the sort control switch and may be utilized, depending upon the manner in which the circuit of FIG. 65 is programmed, to determine whether or not the solenoid L103 will be energized during an automatic posting run of the system, to cause an out-sorting operation in the event of a zero balance, a share overdraft balance, or a loan overdraft balance, the occurrence of one of which conditions will cause energization of a corresponding one of the relays K542, K545, or K546, and consequent closing of the contacts K542A2, K545A3, or K546A12.

Without any programming of the circuit as shown in FIG. 65, it will be seen that closing of the contacts K542A2, under control of the zero balance relay K542, will produce no effect on the circuit, since no circuit path for energization of the solenoid L103 is completed by the closing of these contacts. It is possible to cause the system to out-sort every card in which zero balance is recorded as a result of the transactions performed on the account to which said card pertains, and this is accomplished by connecting a routing wire between the fronts of terminals 31 and 32 of program board PB507, thus connecting the points 947 and 949. Then, whenever the contacts K542A2 close, an energizing circuit for the solenoid L103 is completed which extends from the terminal 940 over the solenoid L103, the contacts K542A2, the points 947 and 949, and the switch SR1A in "Posting I" or "Posting II" position, to the terminal 941.

It is also possible to incorporate the contacts ST103A1 into the sorting circuit which also includes the contacts K542A2, to permit selective disabling of said circuit in cases where a zero balance arises, by manually opening the contacts ST103A1, and this is the preferred mode of programming for the operations being described. To accomplish this, a routing wire is connected from the front of terminal 30 of program board PB507, the back of which terminal is connected to point 947, to the front of terminal 39 of board PB514. The back of terminal 39 is connected to the back of terminal 40 of board PB514 over "A" type contacts controlled by the share transfer relay K573. These contacts are therefore open during a share payment operation and closed during a share transfer operation, so that out-sorting of zero balance cards can take place during a share transfer operation, but cannot take place during a share payment operation. This is desirable, since a large number of the cards processed during a share payment operaion may show zero loan balances, while in a share transfer operation, those accounts in which a zero loan payment is stored on the factor memory card are not processed by the machine in any event, as has been described. To continue with the description of the circuit path, a routing wire is connected from the front of terminal 40 to the front of terminal 31 of board PB507, the back of which terminal is connected to the point 946.

This energizing circuit for the solenoid L103 thus extends from the terminal 940 over the solenoid L103, the point 942, the contacts K542A2, the point 947, the previously described progiam connections, the point 946, the contacts ST103A1, the point 944, and the switch SR1A in "Posting I" or "Posting II" position, to the terminal 941.

With the circuit as shown in FIG. 65, it may be seen that the occurrence of either a share overdraft condition, or a loan overdraft condition, with the consequent closing of the contacts K545A3 or K546A12, is effective to cause energization of the solenoid L103 for out-sorting purposes only when the manually-operable contacts ST103A1 are closed. In such case, the circuit extends from the terminal 940 over the solenoid L103, the point 942, either the contacts K545A3 or K546A12, the point 943, the contacts ST103A1, the point 944, and the switch SR1A in "Posting I" or "Posting II" position, to the terminal 941. On the other hand, if the contacts ST103A1 are open, then the circuit cannot be completed, and out-sorting of the card having the overdraft balance is prevented.

It is possible to bypass the contacts ST103A1, so that the solenoid L103 is energized in every case of a share or loan overdraft balance, regardless of the condition of the contacts ST103A1, by connecting a routing wire between the fronts of terminals 30 and 32 of program board PB507, which terminals are connected to points 946 and 949. However, such a bypass condition is not normally utilized, since it is customarily desired to permit optional disabling of the out-sort control in the case of ledger cards having overdraft balances.

In the case of a transfer operation, only the old account cards or factor memory cards are out-sorted, according to the type of transfer operation being performed. Therefore the circuit extends from the terminal 940 over the solenoid L103, the point 942, the contacts K554B1, and the "Transfer" position of the function control switch SR1A, to the terminal 941. It will be seen that the solenoid L103 is energized in a transfer operation only when the contacts K554B1 are closed. Since a balance pick-up operation is not initiated during the feed of the new factor memory card or the feed of the new account card, the relay K302 is not energized at this time, and therefore the contacts K302A4 (FIG. 56D) remain open, so that the relay K554 is not energized. Accordingly, the contacts K554B1 remain closed, so that during the ejection of the old factor memory card or account card preceding the new factor memory card or account card being fed into the accounting machine, the solenoid L103 is energized and the ejected card is out-sorted.

As previously mentioned, the sorting circuit also functions, during posting operations, to out-sort any card on which all of the printing space is exhausted, by energization of the solenoid L103. This circuit extends from the terminal 940 over the solenoid L103, the point 942, the contacts K564A5, the points 948 and 944, and the switch SR1A in "Posting I" or "Posting II" position, to the terminal 941. The contacts K564A5 are controlled by the relay K564, and the conditions under which that relay is energized have been previously fully described.

It is thus seen that the sorting circuit provides a plurality of different types of controls under which the solenoid L103 may be energized for out-sorting a ledger card according to any one of a number of different requirements, as noted above.

*Program function lock means*

In some establishments using the present system, it may be desired to exert supervisory control over the type of operation being performed, and to make it impossible for the system operator to change the type of operation being performed. In order to provide the necessary supervisory control, a program function lock feature is provided.

In the normal operation of the system without the program function lock feature in operative condition, a program may be freely selected by the operator, by operation of the appropriate program control switch on the controller panel, and the resulting energization of the corresponding program relays will cause the program relays for the program which had been operative previously to be deenergized, so that only the currently-selected program relays are energized. Examination of the energizing circuits for the various program relays (FIG. 56A) shows the manner in which this is accomplished.

Energization of the previously-selected program relays is accomplished in one of two ways, depending upon the position of the previously-selected program relays in the circuit with respect to the newly-selected program relays.

In addition, it should of course be realized that any of the program relays may be deenergized at any time by operation of the manual control switch which controls the contacts SP542B2 (FIG. 56A).

An example of one way in which previously-selected program relays are deenergized may be noted if it is assumed that a share payment operation of the system is to be performed, and that the "Share Payment" switch 754 (FIG. 27) on the controller panel 74 has been operated, so that the contacts SP570A1 (FIG. 56A) are closed in the energizing circuit for the relays K570 and K571, and cause energization of these relays, in the manner previously described. Energization of the relay K570 causes the share payment relay contacts K570BC11 (FIG. 56A) to open. If any of the program relays K573, K574, K575, K576, K577, K579, K580, K582, and K583 have been energized, they are being maintained in the energized condition over a circuit which includes the contacts K570BC11, so that opening of these contacts causes deenergization of any of the other program relays in the circuit.

For example, if the trial balance program relays K576 and K577 had previously been energized in the program circuit, these relays would be held energized over a circuit extending from the conductor 791 over the manually-controlled contacts SP542B2, the contacts K570BC11, the contacts K573BC11, the contacts K576AC11, the relays K576 and K577, the contacts SP579B2, and the contacts SP582B2, to the conductor 792. It will therefore be seen that energization of the relay K570 and the consequent opening of the contacts K570BC11 interrupts said circuit and causes the deenergization of the relays K576 and K577.

Now, let it be assumed that, with the share payment relays K570 and K571 energized, it is wished to initiate some other program and thus energize other program relays, such as the transfer balance relays K579 and K580, in the case of a transfer balance program. Energization of these relays illustrates the second way in which previously-energized program relays are caused to be deenergized when a new set of program relays are energized. The energization of the relays K579 and K580 is accomplished by operation of the "Transfer Balance" switch 752 on the controller panel 74, which causes the contacts SP579A1 to close in the energizing circuit for the transfer balance relays K579 and K580, to energize said relays over a circuit previously described. At the same time, depression of the "Transfer Balance" switch 752 on the controller panel 74 also causes the contacts SP579B2 to open. These contacts are in the holding circuit for maintaining the previously-energized relays K570 and K571 in energized condition. Therefore, when the contacts SP579B2 are opened, the holding circuit for the relays K570 and K571 is opened, and the relays K570 and K571 are deenergized. It will be recalled that the holding circuit for maintaining the relays K570 and K571 energized, after their initial energization, extends from the conductor 791 over the contacts SP542B2, the contacts K570AC11, the relays K570 and K571, the contacts SP573B2, the contacts SP576B2, the contacts SP579B2, and the contacts SP582B2, to the conductor 792.

It will thus be seen from the above two examples that previously-energized program relays are deenergized by the subsequent energization of other program relays, either by the opening of contacts in the holding circuits of said previously-energized relays, which contacts are controlled by the relays being energized, or by the opening of contacts in the holding circuits of said previously-energized relays, which contacts are controlled by the selecting buttons for selecting the new programs.

As noted previously, the function lock feature is provided to prevent the energization of new program relays, and also to prevent the deenergization of the previously energized program relays. In order to render the program lock feature operative, the key-controlled "Program Control" switch 758 on the controller panel 74 (FIG. 27) is turned from "Select" position to "Lock' position. This switches the contacts ST599 (FIG. 56A) from the position in which they are shown to their alternate position. This interrupts the circuit over which any new set of program relays would be energized, and thus prevents any new operating program from being initiated. However, since any previously-energized program relays are being maintained in energized condition over a different circuit, their energization is not affected.

Also, the contacts SP573B2, SP576B2, SP579B2, and SP582B2, which are controlled by the various program control switches on the controller panel, are prevented from effecting deenergization of previously-energized relays by the fact that a bypass circuit is completed for each set of program relays which bypasses these latter contacts.

When the function lock contacts ST599 are switched to function lock position, the relay K599 is energized over a circuit which extends from the conductor 791 over contacts SP542B2, ST599, and the relay K599 to the conductor 792. Energization of the relay K599 causes closing of the contacts K599A1, K599A2, K599A3, and K599A4. These contacts are in parallel with the contacts SP573B2, SP576B2, SP579B2, and SP582B2, respectively, and, when closed, bypass all of the latter contacts, to render them ineffective to interrupt the holding circuits for any of the program relays, thus insuring that the previously-energized program relays will remain energized so long as the "Program Control" switch is maintained in "Lock" position, power is applied to the system, and the contacts SP542B2 are not opened by operation of the switch 753.

*Operating circuitry for both sides print relay K565*

The purpose of the both sides print relay K565 is to bypass certain contacts of the left-right print relay K563, which only allow certain circuits to be operable when printing is taking place on the right side of the ledger card, since these circuits are also required to be operable when both the right and left sides of the card are to be printed upon simultaneously.

The both sides print relay K565 (FIG. 56B) is energized under control of the contacts SC73A2, which in turn are controlled by the setting of the left-right print knob (not shown) on the accounting machine. These contacts are closed when the knob is set to "Off" position, which setting conditions the machine to print on both sides of the ledger card simultaneously, rather than first on one side and then on the other. Setting of the knob to its "On" position is effective to cause the machine to print on either the left side or the right side of the ledger card, and also causes the contacts SC73A2 to open. As previously described, simultaneous printing on both sides of the ledger card cuts the capacity of the card in half, from eighty lines to forty lines, but permits duplicate information to be printed on both sides of the ledger card, so that, if desired, the card can be cut in half, and will provide two duplicate records of the information desired.

The contacts SC73A2 and the relay K565 are serially connected between the conductors 791 and 792, so that whenever the contacts SC73A2 are closed, the relay K565 is energized.

Energization of the relay K565 also causes the contacts K565A4 (FIG. 58) to close. These contacts are in the circuit for controlling the energization of the filled card relay K564, and their function in said circuit has been described previously.

Energization of the relay K565 also causes the contacts K565B11 (FIG. 61B) to open. These contacts are located in the energizing circuit for the print select solenoid L21 and, when open, prevent said solenoid from energizing.

As described in United States Patent No. 3,060,846, issued to William F. Sommer and Dean B. Jackson on October 30, 1962, concerning the printing by a machine of this type on the two sides of the ledger card in succession, rather than simultaneously, in order to achieve the use of eighty lines on the card, rather than forty, the print selector solenoid L21 (designated in that patent as L20) functions to control the print selection mechanism of the accounting machine, so that printing is done on the right side of the ledger card only when the solenoid L21 is energized. The energizing circuit for the solenoid L21 (FIG. 61B) extends from the conductor 798 over the contacts K308AC4; K312B1; over one of the two sets of parallel contacts K405B3 and K553A11; the contacts K565B11; the contacts SC943; and the solenoid L21, to the conductor 799. The contacts K308AC4 are controlled by the gate check relay K308 (not shown) and open in the event of a gate check condition. The contacts K312B1 are controlled by the carriage relay K312 (not shown) and are closed when the accounting machine carriage is in home position. The contacts K405B3 are always closed when printing is taking place on the right side of the ledger card, while the contacts K553A11 are closed when the table is shifted to the line 40 position of the ledger card. The contacts SC943 are controlled by the main cam line of the accounting machine to close at 5 degrees of rotation and to open at 180 degrees of rotation.

It is thus seen that the print selector solenoid L21 is never energized when the accounting machine is printing on the ledger card in the forty-line type of operation, and that said solenoid may be energized when the machine is printing on the ledger card in an eighty-line operation and is printing on the right side.

*Account bypass relays*

The purpose of the account bypass relays K561 and K562 (FIG. 56C) is to enable the bypassing of a particular account on which no action is to be taken in the type of operation being performed at that time by the system. In the case of a share payment operation, the bypassing of a particular account normally takes place when there is no regular payroll deduction for that account. In the case of a share transfer operation, the bypassing of a particular account normally takes place when there is no loan balance outstanding on that account.

The energizing circuit for the account bypass relay K561 extends from the conductor 791 over the contacts SC953A1, controlled by the main cam line of the accounting machine to close at 165 degrees of rotation and to reopen at 205 degrees of rotation, which contacts actually complete the energizing circuits; over the contacts K557AC2, controlled by the manual auto relay K557; over one of two parallel circuit branches, the first of said circuit branches including the zero balance switch contacts SC41A1 controlled by the setting of "share" amount banks 1 to 5 inclusive, and operable to close if all of these amount banks are at zero, and also including points 952 and 953 connected to the backs of terminals 95 and 96, respectively, of program board PB512, which terminals are connected through "A" type contacts controlled by the share payment relay K570, as will subsequently be described in greater detail, the second of said parallel circuit branches including the zero balance switch contacts SC40A1 controlled by the setting of "loan" amount banks 9 to 14 inclusive, and operable to close if all of these amount banks are at zero, and also including points 954 and 955 connected to the backs of terminals 83 and 84 of program board PB512, which terminals are connected through "A" type contacts controlled by the share transfer relay K573, as will subsequently be described in greater detail; the energizing circuit then continuing over the contacts K560B11 controlled by the auto sequence relay K560; and the relay K561, to the conductor 792.

Energization of the relay K561 closes the contacts K561A1 in a holding circuit which is provided for maintaining the relay K561 in energized condition, said circuit extending from the conductor 791 over the contacts SC511A1, which are controlled by the main stepping switch SS510 and are closed except in home position of the stepping switch; over the contacts K561A1; and over the relay K561, to the conductor 792.

Returning to the energizing circuit for the relay K561, the contacts SC953 are included in that circuit to determine the timing for the energization and deenergization of said relay. The contacts K557AC2 are included to cause said energizing circuit to be operable only when the system is set to perform an automatic run, since it is not desired that the account bypass relay be energized when a manual run of the system is being performed. The first branch of the energizing circuit including the contacts SC41A1 is included to enable the relay K561 to be energized when the system is performing a share payment operation and when there is a zero balance in the amount rows 1 to 5 inclusive. As previously described, closing of the contacts SC41A1 takes place only when such a zero balance exists, while closing of the "A" type contacts of the share payment relay K570 takes place when a share payment operation is initiated. It may be noted that the manner in which the "A" type contacts of the relay K570 are incorporated into the circuit in the illustrative example is as follows: The energizing circuit is connected from the point 952 to the back of terminal 95 of program board PB512. The front of terminal 95 is connected by a routing wire to the front of terminal 25 of program board PB514, and the back of terminal 25 is connected to the back of terminal 26 of program board PB514 over "A" type contacts controlled by the relay K570. The front of terminal 26 of program board PB514 is connected by means of a routing wire to the front of terminal 96 of program board PB512, and the circuit extends from terminal 96 to the point 953 and is completed in the manner previously described.

In a similar manner, contacts SC40A1 of the second branch of the energizing circuit for the relay K561 are closed only when a zero condition exists in the amount rows 9 to 13 inclusive pertaining to the loan side of the keyboard. Also the "A" type contacts described previously which are included in this circuit branch are closed only when a share transfer operation is in progress, and the transfer relay K573 is therefore energized. The connections by means of which the "A" type contacts of the relay K573 are connected into the second branch of the energizing circuit for the relay K561 in the illustrative example are as follows: The energizing circuit is connected from the point 954 to the back of the terminal 83 of program board PB512. The front of the terminal 83 is connected by means of a routing wire to the front of the terminal 15 of program board PB516. The back of terminal 15 of program board PB516 is connected to one side of "A" type contacts controlled by the share transfer relay K573. The other side of these "A" type contacts is connected to the back of terminal 16 of program board PB516. The front of terminal 16 of program board PB516 is connected by means of a routing wire to the front of terminal 84 of program board PB512. The back of terminal 84 is connected to the point 955, and the circuit is completed from that point in the manner previously described.

The purpose of the account by pass relay K562 is to act with the previously-described account bypass relay K561, though remaining energized for a longer period, in enabling the bypassing of an account on which no action is to be taken in the type of operation being performed at the time by the system. As has been stated, in the case of a share payment operation, the bypassing of a particular account normally takes place when there is no regular payroll deduction, and in the case of a share transfer operation, the bypassing of a particular account normally takes place when there is no loan balance outstanding on that account.

The energizing circuit for the account bypass relay K562 (FIG. 56C) extends from the conductor 791 over the contacts K561A5, controlled by the account bypass relay K561; and the relay K562, to the conductor 792.

A holding circuit is provided for maintaining the relay K562 in energized condition, and extends from the conductor 791 over the contacts K559A12 controlled by the auto sequence relay K559; over the contacts K562AC4, controlled by the relay K562; and over the relay K562, to the conductor 792. It will be recalled that the relay K559 is energized at the beginnig of a balance pick-up cycle and remains energized during the operation except when a factor memory card is picked up, in which case said relay is deenergized, thus opening the contacts K559A12 to interrupt the holding circuit for the relay K562 and thereby causing said relay to be deenergized.

Certain of the contacts controlled by the relays K561 and K562 have already been described in connection with the energizing circuits for these two relays, and their purposes explained at that time. Consequently the description of these contacts will not be repeated. The functions of the remaining contacts will now be described.

The relay contacts K562A2 (FIG. 59) close during either a share payment operation or a share transfer operation when the relay K562 is energized, by pick-up of an account card for which no payroll deduction is made in the case of a share payment operation, or by pick-up of an account card having a zero loan balance in the case of a share transfer operation. Closure of these contacts, which are connected through points 960 and 961 between the backs of terminals 34 and 35 of program board PB506, makes a circuit effective, through previously-described programming of the program boards, to cause the main stepping switch solenoids SL500 and SL510 to energize and deenergize, to advance the wipers from step "O" to step "P."

The relay contacts K561B11 (FIG. 59) are connected through points 962 and 963 between the backs of terminals 30 and 31 of program board PB506 and, when opened by energization of the relay K561, are effective, through previously-described programming of the program boards, to prevent the relay K309 from energizing, thus causing a short cycle of operation of the accounting machine.

The relay contacts K562A3 (FIG. 59) are connected through points 964 and 965 between the backs of terminals 36 and 48 of program board PB506, and are closed by energization of the relay K462. This prepares a circuit for energization of the relay K302 to cause the relay K302 to energize at the end of a short cycle of operation of the accounting machine, to enable a pick-up to be made on the following factor memory card.

The relay contacts K561AC1 (FIG. 59) are connected through points 966 and 967 between the backs of terminals 26 and 27 of program board PB506, and are closed by energization of the relay K561, to complete a circuit to enable power to be routed from level 24, position P, of the main stepping switch SS510 to the reset sequence circuitry, which is effective to cause the stepping switch solenoids SL500 and SL510 to maintain a self-interrupting routine, thus stepping the wipers of the stepping switches SS500 and SS510 back to home position.

The relay contacts K561BC1 (FIG. 59) are connected through points 966 and 968 between the backs of terminals 25 and 26 of program board PB506, and are opened by energization of the relay K561. When opened, these contacts prevent power from being routed from level 24, position P of the main stepping switch SS510, to the step sequence circuitry during the resetting operation described above in connection with the explanation of functioning of the contacts K561AC1.

The relay contacts K561B13 (FIG. 59) are opened by energization of the relay K561. These contacts are connected through points 969 and 970 between the backs of terminals 28 and 29 of program board PB506 in the energizing circuit for the switch disengaging and reset solenoid L23, and prevent energization of the solenoid L23, which in turn prevents the memory switches from disengaging from the differential mechanism during the bypassing of an account card.

The contacts K562B1 (FIG. 59) are opened by energization of the relay K562. These contacts are connected through points 971 and 972 between the backs of terminals 32 and 33 of program board PB506 in the energizing circuit for the relay K311, and prevent energization of the relay K311. This in turn prevents locking up of the feeder during the deliberate short cycle of the accounting machine which is caused by processing of an inactive account card.

The relay contacts K562A5 (FIG. 61B) are closed by energization of the relay K562 and prepare a circuit for energization of the relay K302 following a short cycle of an inactive account card.

While the form of mechanism shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that for each account processed, a record member of the first type is fed to the sensing means before a record member of the second type is so fed;

first disabling means controlled by the checking means for preventing further operation of the device in the event that, during the processing of any account, a record member of the second type is fed to the sensing means before a record member of the first type is so fed;

indicating means controlled by the checking means to provide a signal in the event that, during the processing of any account, a record member of the second type is fed to the sensing means before a record member of the first type is so fed;

second disabling means for preventing further operation of the device in the event that sequentially-sensed record members of the first and second types do not relate to the same account;

totalizers for accumulating balances;

differential means for providing input and output of information to and from the totalizers;

means for setting the differential means according to the information sensed from the record members;

a first plurality of memory switches for storage of a first type of information sensed from the first type of record member;

a second plurality of memory switches for storage of a second type of information sensed from the second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced two denominational orders to the right and entered into the totalizers by means of the solenoid-operated input means and the differential means; and sequential control means for causing the feeding means to feed a first record member to the sensing means to enable information to be sensed from the first type of record member and stored in the first plurality of memory switches, also causing the feeding means to feed a second record member to the sensing means to enable information to be sensed from the second type of record member and to be stored in the second plurality of memory switches and entered into the totalizers, and subsequently causing operation of the second and then the first read-out means to enter the information stored in said first and second pluralities of memory switches into said totalizers.

2. In a device of the class described, capable of automatic entry of informatiton from first and second types of record members, and also capable of computation required for processing a plurality of accounts, information for each account being derived from a pair of record members of the two different types, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that for each account processed, a record member of the first type is fed to the sensing means before a record member of the second type is so fed;

disabling means controlled by the checking means for preventing further operation of the device in the event that, during the processing of any account, a record member of the second type is fed to the sensing means before a record member of the first type is so fed;

indicating means controlled by the checking means to provide a signal in the event that, during the processing of any account, a record member of the second type is fed to the sensing means before a record member of the first type is so fed;

totalizers for accumulating balances;

differential means for providing input and output of information to and from the totalizers;

means for setting the differential means according to the information sensed from the record members;

a first plurality of memory switches for storage of a first type of information sensed from the first type of record member;

a second plurality of memory switches for storage of a second type of information sensed from the second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced two denominational orders to the right and entered into the totalizers by means of the solenoid-operated input means and the differential means; and sequential control means for causing the feeding means to feed a first record member to the sensing means to enable information to be sensed from the first type of record member and stored in the first plurality of memory switches, also causing the feeding means to feed a second record member to the sensing means to enable information to be sensed from the second type of record member and to be stored in the second plurality of memory switches and entered into the totalizers, and subsequently causing operation of the second and then the first read-out means to enter the information stored in said first and second plurality of memory switches into said totalizers.

3. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that for each account processed, a record member of the first type is fed to the sensing means before a record member of the second type is so fed;

disabling means controlled by the checking means for preventing further operation of the device in the event that, during the processing of any account, a record member of the second type is fed to the sensing means before a record member of the first type is so fed;

totalizers for accumulating balances;

differential means for providing input and output of information to and from the totalizers;

means for setting the differential means according to the information sensed from the record members;

a first plurality of memory switches for storage of a first type of information sensed from the first type of record member;

a second plurality of memory switches for storage of a second type of information sensed from the second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced two denominational orders to the right and entered into the totalizers by means of the solenoid-operated input means and the differential means; and sequential control means for causing the feeding means to feed a first record member to the sensing means to enable information to be sensed from the first type of record member and stored in the first plurality of memory switches, also causing the feeding means to feed a second record member to the sensing means to enable information to be sensed from the second type of record member and to be stored in the second plurality of memory switches and entered into the totalizers, and subsequently causing operation of the second and then the first read-out means to enter the information stored in said first and second pluralities of memory switches into said totalizers.

4. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

disabling means controlled by the identification means for preventing further operation of the device in the event that, during the processing of any account, a record member of the second type is fed to the sensing means before a record member of the first type is so fed;

totalizers for accumulating balances;

differential means for providing input and output of information to and from the totalizers;

means for setting the differential means according to the information sensed from the record members;

a first plurality of memory switches for storage of a first type of information sensed from the first type of record member;

a second plurality of memory switches for storage of a second type of information sensed from the second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced two denominational orders to the right and entered into the totalizers by means of the solenoid-operated input means and the differential means; and sequential control means for causing the feeding means to feed a first record member to the sensing means to enable information to be sensed from the first type of record member and stored in the first plurality of memory switches, also causing the feeding means to feed a second record member to the sensing means to enable information to be sensed from the second type of record member and to be stored in the second plurality of memory switches and entered into the totalizers, and subsequently causing operation of the second and then the first read-out means to enter the information stored in said first and second pluralities of memory switches into said totalizers.

5. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;

identification means for distinguishing between record members of the first and second types;

disabling means controlled by the identification means for preventing further operation of the device in the event that, during the processing of any account, a record member of the second type is sensed by the sensing means before a record member of the first type is so sensed;

totalizers for accumulating balances;

differential means for providing input and output of information to and from the totalizers;

means for setting the differential means according to the information sensed from the record members;

a first plurality of memory switches for storage of a first type of information sensed from the first type of record member;

a second plurality of memory switches for storage of a second type of information sensed from the second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced at least one denominational order in a predetermined direction and entered into the totalizers by means of the solenoid-operated input means and the differential means; and sequential control means for causing information to be sensed from the first type of record member and stored in the first plurality of memory switches, also causing the information to be sensed from the second type of record member and to be stored in the second plurality of memory switches and entered into the totalizers, and subsequently causing operation of the second and then the first read-out means to enter the information stored in said first and second pluralities of memory switches into said totalizers.

6. In a device of the class described, capable of automatic entry of information and also capable of computation required for processing accounts, the combination comprising totalizers for accumulating balances;

new balance means for causing balances accumulated in the totalizers to be recorded on record members;

differential means for providing input and output of information to and from the totalizers;

sensing means for sensing information stored on record members;

means for setting the differential means according to the information sensed from the record members;

a first plurality of memory switches for storage of a first type of information sensed from the first type of record member;

a second plurality of memory switches for storage of a second type of information sensed from a second type of record member;

means cooperating with said differential means for entering the information sensed from the first and second types of record members into the first and second pluralities of memory switches;

solenoid-operated input means associated with the first and second pluralities of switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced at least one denominational order in a predetermined direction and entered into the totalizers by means of the solenoid-operated input means and the differential means;

sequential control means for causing information to be sensed from the first and second types of record members and stored in the first and second pluralities of memory switches, also causing information sensed from the second type of record member to be entered into the totalizers, subsequently causing operation of the second and then the first read-out means to enter the information stored in said first and second pluralities of memory switches into said totalizers, and then causing operation of the new balance means for recording the new balance accumulated in the totalizers on the second type of record member; and sorting means operable to cause record members of the second type to be sorted into a plurality of groups in accordance with the condition of the totalizers, following the new balance operation.

7. In a device of the class described, capable of automatic entry of information and also capable of computation required for processing accounts, the combination comprising totalizers for accumulating balances;

differential means for providing input and output of information to and from the totalizers;

sensing means for sensing information stored on record members;

feeding means for feeding record members to the sensing means;

means for setting the differential means according to the information sensed from the record members;

a first plurality of memory switches for storage of a first type of information sensed from a first type of record member;

a second plurality of memory switches for storage of a second type of information sensed from a second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced at least one denominational order in a predetermined direction and entered into the totalizers by means of the solenoid-operated input means and the differential means; and sequential control means for causing the feeding means to feed a first record member to the sensing means to enable information to be sensed from the first type of record member and stored in the first plurality of memory switches, also causing the feeding means to feed a second record member to the sensing means to enable information to be sensed from the second type of record member to be stored in the second plurality of memory switches and entered into the totalizers, and subsequently causing operation of the second and then the first read-out means to enter the information stored in said first and second pluralities of memory switches into said totalizers.

8. In a device of the class described, capable of automatic entry of information and also capable of computation required for processing accounts, the combination comprising totalizers for accumulating balances;

new balance means for causing balances accumulated in the totalizers to be recorded on record members;

differential means for providing input and output of information to and from the totalizers;

sensing means for sensing information stored on record members;

means for setting the differential means according to the information sensed from the record members;

a first plurality of memory switches for storage of a first type of information sensed from a first type of record member;

a second plurality of memory switches for storage of a second type of information sensed from a second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced at least one denominational order in a predetermined direction and entered into the totalizers by means of the solenoid-operated input means and the differential means; and sequential control means for causing information to be sensed from the first and second types of record members and stored in the first and second pluralities of memory switches, also causing information sensed from the second type of record member to be entered into the totalizers, subsequently causing operation of the second and then the first read-out means to enter the information stored in said first and second pluralities of memory switches into said totalizers, and then causing operation of the new balance means for recording the new balance accumulated in the totalizers on the second type of record member.

9. In a device of the class described, capable of automatic entry of information and also capable of computation required for processing accounts, the combination comprising totalizers for accumulating balances;

differential means for providing input and output of information to and from the totalizers;

sensing means for sensing information stored or record members;

means for setting the differential means according to the information sensed from the record members;

a first plurality of memory switches for storage of a first type of information sensed from a first type of record member;

a second plurality of memory switches for storage of a second type of information sensed from a second type of record member;

means cooperating with said differential means for entering the information sensed from the first and second types of record members into the first and second pluralities of memory switches;

solenoid-operated input means associated with the first and second pluralities of memory switches for entering the information stored in said switches into the totalizers via the differential means;

first read-out means for causing the information stored in said first plurality of memory switches to be entered into the totalizers by means of the solenoid-operated input means and the differential means;

second read-out means for causing the information stored in said second plurality of memory switches to be displaced at least one denominational order in a predetermined direction and entered into the totalizers by means of the solenoid-operated input means and the differential means; and sequential control means for causing information to be sensed from the first and second types of record members and stored in the first and second pluralities of memory switches, also causing information sensed from the second type of record member to be entered into the totalizers, and subsequently causing operation of the second and then the first read-out means to enter the information stored in said first and second pluralities of memory switches into said totalizers.

10. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that for each account processed, a record member of the first type is fed to the sensing means before a record member of the second type is so fed;

first disabling means controlled by the checking means for preventing further operation of the device in the event that, during the processing of any account, a record member of the second type is fed to the sensing means before a record member of the first type is so fed;

indicating means controlled by the checking means to provide a signal in the event that, during the processing of any account, a record member of the second type is fed to the sensing means before a record member of the first type is so fed;

second disabling means for preventing further operation of the device in the event that sequentially-sensed record members of the first and second types do not relate to the same account;

totalizers for accumulating balances;

differential means for providing input and output of information to and from the totalizers;

means for setting the differential means according to the information sensed from the record members;

a plurality of memory switches for storage of information sensed from the record members;

means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means; and sequential control means for causing the feeding means to feed a record member of said first type to the sensing means to enable information to be sensed from the first type of record member and stored in the memory switches, subsequently causing the feeding means to feed a record member of said second type to the sensing means to enable information to be sensed from the record member of said second type and entered into the totalizers, and then causing operation of the read-out means to enter the information stored in the memory switches into said totalizers.

11. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that for each account processed, a record member of the first type is fed to the sensing means before a record member of the second type is so fed;

disabling means controlled by the checking means for preventing further operation of the device in the event that, during the processing of any account, a record member of the second type is fed to the sensing means before a record member of the first type is so fed;

indicating means controlled by the checking means to provide a signal in the event that, during the processing of any account, a record member of the second type is fed to the sensing means before a record member of the first type is so fed;

totalizers for accumulating balances;

differential means for providing input and output of information to and from the totalizers;

means for setting the differential means according to the information sensed from the record members;

a plurality of memory switches for storage of information sensed from the record members;

means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means; and sequential control means for causing the feeding means to feed a record member of said first type to the sensing means to enable information to be sensed from the first type of record member and stored in the memory switches, subsequently causing the feeding means to feed a record member of said second type to the sensing means to enable information to be sensed from the record member of said second type and entered into the totalizers, and then causing operation of the read-out means to enter the information stored in the memory switches into said totalizers.

12. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;
feeding means for successively feeding record members to the sensing means from a stack in which the pairs of record members for the various accounts are arranged with the first type of record member for each pair located above the record member of the second type for each pair;
identification means for distinguishing between record members of the first and second types;
checking means controlled by the identification means for verifying that for each account processed, a record member of the first type is fed to the sensing means before a record member of the second type is so fed;
disabling means controlled by the checking means for preventing further operation of the device in the event that, during the processing of any account, a record member of the second type is fed to the sensing means before a record member of the first type is so fed;
totalizers for accumulating balances;
differential means for providing input and output of information to and from the totalizers;
means for setting the differential means according to the information sensed from the record members;
a plurality of memory switches for storage of information sensed from the record members;
means cooperating with said differential means for entering the information sensed from the record members into the memory switches;
solenoid-operated input means associated with the memory switches for entering the information stored in said switches into the totalizers via the differential means;
read-out means for causing the information stored in said memory switches to be entered into the totalizers by means of the solenoid-operated input means and the differential means; and
sequential control means for causing the feeding means to feed a record member of said first type to the sensing means to enable information to be sensed from the first type of record member and stored in the memory switches, subsequently causing the feeding means to feed a record member of said second type to the sensing means to enable information to be sensed from the record member of said second type and entered into the totalizers, and then causing operation of the read-out means to enter the information stored in the memory switches into said totalizers.

13. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;
feeding means for successively feeding record members to the sensing means from a stack in which the pairs of record members for the various accounts are arranged with the first type of record member for each pair located above the record member of the second type for each pair;
identification means for distinguishing between record members of the first and second types;
disabling means controlled by the identification means for preventing further operation of the device in the event that, during the processing of any account, a record member of the second type is fed to the sensing means before a record member of the first type is so fed;
totalizers for accumulating balances;
differential means for providing input and output of information to and from the totalizers;
means for setting the differential means according to the information sensed from the record members;
a plurality of memory switches for storage of information sensed from the record members;
means cooperating with said differential means for entering the information sensed from the record members into the memory switches;
solenoid-operated input means associated with the memory switches for entering the information stored in said switches into the totalizers via the differential means;
read-out means for causing the information stored in said memory switches to be entered into the totalizers by means of the solenoid-operated input means and the differential means; and
sequential control means for causing the feeding means to feed a record member of said first type to the sensing means to enable information to be sensed from the first type of record member and stored in the memory switches, subsequently causing the feeding means to feed a record member of said second type to the sensing means to enable information to be sensed from the record member of said second type and entered into the totalizers, and then causing operation of the read-out means to enter the information stored in the memory switches into said totalizers.

14. In a device of the class described, capable of automatic entry of information from first and second types of record members, and also capable of computation required for processing a plurality of accounts, information for each account being derived from a pair of record members of the two different types, the combination comprising sensing means for sensing information stored on the two types of record members;
identification means for distinguishing between record members of the first and second types;
disabling means controlled by the identification means for preventing further operation of the device in the event that, during the processing of any account, a record member of the second type is sensed by the sensing means before a record member of the first type is so sensed;
totalizers for accumulating balances;
differential means for providing input and output of information to and from the totalizers;
means for setting the differential means according to the information sensed from the record members;
a plurality of switches for storage of information sensed from the record members;
means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means; and sequential control means for causing information to be sensed from the first type of record member and stored in the memory switches, and subsequently causing information to be sensed from the record member of said second type and entered into the totalizers, and then causing operation of the read-out means to enter the information stored in the memory switches into said totalizers.

15. In a device of the class described, capable of automatic entry of information and also capable of computation required for processing accounts, the combination comprising totalizers for accumulating balances;

new balance means for causing balances accumulated in the totalizers to be recorded on record members;

differential means for providing input and output of information to and from the totalizers;

sensing means for sensing information stored on record members;

means for setting the differential means according to the information sensed from the record members;

a plurality of memory switches for storage of information sensed from the record members;

means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means;

sequential control means for causing information to be sensed from a first record member and stored in the memory switches, subsequently causing information to be sensed from a second record member and entered into the totalizers, then causing operation of the read-out means to enter the information stored in the memory switches into said totalizers, and finally causing operation of the new balance means for recording the new balance accumulated in the totalizers on the second record members; and sorting means operable to cause record members of the second type to be sorted into a plurality of groups in accordance with certain predetermined conditions, following the new balance operation.

16. In a device of the class described, capable of automatic entry of information and also capable of computation required for processing accounts, the combination comprising totalizers for accumulating balances;

differential means for providing input and output of information to and from the totalizers;

sensing means for sensing information stored on record members;

feeding means for feeding record members to the sensing means;

means for setting the differential means according to the information sensed from the record members;

a plurality of memory switches for storage of information sensed from the record members;

means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means; and sequential control means for causing the feeding means to feed a first record member to the sensing means to enable information to be sensed from said first record member and stored in the memory switches, subsequently causing the feeding means to feed a second record member to the sensing means to enable information to be sensed from said second record member and entered into the totalizers, and then causing operation of the read-out means to enter the information stored in the memory switches into said totalizers.

17. In a device of the class described, capable of automatic entry of information and also capable of computation required for processing accounts, the combination comprising totalizers for accumulating balances;

new balance means for causing balances accumulated in the totalizers to be recorded on record members;

differential means for providing input and output of information to and from the totalizers;

sensing means for sensing information stored on record members;

means for setting the differential means according to the information sensed from the record members;

a plurality of memory switches for storage of information sensed from the record members;

means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means; and sequential control means for causing information to be sensed from a first record member and stored in the memory switches, subsequently causing information to be sensed from a second record member and entered into the totalizers, then causing operation of the read-out means to enter the information stored in the memory switches into said totalizers, and finally causing operation of the new balance means for recording the new balance accumulated in the totalizers on the second record member.

18. In a device of the class described, capable of automatic entry of information and also capable of computation required for processing accounts, the combination comprising totalizers for accumulating balances;

differential means for providing input and output of information to and from the totalizers;

sensing means for sensing information stored on record members;

means for setting the differential means according to the information sensed from the record members;

a plurality of memory switches for storage of information sensed from the record members;

means cooperating with said differential means for entering the information sensed from the record members into the memory switches;

solenoid-operated input means associated with the memory switches for entering the information stored in said switches into the totalizers via the differential means;

read-out means for causing the information stored in said memory switches to be entered into the totalizers by means of the solenoid-operated input means and the differential means; and sequential control means for causing information to be sensed from a first record member and stored in the memory switches, subsequently causing information to be sensed from a second record member and entered into the totalizers, and then causing operation of the read-out means to enter the information stored in the memory switches into said totalizers.

19. In a device of the class described, capable of automatic entry of information from first and second types of record members, and also capable of computation to produce a trial balance of a plurality of accounts, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that, for each account processed, a record member of the first type is fed to the sensing means before a record member of the second type is so fed;

first disabling means controlled by the checking means for preventing further operation of the device in the event that, during the processing of any account, a record member of the second type is fed to the sensing means before a record member of the first type is so fed;

indicating means controlled by the checking means to provide a signal in the event that, during the processing of any account, a record member of the second type is fed to the sensing means before a record member of the first type is so fed;

second disabling means for preventing further operation of the device in the event that sequentially-sensed record members of the first and second types do not relate to the same account;

trial balance program means to prevent the entry into the device of information stored on all record members of the first type which are fed to the sensing means by the feeding means;

totalizers for accumulating balances;

differential means for providing input and output of information to and from the totalizers;

means for setting the differential means according to the information sensed from the second type of record members;

a first plurality of memory switches for storage of information sensed from the second type of record members;

a second plurality of memory switches for storage of information sensed from the second type of record members;

means cooperating with said differential means for entering information sensed from the second type of record members into the first and second pluralities of memory switches;

solenoid-operated input means associated with the first plurality of memory switches for entering information sensed from the second type of record members into the totalizers via the differential means;

sequential control means for effecting completion of circuits through selected memory switches and associated solenoid-operated input means to cause the input into the totalizers of information stored in the first plurality of memory switches;

circuit means associated with the second plurality of memory switches to provide a signal when the amount stored in said switches is less than a predetermined amount; and operating means controlled by the signal from the circuit means and operable to prevent the entry into the totalizers of the amount stored in the first plurality of memory switches in response to a signal from the circuit means.

20. In a device of the class described, capable of automatic entry of information from first and second types of record members, and also capable of computation to produce a trial balance of a plurality of accounts, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

checking means controlled by the identification means for verifying that, for each account processed, a record member of the first type is fed to the sensing means before a record member of the second type is so fed;

disabling means controlled by the checking means for preventing further operation of the device in the event that, during the processing of any account, a record member of the second type is fed to the sensing means before a record member of the first type is so fed;

indicating means controlled by the checking means to provide a signal in the event that, during the processing of any account, a record member of the second type is fed to the sensing means before a record member of the first type is so fed;

trial balance program means to prevent the entry into the device of information stored on all record members of the first type which are fed to the sensing means by the feeding means;

totalizers for accumulating balances;

differential means for providing input and output of information to and from the totalizers;

means for setting the differential means according to the information sensed from the second type of record members;

a first plurality of memory switches for storage of information sensed from the second type of record members;

a second plurality of memory switches for storage of information sensed from the second type of record members;

means cooperating with said differential means for entering information sensed from the second type of record members into the first and second pluralities of memory switches;

solenoid-operated input means associated with the first plurality of memory switches for entering information sensed from the second type of record members into the totalizers via the differential means;

sequential control means for effecting completion of circuits through selected memory switches and associated solenoid-operated input means to cause the input into the totalizers of information stored in the first plurality of memory switches;

circuit means associated with the second plurality of memory switches to provide a signal when the amount stored in said switches is less than a predetermined amount; and operating means controlled by the signal from the circuit means and operable to prevent the entry into the totalizers of the amount stored in the first plurality of the memory switches in response to a signal from the circuit means.

21. In a device of the class described, capable of automatic entry of information from first and second types of record members, and also capable of computation to produce a trial balance of a plurality of accounts, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

disabling means controlled by the identification means for preventing further operation of the device in the event that, during the processing of any account, a record member of the second type is fed to the sensing means before a record member of the first type is so fed;

trial balance program means to prevent the entry into the device of information stored on all record members of the first type which are fed to the sensing means by the feeding means;

totalizers for accumulating balances;

differential means for providing input and output of information to and from the totalizers;

means for setting the differential means according to the information sensed from the second type of record members;

a first plurality of memory switches for storage of information sensed from the second type of record members;

a second plurality of memory switches for storage of information sensed from the second type of record members;

means cooperating with said differential means for entering information sensed from the second type of record members into the first and second pluralities of memory switches;

solenoid-operated input means associated with the first plurality of memory switches for entering information sensed from the second type of record members into the totalizers via the differential means;

sequential control means for effecting completion of circuits through selected memory switches and associated solenoid-operated input means to cause the input into the totalizers of information stored in the first plurality of memory switches;

circuit means associated with the second plurality of memory switches to provide a signal when the amount stored in said switches is less than a predetermined amount; and operating means controlled by the signal from the circuit means and operable to prevent the entry into the totalizers of the amount stored in the first plurality of the memory switches in response to a signal from the circuit means.

22. In a device of the class described, capable of automatic entry of information from first and second types of record members, and also capable of computation to produce a trial balance of a plurality of accounts, the combination comprising sensing means for sensing information stored on the two types of record members;

identification means for distinguishing between record members of the first and second types;

disabling means controlled by the identification means for preventing further operation of the device in the event that, during the processing of any account, a record member of the second type is sensed by the sensing means before a record member of the first type is so sensed;

trial balance program means to prevent the entry into the device of information stored on all record members of the first type which are fed to the sensing means by the feeding means;

totalizers for accumulating balances;

differential means for providing input and output of information to and from the totalizers;

means for setting the differential means according to the information sensed from the second type of record members;

a first plurality of memory switches for storage of information sensed from the second type of record members;

a second plurality of memory switches for storage of information sensed from the second type of record members;

means cooperating with said differential means for entering information sensed from the second type of record members into the first and second pluralities of memory switches;

solenoid-operated input means associated with the first plurality of memory switches for entering information sensed from the second type of record members into the totalizers via the differential means;

sequential control means for effecting completion of circuits through selected memory switches and associated solenoid-operated input means to cause the input into the totalizers of information stored in the first plurality of memory switches;

circuit means associated with the second plurality of memory switches to provide a signal when the amount stored in said switches is less than a predetermined amount; and operating means controlled by the signal from the circuit means and operable to prevent the entry into the totalizers of the amount stored in the first plurality of the memory switches in response to a signal from the circuit means.

23. In a device of the class described, capable of automatic entry of information from first and second types of record members, and also capable of computation to produce a trial balance of a plurality of accounts, the combination comprising sensing means for sensing information stored on the two types of record members;

feeding means for successively feeding record members to the sensing means from a stack in which the pairs of record members for the various accounts are arranged with the first type of record member for each pair located above the record member of the second type for each pair;

identification means for distinguishing between record members of the first and second types;

disabling means controlled by the identification means for preventing further operation of the device in the event that, during the processing of any account, a record member of the second type is fed to the sensing means before a record member of the first type is so fed;

trial balance program means to prevent the entry into the device of information stored on all record members of the first type which are fed to the sensing means by the feeding means;

totalizers for accumulating balances;

differential means for providing input and output of information to and from the totalizers; and means for setting the differential means according to the information sensed from the second type of record members.

24. In a device of the class described, capable of automatic entry of information and also capable of computation required for processing accounts, the combination comprising totalizers for accumulating balances;

differential means for providing input and output of information to and from the totalizers;

sensing means for sensing information stored on record members;

means for setting the differential means according to the information sensed from the record members;

a first plurality of memory switches for storage of information sensed from the record members;

a second plurality of memory switches for storage of information sensed from the record members;

means cooperating with said differential means for entering information sensed from the record members into the first and second pluralities of memory switches;

solenoid-operated input means associated with the first plurality of memory switches for entering information sensed from the record members into the totalizers via the differential means;

read-out means for causing the input into the totalizers of an amount stored in the first plurality of memory switches, by means of the solenoid-operated input means and the differential means;

circuit means associated with the second plurality of memory switches to provide a signal when the amount stored in said switches is less than a predetermined amount;

operating means controlled by the signal from the circuit means and operable to prevent the entry into the totalizers of the amount stored in the first plurality of the memory switches in response to a signal from the circuit means; and sequential control means for causing information to be sensed from the record members and stored in the first and second pluralities of memory switches, and subsequently causing operation of the read-out means to enter the amount stored in said first plurality of memory switches into said totalizers when the amount stored in the second plurality of memory switches equals or exceeds the predetermined amount.

25. In a device of the class described, capable of automatic entry of information and also capable of computation required for processing accounts, the combination comprising totalizers for accumulating balances;

differential means for providing input and output of information to and from the totalizers;

sensing means for sensing information stored on record members;

means for setting the differential means according to the information sensed from the record members;

a first plurality of memory switches for storage of information sensed from the record members;

a second plurality of memory switches for storage of information sensed from the record members;

means cooperating with said differential means for entering information sensed from the record members into the first and second pluralities of memory switches;

solenoid-operated input means associated with the first plurality of memory switches for entering information sensed from the record members into the totalizers via the differential means;

sequential control means for effecting completion of circuits through selected memory switches and associated solenoid-operated input means to cause the input into the totalizers of information stored in the first plurality of memory switches;

circuit means associated with the second plurality of memory switches and arranged to be completed when the amount stored in said switches is less than a predetermined amount; and operating means including a relay energized by completion of the circuit means, said operating means being operable to prevent the entry into the totalizers of the amount stored in the first plurality of the memory switches, in response to a signal from the circuit means.

26. In a device of the class described, capable of automatic entry of information and also capable of computation required for processing accounts, the combination comprising totalizers for accumulating balances;

differential means for providing input and output of information to and from the totalizers;

sensing means for sensing information stored on record members;

means for setting the differential means according to the information sensed from the record members;

a first plurality of memory switches for storage of information sensed from the record members;

a second plurality of memory switches for storage of information sensed from the record members;

means cooperating with said differential means for entering information sensed from the record members into the first and second pluralities of memory switches;

solenoid-operated input means associated with the first plurality of memory switches for entering information sensed from the record members into the totalizers via the differential means;

sequential control means for effecting completion of circuits through selected memory switches and associated solenoid-operated input means to cause the input into the totalizers of information stored in the first plurality of memory switches;

circuit means associated with the second plurality of memory switches to provide a signal when the amount stored in said switches is less than a predetermined amount; and operating means controlled by the signal from the circuit means and operable to prevent the entry into the totalizers of the amount stored in the first plurality of the memory switches in response to a signal from the circuit means.

27. In a device of the class described, capable of automatic entry of information and also capable of computation required for processing accounts, the combination comprising totalizers for accumulating balances;

new balance means for causing balances accumulated in the totalizers to be recorded on record members;

differential means for providing input and output of information to and from the totalizers;

sensing and recording means for sensing information stored on record members, and for recording information on record members;

feeding means for feeding record members of two different types to the sensing and recording means;

means for setting the differential means according to the information sensed from the record members;

program selection means for causing said device to perform a transferring operation in which information is sensed from a record member of one of the two types, and is subsequently recorded on a blank record member;

checking means controlled by the program selection means for causing information to be picked up only from the selected type of record member and not from the other of said two types;

and sequential control means controlled by the program selection means for causing the feeding means to feed a record member of the selected type to the sensing and recording means to enable information to be sensed from said first record member and entered into the totalizers, for causing the feeding means to feed a blank record member to the sensing and recording means, for causing operation of the new balance means for recording the amount entered in the totalizers on the second blank record member, and for causing the feeding means to feed a record member of the non-selected type to the sensing and recording means, said checking means being operative to prevent the sensing of information from the record member of said non-selected type.

28. In a device of the class described, capable of automatic entry of information and also capable of computation required for processing accounts, the combination comprising
   totalizers for accumulating balances;
   new balance means for causing balances accumulated in the totalizers to be recorded on record members;
   differential means for providing input and output of information to and from the totalizers;
   sensing and recording means for sensing information stored on record members, and for recording information on record members;
   feeding means for feeding record members to the sensing and recording means;
   means for setting the differential means according to the information sensed from the record members;
   sequential control means for causing the feeding means to feed a first record member to the sensing and recording means to enable information to be sensed from said first record member and entered into the totalizers, for then causing the feeding means to feed a second blank record member to the sensing and recording means, and for finally causing operation of the new balance means for recording the amount entered in the totalizers on the second blank record member; and
   sorting means for causing the first and second record members to be sorted into different groups.

29. In a device of the class described, capable of automatic entry of information and also capable of computation required for processing accounts, the combination comprising
   totalizers for accumulating balances;
   new balance means for causing balances accumulated in the totalizers to be recorded on record members;
   differential means for providing input and output of information to and from the totalizers;
   sensing and recording means for sensing information stored on record members, and for recording information on record members;
   feeding means for feeding record members to the sensing and recording means;
   means for setting the differential means according to the information sensed from the record members; and
   sequential control means for causing the feeding means to feed a first record member to the sensing and recording means to enable information to be sensed from said first record member and entered into the totalizers, for then causing the feeding means to feed a second blank record member to the sensing and recording means, and for finally causing operation of the new balance means for recording the amount entered in the totalizers on the second blank record member.

30. In a device of the class described, constructed and arranged to perform a number of different total operations and to accumulate a number of different totals during automatic information-processing operations, the combination comprising
   a plurality of totalizers;
   differential means to provide input and output of information to and from the totalizers;
   totalizer selection means for selectively engaging and disengaging the totalizers with and from the differential means for input, output, and clearing of information to and from said totalizers;
   totalizer control means for each totalizer and operable to select that totalizer for operative association with the differential means;
   solenoid-operating means for the totalizer control means for each totalizer; and
   sequential operating means for sequentially energizing the various solenoid-operating means for operation of the totalizer control means to cause the information stored in each of the totalizers to be cleared therefrom.

31. In a device of the class described, constructed and arranged to perform a number of different total operations and to accumulate a number of different totals during automatic information processing operations, the combination comprising
   a plurality of totalizers;
   differential means to provide input and output of information to and from the totalizers;
   totalizer selection means for selectively engaging and disengaging the totalizers with and from the differential means for input, output, and clearing of information to and from said totalizers;
   totalizer control means for each totalizer and operable to select that totalizer for operative association with the differential means; and
   sequential operating means for sequentially operating each totalizer control means to cause the information stored in each of the totalizers to be cleared therefrom.

32. In a device of the class described, capable of automatic entry of information and also capable of computation required for processing accounts, the combination comprising
   totalizers for accumulating balances;
   differential means for providing input and output of information to and from the totalizers;
   sensing means for sensing information stored on record members;
   means for setting the differential means according to the information sensed from the record members;
   a plurality of memory switches for storage of information sensed from the record members;
   means cooperating with said differential means for entering information sensed from the record members into the memory switches;
   solenoid-operated input means associated with the memory switches for entering information sensed from the record members into the totalizers via the differential means;
   program selection means for selecting one of a number of different operating routines which may be performed by the device;
   program selection locking means to prevent changing of the program selected by the program selection means except by an authorized person; and
   sequential control means controlled by the program selection means for effecting completion of circuits through selected memory switches and associated solenoid-operated input means to cause the input into the totalizers of information stored in the memory switches.

33. In a device of the class described, capable of automatic entry of information and also capable of computation required for processing accounts, the combination comprising
   totalizers for accumulating balances;
   differential means for providing input and output of information to and from the totalizers;
   sensing means for sensing information stored on record members;
   means for setting the differential means according to the information sensed from the record members;
   a plurality of memory switches for storage of information sensed from the record members;
   means cooperating with said differential means for entering information sensed from the record members into the memory switches;
   solenoid-operated input means associated with the memory switches for entering information sensed from the record members into the totalizers via the differential means;

program selection means for selecting one of a number of different operating routines which may be performed by the device; and sequential control means controlled by the program selection means for effecting completion of circuits through selected memory switches and associated solenoid-operated input means to cause the input into the totalizers of information stored in the memory switches.

34. In a device of the class described, capable of automatic entry of information and also capable of computation required for processing accounts, the combination comprising:

totalizers for accumulating balances;

differential means for providing input and output of information to and from the totalizers;

sensing means for sensing information stored on record members;

means for setting the differential means according to the information sensed from the record members;

a plurality of memory switches for storage of information sensed from the record members;

entry means cooperating with said differential means for entering information sensed from the record members into the memory switches;

means for controlling the engagement of the entry means with the memory switches in order that the differential means can operate independently of certain of the memory switches at selected times;

solenoid-operated input means associated with the memory switches for entering information sensed from the record members into the totalizers via the differential means; and sequential control means for effecting completion of circuits through selected memory switches and associated solenoid-operated input means to cause the input into the totalizers of information stored in the memory switches.

35. In a device of the class described, capable of automatic entry of information and also capable of computation required for processing accounts, the combination comprising:

totalizers for accumulating balances;

a differential means for providing input and output of information to and from the totalizers;

sensing means for sensing information stored on record members;

means for setting the differential means according to the information sensed from the record members;

a plurality of memory switches for storage of information sensed from the record members;

entry means cooperating wtih said differential means for entering information sensed from the record members into the memory switches;

solenoid-operated input means associated with the memory switches for entering information sensed from the record members into the totalizers via the differential means; and sequential control means for effecting completion of circuits through selected memory switches and associated solenoid-operated input means to cause the input into the totalizers of information stored in the memory switches.

36. In a device of the class described, capable of automatic entry of information and also capable of computation required for processing accounts, the combination comprising:

totalizers for accumulating balances;

differential means for providing input and output of information to and from the totalizers;

sensing means for sensing information stored on record members;

means for setting the differential means according to the information sensed from the record members;

a first plurality of memory switches for storage of information sensed from the record members;

a second plurality of memory switches for storage of information sensed from the record members;

entry means engageable with the memory switches and cooperating with the differential means for entering the information sensed from the record members into the memory switches; and means for controlling the engagement of the entry means with the first plurality of memory switches and operable to disengage the entry means from said first plurality of memory switches to permit the settings of the differential means to be changed without altering the settings of the first plurality of memory switches, the settings of the second plurality of memory switches changing in accordance wtih the changing of the settings of the differential means.

37. In a device of the class described, capable of automatic entry of information and also capable of computation required for processing accounts, the combination comprising:

totalizers for accumulating balances;

differential means for providing input and output of information to and from the totalizers;

sensing means for sensing information stored on record members;

means for setting the differential means according to the information sensed from the record members;

a plurality of memory switches for storage of information sensed from the record members;

entry means engageable with the memory switches and cooperating with the differential means for entering the information sensed from the record members into the memory switches; and means for controlling the engagement of the entry means with the memory switches and operable to disengage the entry means from the memory switches to permit the setting of the differential means to be changed without altering the setting of the memory switches.

No references cited.

MAYNARD R. WILBUR, *Primary Examiner.*

D. W. COOK, *Assistant Examiner.*